US009697239B1

(12) United States Patent
Buchholz

(10) Patent No.: US 9,697,239 B1
(45) Date of Patent: Jul. 4, 2017

(54) TOKEN-BASED DATABASE SYSTEM AND METHOD OF INTERFACING WITH THE TOKEN-BASED DATABASE SYSTEM

(71) Applicant: Lars Dierk Buchholz, Ludwigsburg (DE)

(72) Inventor: Lars Dierk Buchholz, Ludwigsburg (DE)

(*) Notice: Subject to any disclaimer, the term of this patent is extended or adjusted under 35 U.S.C. 154(b) by 0 days.

(21) Appl. No.: 15/130,534

(22) Filed: Apr. 15, 2016

(51) Int. Cl.
G06F 17/30 (2006.01)
(52) U.S. Cl.
CPC .. *G06F 17/30294* (2013.01); *G06F 17/30309* (2013.01)
(58) Field of Classification Search
CPC ................. G06F 17/2247; G06F 17/30; G06F 17/30604; G06F 17/30607; G06F 9/443; G06F 17/278; G06F 17/30312; G06F 17/30997; G06F 17/30575; G06F 17/30091; G06F 17/30292; Y10S 707/99944
USPC ....................................................... 707/807
See application file for complete search history.

(56) References Cited

U.S. PATENT DOCUMENTS

2002/0069192 A1* 6/2002 Aegerter ........... G06F 17/30292
2008/0162548 A1* 7/2008 Ahmed ............. G06F 17/30908

OTHER PUBLICATIONS

Distributed Management Task Force, Article: DMTF Standard/Common Information Model (CIM) Infrastructure Specification, Document No. DSP0004, Date: Apr. 22, 2012, Version: 2.7.0, Distributed Management Task Force, Inc. (DMTF), 2012 (https://www.dmtf.org/sites/default/files/standards/documents/DSP0004_2.7.0.pdf).*

* cited by examiner

*Primary Examiner* — Evan Aspinwall
(74) *Attorney, Agent, or Firm* — Hoffmann & Baron, LLP

(57) ABSTRACT

Provided are a token-based database system and method of interfacing with the token-based database system. In accordance therewith, a token database is accessed in a memory. The token database includes a core model, which includes one or more core model tokens that provide default functionality. An extended model is generated in the token database. The extended model includes one or more non-core extended model tokens, which conform to the core model and reference the core model tokens. Thereafter, one or more non-core instance tokens are generated in the token database. The instance tokens conform to the extended model and reference the extended model tokens, wherein each of the instance tokens is configured to have zero or more connections connecting other instance tokens, and wherein the token database comprises a plurality of tokens that includes the core model tokens, the extended model tokens, and the instance tokens.

29 Claims, 56 Drawing Sheets

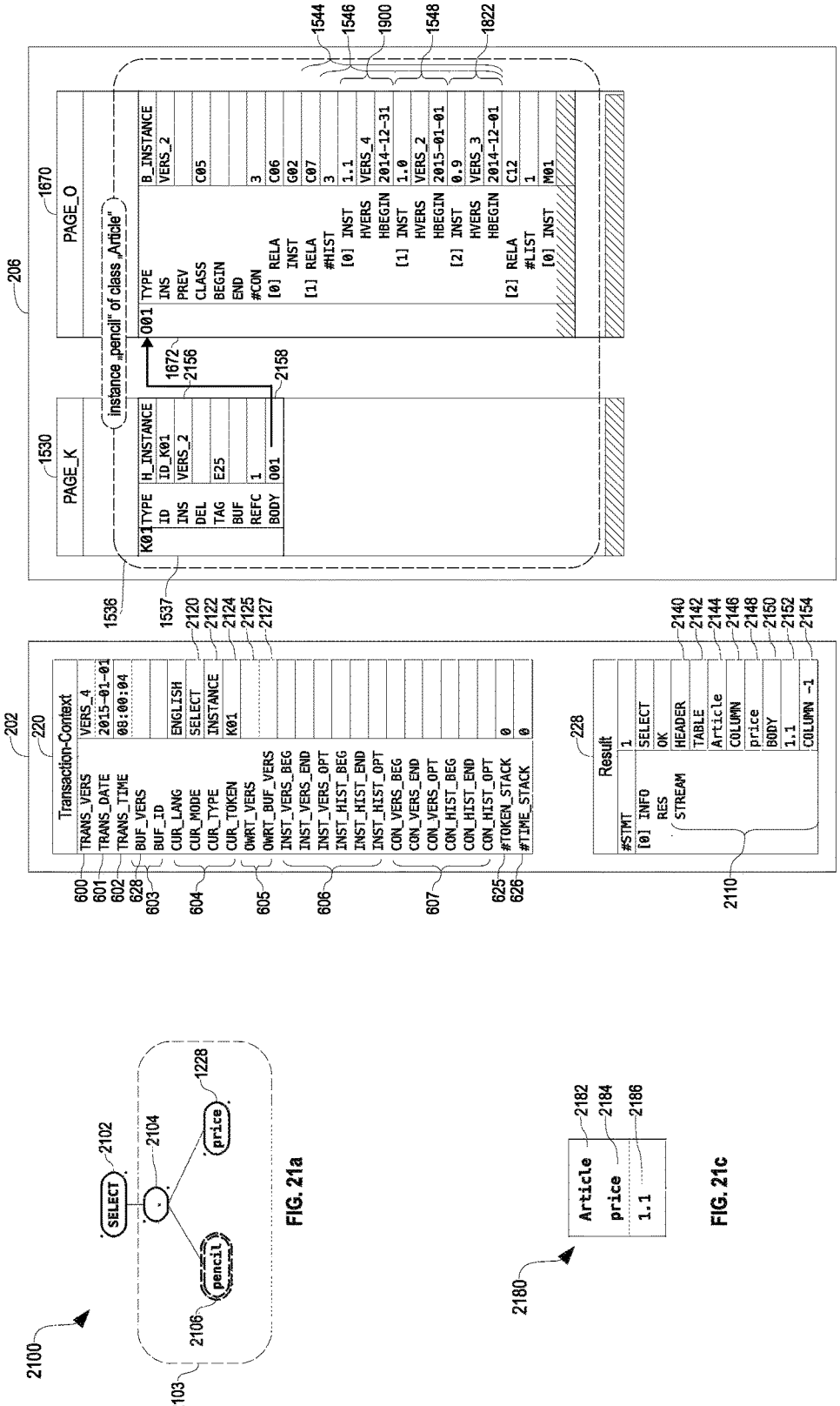

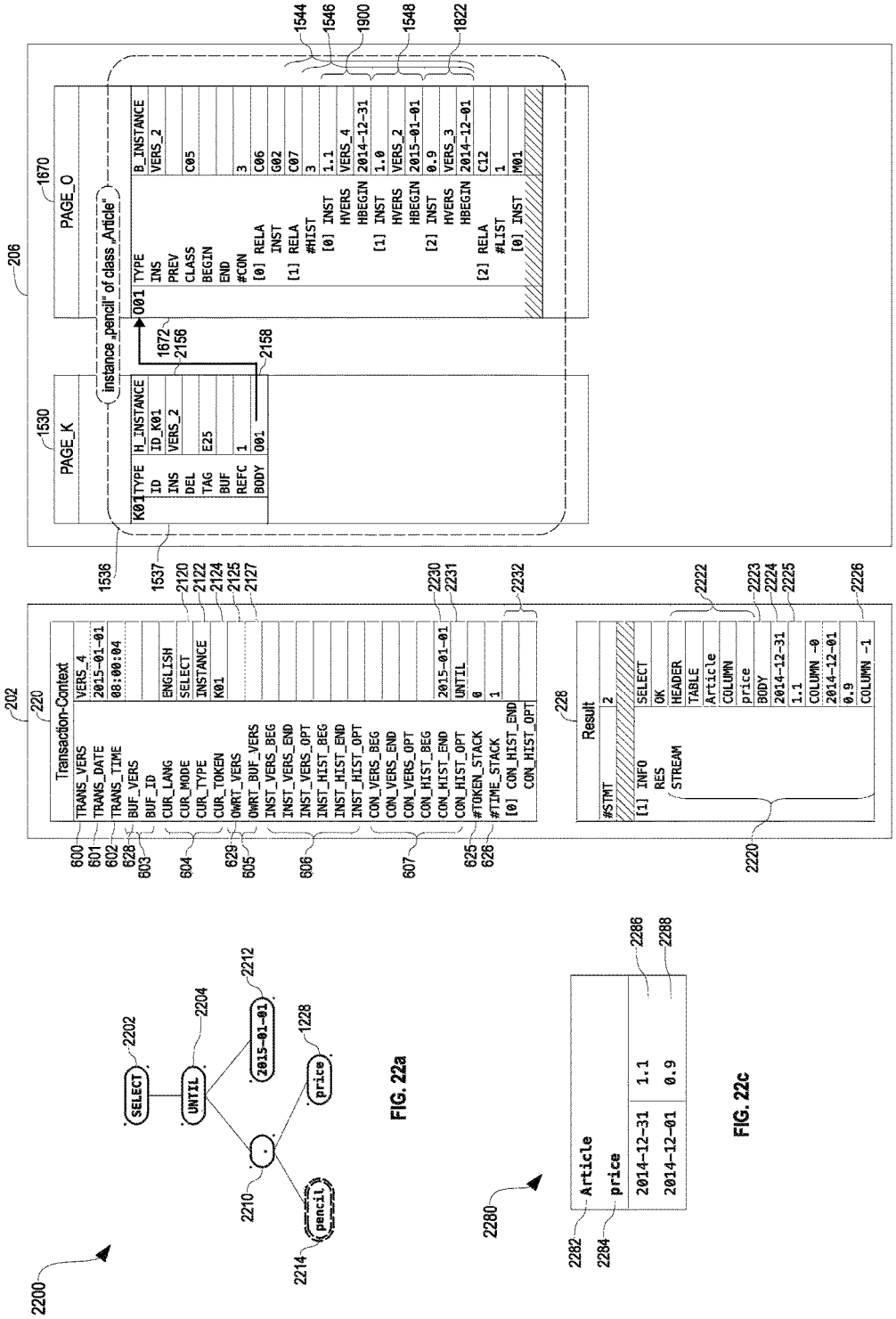

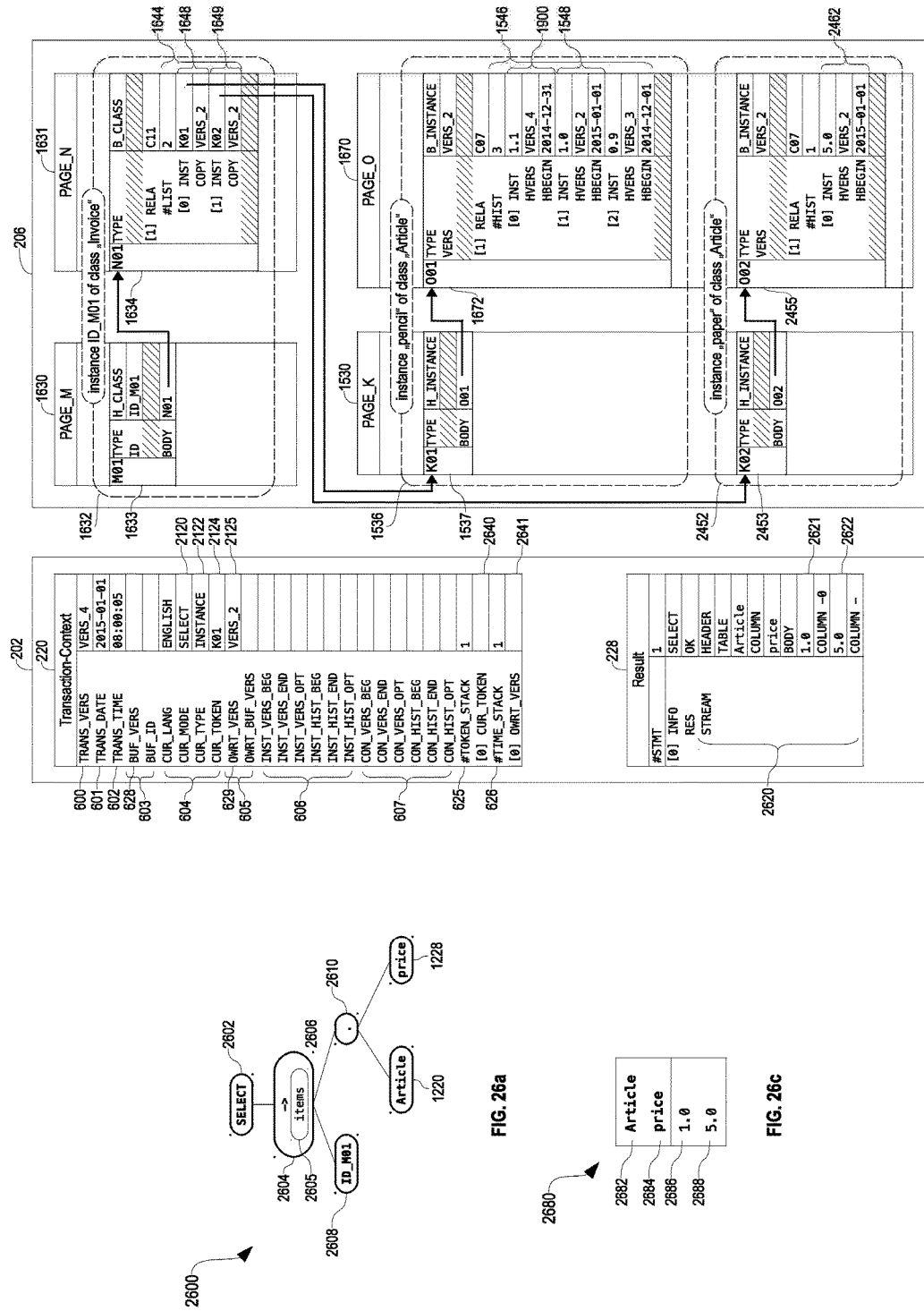

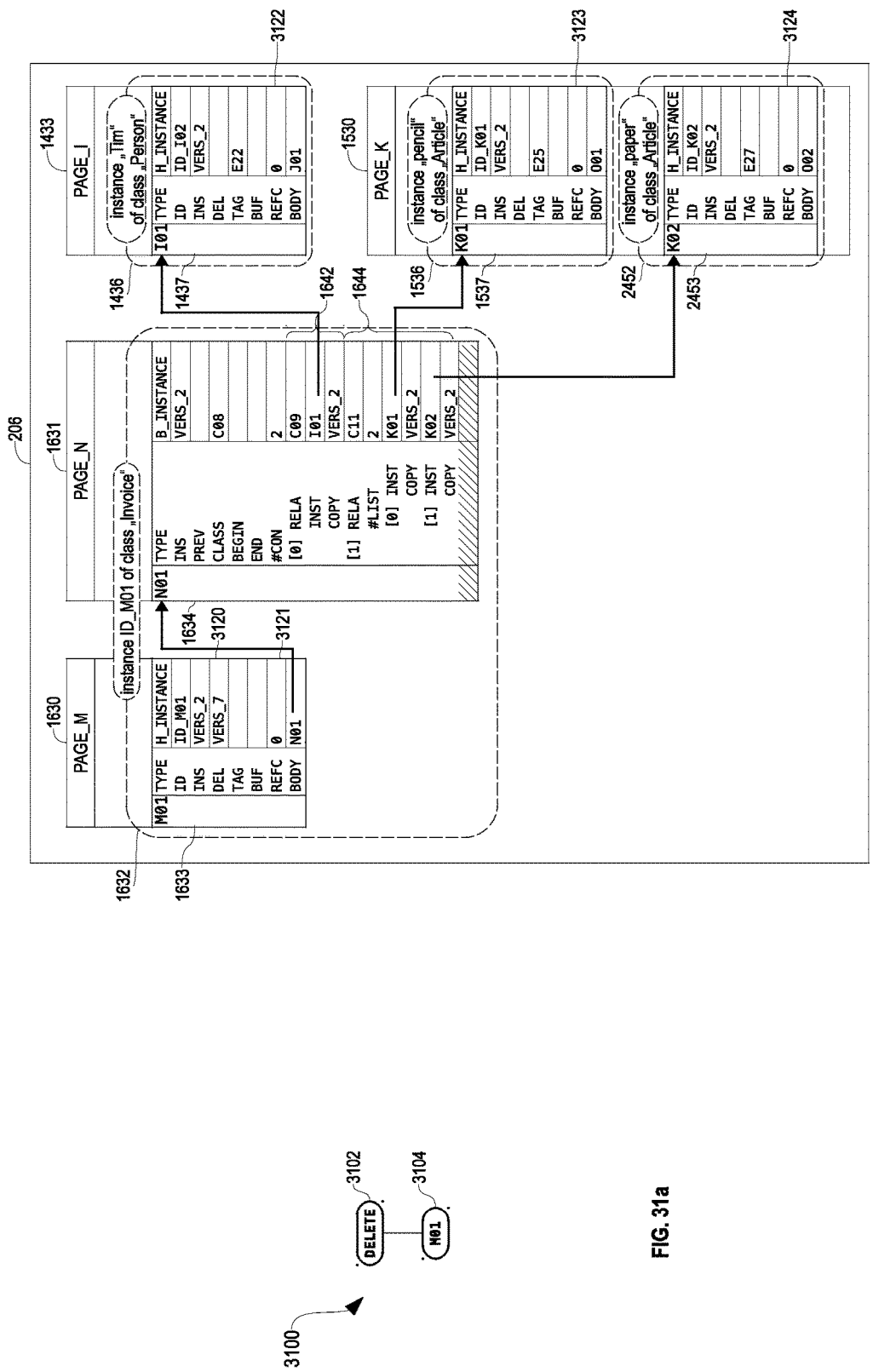

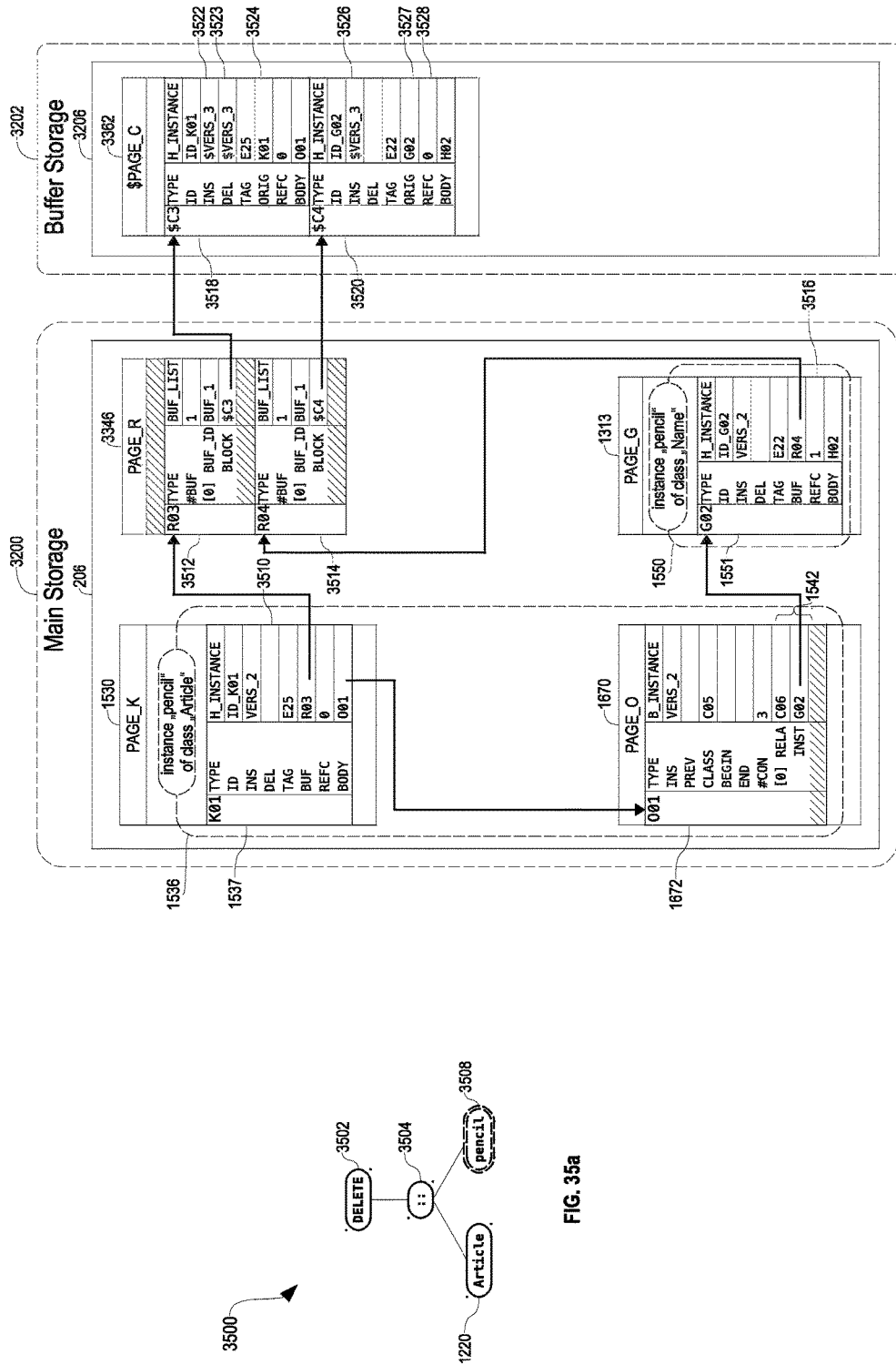

TOKEN-BASED DATABASE SYSTEM AND METHOD OF INTERFACING WITH THE TOKEN-BASED DATABASE SYSTEM

BACKGROUND

Field

The present application relates generally to database management systems. More specifically, the present application is directed to a token-based database system, and a method of interfacing with the token-based database system.

Brief Discussion of Related Art

A database is a collection of data. Typically, these data are organized according to a schema in order to support retrieval of information. For example, a hierarchical schema organizes the data in hierarchical file structures. As another example, a relational schema organizes the data in table-based data structures. Generally, a database refers to the data structures that store the data and to the data stored in the data structures.

A database management system interacts with one or more other systems to store data in and retrieve data from the database. The database management system conforms to the schema of the database and provides an interface that allows database users to insert, update, delete, and query the data in the database. The interface is typically a database language. For example, a SQL relational database management system provides a SQL database language as an interface to the data in a relational database.

The interface or database language provided by today's database management systems focus on the retrieval of information from the database and only provide weak support for modeling and validating information that is inserted into the database. For example, the SQL database language cannot be used for modeling encapsulated data objects that are automatically validated. The weak modeling and validation capabilities of today's database management systems often lead to inconsistent information in the database, which in turn can lead to erroneous results when the information is retrieved from the database.

While the database management systems can allow storage of executable code in the database (e.g., SQL stored procedures), the database management systems maintain this executable code separately from the data in the database. This represents a problem because the non-unification of the code and the data can result in further inconsistencies in the database, such that code included in the database can fail to execute on the data included in the same database.

In addition, today's databases management systems do not automatically track changes that are made to the data in the database. Many companies would benefit from such change tracking (e.g., for audit purposes), and currently must rely on full backup copies of the database. However, such "blind" copies are not suited for change tracking because it is generally difficult to identify which data have changed between the copies and when and by whom these data changes were requested.

Moreover, present database management systems do not provide an interface to a virtual copy of the database. Many companies would further benefit from such virtual copies for running what-if scenarios. In a what-if scenario a database user wants to test what effect a change of some data in the database has on the other data included in the database. However, with current database management systems all changes are immediately made permanent and are visible to all users. Therefore, companies can only run such what-if scenarios on full physical copies of the database where each copy requires considerable system resources (e.g., memory).

Accordingly, it is desirable to provide a database management system and a method of interfacing with the database that resolve the above-identified limitations, among others.

SUMMARY

The present application is directed to a token-based database system, and a method of interfacing with the token-based database system.

Unlike the databases of other database management systems, the token database of the token-based database system stores all data as tokens and references amongst the tokens. A token in the token database can represent any real world object. For example, a first token can represent (store) the color green and a second token can represent (store) a car. A reference amongst the first token and the second token can then represent (store) the color of the car. In a similar way, the token database stores code. More specifically, the token database stores code as a sequence of tokens. Using tokens to store code and also to store data enables the token-based database system to automatically keep code and data consistent in the token database.

The token database includes a core model that provides for basic functionality, such as inserting, deleting, or updating information in the database. The core model guarantees that the tokens in the token database are interconnected in a defined and structured way, which logically relates the data of the tokens in the token database. Moreover, the token-based database system is designed to automatically validate new information (e.g., code and data) against existing information (e.g., code and data) in the token database, and thus ensures the consistency of the information stored in the token database. In other words, the token database does not include tokens with inconsistent information.

Moreover, the token-based database system includes a sophisticated history-versioning mechanism that automatically tracks changes made to the data and also to the code in the token database. In this regard, the token-based database system provides a set of history-versioning operators that enable easy access of information—e.g., deleted and overwritten code and data—that has ever been stored in the token database.

Furthermore, the token-based database system includes a nonvolatile buffering mechanism that buffers changes to the code or data of the token database without affecting the actual code or data in the token database, e.g., database users can change code or data without affecting other users of the same token-database by these changes. In this regard, the buffering mechanism greatly simplifies situations where a database change is performed for testing purposes, e.g., in case of running a what-if scenario or in case of testing new or updated code.

In accordance with an embodiment or aspect, a method of interfacing with a token-based database system is disclosed. The method includes accessing a token database in a memory. The token database includes a core model, wherein the core model includes one or more core model tokens that provide default functionality. The method further includes generating an extended model in the token database. The extended model includes one or more non-core extended model tokens, wherein the extended model tokens conform to the core model and reference the core model tokens. Thereafter, the method includes generating one or more non-core instance tokens in the token database. The instance tokens conform to the extended model and reference the extended model tokens, wherein each of the instance tokens is configured to have zero or more connections connecting to other instance tokens, and wherein the token database comprises a plurality of tokens that includes the core model tokens, the extended model tokens, and the instance tokens.

The method can further include differentiating the extended model tokens into one or more of class tokens, cluster tokens, relation tokens, derived tokens, and combinations thereof, as generally summarized below.

More specifically, a class token is configured to reference zero or more instance tokens. However, a cluster token is configured to reference zero or more instance tokens that conform to one or more conditions associated with the cluster token.

Moreover, a relation token can reference one or more connections, a source token, and a target token. A connection is amongst instance tokens. The source token is one of a class token and a cluster token, wherein the source token represents a source of the connection. The target token is one of a class token and a cluster token, wherein the target token represents a target of the connection.

Yet further, the relation token can include one or more connection options associated with the connection amongst the instance tokens, the connection options include a constant option, a variable option, a copied option, and a linked option. The constant option indicates that an associated connection is constant and cannot change over time. The variable option indicates that an associated connection is variable and changeable over time. The copied option indicates that an associated connection must generate an immutable copy of one or more instance tokens associated with the connection. The linked option indicates that an associated connection must not generate an immutable copy of one or more instance tokens associated with the connection.

A derived token is configured reference zero or more instance tokens that are derived or calculated according to code associated with the derived token.

The method can further include associating a token with a version identifier in the token database, wherein the version identifier is associated with a system-generated date and time of one or more of insertion, update, and deleting the token in the token database. Similarly, the method can include associating a connection with a version identifier in the token database, wherein the version identifier is associated with a system-generated date and time of one or more of insertion, update, and deleting the connection in the token database.

In addition, the method can further include associating an instance token with at least one of a first history identifier and a second history identifier, wherein the first history identifier is associated with a user-selected date and time when the real-world object that is represented by the instance token was generated in the real world, and the second history identifier is associated with a user-selected date and time when the real-world object that is represented by the instance token was deleted in the real world. Similarly, the method can include associating a connection with at least one of a first history identifier and a second history identifier, wherein the first history identifier indicates a user-selected date and time when the connection was generated in the real world, and the second history identifier indicates a user-selected date and time when the connection was deleted in the real world.

Moreover, the method can further include representing each of the tokens using a head block in the token database, wherein the head block is a block of memory in the memory of the token-based database system. In connection with the extended model tokens or instance tokens, the method includes associating the head block of each token with one or more body blocks in the token database, wherein a body block is a block of memory in the memory of the token-based database system. In this regard, the method includes linking a first body block to the head block of each token. Where the token includes a second body block, the method includes linking the second body block to the head block, and linking the first body block to the second body block. The method can further include generating a connection in a body block of a first instance token that connects the first instance token to a head block of a second instance token.

The method can further include associating a token with a tag in the token database, wherein the tag includes a word and a language identifier, and wherein the word distinctively identifies the token using a language associated with the language identifier in the token database.

Yet further, the method can include generating an execution tree based on a sequence of tokens, wherein the execution tree includes a plurality of nodes, and wherein a node of the execution tree is associated with one or more tokens, and associating the execution tree with a current version identifier of the token database. The method can also include converting text of a database request into the sequence of tokens.

In addition, the method can include executing one or more nodes of the execution tree associated with inserting a token into the token database. In regard to insertion of the token, the method can include allocating a head block and a body block associated with the token in the token database, writing to the head block an identifier and the current version identifier, wherein the identifier identifies the head block in the token database, writing to the body block the current version identifier and one or more of a history identifier, a token sequence, a reference, a connection, and a combination of one or more thereof, and linking the body block to the head block.

Moreover, the method can further include determining whether the execution tree is associated with buffered storage, and allocating the head block and the body block in a buffer storage of the memory based on determination that the execution tree is associated with buffered storage. The method can further include determining whether the buffer storage does not exist in the memory, and generating the buffer storage in the memory based on determination that the buffer storage does not exist in the memory.

The method can further include converting text of a database request into the sequence of tokens and an unknown word, and generating the execution tree based on the sequence of tokens and the unknown word, wherein a node of the execution tree is associated with the unknown word. The method can include executing one or more nodes of the execution tree associated with inserting a token into the token database. The insertion of the token can include allocating a head block and a body block associated with the token in the token database, writing to the head block an identifier and the current version identifier, wherein the identifier identifies the head block in the token database, writing to the body block the current version identifier and one or more of a history identifier, a token sequence, a reference, a connection, and a combination of one or more thereof, and linking the body block to the head block. Further, the method can include associating the token with a tag represented by the unknown word, wherein the tag distinctively identifies the token in the token database.

Additionally, the method can further include executing one or more nodes of the execution tree associated with updating a token in the token database. In this regard, the method can include allocating a new body block associated with the token in the token database, copying contents of a previous body block associated with the token to the new body block, writing to the new body block the current version identifier and one or more of a history identifier, a token sequence, a reference, a connection, and a combination of one or more thereof, linking the previous body block to the new body block, and linking the new body block to a head block associated with the token.

Moreover, the method can further include determining whether the execution tree is associated with buffered storage, allocating the new body block associated with the token in a buffer storage of the memory based on determination that the execution tree is associated with buffered storage, and associating the new body block in the buffer storage with a corresponding head block in a main storage of the memory. The method can further include determining whether the buffer storage does not exist in the memory, and generating the buffer storage in the memory based on determination that the buffer storage does not exist in the memory.

Still further, the method can also include executing one or more nodes of the execution tree associated with deleting a token from the token database. In this regard, the method can include marking a head block associated with the token as deleted. However, the method can further include determining whether the execution tree is associated with buffered storage, allocating a new head block in a buffer storage, copying contents of a corresponding head block in a main storage to the new head block of the buffer storage, marking the new head block as deleted, and associating the new head block of the buffer storage with the corresponding head block in the main storage.

In addition, the method can further include executing one or more nodes of the execution tree associated with generating a connection amongst a first instance token and a second instance token in the token database. In this regard, the method can include writing a connection entry to a body block of the first instance token, wherein the connection entry includes a reference to a head block of the second instance token, validating the connection entry against a relation token that references the connection entry to determine whether the second instance token is referenced by a target token of the relation token, wherein the target token is one of a class token and a cluster token, and validating whether one or more connection options included in the relation token are satisfied, wherein the relation token is associated with the connection. The method can further include determining whether the relation token includes a copied option that is set, and writing the current version identifier to the connection entry based on determination that the copied option is set.

The method can further include executing one or more nodes of the execution tree associated with inserting a sequence of tokens into a token of the token database, wherein the token is one of a cluster token and a derived token, wherein the cluster token references one or more instance tokens that conform to one or more conditions associated with the cluster token, and wherein the derived token references one or more instance tokens that are derived or calculated according to code associated with the derived token. Insertion of the sequence of tokens can include allocating a body block associated with the token, writing the sequence of tokens to the body block of the token, test generating a second execution tree based on the sequence of tokens, wherein the second execution tree includes a second plurality of nodes, and linking the body block to a head block associated with the token based on a successful test generation of the second execution tree. Moreover, the insertion of the sequence of tokens can further include deleting the body block associated with the token based on an unsuccessful test generation of the second execution tree.

Additionally, the method can further include executing one or more nodes of the execution tree associated with querying one or more tokens in the token database. The method can include determining the visibility of a token being queried. The determination of visibility can further include testing one or more of whether the token is not marked as deleted, a version of the token is smaller than the current version identifier of the execution tree, and the version of the token matches a visible version range that is associated with the execution tree. The method can further include determining whether the execution tree is associated with buffered storage, and accessing a buffered token in a buffer storage associated with a token being queried, wherein the token being queried is in a main storage.

If a token being queried is an instance token, the method can include determining whether the instance token belongs to one of a class and a cluster that is associated with a node in the execution tree, and determining whether the instance token is visible based on a comparison of a history identifier associated with the instance token against a visible time range associated with the execution tree.

Furthermore, the method can further include reading one or more values from at least one of a head block and a body block of a token being queried in the token database, and appending the one or more values to a result that is associated with execution of the execution tree.

Where a token being queried is a derived token, the method can further include generating a sub-execution tree based on a sequence of tokens included in the derived token, executing the sub-execution tree that queries at least one second token in the token database, reading one or more second values from at least one of a head block and a body block of the at least one second token being queried in the token database, appending the one or more second values to a sub result that is associated with execution of the sub-execution tree, and appending the one or more second values of the sub result to one or more values of a result associated with execution of the execution tree.

However, where a token being queried is an instance token, the method further include determining whether aggregation associated with the instance token being queried is requested based on a node included in the execution tree, determining whether the instance token being queried is associated with a previously queried instance token based on a class that is in common with the instance token being queried and the previously queried instance token, reading one or more values from at least one of a head block and a body block of the token being queried in the token database; and aggregating the one or more values and one or more second values read from the previously queried instance token in a result associated with the execution tree.

In addition, the method can further include executing one or more nodes of the execution tree associated with following a connection amongst instance tokens, wherein the connection includes a reference to a source instance token, a reference to a target instance token, a reference to a relation token, a version identifier, and a history identifier. The method can further include determining visibility of the connection. The determination of visibility can include comparing the version identifier against the current version identifier and a visible version range associated with the execution tree, and comparing the history identifier against a visible time range associated with the execution tree.

Lastly, following the connection can include determining whether the connection comprises a copy version identifier indicating a latest version of the target instance token that is accessible, determining whether the target instance token is visible based on the copy version identifier, and processing the target instance token based on a successful determination of visibility.

In accordance with another embodiment or aspect, a token-based database system is disclosed. The system includes a computing device, and a memory device to store instructions that, when executed by the computing device, cause the computing device to perform the following operations. The operations include accessing a token database in a memory. The token database includes a core model, wherein the core model includes one or more core model tokens that provide default functionality. The operations further include generating an extended model in the token database. The extended model includes one or more non-core extended model tokens, wherein the extended model tokens conform to the core model and reference the core model tokens. The operations further include generating one or more non-core instance tokens in the token database. The instance tokens conform to the extended model and reference the extended model tokens, wherein each of the instance tokens is configured to have zero or more connections connecting to other instance tokens, and wherein the token database comprises a plurality of tokens that includes the core model tokens, the extended model tokens, and the instance tokens.

The operations can further include differentiating the extended model tokens into one or more of class tokens, cluster tokens, relation tokens, derived tokens, and combinations thereof, as generally summarized below.

More specifically, a class token is configured to reference zero or more instance tokens. However, a cluster token is configured to reference zero or more instance tokens that conform to one or more conditions associated with the cluster token.

Moreover, a relation token can reference one or more connections, a source token, and a target token. A connection is amongst tokens. The source token is one of a class token and a cluster token, wherein the source token represents a source of the connection. The target token is one of a class token and a cluster token, wherein the target token represents a target of the connection.

Yet further, the relation token can include one or more connection options associated with the connection amongst the instance tokens, the connection options include a constant option, a variable option, a copied option, and a linked option. The constant option indicates that an associated connection is constant and cannot change over time. The variable option indicates that an associated connection is variable and changeable over time. The copied option indicates that an associated connection must generate an immutable copy of one or more instance tokens associated with the connection. The linked option indicates that an associated connection must not generate an immutable copy of one or more instance tokens associated with the connection.

A derived token is configured to reference zero or more instance tokens that are derived or calculated according to code associated with the derived token.

The operations can further include associating a token with a version identifier in the token database, wherein the version identifier is associated with a system-generated date and time of one or more of insertion, update, and deleting the token in the token database. Similarly, the operations can include associating a connection with a version identifier in the token database, wherein the version identifier is associated with a system-generated date and time of one or more of insertion, update, and deleting the connection in the token database.

In addition, the operations can further include associating an instance token with at least one of a first history identifier and a second history identifier, wherein the first history identifier is associated with a user-selected date and time when the instance token was generated in the real world, and the second history identifier is associated with a user-selected date and time when the instance token was deleted in the real world. Similarly, the operations can include associating a connection with at least one of a first history identifier and a second history identifier, wherein the first history identifier indicates a user-selected date and time when the connection was generated in the real world, and the second history identifier indicates a user-selected date and time when the connection was deleted in the real world.

Moreover, the operations can further include representing each of the tokens using a head block in the token database. In connection with the extended model tokens or instance tokens, the operations include associating the head block of each token with one or more body blocks in the token database. In this regard, the operations include linking a first body block to the head block of each token. Where the token includes a second body block, the operations include linking the second body block to the head block, and linking the first body block to the second body block. The operations can further include generating a connection in a body block of a first instance token that connects the first instance token to a head block of a second instance token.

The operations can further include associating a token with a tag in the token database, wherein the tag includes a word and a language identifier, and wherein the word distinctively identifies the token using a language associated with the language identifier in the token database.

Yet further, the operations can include generating an execution tree based on a sequence of tokens, wherein the execution tree includes a plurality of nodes, and wherein a node of the execution tree is associated with one or more tokens, and associating the execution tree with a current version identifier of the token database. The operations can also include converting text of a database request into the sequence of tokens.

In addition, the operations can include executing one or more nodes of the execution tree associated with inserting a token into the token database. In regard to insertion of the token, the operations can include allocating a head block and a body block associated with the token in the token database, writing to the head block an identifier and the current version identifier, wherein the identifier identifies the head block in the token database, writing to the body block the current version identifier and one or more of a history identifier, a token sequence, a reference, a connection, and a combination of one or more thereof, and linking the body block to the head block.

Moreover, the operations can further include determining whether the execution tree is associated with buffered storage, and allocating the head block and the body block in a buffer storage of the memory based on determination that the execution tree is associated with buffered storage. The operations can further include determining whether the buffer storage does not exist in the memory, and generating the buffer storage in the memory based on determination that the buffer storage does not exist in the memory.

The operations can further include converting text of a database request into the sequence of tokens and an unknown word, and generating the execution tree based on the sequence of tokens and the unknown word, wherein a node of the execution tree is associated with the unknown word. The operations can include executing one or more nodes of the execution tree associated with inserting a token into the token database. The insertion of the token can include operations of allocating a head block and a body block associated with the token in the token database, writing to the head block an identifier and the current version identifier, wherein the identifier identifies the head block in the token database, writing to the body block the current version identifier and one or more of a history identifier, a token sequence, a reference, a connection, and a combination of one or more thereof, and linking the body block to the head block. Further, the operations can include associating the token with a tag represented by the unknown word, wherein the tag distinctively identifies the token in the token database.

Additionally, the operations can further include executing one or more nodes of the execution tree associated with updating a token in the token database. In this regard, the operations can include allocating a new body block associated with the token in the token database, copying contents of a previous body block associated with the token to the new body block, writing to the new body block the current version identifier and one or more of a history identifier, a token sequence, a reference, a connection, and a combination of one or more thereof, linking the previous body block to the new body block, and linking the new body block to a head block associated with the token.

Moreover, the operations can further include determining whether the execution tree is associated with buffered storage, allocating the new body block associated with the token in a buffer storage of the memory based on determination that the execution tree is associated with buffered storage, and associating the new body block in the buffer storage with a corresponding head block in a main storage of the memory. The operations can further include determining whether the buffer storage does not exist in the memory, and generating the buffer storage in the memory based on determination that the buffer storage does not exist in the memory.

Still further, the operations can also include executing one or more nodes of the execution tree associated with deleting a token from the token database. In this regard, the operations can include marking a head block associated with the token as deleted. However, the operations can further include determining whether the execution tree is associated with buffered storage, allocating a new head block in a buffer storage, copying contents of a corresponding head block in a main storage to the new head block of the buffer storage, marking the new head block as deleted, and associating the new head block of the buffer storage with the corresponding head block in the main storage.

In addition, the operations can further include executing one or more nodes of the execution tree associated with generating a connection amongst a first instance token and a second instance token in the token database. In this regard, the operations can include writing a connection entry to a body block of the first instance token, wherein the connection entry includes a reference to a head block of the second instance token, validating the connection entry against a relation token that references the connection entry to determine whether the second instance token is referenced by a target token of the relation token, wherein the target token is one of a class token and a cluster token, and validating whether one or more connection options included in the relation token are satisfied, wherein the relation token is associated with the connection. The operations can further include determining whether the relation token includes a copied option that is set, and writing the current version identifier to the connection entry based on determination that the copied option is set.

The operations can further include executing one or more nodes of the execution tree associated with inserting a sequence of tokens into a token of the token database, wherein the token is one of a cluster token and a derived token, wherein the cluster token references one or more instance tokens that conform to one or more conditions associated with the cluster token, and wherein the derived token references one or more instance tokens that are derived or calculated according to code associated with the derived token. Insertion of the sequence of tokens can include operations of allocating a body block associated with the token, writing the sequence of tokens to the body block of the token, test generating a second execution tree based on the sequence of tokens, wherein the second execution tree includes a second plurality of nodes, and linking the body block to a head block associated with the token based on a successful test generation of the second execution tree. Moreover, the insertion of the sequence of tokens can further include operations of deleting the body block associated with the token based on an unsuccessful test generation of the second execution tree.

Additionally, the operations can further include executing one or more nodes of the execution tree associated with querying one or more tokens in the token database. The operations can include determining the visibility of a token being queried. The determination of visibility can include operations of testing one or more of whether the token is not marked as deleted, a version of the token is smaller than the current version identifier of the execution tree, and the version of the token matches a visible version range that is associated with the execution tree. The operations can further include determining whether the execution tree is associated with buffered storage, and accessing a buffered token in a buffer storage associated with a token being queried, wherein the token being queried is in a main storage.

If a token being queried is an instance token, the operations can include determining whether the instance token belongs to one of a class and a cluster that is associated with a node in the execution tree, and determining whether the instance token is visible based on a comparison of a history identifier associated with the instance token against a visible time range associated with the execution tree.

Furthermore, the operations can further include reading one or more values from at least one of a head block and a body block of a token being queried in the token database, and appending the one or more values to a result that is associated with execution of the execution tree.

Where a token being queried is a derived token, the operations can further include generating a sub-execution tree based on a sequence of tokens included in the derived token, executing the sub-execution tree that queries at least one second token in the token database, reading one or more second values from at least one of a head block and a body block of the at least one second token being queried in the token database, appending the one or more second values to a sub result that is associated with execution of the sub-execution tree, and appending the one or more second values of the sub result to one or more values of a result associated with execution of the execution tree.

However, where a token being queried is an instance token, the operations further include determining whether aggregation associated with the instance token being queried is requested based on a node included in the execution tree, determining whether the instance token being queried is associated with a previously queried instance token based on a class that is in common with the instance token being queried and the previously queried instance token, reading one or more values from at least one of a head block and a body block of the token being queried in the token database; and aggregating the one or more values and one or more second values read from the previously queried instance token in a result associated with the execution tree.

In addition, the operations can further include executing one or more nodes of the execution tree associated with following a connection amongst instance tokens, wherein the connection includes a reference to a source instance token, a reference to a target instance token, a reference to a relation token, a version identifier, and a history identifier. The operations can further include determining visibility of the connection. The determination of visibility can include operations of comparing the version identifier against the current version identifier and a visible version range associated with the execution tree, and comparing the history identifier against a visible time range associated with the execution tree.

Lastly, following the connection can include operations of determining whether the connection comprises a copy version identifier indicating a latest version of the target instance token that is accessible, determining whether the target instance token is visible based on the copy version identifier, and processing the target instance token based on a successful determination of visibility.

These and other purposes, goals and advantages of the present application will become apparent from the following detailed description read in connection with the accompanying drawings.

BRIEF DESCRIPTION OF THE DRAWINGS

Some embodiments or aspects are illustrated by way of example and not limitation in the figures of the accompanying drawings in which:

FIG. 2b illustrates example memory layout of the token-based database system illustrated in FIG. 2a;

FIG. 3b illustrates an example token-tree associated with an example root-token of the logical model illustrated in FIG. 3a;

FIG. 6b illustrates an example snapshot of processing memory, index memory, and token memory after tokenizing an example first statement in the transaction of FIG. 6a;

FIG. 8b illustrates a snapshot of processing memory, index memory, and token memory after the execution of the example execution tree in FIG. 8a;

FIG. 13b illustrates snapshot of processing memory, index memory, and token memory, after execution of the execution tree illustrated in FIG. 13a;

FIG. 14b illustrates snapshot of index memory and token memory, after execution of the execution tree illustrated in FIG. 14a;

FIG. 15b illustrates snapshot of processing memory, after execution of the execution tree illustrated in FIG. 15a;

FIG. 16b illustrates snapshot of token memory after execution of the execution tree illustrated in FIG. 16a;

FIG. 17b illustrates snapshot of index memory and token memory, after execution of the execution tree illustrated in FIG. 17a;

FIG. 18b illustrates snapshot of token memory after execution of the execution tree illustrated in FIG. 18a;

FIG. 20a illustrates an example nested table generated in an example answer in response to execution of an example request to select information;

FIG. 20b illustrates an example result stream in processing memory that is the basis of the nested table illustrated in FIG. 20a;

FIG. 21a illustrates an execution tree of an example first select statement in an example fifth request;

FIG. 21b illustrates processing memory and token memory, after execution of the first select statement of FIG. 21a;

FIG. 21c illustrates an example table generated in an example answer in response to execution of the first select statement of FIG. 21a;

FIG. 22a illustrates an execution tree of an example second select statement in the fifth example request;

FIG. 22b illustrates processing memory and token memory, after execution of the second select statement of FIG. 22a;

FIG. 22c illustrates an example table generated in an example answer in response to execution of the second select statement of FIG. 21a;

FIG. 23a illustrates an execution tree of an example third select statement in the fifth example request;

FIG. 23b illustrates processing memory and token memory, after execution of the third select statement of FIG. 23a;

FIG. 23c illustrates an example table generated in an example answer in response to execution of the third select statement of FIG. 23a;

FIG. 24a illustrates an execution tree of an example fourth select statement in the fifth example request;

FIG. 24b illustrates processing memory and token memory, after execution of the fourth select statement of FIG. 24a;

FIG. 24c illustrates an example table generated in an example answer in response to execution of the fourth select statement of FIG. 24a;

FIG. 25a illustrates an execution tree of an example fifth select statement in the fifth example request;

FIG. 25b illustrates processing memory and token memory, after execution of the fifth select statement of FIG. 25a;

FIG. 25c illustrates an example table generated in an example answer in response to execution of the fifth select statement of FIG. 25a;

FIG. 26a illustrates an execution tree of an example first select statement in an example sixth request;

FIG. 26b illustrates processing memory and token memory, after execution of the first select statement of FIG. 26a;

FIG. 26c illustrates an example table generated in an example answer in response to execution of the first select statement of FIG. 26a;

FIG. 27a illustrates an execution tree of an example second select statement in the sixth request;

FIG. 27b illustrates processing memory and token memory, after execution of the second select statement of FIG. 27a;

FIG. 27c illustrates an example nested table generated in an example answer in response to execution of the second select statement of FIG. 27a;

FIG. 28a illustrates an execution tree of an example first select statement in an example seventh request;

FIG. 28b illustrates an example table generated in an example answer in response to execution of the seventh select statement of FIG. 28a;

FIG. 29b illustrates token memory after execution of the insert statement of the eighth request of FIG. 29a;

FIG. 30a illustrates an execution tree of an example update statement in an example ninth request;

FIG. 30b illustrates token memory after execution of the update statement of the ninth request of FIG. 30a;

FIG. 31a illustrates an example execution tree for an example delete statement in an example tenth request;

FIG. 31b illustrates token memory after the execution of the delete statement of the tenth request of FIG. 31a;

FIG. 33b illustrates processing memory, main storage, and buffer storage, after execution of an insert operator of the insert statement in the buffered transaction of FIG. 33a;

FIG. 33c illustrates main storage and buffer storage, after execution of the insert statement of the eleventh request of FIG. 33a;

FIG. 34b illustrates main storage and buffer storage, after execution of buffered updated statement of the twelfth request of FIG. 34a;

FIG. 35a illustrates an example execution tree of an example buffered transaction that includes a delete statement in accordance with an example thirteenth request;

FIG. 35b illustrates main storage and buffer storage, after execution of buffered delete statement of the thirteenth request of FIG. 35a;

DETAILED DESCRIPTION

A token-based database system and a method of interfacing with the token-based database system are disclosed herein. In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

Figure 1:
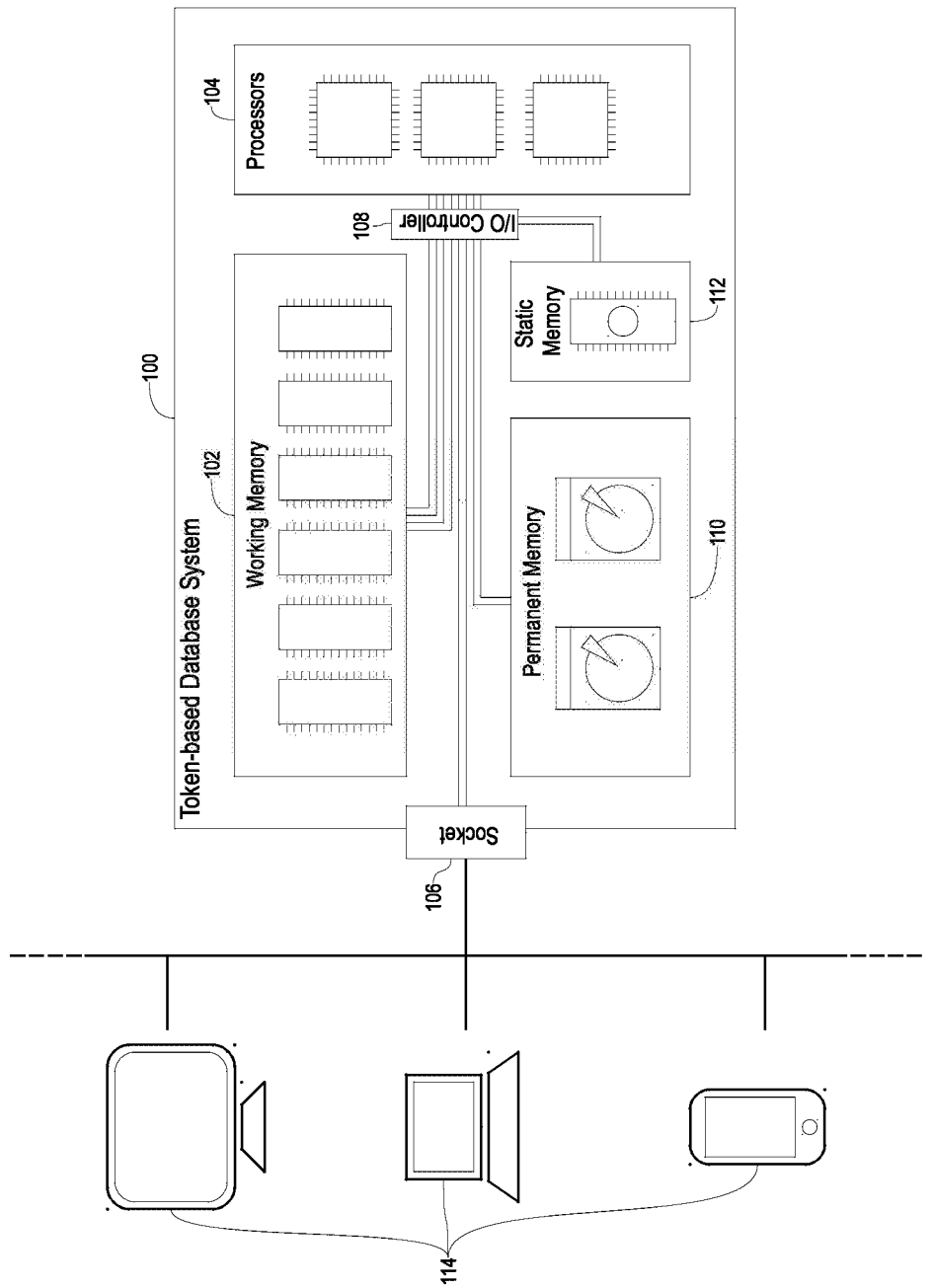
FIG. 1 illustrates a block diagram of example hardware components of an example token-based database system.

FIG. 1 illustrates a block diagram of hardware components of an example token-based database system 100. More specifically, the system 100 includes a working memory 102 (e.g., random-access-memory (RAM)), one or more processors 104, a socket 106, an input/output (I/O) controller 108, a permanent memory 110 (e.g., one or more hard-disks), and a static memory 112 (e.g., read-only memory (ROM)).

The I/O controller 108 organizes the flow of instructions and data amongst the one or more processors 104, the memory components 102, 110, 112, and the socket 106. The socket 106 connects the system 100 to one or more computing systems 114 (e.g., via Internet). The structure and function of the foregoing hardware components 102-112 will be described in greater detail with reference to FIGS. 2a and 2b.

Figure 2A:
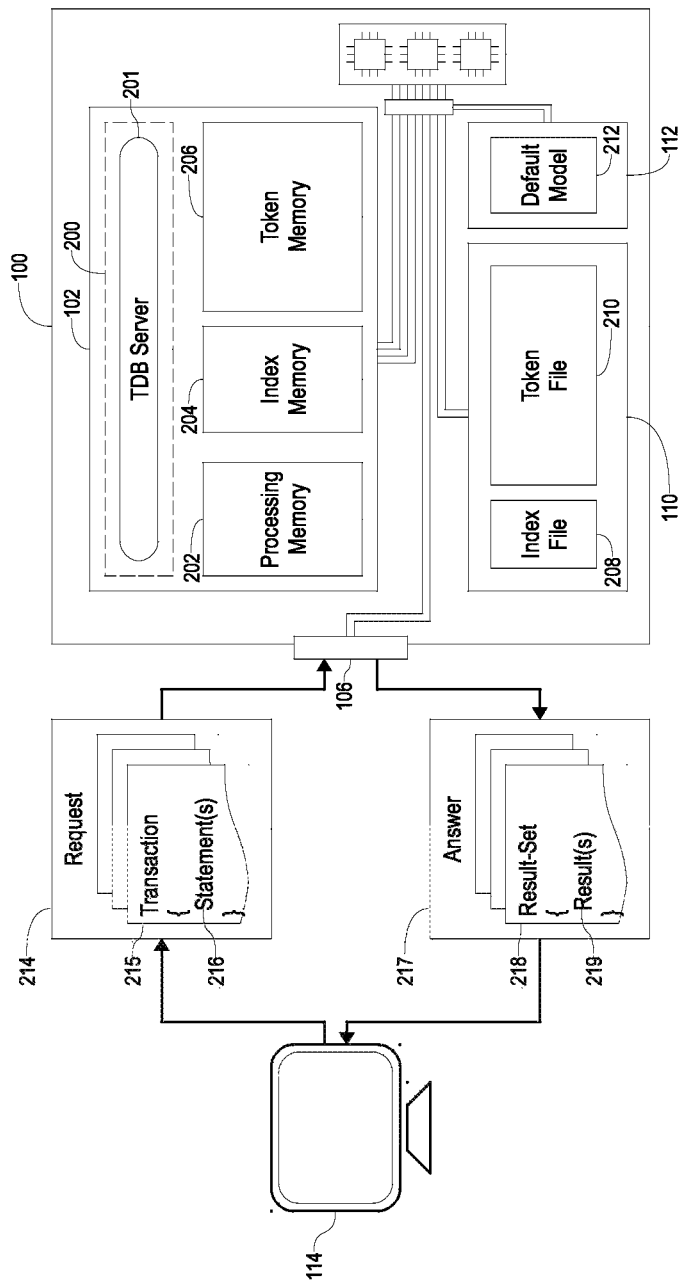
FIG. 2a illustrates a block diagram of example functional components of the token-based database system illustrated in FIG. 1.

FIG. 2a illustrates a block diagram of the functional components of the token-based database system 100. The working memory 102 is divided into component memory areas, which include a server memory 200, a processing memory 202, an index memory 204, and a token memory 206.

The server memory 200 stores a token-database server (TDB-Server) 201. The TDB-Server 201 is executed by the token-based database system 100 and enables the token-based database system 100 to receive an incoming database request 214 from a computing system 114 at the socket 106, process the request 214, and send out an answer 217 to the computing system 114 in response to the request 214. The database request 214 includes one or more transactions 215; each database transaction 215 includes one or more statements 216. The answer 217 includes one or more result-sets 218; each result-set 218 includes one or more results 219. A particular result-set 218 corresponds to a particular transaction 215, and a certain result 219 corresponds to a certain statement 216. The incoming database request 214 can be received from, and the answer 217 sent to, another computing system 114 connected to the token-based database system 100 (e.g., via the Internet).

The processing memory 202 is used by the TDB-Server 201 to store intermediate processing results, while the index memory 204 stores indexing structures used by the TDB-Server 201 to perform efficient lookup operations. The token memory 206 stores actual data in the token-based database system 100, as will be described in greater detail with reference to FIG. 2b.

The permanent memory 110 includes an index file 208 and a token file 210. The index memory 204 and the token memory 206 of the working memory 102 are mirrored into the index file 208 and the token file 210 of the permanent memory 110, respectively.

The static memory 112 includes a default model 212 of the token-based database system 100. More specifically, the default model 212 includes the functionality (hereinafter "default-functions") that the token-based database system 100 provides natively. For example, the default model 212 includes default-functions for one or more mathematical operators, e.g., plus, minus, multiply, and divide.

Figure 2B:
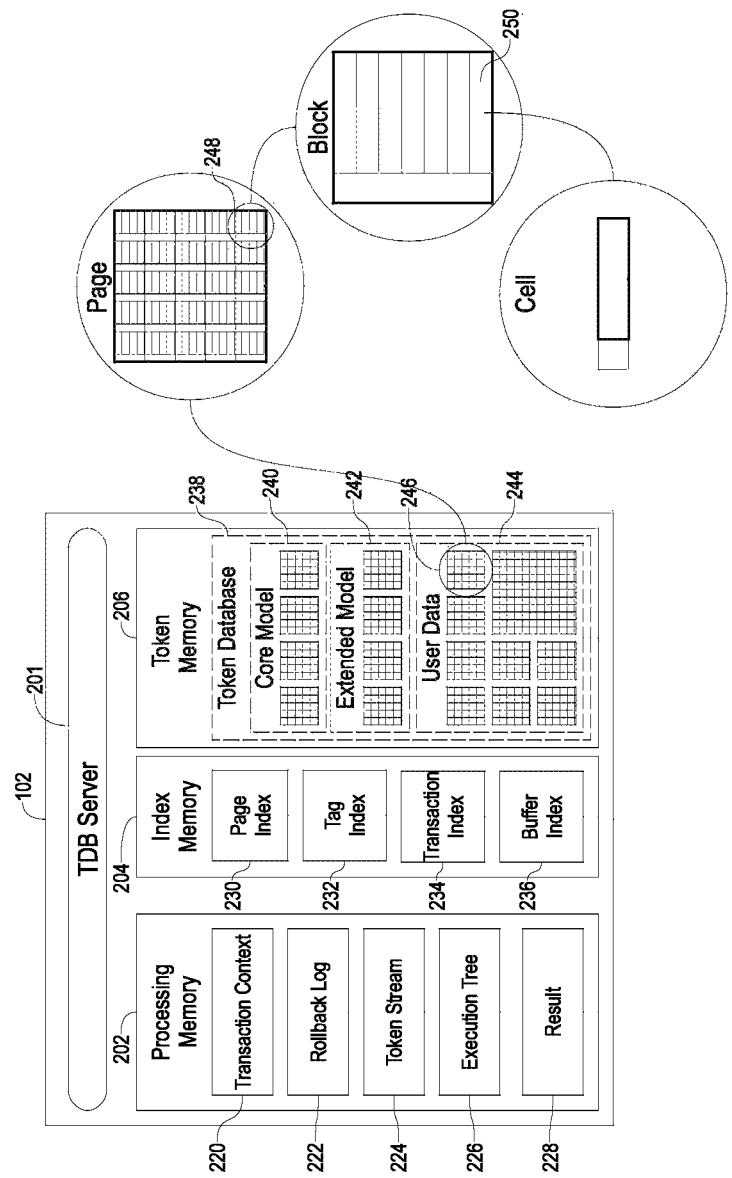

FIG. 2b illustrates the memory layout of the working memory 102 in the token-based database system 100. More specifically, FIG. 2b shows layout details of the processing memory 202, the index memory 204, and the token memory 206.

The processing memory 202 generally includes five different types of memory structures 220-228, which are generated during the processing of a database transaction 215 in the database request 214, and which are deleted after the processing of the database request 214 is completed. The memory structures include a transaction-context structure 220, rollback-log structure 222, token-stream structure 224, execution-tree structure 226, and result structure 228. It is noted that for brevity and clarity the word structure in connection with structures 220-228 is omitted in the following description (e.g., result structure 228 is simply referred to as result 228).

The transaction-context 220 stores context information that the TDB-Server 201 requires during the execution of the database transaction 215, e.g., the language in which the transaction is written. The rollback-log 222 stores information about all changes that the execution of the database transaction 215 makes to the index memory 204 and the token memory 206. These changes can be undone (rolled back) in the case of an error during execution. The token-stream 224 and the execution-tree 226 store intermediate information during the execution of the transaction 215. The result 228 stores the result-set 218 that results from the execution of the database transaction 215 and is the basis for the answer 217.

The index memory 204 includes four different types of indices 230-236. The indices include a page index 230, tag index 232, transaction index 234, and buffer index 236. The page-index 230 is an index to all memory pages that the TDB-Server 201 generates in the token memory 206. The tag-index 232 is an index to all tags (words) that are stored in the token-based database system 100. The transaction-index 234 includes a list of all transactions that changed the contents of the token-based database system 100. The buffer-index 236 is an index to all memory buffers that the TDB-Server 201 generates.

The token memory 206 includes a token database 238 of the token-based database system 100. Moreover, the token database 238 includes a core model 240, extended model 242, and user data 244. The core model 240 includes references to the default-functions of the default model 212, thus making the default-functions available in the token database 238. The extended model 242 describes (models) the structure of data that is included in the user data 244. The user data 244 includes the actual data that is stored in the token database 238 of the token-based database system 100. For example, whereas the extended model 242 can include information that models a person as an entity, which has a name and a birthdate, the user data 244 can include information about a concrete person with a name "Tim" and a birthdate of 1 Jan. 1970.

The token database 238 includes one or more memory pages 246. Each memory page 246 is sub-divided into a number of memory blocks 248, and each block 248 is further sub-divided into a number of memory cells 250. A memory cell 250 is a smallest storage unit of the token-based database system 100. The size of the memory cell 250 typically corresponds to the size of a physical memory address of a computer hardware in which the token-based database system 100 is executed (e.g., a cell on a 64-bit computer typically has the size of 64-bits or 8 bytes). All memory blocks 248 on one memory page 246 have the same size. However, different memory pages 246 can have different block sizes, and also the overall size of the memory pages 246 can vary. The information about the page size and block size is, amongst others, stored in the page-index 230.

Processing a Database Request

Figure 2C:
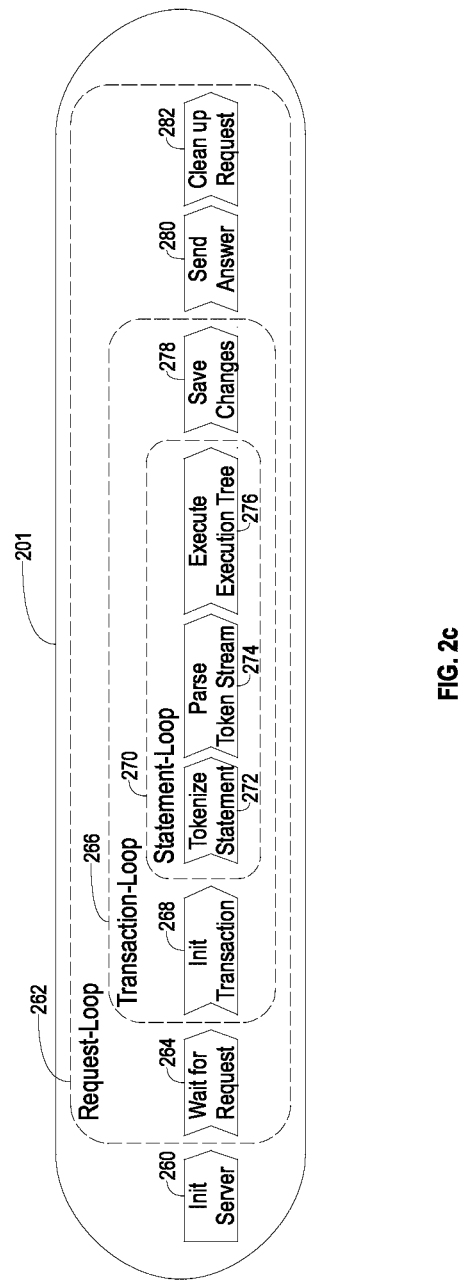
FIG. 2c illustrates an example functional block diagram of the token-based database system illustrated in FIG. 2b.

FIG. 2c illustrates an example functional block diagram of the TDB-Server 201 of the token-based database system 100, as illustrated in FIG. 2b. More specifically, the following description provides how the TDB-Server 201 processes a database request 214 and generates an answer 217, which are illustrated in FIG. 2a.

At operation 260, the TDB-Server 201 is started and initializes the token-based system 100. More specifically, the TDB-Server 201 reserves a portion of the working memory 102 and loads the contents of the index file 208 into the index memory 204 and the token file 210 into the token memory 206, if the index file 208 and the token file 210 exist. If the index file 204 and the token file 210 do not exist, the TDB-Server 201 initializes the core model 240 of the token database 238 in the token memory 206. After initialization, the TDB-Server 201 enters the request loop 262, where the TDB-Server 201 awaits a database request 214.

At operation 264, the TDB-Server 201 awaits a database request 214. The socket 106 receives the database request 214 including one or more database transactions 215 from a caller (e.g., a database user via computing device 114), and informs the TDB-Server 201. The TDB-Server 201 ends the wait processing at operation 264 and enters the transaction-loop 266, where the TDB-Server 201 performs operation 268.

At operation 268, the TDB-Server 201 initializes the processing of the first database transaction 215 in the database request 214, which, among other things, generates the transaction-context structure 220 in the processing memory 202. The TDB-Server 201 then enters the statement-loop 270.

In the statement-loop 270, the TDB-Server 201 iterates over each statement 216 set forth in the database transaction 215 using operations 272, 274, and 276. At operation 272, the TDB-Server 201 tokenizes the statement 216. More specifically, the TDB-Server 201 reads the text of the database transaction 215 word by word until an end-of-statement indicator (e.g., a semicolon). Thereafter, TDB-Server 201 converts the read words of the text into tokens (e.g., words of the database transaction 215 are looked up in the tag-index 232). The foregoing conversion results in a sequence of tokens (token-stream), which is stored in the token-stream 224.

At operation 274, the TDB-Server 201 parses the token stream in the token-stream 224. Moreover, TDB-Server 201 transforms the token-stream into an execution tree and stores the execution tree in the execution-tree 226. For example, the TDB-Server 201 can use a standard operator-precedence algorithm for the foregoing transformation.

At operation 274, the TDB-Server 201 executes the execution tree. If the execution tree includes insert, update, or delete operations, then these operations change the contents of the index memory 204 and/or the token memory 206 in the token-based database system 100. Moreover, a transaction 215 that includes statements 216, which lead to execution trees that change the index memory 204 and/or the token memory 206, is called a change-transaction. Such a change-transaction can include a single insert operation of a token into the token database 238, and can similarly include a mixture of multiple insert, update, and delete operations. Each transaction 215 that affects changes to the information in the token-based database system 100 is assigned a unique version-identifier. When the TDB-Server 201 executes a change-transaction, the version-identifier is stored together with each change that is made to the contents of the index memory 204 and/or the token memory 206. The version-identifier can, for example, be used to identify exactly which transaction made what changes in the token-based database system 100.

In addition, all of the changes to the token-based database system 100 are logged in the rollback-log 222, and thus can be undone in case of an execution error. If the execution tree includes only select operations, then these operations do not change the contents of the index memory 204 and/or the token memory 206, and the rollback-log 222 remains empty. Thereafter, a result of executing the execution tree is stored in the result 228.

After the statement-loop 270, at operation 278, the TDB-Server 201 saves possible changes in the index memory 204 and/or token memory 206 to the index-file 208 and/or token file 210. Thereafter, the TDB-Server 201 returns to operation 268, if the database request 214 includes more database transactions 215 that are to be processed.

At operation 280, the TDB-Server 201 sends out the database answer 217, which results from the execution of the database request 214. The database answer 217 can be a simple "OK" (e.g., update of some information was successful), or can be a nested result table generated in response to a query for information.

At operation 282, the TDB-Server 201 cleans up the processing memory 202 (e.g., removing the transaction-context 220, rollback-log 222, token-stream 224, execution tree 226, and result 228). Thereafter, the TDB-server 201 returns to operation 264 and awaits the next database request 214.

Logical Model of a Token-Based Database System

A key feature of the token-based database system 100 is that all information in the token memory 206 is stored in the form of tokens, as well as references among these tokens. Generally, a token represents a set of information that describes a real-world object. A real-world object can be any object that exists in the real world, including tangible objects (e.g., a certain person with name "Tim") and intangible objects (e.g., the color "red" or the mathematical operator "plus"). In order to take account of the different nature of tokens (e.g., a mathematical operator or a color), the token-based database system 100 assigns a token type to each token.

Figure 3A:
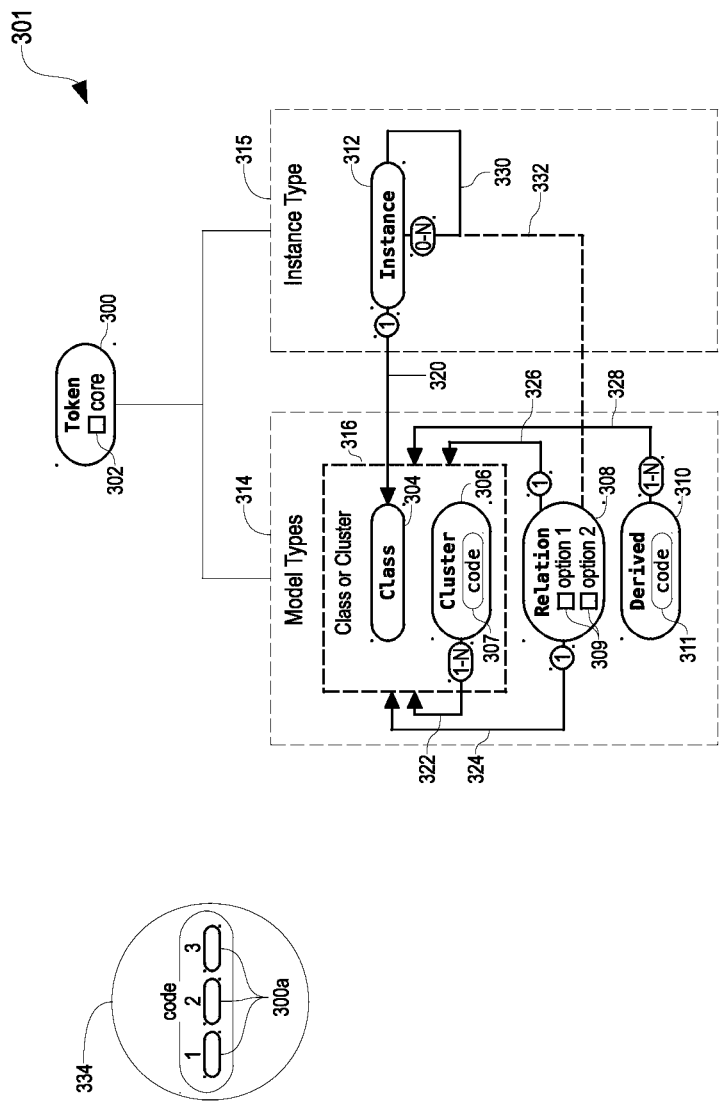
FIG. 3a illustrates different token types that form an example logical model of the token-based database system.

FIG. 3a illustrates different token types that form a logical model 301 of the token-based database system 100. The logical model 301 includes the following token types: "class" 304, "cluster" 306, "relation" 308, "derived" 310, and "instance" 312. The token types "class" 304, "cluster" 306, "relation" 308, and "derived" 310 are commonly referred to as model types 314. However, the "instance" 312 is referred to as an instance type 315. As illustrated in FIG. 3a, a prototype token 300 can be assigned one of the different token types, as described hereinafter in greater detail. The prototype token 300 includes an option core 302 (e.g., illustrated by a checkbox), which indicates whether a token is a core-token or not, as described in greater detail hereinbelow. It should be noted that the token-based database system 100 can store a plurality of tokens of various token types.

The following several paragraphs briefly describe the logical concept behind the different token types of tokens and the references among these tokens. To improve the readability of the following description, the words "token of type" will be omitted in most cases when referencing concrete tokens of a particular token type as shown in FIG. 3a. For example, a token of the token type "class" 304 will be referenced as "class-token" or simply as a "class". As another example, a token of the type "instance" 312 will be referenced as an "instance-token" or simply an "instance", and so on.

In the token-based database system 100, the prototype token 300 that has the core option 302 set (e.g., checkbox ticked) represents a reference to built-in (core) functionality included in the default-model 212 of the token-based database system 100. For example, a core-token "+" represents the functionality associated with addition. As another example, a core-token "today" represents a current date from the computer hardware in which the token-based database system 100 is implemented. In the token-based database system 100, a core-token is assigned a concrete function (default-function) that executes operations representing the core-token. For example, the core-token "+" is assigned a function that executes functionality (e.g., machine code), which performs a mathematical addition operation using one or more of the processors 104 in the token-based database system 100, as illustrated in FIG. 1.

The token-based database system 100 models the real world by grouping similar real world objects together. More specifically, a class-token 304 is a representation of a group of similar real-world objects that are represented by instance-tokens 312. As an example, all person instances (e.g., all people) are grouped into a class "Person". As another example, all color instances (e.g., colors red, green, and etcetera) are grouped into a class "Color." A reference 320, which is illustrated by an arrow extending from the instance 312 to the class 304, indicates that the instance 312 must be related to exactly one class 304, as further denoted by the numeral "1" associated with the reference 320.

In the token-based database system 100, the tokens 300 of the token type "cluster" 306 (hereinafter "cluster-token" or "cluster") are used to model the details of classes 304. As an example, a cluster "Adult" models all person instances of the class "Person" older than 18 years. A cluster 306 generally includes a condition (e.g., "older than 18 years") and references a pool of base instances to which the condition is applied (e.g., base instances 312 for the cluster "Adult" are all instances 312 referencing the class "Person"). All base instances 312 that satisfy the condition are considered part of the cluster 306. The condition is stored in code 307 of the cluster-token 306. A reference 322, which is illustrated by an arrow extending from the cluster 306 to the class or cluster 316, indicates that the base instances 312 can be from one or more classes 304 or clusters 306, as denoted by a range "1-N" associated with the reference 322. As an example, the base instances of a cluster "Legal Person" are all instances of a class "Person" and a class "Company" because a legal person can be a person as well as a company.

Moreover, tokens 300 of the token type "relation" 308 (hereinafter "relation-token" or "relation") are used to model relations amongst classes 304 and clusters 306. A reference 324, which is illustrated by an arrow extending from the relation 308 to the class or cluster 316, indicates that the relation 308 belongs to exactly one class 304 or cluster 306 (considered a source), as denoted by the numeral "1" associated with the reference 324. However, a reference 326, which is illustrated by an arrow extending from the relation 308 to the class or cluster 316, indicates that a relation 308 can relate to exactly one class 304 or cluster 306 (considered a target), as denoted by the numeral "1" associated with the reference 326. For example, the relation "birthdate" relates the class "Person" to the class "Date". It should be noted that a relation 308 can have a number of options 309, which further specify the nature of the relation between the source and the target. As an example, the options 309 can specify an option MULTIPLE, which indicates that the relation 308 can relate to multiple instances of the target class 304, or can specify an option SINGLE, which indicates that the relation 308 can at most relate to one instance of the target class 304. It should be noted that a relation 308 is also referred to as a property of a class 304. For example, the relation "birthdate" is also called the property "birthdate" of the class "Person".

In addition, tokens 300 of the token type "derived" 310 (hereinafter "derived-token" or "derived") are used to model formal dependencies (formulas) among tokens in the token-based database system 100. Token type derived 310 stores code 311, which can be used to model the formal dependencies. As an example, a derived "age" can calculate the age of a person by using a formula "today minus birthday". A reference 328, which is illustrated by an arrow extending from the derived 310 to the class or cluster 316, indicates that the code 311 can be applied to all instances 312 of one or more classes 304 or clusters 306, as denoted by the numeral "1-N" associated with the reference 328. For example, the foregoing formula for calculating "age" can be applied to all instances 312 of the class "Person".

It is noted that in the token-based database system 100, a formula (or code in general) is generally an ordered sequence of tokens. This is illustrated by inset 334 in FIG. 3a, which depicts three tokens 300a ordered by numerals 1, 2, and 3. As an example, the formula "age" from the above example can be represented by three tokens where the first two tokens 1 and 2 are the core-tokens "today" and "minus", and the third token 3 is the relation-token "birthdate". Storing code as a sequence of tokens enables the token-based database system 100 to automatically keep the code consistent with all other information (e.g., tokens) that is included in the token-based database system 100. For example, the token-based database system 100 does not allow deleting the relation-token "birthdate" as long as the relation-token "birthdate" is used in the formula of the derived-token "age".

An instance-token 312 can generally be connected to any number of other instance-tokens 312 via connection 330, as denoted by a range "0-N" associated with the connection 330. However, each such connection 330 must be assigned to a relation 308, as indicated by the dashed line 332. For example, a connection is generally not valid between an instance 312 of a person "Tim" and an instance 312 of a class "Date" (e.g., 1 Jan. 1970). However, such a connection can become valid when it is assigned to the relation "birthdate" because this relation 308 relates the class "Person" to the class "Date". It is one of the main tasks of a TDB-Server 201 to create and validate such connections amongst instances 312.

Figure 3C:
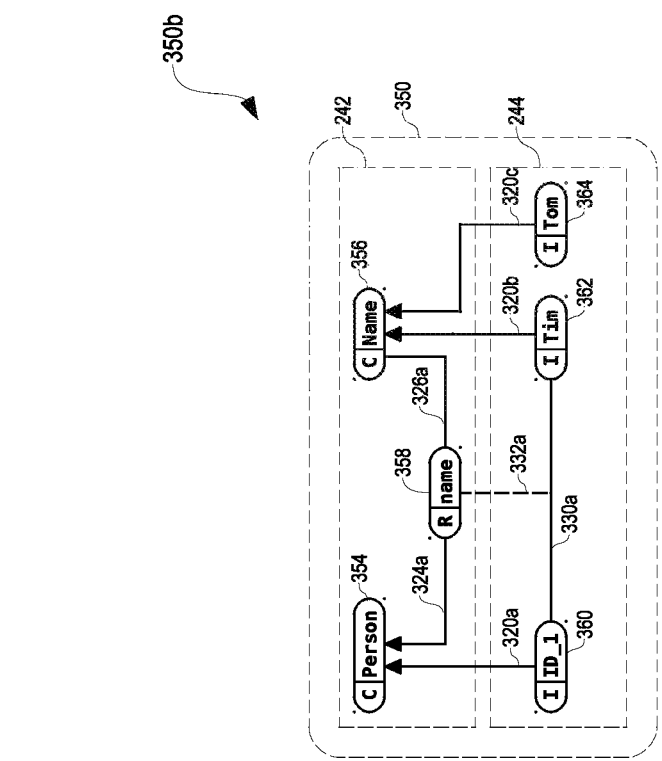
FIG. 3c illustrates connections included in an example token-web illustrated in FIG. 3b.
Figure 3B:
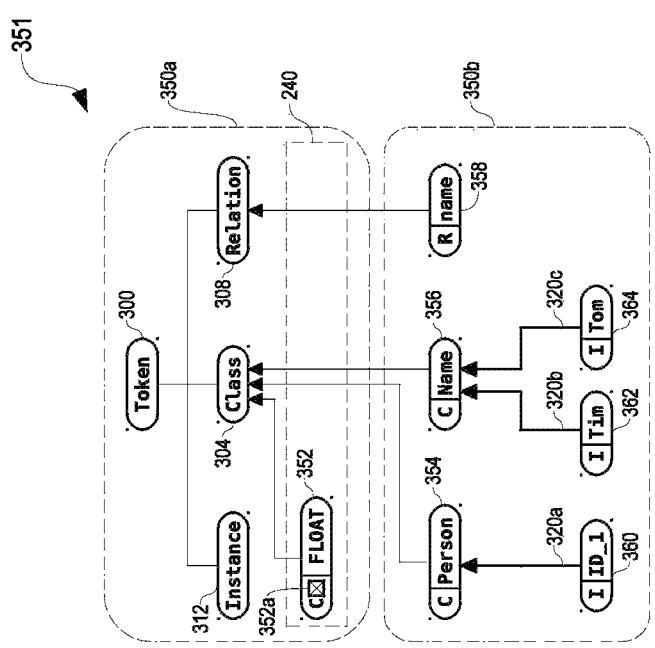

FIG. 3b illustrates a token-tree 351 associated with the root-token 300 of the logical model 301 in FIG. 3a. As illustrated, the token-tree 351 roots from the root-token 300. The token-tree 351 can be separated into two parts, the upper part 350a and the lower part 350b. The upper part 350a includes tokens from the logical model 301 (e.g., the prototype token 300) and the core-model 240 (e.g., the core-token "FLOAT" 352). It should be noted that for brevity and clarity of the description, only a subset of the tokens from the logical model 301 is illustrated in the upper part 350a. The lower part 350b is referred to as token-web and includes tokens of certain token types. More specifically, the token-web 350b includes two class tokens 354, 356 labeled "Person" and "Name", one relation token 358 labeled "name", and three instance tokens 360, 362, 364 labeled "ID_1", "Tim", and "Tom". Each token in the token-web 350b and the core-model 240 includes two parts. The left-hand part includes a single letter that indicates the type of the token, e.g., the letter "C" in token Person 354 indicates that this is a class token. Optionally, the left-hand part can include an option (e.g., option 352a in token 352), which indicates that the token 300 has the core option 302 set and thus is part of the core-model 240. The right-hand part of each token includes the label for that token.

Each token in the token-web 350b has at least one out-going reference to the token that represents its type, e.g., the token 354 has a reference to the class type token 304, which indicates that the token 354 is of type class. However, for clarity and brevity the references from the instance tokens 360, 362, 364 to the instance type token 312 are not shown, and instead the references 320a-320c are shown. The references 320a-320c are realizations of the logical reference 320 (illustrated in FIG. 3a) that relates an instance to its class 304.

FIG. 3c illustrates connections amongst instance tokens included in the token-web 350b. It should be noted that the tokens have been rearranged inside the token-web 350b for clarity of the connections.

More specifically, the relation "name" 358 is now connected via arrow 324a to its source class "Person" 354 and via arrow 326a to its target class "Name" 356. Similarly, the instance 360 of class "Person" is now connected via line 330a to the instance "Tim" 362 and via dashed line 332a to the relation "name" 358. This indicates that the (real-world) person, which is represented by the instance 360, has the name Tim. It is reiterated that in a token-based database system 100, the information is stored in the form of tokens and references amongst the tokens. For example, the name of the person represented by instance 360 is not stored as a character string "Tim" inside the token 360, but rather is stored in the form of the connection 330a to the instance 362 labeled "Tim".

The token-based database system 100 guarantees that each token in the token-web 350b can be uniquely identified by their respective labels. In order to achieve this, the token-based database system 100 applies two rules: (i) all tokens that point to (reference) another token must have a different type or label; and (ii) all tokens that have no out-going references must have different labels. For example, the token-based database system 100 would not allow changing the label of token 364 from "Tom" to "Tim" because two instance tokens 362, 364 would then point to the same token 356, which would violate rule (i). However, it would be permissible to change the label of token 360 from "ID_1" to "Tim". In this case, the token-based database system 100 can still uniquely identify token 360 by the combined labels "Person:Tim" and token 362 by combined labels "Name:Tim".

Technical Implementation of the Logical Model

Figure 4:
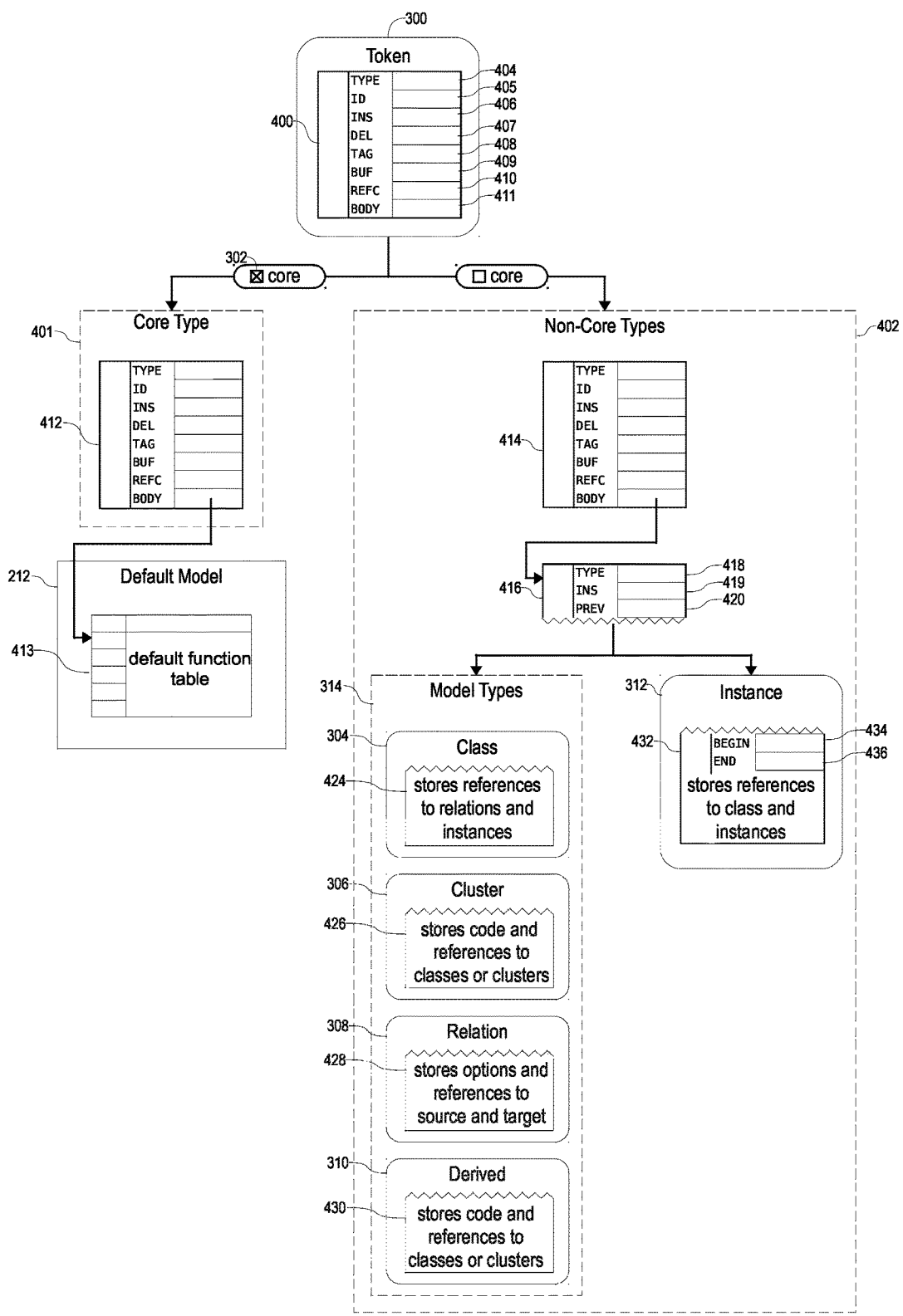
FIG. 4 illustrates an example technical realization of the logical model illustrated in FIGS. 3a-3c.

FIG. 4 illustrates the technical realization of the logical model 301 in FIGS. 3a-3c. The prototype token 300, independently of its token type, is stored in a memory block (e.g., example memory block 400) of the token memory 206 in the working memory 102 of the token-based database system 100, as described with reference to FIG. 2b. A token 300 that has the core option 302 set (e.g., as indicated by the checked box), is stored as a core type token 401 in a memory block 412. However, a token 300 that has the core option not set (e.g., as indicated by the unchecked box), is stored as a non-core type token 402 in at least two memory blocks 414 and 416, as will be described in greater detail hereinbelow.

The example memory block 400 is representative of the token 300 and includes eight cells 404-411. The cell 404 of memory block 400 is labeled as "TYPE" and stores the type of the token 300.

The cell 405 is labeled "ID" and stores an identifier for the token 300 that uniquely identifies the token 300 within all tokens that are stored in the token-based database system 100. Such IDs can be denoted in the form of "ID_A01", "ID_A02", and etcetera.

The cell 406 is labeled "INS" and stores a version-identifier that was active when the memory block 400 associated with the token 300 was generated. Such version-identifiers are denoted in the form of "VERS_0", "VERS_1", and etcetera, where VERS_1 is after VERS_0, and so on. The latest (highest) version-identifier is referred to as the active version-identifier. As described earlier, the TDB-Server 201 generates a new version-identifier for each transaction that changes information in the token-based database system 100. Such versioning generally enables the TDB-Server 201 to recreate the informational content of the token-based database system 100 as it existed on any past date.

The cell 407 is labeled "DEL" and optionally stores a version-identifier that was active when the memory block 400 associated with the token 300 was marked as deleted. It is noted that information in a token-based database system 100 is generally not physically overwritten or deleted, but rather marked as deleted. This enables the TDB-Server 201 to query also the information marked as deleted.

The cell 408 is labeled "TAG" and optionally stores a reference to a memory block (not shown in FIG. 4), which stores one or more tags. In general, a tag is a tuple that includes a word (e.g., character string) and a language-identifier (e.g., identifier specifying a language of the word). The tag provides a user-oriented way of identifying the token 300 as compared to its ID 405, which was described above. As described above, the token-based database system 100 includes validation functionality that ensures that a labeled token can always be uniquely identified. However, the token-based database system 100 can store several tags as labels for the same token 300, as long as the languages of the tags are different. For example, a token that represents the color red and has the ID of "ID_C42" can be labeled by tag "red" in the English language, and tag "rouge" in the French language. It should be noted that the implementation of tags enables the token-based database system 100 to communicate with users in different languages. For example, the token-based database system 100 can present the aforementioned token with "ID_C42" as "red" to an English speaking user or as "rouge" to a French speaking user.

The cell 409 is labeled "BUF" and optionally stores a reference to a memory block (not shown in FIG. 4), which buffers changes that are made to memory block 400. In general, the TDB-Server 201 applies changes to a memory block 400 in such a way that the changes are visible to all database users. In the alternative, the TDB-Server 201 can also write changes into buffer-blocks, which are in this case only visible to the database user who requested the usage of the buffer.

The cell 410 is labeled "REFC" and optionally stores a reference counter that indicates how many times the memory block 400 is referenced from other memory blocks. Such references result from connections among tokens (memory blocks), as illustrated in FIG. 3a. The cell 410 can be used by the TDB-Server 201 to determine whether a memory block can be removed (e.g., only a memory block with a reference counter of zero can be removed because the reference counter of zero indicates that the memory block is not referenced from any other block).

The cell 411 is labeled "BODY" and optionally stores a reference to a memory location that includes further information associated with the token 300 as described in greater detail hereinbelow.

The example memory block 400 is a representative basic block that is used for all types of tokens, as set forth in FIGS. 3a-3c and FIG. 4, e.g., the core type 401 and the non-core types 402. In the following description, a basic memory block (e.g., memory block 400) is generally referred to as a "head-block".

As further illustrated in FIG. 4, the cell 411 (BODY) of the head-block 412 includes a reference to one (1) default-function in the default-function table 413 that is included in the default model 212. The default-function table 413 includes references to the concrete implementation of each default-function. Such an implementation—for reasons of technical performance—can be hardcoded and thus static.

However, a token of the non-core types 402, unlike the token of the core type 401, generally stores dynamic information. For example, as illustrated in the logical model 301 of FIG. 3, the token type derived 310 stores the code 311 and also stores information to which class the derived 310 has a reference, as indicated by the reference 328. Some of this information (e.g., code 311) is dynamic and can change over time. For this reason, the information of non-core tokens 402 is stored in multiple memory blocks 414 and 416. As mentioned earlier, the first memory block 414 is referred to as a "head-block" and the second memory block 416 is referred to as a "body-block".

More specifically, the head-block 414 includes the information from the example basic block 400 and stores in the cell 411 (BODY) a reference to the body-block 416, which includes the additional information for the token 300 (e.g., code 311 of the derived 310). The head-block 414 generally represents the token 300, while the body-block 416 describes the token 300. For example, a class 304 is represented by a head-block 414 that includes a unique ID and a tag for the class 304, and a body-block 416 that includes a description of the class 304, such as what kind of relations 308 are associated with the class 304.

As illustrated in FIG. 4, the body-blocks 416 of all tokens 300 have the same first three cells 418, 419, and 420, as described hereinafter. In addition, the body-blocks 416 of the tokens 300 can have additional portions 424, 426, 428, 430, and 432 including cells that extend the body-blocks 416 in connection with the various non-core types 402, such as class 304, cluster 306, relation 308, derived 310 and instance 312.

More specifically, the portion 424 includes cells (not shown) that store references to relations 308 and instances 312. Portion 426 includes cells (not shown) that store code and references to other classes 304 and clusters 306. The portion 428 includes cells (not shown) that store options, a source and target class 304 or cluster 306. The portion 430 includes cells (not shown) that store code and references to classes 304 or clusters 306. The portion 432 includes cells (not shown) that store references to a class 304 and other instances 312. In addition, the portion 432 includes a cell 434 labeled as "BEGIN" and a cell 436 labeled as "END". These cells 434, 436 of the portion 432 optionally store timestamps that mark the beginning and ending of an instance 312 and are described in greater detail hereinbelow.

The cell 418 of the body-block 416 is labeled "TYPE" and includes the token type of the token 300. This information is generally redundant because the corresponding head-block 414 already includes the type of the token 300, as TYPE 404. However, as will be illustrated hereinafter, the TDB-Server 201 can use the information in cell 418 of the body-block 416 to mirror the body-blocks from the working memory 102 to the permanent memory 104 in a more efficient manner. In order to distinguish the cells 404, 418 among the head block 414 and the body block 416, the value in the cell 404 of the head-block 414 is prepended with an "H_" and the value in the cell 418 of the body-block 416 is prepended with a "B_".

The cell 419 of the body-block 416 is labeled "INS" and includes a version-identifier that was active when the body-block 416 was generated. Moreover, the cell 420 of the body-block 416 is labeled "PREM" and optionally includes a reference to another body-block (not shown), which includes a previous version of the body-block 416.

The cell "INS" 419 and the cell "PREY" 420 of the body-block 416, together with corresponding cells "INS", "DEL", and "BODY", respectively cells 406, 407, and 411 of the head-block 414, form a backbone for the versioning of the token-based database system 100. The versioning of the token-based database system 100 is briefly described hereinafter.

Whenever the TDB-Server 201 needs to update a body-block 416 (e.g., the code 311 of a derived 310 changes), then the TDB-Server 201 does not directly update the existing body-block 416, but rather copies the contents of the existing body-block 416 into a newly generated body-block (not shown) that is initially empty and then updates (applies the changes) to this copied body-block. Thereafter, the TDB-Server 201 links the copied body-block back to the original body-block 416 by storing a reference to the original body-block 416 in the "PREV" cell 420 of the copied body-block. Finally, the TDB-Server 201 changes the "BODY" cell 411 of the corresponding head-block 414 such that the head-block 414 refers to the newly-generated and updated body-block. Hereinafter, the foregoing update procedure is referred to as a body-block updating procedure, or a "micro-versioning" procedure.

It should be noted that when a body-block is updated repeatedly, the micro-versioning procedure generates a version-chain of the body-blocks where the head-block 414 refers to the most recently generated and updated body-block, and this body-block in turn refers to a previous version of the body block, and so on, until a first version of a body-block is reached at the end of the version-chain.

Similarly, when the TDB-Server 201 needs to delete information (e.g., tokens) from the token-based database system 100, the TDB-Server 201 does not physically remove the relevant information, but rather marks the relevant head-block 414 as deleted, by storing the active version-identifier in the "DEL" cell 407 of the head-block 414.

In addition to performing versioning which stores the version-identifier, the token-based database system 100 also performs historicization which stores history-identifiers. The historicization of the token-based database system 100 is briefly described hereinafter.

A history-identifier, unlike a version-identifier, is a time-stamp that reflects a real world date and a time. The date can be denoted as a formatted date or date-time format, e.g., 2015-06-21 represents the date 21 Jun. 2015. The token-based database system 100 stores history-identifiers in the cell BEGIN 434 and the cell END 436 of an instance portion 432 of the body-block 416, and also stores history-identifiers together with each connection among instances 312. For example, an instance of a person "Tim" can include a history-identifier in the cell BEGIN 434 that stores a time-stamp when the person "Tim" begins in the real world, e.g., the birthdate of the person "Tim".

Using version-identifiers and history-identifiers enables the token-based database system 100 to correctly represent back-dated changes. For example, the token-based database system 100 can store instances that represent stock quotes. Each instance (quote) is stored with a version-identifier which indicates when the quote was stored in the token-based database system 100 and a history-identifier which indicates when the quote was observed in the real-world. If at some later point in time a user of a token-based database system 100 changes a quote for a past date, then this change will also be stored with a version-identifier and a history-identifier. In this case, the history-identifier includes the timestamp that the user supplied (e.g., the past date for which the quote should be changed). However, the version-identifier includes a current timestamp from the token-based database system 100 (e.g., computer system clock) that cannot be altered by a user.

Moreover, the TDB-Server 201 implements a set of special operators included in the default-model 212—called history-version operators—that allow the database users to easily navigate or traverse the aforementioned history-identifiers and version-identifiers. These history-version operators provide to the users full access to all information that has ever been stored in the token-based database system 100. For example the history-version operators can be used by auditors to detect data manipulations, e.g., by querying all stock quotes that have been changed (manipulated) after insertion. It is noted that today's database management systems typically only provide access to a latest version of information, e.g., data that is overwritten in the database is lost and a user must rely on periodic database backups when the user wants to retrieve older versions of the database.

Implementation Examples in Token-Based Database System

The following paragraphs describe by example the operations of the TDB-Server 201. The initialization of the TDB-Server 201, including the generation of a core model 240 in the token database 238 in the token-based database system 100, is described first. Thereafter, the processing of a series of database requests 216 is described. The first of these database requests generates an extended model 242 in the token database 238 of the token-based database system 100. The database requests that follow, insert, update, and select information or data based on the model. The extended model 242 that is used in this example is a "Person-Invoice-Article" model, which allows insertion of people (e.g., customers) and articles (e.g., goods) into user data 244 of the token database 238 and further allows creation of invoices for the articles sold (e.g., articles that one or more people purchased).

As described hereinabove, the TDB-Server 201 first executes operation 260, which initializes the token-based database system 100 for the subsequent operations of the TDB-Server 201. At the beginning of the initialization, the TDB-Server 201 reserves a portion of working memory 102, which is used for internal processing (processing memory 202). The TDB-Server 201 looks for the index file 208 and the token file 210 in the permanent memory 110. If the files 208, 210 are found, then the TDB-Server 201 loads these files 208, 210 into working memory 102, generating the index memory 204 and the token memory 206. The TDB-Server 201 concludes the initialization by generating a port (not shown) on the socket 106, and then starts operation 264 that awaits (e.g., listens for) database requests 216 on the port of the socket 106.

However, if the TDB-Server 201 does not find the foregoing files 208, 210 (e.g., such as when the TDB-Server 201 is started for the first time), then the TDB-Server 201 executes a base initialization that generates a core model 240 in the token database 238 of the token-based database system 100. The core model 240 includes references to all default-functions in the default model 212 and represents these functions as core-tokens. It is noted that the default-functions in the default model 212 typically are operators, e.g., the mathematical operators such as "plus", "minus", and so on, but can also provide other functionality. An example is a default-function "Float" that provides access to the hardware representation of floating point numbers on the computer hardware on which the token-based database system 100 is executed. The core model 240 can reference a default-function that implements the "Float" functionality with a core-token "FLOAT".

The base initialization performs the following operations. The TDB-Server 201 generates default (empty) index structures (e.g., page-index 230, tag-index 232, transaction-index 234, and buffer-index 236) in the index memory 204. The TDB-Server 201 generates memory pages in core model 240 of the token memory 206. Thereafter, the TDB-Server 201 generates memory blocks 412 of the type core 401 (e.g., core-blocks) and stores references to the default-functions in the default model 212 within the core-blocks 412. The generation of such references between the core model 240 and the default model 212 is shown in greater detail in FIG. 5.

Figure 5:
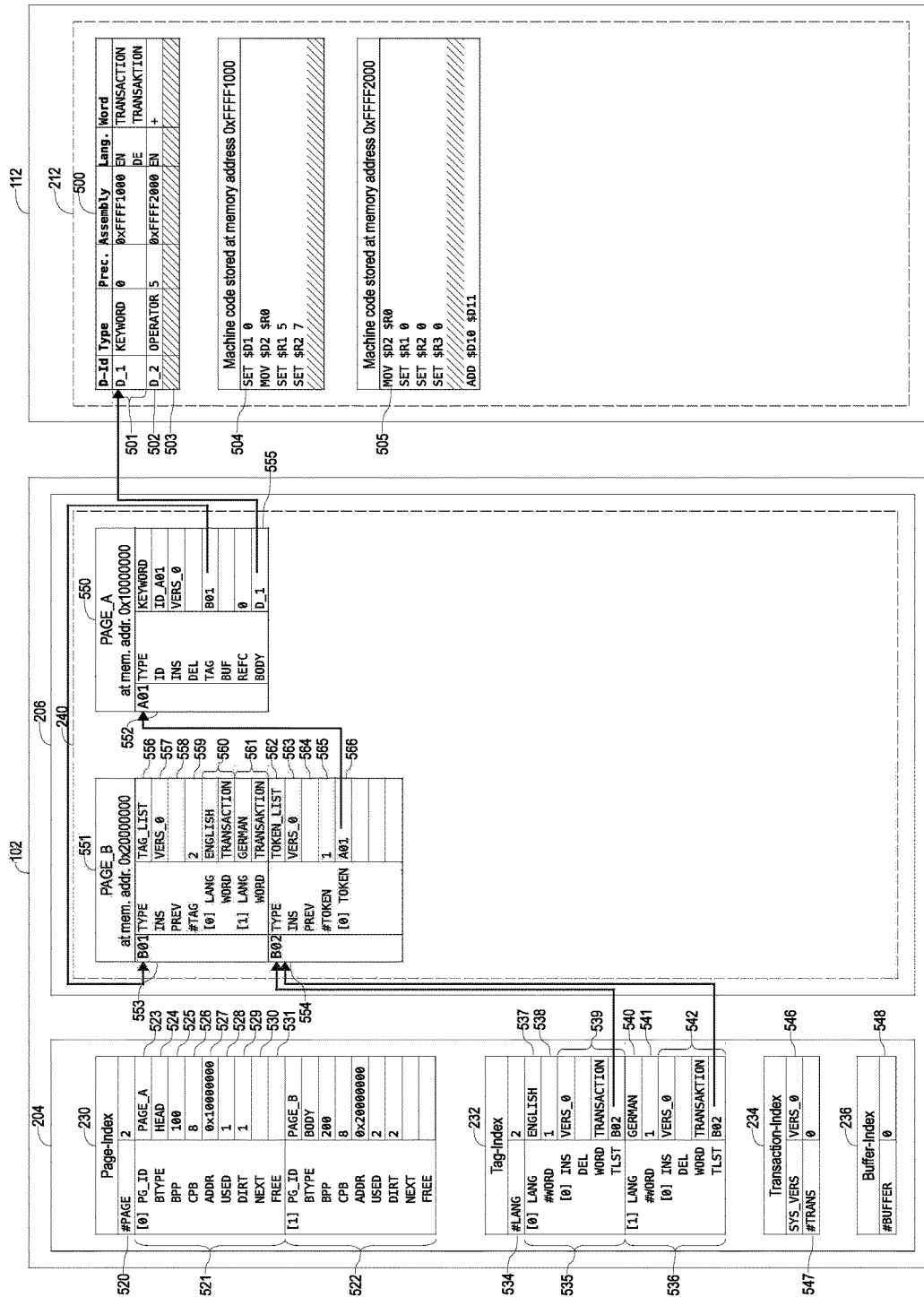
FIG. 5 illustrates example technical representation of static memory and working memory of the token-based database system illustrated in FIGS. 1-2b, including an example technical representation of a core type token illustrated in FIGS. 3a and 4.

FIG. 5 illustrates the static memory 112 and the working memory 102 of the token-based database system 100. More specifically, FIG. 5 illustrates a snapshot of the static memory 112 that includes the default model 212, and the working memory 102 that includes the index memory 204 and token memory 206, taken after the TDB-Server 201 has generated a first reference among the default model 212 and the core model 240 in token memory 206.

As particularly illustrated in FIG. 5, the default model 212 includes a default-function table 500 that lists default-functions of the default model 212 and two example memory blocks 504, 505 that store example machine code. Moreover, the index memory 204 includes indexes 230, 232, 234, and 236. In addition, the token memory 206 includes example memory pages 550 and 551.

The default-function table 500 illustrates two example default-functions of the default model 212. The first example default-function 501 is named "TRANSACTION" and implements functionality (e.g., machine code) that generates a transaction, e.g., allocates memory for a transaction-context 220 as described hereinbelow. The second example default-function 502 is named "+" and implements functionality (e.g., machine code) that adds two numbers. The hatched area 503 at the bottom of the table 500 indicates that the table 500 can include more or fewer default-functions than the example default-functions 501 and 502 illustrated in table 500.

The default-function table 500 includes six columns which are labeled as "D-Id", "Type", "Prec." ("Precedence"), "Assembly", "Lang." ("Language"), and "Word". The D-Id column includes a unique identifier for each default-function in the default model 212. Such identifiers are denoted as "D_1", "D_2", and so on.

The Type column includes the type of the default-function. Such types are typically KEYWORD or OPERATOR, but can also be one of the token types included in the logical model 301 (e.g., class 304, cluster 306, and etcetera), as described with reference to FIG. 3.

The Precedence column includes the precedence of the default-function. The precedence of a default-function determines the execution order. For example, default-functions with lower precedence are executed before default-functions with higher precedence.

The Assembly column includes a reference to a physical memory address where the executable machine code that implements the default-function is stored (e.g., memory blocks 504, 505 at memory addresses 0xFFFF1000, 0xFFFF2000, respectively).

The Language column includes an indicator for the language of a word that is included in the column Word. The Language column and the Word column together provide tag information for the associated default-function. All default-functions in the default model 212 include a tag for the English language and can optionally include more tags for other languages. For example, the default-function 501 includes a word "TRANSACTION" for the English language ("EN") and a word "TRANSAKTION" for the German language ("DE").

As aforementioned, the index memory 204 includes indexes 230, 232, 234, and 236. The page-index 230 includes information about the memory pages 550 and 551, which are included in the token memory 206 of the token-based database system 100. The first cell 520 of the page index 230 is labeled #PAGE and includes the value two (2), which indicates that the page-index 230 currently has two (2) entries 521 and 522. Constituent cells of the entry 521 will be described in greater detail. The entry 522 follows the same convention.

It should be noted that the cell labels (e.g., #PAGE) are not stored in the token-based database system 100, but are used herein to improve the readability. The TDB-Server 201 creates an entry in the page-index 230 when a new page is created in token memory 206. For example, the TDB-Server 201 creates an entry 521 in the page-index 230 that describes certain information concerning the memory page 550 (PAGE_A) in the token memory 206.

More specifically, the entry 521 in the page-index 230 includes nine (9) cells that describe the properties of the memory page 550. The cell labeled PG_ID 523 includes the value PAGE_A, which is a unique identifier for the entry 521 and thus the memory page 550 which it describes. The cell labeled BTYPE 524 includes the value HEAD, which indicates that the memory page 550 includes one or more head-blocks (e.g., head-blocks 400 as described in connection with FIG. 4). The cell labeled BPP 525 includes information concerning blocks-per-page, e.g., a number of blocks that are included in a memory page. For example, the value of 100 in cell BPP 525 indicates that page 550 (PAGE_A) has the capacity to store 100 memory blocks, such as memory block 552. The cell labeled CPB 526 includes information concerning cells-per-block, e.g., a number of cells that are included in each memory block. For example, the value 8 in cell CPB 526 indicates that each memory block (e.g., memory block 552) in the memory page 550 includes eight cells.

Moreover, the cell labeled ADDR 527 includes the physical memory address where the memory page 550 (PAGE_A) begins in the token memory 206. In example entry 521, the cell ADDR 527 includes the value 0x10000000, which is an example physical memory address on a 32-bit computer-system using hexadecimal notation. The cell labeled USED 528 includes the number of blocks that have already been used by the token-based database system 100. In the foregoing example, the cell USED 528 of entry 521 includes the value 1, which indicates that 1 of the available 100 memory blocks have been used. The cell labeled DIRT 529 includes the number of memory blocks that experienced changes in their respective cells since a last save changes operation 278, as described hereinabove with reference to FIG. 2c.

The cell labeled NEXT 530 can optionally include a reference to another page entry describing a memory page where content of the current memory page 550 (PAGE_A) is continued. The cell labeled FREE 531 can optionally include a reference to a memory block (not shown), which includes references to all memory blocks of page 550 which were used by the token-based database system 100, but which are now unused (free) again.

The tag-index 232 includes information about the tags that are stored in a token-based database system 100. More specifically, the tag-index 232 allows the TDB-Server 201 to translate the text of database requests 214 into a sequence of tokens. The first cell of the tag-index 232 is labeled as #LANG 534 and stores a number of languages for which the tag-index 232 includes tags. The tag-index 232 includes a sub-index structure in connection with each language, such that the tags for the different languages are sorted in a lexically ascending order. Such structure enables the TDB-Server 201 to apply a binary search algorithm for efficient lookup of the tags in the tag-index 232. For example, the tag-index 232 includes sub-index structures 535 and 536, with the sub-index 535 for the English language starting in cell 537, and the sub-index structure 536 for the German language starting in cell 540. The cells 537 and 540 are filled with indicators of the respective languages, ENGLISH and GERMAN.

The sub-index structures 535 and 536 have respective cells 538 and 541 labeled as #WORD. The values stored in #WORD cells indicate the number of word entries 539 and 542 that follow directly after the cells 538 and 541. Each of the word entries 539 and 542 has four associated cells that are labeled INS, DEL, WORD, and TLST. The cell INS includes the active version-identifier when the word entries 539 and 542 were generated. The cell DEL optionally includes the version-identifier when the word entries 539 and 542 were marked as deleted. The cell WORD includes the word of the tag itself (e.g., a character string). The cell TLST (token list) includes a reference to a memory block (e.g., B02) that references to one or more head-blocks (e.g., A01) of tokens, as will be described in greater detail hereinbelow.

The transaction-index 234 includes version related information of the token-based database 100, including cells SYS_VER 546 and #TRANS 547. More specifically, the cell SYS_VERS 546 stores a current (active) version-identifier (e.g., VERS_0) of the token-based database 100. During the base initialization, the version-identifier is initialized to VERS_0, indicating the base version of the token-based database 100. The version-identifier of SYS_VER 546 is incremented when the token-based database 100 is updated. The cell #TRANS 547 stores the number of transactions that have been executed by the TDB-Server 201 and have changed the contents of the index memory 204 or the token memory 206. More specifically, the value zero (0) in cell #TRANS 547 indicates that no change-transactions have been executed. It is reiterated that a transaction that only reads (selects) information from the working memory 102 does not affect the transaction-index 234.

The buffer-index 236 includes buffer related information of the token-based database 100, including a cell #BUFFER 548. More specifically, the cell #BUFFER 548 stores the number of buffers that the token-based database 100 maintains. As illustrated in FIG. 5, the #BUFFER 548 is initialized during the base initialization to a value zero (0), e.g., indicating that no buffers exist. A database user can request the usage of one or more buffers. This has the effect that subsequent database changes from such a user are not stored in token memory 206, but rather in a buffer storage (not shown). The use of buffers is described in greater detail in the following and in connection with FIG. 32.

Concerning the token memory 206, the memory pages 550 and 551 are named PAGE_A and PAGE_B, respectively. Memory page 550 currently includes a memory block 552, which is stored in token memory 206 and is referenced by a page memory address A01. However, memory page 551 currently includes memory blocks 553 and 554, which are stored in token memory 206 and are referenced by page memory addresses B01 and B02, respectively. Each of the memory blocks includes eight (8) cells, all of which are not labeled individually for clarity and brevity. Each cell in a memory block that is used has a label (middle column), which indicates the kind of information that is stored in that cell (right column). It is reiterated that the labels in the left and the middle columns of the memory pages 550 and 551 are not stored in the token-based database system 100, but rather are used herein to improve the clarity and readability of this description.

The token-based database system 100 can translate the page memory addresses A01, B01, and B02 to physical memory addresses using the information in the page-index 230, e.g., cell ADDR 527 and cell CPB 526 (cells-per-block) of the entries 521 and 522 in the page-index 230. For example, the page memory address A01 translates to a physical address 0x10000000 because the page memory address A01 refers to a first memory block of page PAGE_A, which starts at the physical memory address 0x10000000, as indicated by the value in cell ADDR 527. As another example, a page memory address A02 (not shown) refers to a second memory block of page PAGE_A 550, which starts directly after the end of the first memory block. The physical memory address of page memory address A02 is calculated by adding a size of one (1) memory block to the physical memory address of the first block. More specifically, a memory block on page PAGE_A 550 includes eight (8) cells, as indicated by the value in cell CPB 526. Assuming that a cell has a size of 8 bytes, the memory block size is thus 8x8 or 64 bytes. Accordingly, the physical memory address of page memory address A02 would be 0x10000040 (e.g., 0x40 is the hexadecimal notation of 64). The physical addresses of the memory blocks 553 and 554 of page PAGE_B 551 would be calculated accordingly, using the information in cells 527 and 526 of the entry 522 in page-index 230.

It is noted that in the working memory 102 of a token-based database system 100 all page memory references (e.g., page memory reference A01 in cell 566) are typically stored as physical memory addresses (e.g., 0x10000000) and not as page memory addresses (e.g., A01). However, for clarity and brevity of this description, the memory references are denoted as page memory addresses (hereinafter simply referred to as "memory addresses"). For further clarity and brevity, the words "at memory address" will be omitted in most cases when referencing memory blocks, e.g., the memory block at memory address A01 will simply be referred to hereinafter as memory block A01 or memory block 552.

The memory block 552 is a core-block and includes a reference 555 to the first default-function referenced as D_1 (e.g., default function 501 in the default model 212). This memory block 552 stores the information described in connection with the core-block 412, e.g., cells TYPE, ID, INS, DEL, TAG, BUF, REFC, and BODY. The cell TYPE stores the type of the memory block, which in this case is KEYWORD. The cell ID stores an identifier (ID_A01) that uniquely identifies the memory block 552 and thus the default-function 501 that it represents. The cell INS stores an insertion version-identifier (VERS_0), which indicates that the memory block 552 was generated at version zero (0). The cell DEL can optionally store the deletion version-identifier from which the core token is no longer valid in the token-based database system 100. As illustrated, the cell DEL is empty because the memory block 552 of the core token 302 has not been deleted. The cell TAG stores a reference to another memory block 553, which includes the actual tag(s) in connection with memory block 552. The cells BUF and REFC are empty and include a zero (0), respectively, and indicate that the memory block 552 has no buffer associated with it and is not referenced by other memory blocks. The cell BODY stores the ID of the default-function 501 as listed in table 500, e.g., D_1. This ID can later be used by the TDB-Server 201 as a reference to lookup details of the default-function 501, e.g., the precedence or the assembly of the default-function 501.

As illustrated in FIG. 5, the cell TAG included in memory block 552 references memory block B01 (553). The first three (3) cells of the memory block 553 include the cells TYPE 556, INS 557, and PREV 558, which are similar to the first three cells of the body-block 416 described in connection with FIG. 4. The cell TYPE 556 stores the value TAG_LIST, indicating that the memory-block 553 includes a list of tags. The cell INS 557 stores the version-identifier (VERS_0), which indicates that the memory block 553 was generated at version zero. The cell PREV 558 is empty but can optionally store a reference to a memory block that contains a previous version of the list of tags. Moreover, the cell #TAG 559 stores the number of elements or tags that are included in the memory block 553. As illustrated, the memory block 553 includes two (2) tags, tag [0] 560 and tag [1] 561. Each of the tags 560, 561 includes two (2) cells, with the first cell setting a language associated with the tag, and the second cell including the word of the tag (e.g., a character string). For example, while the first tag 560 is in English, and the word is TRANSACTION, the second tag 561 is in German, and the word is TRANSAKTION.

As further illustrated in FIG. 5, the cells TLST of word entries 539, 542 in the tag-index 232 both reference memory block B02 (554). The first three (3) cells of the memory block 554 include the cells TYPE 562, INS 563, and PREV 564. The cell TYPE 562 stores a value TOKEN_LIST indicating that the memory-block 554 includes a list of tokens. The cells INS 563 and PREV 564 include an insert version-identifier and optionally reference a previous version of the token-list. The cell #TOKEN 565 stores the number of tokens that are included in the token-list of memory block 554. As illustrated, the memory block 554 includes one (1) token (e.g., token [0] 566), which is stored in the form of a reference (e.g., memory address A01).

In general, the token-list is necessary because the same word can have different meanings within the same language, e.g., the English language. For example, the word "green" can have several meanings in the English language. More specifically, the word "green" can be a color green (e.g., "a green leaf"), an eco-friendly behavior (e.g., "a green car"), or a positive project status (e.g., "the project is green"). As such, the token-list enables the TDB-Server 201 to automatically generate meaningful responses in the case of ambiguous database requests 214. For example, the TDB-Server 201 can differentiate the color "green" from the "green" behavior, if the extended model 242 of the token-based database system 100 includes a class for "Color" and a class for "Behavior," with two tags "green" referencing instances of such classes. In this case, the TDB-Server 201 would for example not directly execute the database request 214 for "SELECT green car," but would first automatically generate a callback query to the database user with a question "Do you mean green-Color or green-Behavior?"

As mentioned earlier, FIG. 5 shows a snapshot of the working memory 102 during the initialization process 260, which is executed by the TDB-Server 201 at startup. During initialization, the TDB-Server 201 first allocates memory page PAGE_A 550, then generates the corresponding entry 521 in the page-index 230, then generates the memory block A01 (552). The memory block 552 of memory page 550 is filled with the values as described hereinabove. However, before the TDB-Server 201 can fill the cell TAG with the memory address B01, it allocates the memory page PAGE_B 551, generates the corresponding entry 522 in the page-index 230, and generates the memory block B01 (553). Then memory block 553 is filled with the values as described hereinabove. Thereafter, the TDB-Server 201 generates the memory block 554 and fills it with values as described hereinabove. Finally, the TDB-Server 201 generates the entries 539 and 542 in the tag-index 232, which reference memory block B02 (554). The TDB-Server 201 will then continue to generate a reference for the second default-function 502 in the default model 212. To do so, the TDB-Server 201 will generate another core-block (e.g., A02), and corresponding memory blocks (e.g., B03 and B04), which include a tag-list and a token-list. The initialization process 260 ends after all references among the core model 240 and the default model 212 have been generated.

After the initialization process, the TDB-Server 201 enters into the main request loop 262 as described with reference to FIG. 2c, where the TDB-Server 201 listens on a port of the socket 106, and awaits incoming database requests 214.

The following description illustrates an example database request 214 that is received and processed by the TDB-Server 201. In this example, the database request 214, once processed, extends the core model 240 of the token-based database system 100 by generating an extended model 242—Person-Invoice-Article model—used throughout the following examples. The contents of the database request 214 are shown in the example table below labeled Request 1. It is reiterated that the TDB-Server 201 affects informational changes to the token-based database system 100 in the form of one or more transactions 215 included in the database request 214. As described hereinbefore, a transaction 215 can include one or more statements 216, such as a single insert operation of a token into the token-based database system 100, and can also include a mixture of multiple insert, update, and delete operations of tokens in connection with informational changes to the token-based database system 100. In the example Request 1, the left column includes line numbers that are used solely for referencing purposes and that do not form a part of the actual database request 214, which is set forth in the right column.

REQUEST 1

| 1 | TRANSACTION ( ) { |
| 2 | INSERT Name IS CLASS; |
| 3 | |
| 4 | INSERT Person IS CLASS HAS ( |
| 5 | CONSTANT name HOLDS Name, |

REQUEST 1

| 6 | CONSTANT BEGIN birthdate HOLDS DATE); |
| 7 | |
| 8 | INSERT Article IS CLASS HAS ( |
| 9 | CONSTANT name HOLDS Name, |
| 10 | VARIABLE price HOLDS FLOAT); |
| 11 | |
| 12 | INSERT Invoice IS CLASS HAS ( |
| 13 | CONSTANT receiver HOLDS TWO_WAY COPY Person, |
| 14 | CONSTANT items HOLDS TWO_WAY MULTIPLE COPY Article); |
| 15 | } |

As illustrated immediately above, the database request 214 (Request 1) includes a transaction 215, which includes four constituent insert statements 216. The transaction starts with the keyword TRANSACTION, followed by a pair of parenthesis and a code block set forth between an opening curly brace and a closing curly brace. The pair of parenthesis following the TRANSACTION keyword can optionally include user specific settings for the transaction. For example, the transaction can set the language to German with the following setting between parenthesis of the transaction "TRANSACTION (GERMAN) { . . . }." This setting indicates to the TDB-Server 201 that the transaction is written in German and also that any results of this transaction should be returned in German. By default, the TDB-Server 201 uses the English language, which can simply be indicated by the empty parenthesis in connection with the transaction.

It should be noted that all words that are written in all capital letters in the example database requests 214 are keywords or operators that the TDB-Server 201 natively understands, e.g., the TDB-Server 201 finds hard-coded implementations that can process and execute these keywords and operators in the default model 212, as described in detail hereinabove. The implementation of the particular keywords will be described in greater detail in connection with each statement 216 of the database request 214 (Request 1).

The first insert statement in Request 1 inserts a class called "Name" into the extended model 242 of the token-based database system 100. The instances of this class can be names such as "Tim", "Tom", "Agnes" and etcetera. The first insert statement includes the keywords INSERT, the operator IS, the keyword CLASS, and a semicolon (";") that is also considered a keyword. The keyword INSERT indicates that the current statement, e.g., the first statement in Request 1, inserts new information into the token-based database system 100. The operator IS allocates a new head-block 400 in the token memory 206 and connects this new head-block to a tag as described in greater detail hereinbelow. The keyword CLASS indicates that the new head-block should by of the type class. The semicolon marks the end of the statement.

The second statement in Request 1 inserts a class called "Person" into the extended model 242 of the token-base database system 100. This class describes a person by two properties, which are a name and a birthdate, as set forth in lines 5 and 6 of Request 1. As explained hereinabove, a property is actually a relation 308 among a source class (e.g., "Person") and a target class (e.g., "Name"). As such, a property can only store instances of the target class. For example, the "birthdate" property cannot store the name "Tim" because "Tim" is an instance of the class "Name" and not an instance of the class DATE. The second statement includes the operators IS, HAS, HOLDS and the keywords CONSTANT, BEGIN, and DATE.

As already described hereinabove, the operator IS allocates a new head-block 400 in the token-memory 206. The operator HAS allocates a new relation-block (head-block of the type relation) in the token-memory 206 and then connects the relation-block to an already existing class-block, as described in greater detail hereinbelow. The operator HOLDS connects a relation-block to its target class-block (or cluster-block), as also described in greater detail hereinbelow.

The keywords CONSTANT and BEGIN specify the nature of a relation. More specifically, the keyword CONSTANT specifies that the relation "birthdate" remains constant during the lifetime of an instance of the class "Person". The keyword BEGIN specifies that the date value that is assigned to the relation "birthdate" should be used as the beginning date of the instance. The TDB-Server 201 uses the information from the keywords CONSTANT and BEGIN as hints to correctly and efficiently store history-identifiers in connections with the historicization of instances, as described in greater detail hereinbelow. The keyword DATE refers to a functionality "Date" that is included in the default-model 212. Similar to the functionality "Float" described above, the functionality "Date" provides efficient access to the representation of date and/or time values (instances) on the computer hardware on which the token-based database system 100 is executed.

The third statement in Request 1 inserts a class called "Article" into the extended model 242 of the token-based database system 100. The class "Article" describes an article (e.g., a certain good) by name and price. It should be noted that there now exist two relations with the name "name", the relation "name" of the class "Person" resulting from the second statement and the relation "name" of the class "Article" resulting from the third statement. However the TDB-Server 201 can differentiate these relations because one relation refers to the name of a person and the other relation refers to the name of an article.

The third statement includes the operators IS, HAS, and HOLDS, and the keywords CONSTANT, VARIABLE, and FLOAT. As described earlier, the operators IS and HAS allocate new head-blocks in the token memory 206, and the operator HOLDS generates connections among head-blocks. The keyword VARIABLE is the counterpart to the keyword CONSTANT and indicates that the value of a relation (e.g., the relation "price" as specified in line 10 of Request 1) can vary during the lifetime of an instance, e.g., the price of a certain good can change over time. The keyword FLOAT refers to a functionality "Float" that is included in the default-model and provides efficient access to the representation of floating point numbers on the computer hardware on which the token-based database system 100 is executed.

The fourth statement in Request 1 inserts a class called "Invoice" into the extended model 242 of the token-based database system 100. This class describes an invoice by its receiver (e.g., a person) and its items (e.g., articles).

The fourth statement includes the operators IS, HAS, and HOLDS and the keywords CONSTANT, TWO_WAY, MULTIPLE, and COPY. As previously described the operators IS and HAS allocate new head-blocks in the token memory 206, and the operator HOLDS generates connections among head-blocks. The keyword CONSTANT indicates that the values assigned to a relation, e.g., relation "receiver" or relation "item", do not change over the lifetime of an instance, e.g., a certain invoice. The keyword TWO_WAY specifies that a relation should automatically be generated in both directions, e.g., from the source class to the target class, and vice versa (e.g., the relation "receiver" relates an invoice to a person and a person to an invoice). By default, e.g., in case the keyword TWO_WAY is not set, a relation is generated in one direction. The keyword MULTIPLE specifies that a relation can refer to more than one instance of the target class. By default, a relation refers to a single instance of the target class. For example, the relation "receiver" can relate to one person at most, while the relation "items" can relate to multiple articles. The COPY keyword specifies that a relation copies the instance of the target class. In the case of the relation "items", this means that the instances from the target class "Article" are copied into the invoice. Thus, a subsequent change of the original instance (e.g., a change of the price of an article) is not reflected in the invoice. By default, a relation does not copy but links the instances of the target class.

In view of the foregoing example, the TDB-Server 201 receives the database request 214 (Request 1) from the socket 106 at operation 264, and executes operation 268 that initializes the processing of the transaction 215 included in the request 214 (Request 1).

Figure 6A:
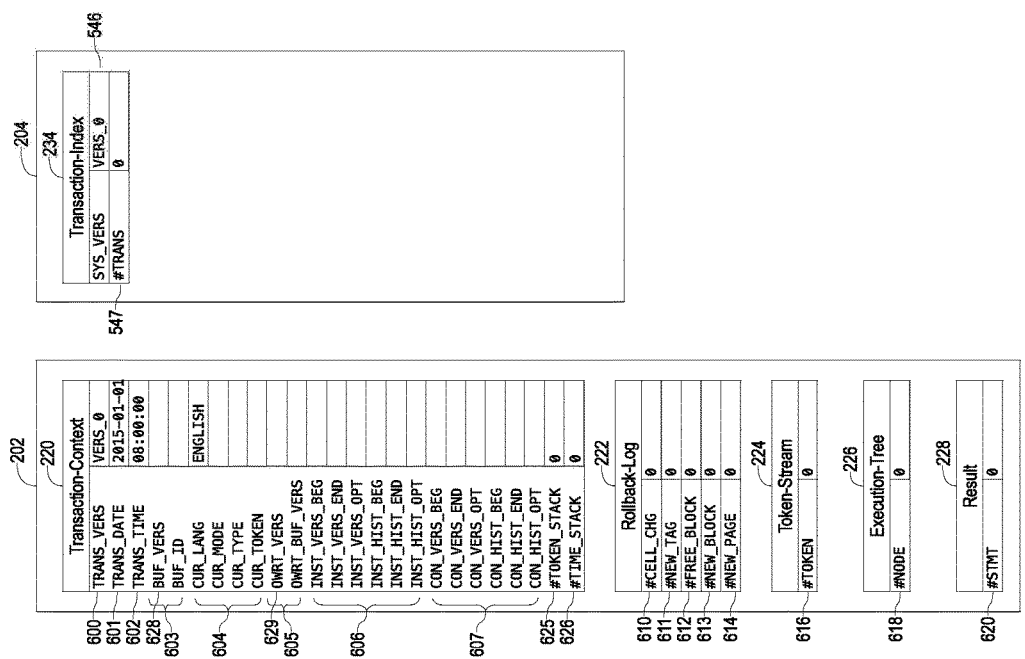
FIG. 6a illustrates an example snapshot of processing memory and index memory after initialization of the token-based database system in connection with an example transaction included in a first example request.

FIG. 6a illustrates a snapshot of the processing memory 202 and the index memory 204, after the execution of the operation 268 that initializes the processing of the transaction 215 included in the request 214 (Request 1). It should be noted that token memory 206 is not illustrated in FIG. 6a because operation 268 does not affect the token memory. The processing-memory 202 includes a transaction-context 220, a rollback-log 222, a token-stream 224, an execution-tree 226, and a result 228. The index memory 204 includes the transaction-index 234. It is noted that for brevity and clarity of the description, the page-index 230, the tag-index 232, and the buffer-index 236 are not shown in index memory 204 in FIG. 6a.

The transaction-context 220 includes information about the state of the transaction 215 of the request 214 (Request 1). More specifically, the transaction-context 220 includes cells TRANS_VERS 600, TRANS_DATE 601, TRANS_TIME 602, buffer-related cells 603, statement-related cells 604, history-versioning related cells 605-607, as well as two sub-indices #TOKEN_STACK 625 and #TIME_STACK 626.

TRANS_VERS 600 includes the current version-identifier (VERS_0) of the token-database system 100, which the TDB-Server 201 can read from cell SYS_VERS 546 of the transaction-index 234. The TRANS_DATE 601 and the TRANS_TIME 602 include the date and the time when the TDB-Server 201 started the processing of the transaction 215 of request 214 (Request 1) in operation 268. It will be assumed in this example that processing of Request 1 started on 1 Jan. 2015 at 8:00 AM, which is stored in the respective cells 601 and 602.

Buffer-related cells 603 include information concerning an optional buffer that the can be generated during the processing of the transaction 215, and include cells BUF_VERS and BUF_ID, which can store a version-identifier of a buffer and a reference to a buffer (BUFFER_ID), respectively.

Statement-related cells 605 include information concerning the processing status of a statement 216, and include cells CUR_LANG, CUR_MODE, CUR_TYPE, and CUR_TOKEN. CUR_LANG includes a language identifier that indicates the language in which a current statement 216 in a transaction 215 is written. More specifically, since Request 1 214 is written in the English language, CUR_LANG stores the language-identifier ENGLISH. CUR_MODE includes a current processing mode, which can include INSERT, UPDATE, DELETE, and SELECT, indicating the processing of an insert, update, delete, and select statement, respectively. It is noted that the foregoing list of processing modes is not exhaustive and additional processing modes can be provided. CUR_TYPE includes a type of a currently processed token, and CUR_TOKEN includes a reference to the currently processed token.

The history-versioning related cells 605-607 include optional information that is used by history-version operators, as will be described in greater detail hereinbelow. More specifically, cells 605 can optionally overwrite the version-identifier in cells 600 and 628. For example, if the cell OWR_TRANS_VERS 629 includes a version-identifier, then the TDB-Server 201 will use this version-identifier during its operations, and will not use the version-identifier set forth in cell 600. Cells 606 include optional information that specifies details about the versions and times that the TDB-Server 201 uses for processing instances 312. Similarly, cells 607 include such information for processing connections 330 between the instances 312.

The sub-indices 625 and 626 can optionally include temporary processing information. For example can sub-index 625 temporary store one or more memory references (tokens) during a complex query operation that the TDB-Server 201 executes. This will be described in connection with a select statement in FIG. 27b. As illustrated in FIG. 6a, the sub-indices 625 and 626 are initialized to zero (0) elements at the beginning.

The rollback-log 222 includes five (5) sub-indices that are used to store changes that have been executed in the index memory 204 and the working memory 206 by the transaction 215. More specifically, the rollback-log 222 includes #CELL_CHG 610, #NEW_TAG 611, #FREE_BLOCK 612, #NEW_BLOCK 613, and #NEW_PAGE 614. The #CELL_CHG 610 includes information about changes to cells, e.g., the original value that a cell had before the change, such that the original value can be restored in case of a rollback. The #NEW_TAG 611 includes information about newly added tags. The #FREE_BLOCK 612 includes information about memory blocks that have been freed, e.g., a freed memory block must be un-freed in the case of a rollback. The #NEW_BLOCK 613 includes information about newly allocated memory blocks. The #NEW_PAGE 614 includes information about newly allocated memory pages. As illustrated in FIG. 6a, the rollback-log 222 is initialized, with constituent cells 610-614 set to zero (0) elements.

The token-stream 224 includes information about the tokens that are processed in a statement 216, e.g., cell #TOKEN 616 indicates a number of token in the token-stream 224. The execution-tree 226 includes a tree-like representation of information included in the token-stream 224, as will be described in greater detail hereinbelow. Specifically, cell #NODE 618 of token-stream 224 indicates the number of nodes included in the execution-tree 226. The result 228 includes results of the execution of a statement 216. Specifically, cell #STMT 620 of result 228 indicates the number of statement results included in the result 228. As further illustrated in FIG. 6a, the token-stream 224, execution-tree 226, and the result 228 are all empty, e.g., the cells 616, 618, and 620, all include zero (0) elements.

As described earlier, the transaction-index 234 in the index memory 204 includes information about all transactions that changed the contents of the index memory 204 or token memory 206. The cell SYS_VERS 546 stores a current (active) version-identifier (e.g., VERS_0) of the token-based database 100. The value zero (0) in cell #TRANS 547 indicates that the processed transaction 216 included in request 214 (Request 1) has not (yet) affected the contents of the index memory 204 or working memory 206, and thus is not reflected in the transaction-index 234.

After the TDB-Server 201 has initialized the processing memory 202 with the transaction-context 220, rollback-log 222, token-stream 224, execution-tree 226, and result 228, the TDB-Server 201 enters the statement-loop 270 which iterates over each statement 216 in the transaction 215 included in the request 214 (Request 1). As described hereinabove, the transaction 215 includes four (4) constituents insert statements 216. The TDB-Server 201 first executes the tokenizing operation 272 on the first statement 216 at line two (2) in the transaction 215 of request 214 (Request 1): "INSERT Name IS CLASS;".

Figure 6B:
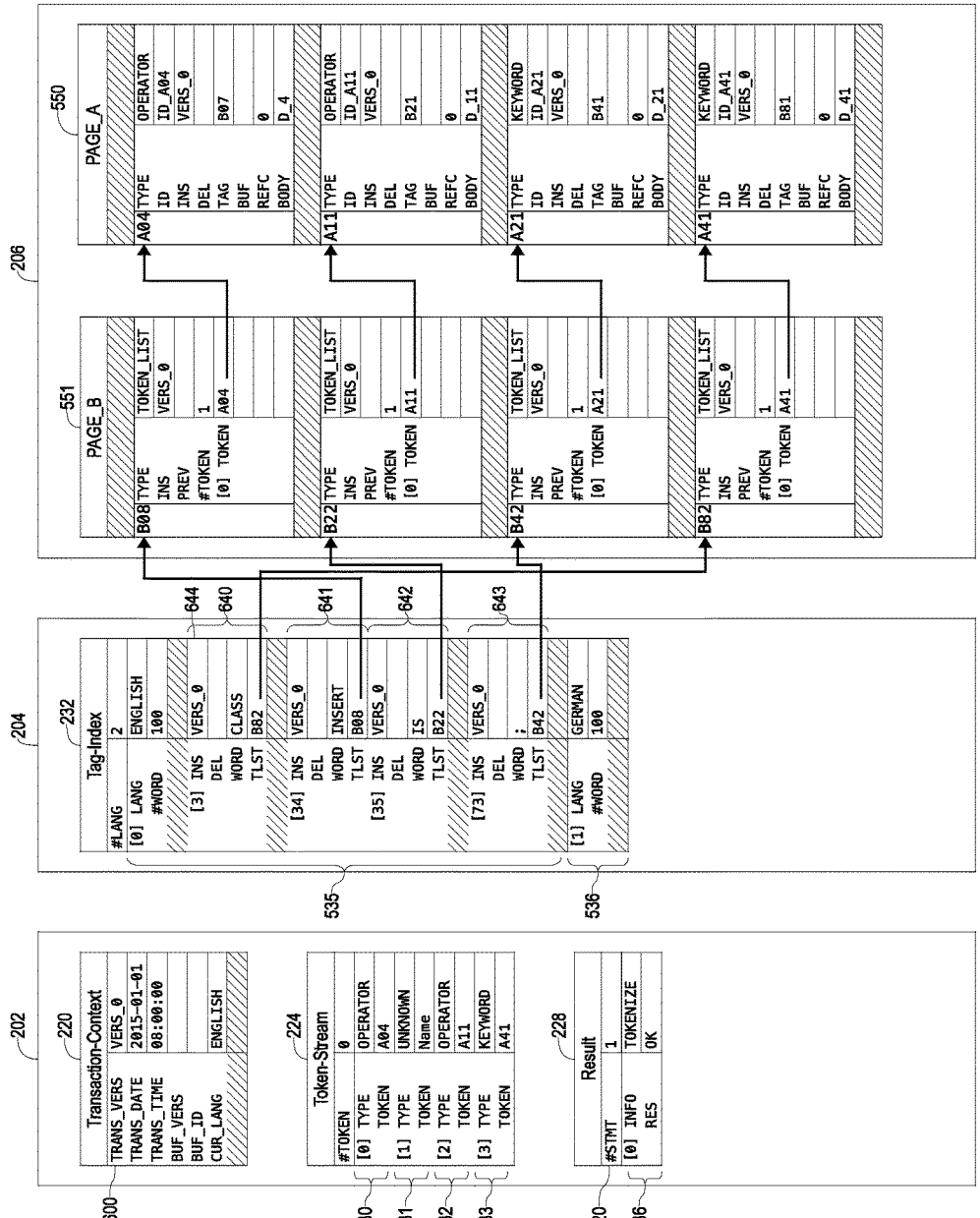

FIG. 6b illustrates a snapshot of the processing memory 202, index memory 204, and token memory 206, after the execution of the tokenizing operation 272 of the statement-loop 270 over the first statement 216 in the transaction 215 included in the request 214 (Request 1). The processing memory 202 includes the token-stream 224 and the result 228. For clarity and brevity of the description, the transaction-context 220 is shown with a reduced number of cells where the hatched area at the bottom of transaction-context 220 indicates that more cells exist. For clarity and brevity of the description the rollback-log 222 and the execution-tree 226 are not shown, as these elements are not affected by the tokenizing operation 272.

The token-stream 224 includes four (4) token-stream entries or simply entries 630-633. Each entry includes two (2) cells, TYPE and TOKEN. The cell TYPE generally stores a type of a token, e.g., entry 630 indicates that the token is of type OPERATOR. The cell TOKEN generally includes a reference (memory address) to the token, e.g., entry 630 includes memory address A04 of PAGE_A 550. The cell TYPE can include any of the token types of the logical model 301 and the default table 500, as described with reference to FIG. 3 and FIG. 5, respectively. Moreover, the cell TYPE can additionally include a type UNKNOWN and a type AMBIGUOUS, as will be described in greater detail hereinbelow.

The result 228 includes one (1) result entry or simply entry 636. The entry 636 generally includes two or more cells. The first cell INFO includes information about the kind of result that is included in the following cell(s). Specifically, the value TOKENIZE in cell INFO indicates that the result concerns the tokenizing operation 272. The second cell RES indicates a completion indicator associated with the operation in the cell INFO. Specifically, the value OK in cell RES indicates that the result of the tokenizing operation is OK, e.g., the tokenizing operation was executed successfully.

The index memory 204 includes the tag-index 232. For clarity and brevity of the description, the other indices 230, 234, and 236 are not shown in FIG. 6b. As described earlier, the tag-index 232 includes sub-indices 535 and 536 for each language. Each of the sub-indices includes one or more word entries 640-643 that reference memory blocks of the type TOKEN_LIST in the token memory 206. The hatched areas included in the tag-index 232 indicate that there exist more word entries in the tag-index 232, which are not shown for reasons of clarity and brevity. The word entries 640-643 are sorted in lexically-ascending order.

The token memory 206 includes memory pages PAGE_A 550 and PAGE_B 551. Memory page 550 is shown to include several memory blocks at memory addresses A04, A11, A21, and A41. It should further be noted that the hatched areas included in the memory page 550 indicate that the memory page includes more memory blocks that are not shown in FIG. 6b. Similarly, memory page 551 includes memory blocks at memory addresses B08, B22, B42, and B82, as well as several more memory blocks that are not shown in FIG. 6b indicated by hatching.

During the tokenizing operation 272, the TDB-Server 201 generally executes the following steps. More specifically, the TDB-Server 201 reads a word from a request 214. The TDB-Server 201 then looks up the word in the tag-index 232. It is noted that for this look up the TDB-Server 201 only considers word entries that include a version-identifier (e.g., VERS_0) in the cell INS (e.g., cell 644) that is less or equal to the version-identifier included in cell 600. If a matching word entry is found and the word entry refers to exactly one head-block (token), then the type of the head-block and the memory address of the head-block are appended to the token-stream 224. If the matching word entry in the tag-index 232 refers to more than one head-block (token), then an ambiguity marker is written to the token-stream 224. However, if the word is not found in the tag-index 232, then an unknown marker is written to the token-stream 224. The TDB-Server continues reading words from the request 214 and appending corresponding tokens to the token-stream 224 as described immediately above, until the TDB-Server 201 encounters a word that indicates the end of a statement 216 (e.g., a semicolon indicated by the word entry 643).

For example, the first word of the first statement 216 in request 214 (Request 1) is "INSERT". The TDB-Server 201 looks up this word in the tag-index 232 and finds the word entry 641. This entry includes the version-identifier VERS_0 in cell 644 which is equal to the version-identifier in cell 600. It should be noted that, as a result of the initialization operation 260 described above, the tag-index 232 includes at least the tags of the tokens that are included in the core-model 240. Accordingly as illustrated in FIG. 6b, the word entry 641 includes a reference to a memory block at memory address B08 of PAGE_B 551. The memory block B08 is of type TOKEN_LIST and includes exactly one reference to a head-block at memory address A04 of page 550. The TDB-Server 201 thus appends an entry 630 to the token-stream 224, which includes the type of the head-block (KEYWORD) and the memory address of the head-block (A04). The TDB-Server 201 then reads the next word of the first statement in Request 1 which is "Name". In this case, the TDB-Server 201 does not find the word "Name" in the tag-index 232. Therefore, the TDB-Server 201 appends an entry 631 to the token-stream 224, which includes the type UNKNOWN and the unknown word "Name". The TDB-Server 201 continues reading the third, the fourth, and the fifth word of the request which are "IS", "CLASS", and ";" respectively. These words are included in the tag-index 232 in entries 642, 640, and 643, respectively. The TDB-Server 201 appends the corresponding entries 632, 633, and 634 to the token-stream 224.

After the TDB-Server 201 has tokenized the first statement 216 of the request 214 (Request 1), the TDB-Server 201 continues with the parsing operation 274, which parses the token-stream 224 and generates an execution tree that is stored in the execution-tree 226.

Figure 6C:
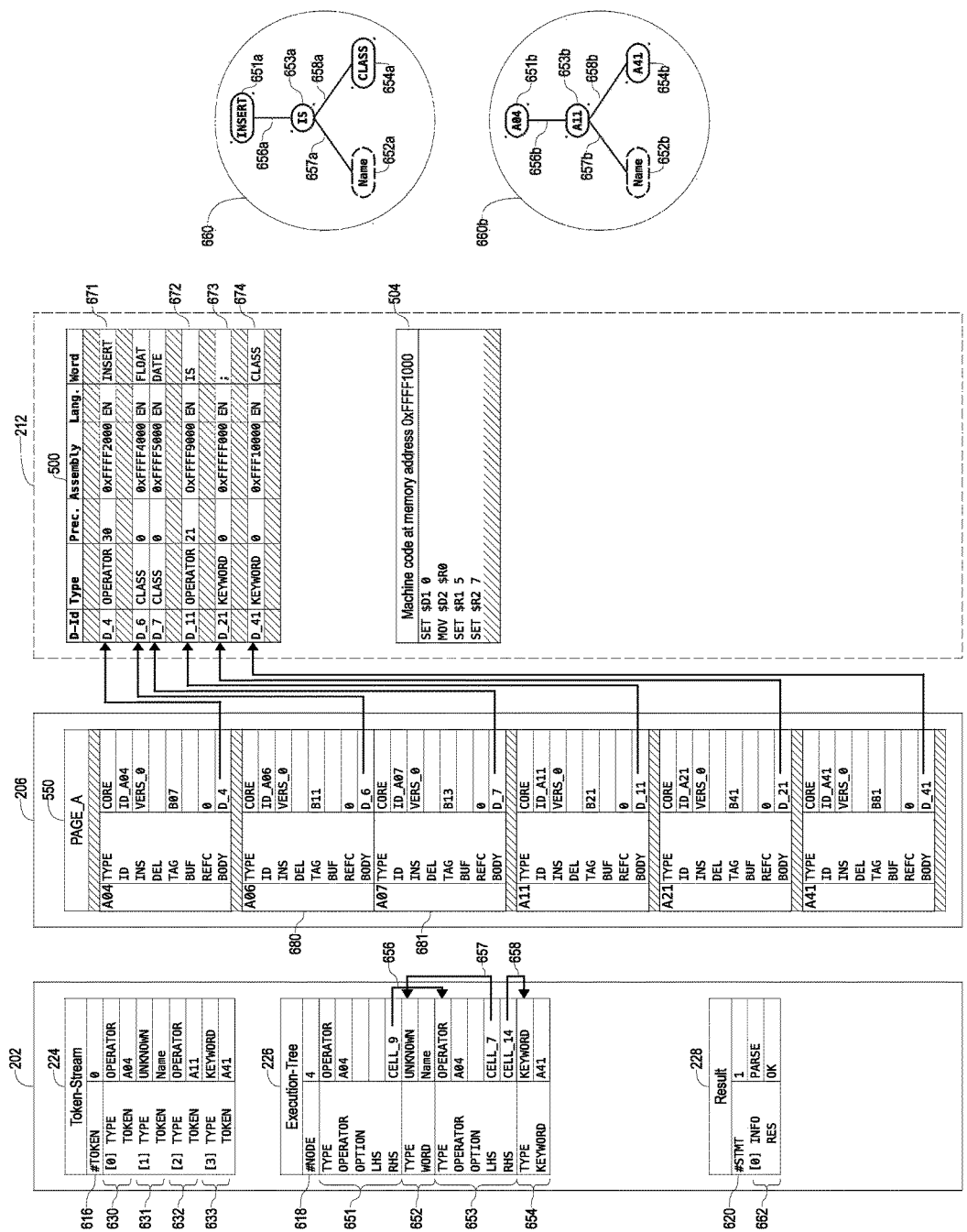
FIG. 6c illustrates an example snapshot of processing memory, token memory, and default model of static memory after parsing the example first statement of FIG. 6b.

FIG. 6c shows a snapshot of the processing memory 202, token memory 206, and default model 212, after the execution of the parsing operation 274 of the statement-loop 270 over the first statement 216 in the transaction 215 included in the request 214 (Request 1). The processing memory 202 includes the token-stream 224, the execution-tree 226 and the result 228. The token-stream 224 includes the information that results from the tokenizing operation 272, as described in relation to FIG. 6b.

The execution-tree 226 includes node-entries or simply entries 651-654. The entries 651-654 are referenced among each other in such a way that the entries 651-654 and the cell references—as indicated by arrows 656-658—form an execution tree, as illustrated graphically in inset 660. More specifically, entry 651 includes the unary operator INSERT (651a) which is also the root of the execution tree in inset 660, entry 652 includes the unknown word "Name" (652a), entry 653 includes the binary operator IS (653a), and entry 654 includes the keyword CLASS (654a). The execution tree 660 and the following depictions of execution trees show clear names of the operators for brevity and clarity of the description. However, it is noted that the TDB-Server 201 processes the execution tree by using memory references for all known tokens as illustrated in the inset 660b.

More specifically, the execution-tree 226 includes three different types of entries, which are OPERATOR, KEYWORD, and UNKNOWN. The entry of the type OPERATOR (e.g., entry 651 or entry 653) includes five (5) cells, TYPE, OPERATOR, OPTION, LHS and RHS. The cell TYPE includes the type of the entry, e.g., OPERATOR. The cell OPERATOR includes a reference (e.g., memory address A04 or memory address A11) to the head-block that represents the operator. The cell OPTION can optionally include information that specifies details regarding the execution of the operator. The cell LHS includes a reference to the first cell of an entry that stands on the left-hand-side of the operator, as illustrated graphically in the inset 660. It should be noted that in the case of a unary operator (e.g., the INSERT operator 651($a$)), the cell LHS remains empty. The cell RHS includes a reference to the first cell of an entry that stands on the right-hand-side of the operator.

An entry of type KEYWORD (e.g., entry 654) includes two (2) cells, TYPE and KEYWORD. The cell TYPE includes the type of the entry, e.g., KEYWORD. The cell KEYWORD includes a reference to the head-block that represents the keyword. The entry of type UNKNOWN (e.g., entry 652) includes two (2) cells, TYPE and WORD. The cell TYPE includes the type of the entry, e.g., UNKNOWN. The cell WORD stores the unknown word (e.g., character string).

The result 228 includes one (1) result entry 662, which includes cells INFO and RES. The cell INFO includes the value PARSE, which indicates that the result stored in cell RES refers to the parsing operation 274. The cell RES includes the value OK, which indicates that the parsing operation has been executed successfully. As described earlier, the TDB-Server 201 generates one result for each statement 216 in the transaction 215 of the request 214 (Request 1). However, the individual processing operations (e.g., tokenizing 272, parsing 274, and executing 274 of statement loop 270) do not generate individual results in connection with statement 216, but rather each of the operations overwrites the result entry 662 in the result 228.

The token memory 206 illustrates one memory page 550. The memory page 550 includes several memory blocks at memory addresses A04, A06, A07, A11, A21, and A41. However, the hatched regions in memory page 550 indicate that the memory page 550 includes more memory blocks which are not shown.

The default-model 212 includes a default-function table 500, which includes several default-functions 671-674 associated with IDs D_4, D_11, D_21, and D_41. The hatched regions in table 500 indicate that table 500 includes more default-functions which are not shown.

During the parsing operation 274, the TDB-Server 201 executes the following operations. The TDB-Server 201 inspects an entry (e.g., first entry) in the token-stream 224 (e.g., entry 630). If the cell TYPE of the entry 630 includes KEYWORD or OPERATOR, then the TDB-Server 201 looks up the corresponding memory address (e.g., A04) of the token (head-block) in token-memory 206 using the cell TOKEN of the entry 630. Thereafter, the TDB-Server 201 reads the default-function reference (e.g., D_4) that is included in the cell BODY of the head-block stored at memory address A04 of the memory page 550, and locates the entry 671 for the default-function in the default-function table 500.

Depending on the type of the default-function in column "Type" of table 500 (e.g., OPERATOR or KEYWORD), the TDB-Server 201 generates an entry in the execution-tree 226 of a corresponding type, e.g., entry 651 for OPERATOR or entry 654 for KEYWORD. If an entry in the token-stream 224 is of type UNKNOWN (e.g., in entry 631), the TDB-Server 201 generates a node-entry (e.g., entry 652) for UNKNOWN in the execution-tree 226. After the generation of the node entry 651 (e.g., first entry) in the execution-tree 226 for the first token-stream entry 630, the TDB-Server 201 executes or continues the parsing operation 274 over the next entry in the token-stream 224 until all entries in the token-stream 224 have been processed.

Thereafter, the TDB-Server 201 employs a standard operator-precedence algorithm that references the node entries 651-654 in the execution-tree 226 among each other in such a way that the operators with higher precedence are closer to the root of the execution tree than operators with lower precedence. It is noted that the algorithm reads the operator-precedence from column "Prec." in the default-function table 500. It is noted further that the precedence in column "Prec." of table 500 is hard-coded and set together with the equally hard-coded machine code (e.g., memory block 504) that executes the default-function. For example, the default-function INSERT 671 has a precedence of 30 that is higher than 21, which is the precedence of default-function IS 672. Accordingly the default-function INSERT 671 which is related to node-entry 651(*a*) is at the root 651*a* of the execution tree 660 and default-function IS 672 which is related to node-entry 653(*a*) is a subordinated node 653*a*.

After the TDB-Server 201 has generated the execution-tree 228, the TDB-Server 201 continues with the execution of operation 276, which executes the execution tree stored in execution-tree 228. It is noted that for clarity and brevity of the following description, the figures that illustrate memory snapshots do not show the complete memory structures but only those elements of the memory structures that are relevant for the understanding of the described operations.

Figure 7:
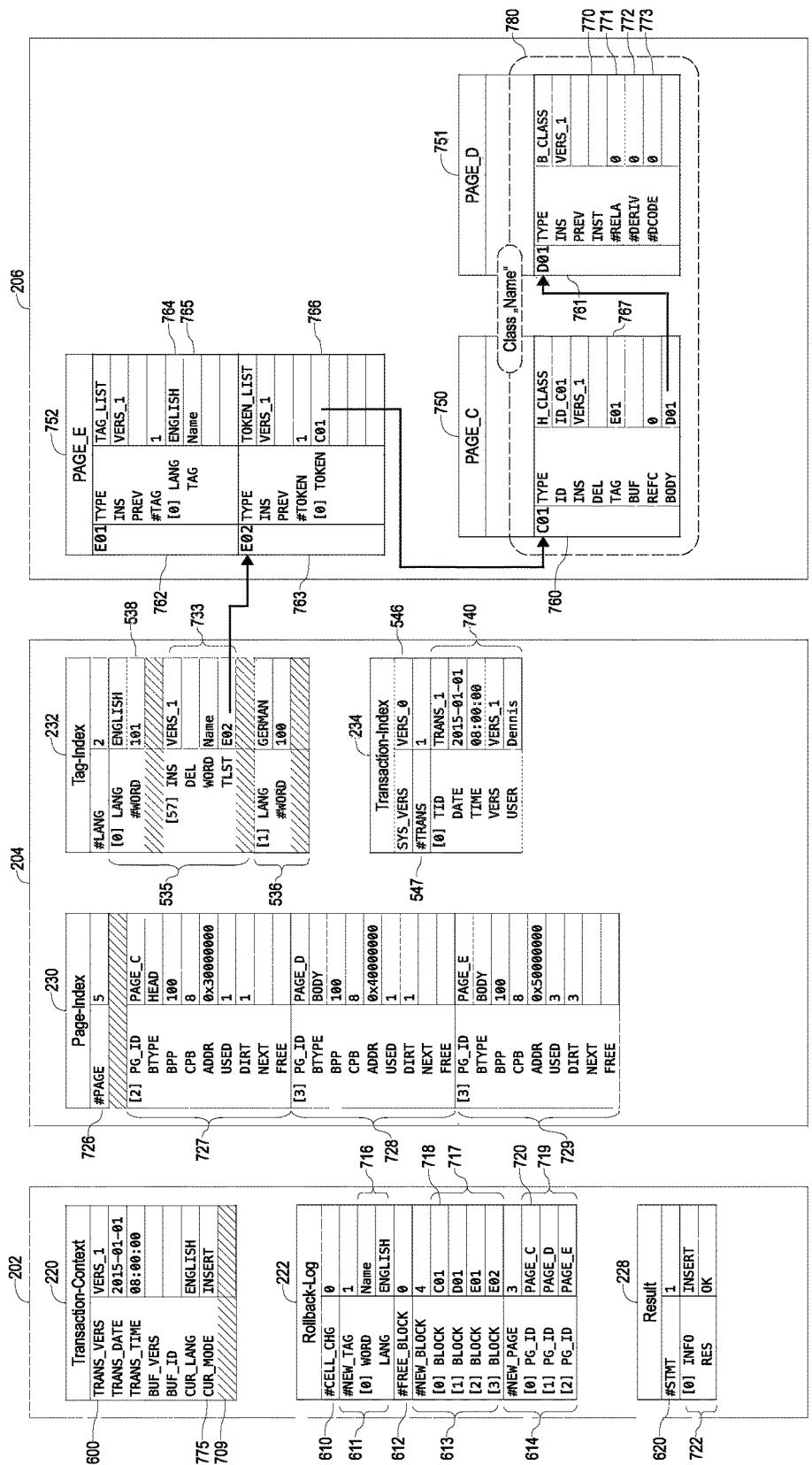
FIG. 7 illustrates an example snapshot of processing memory, index memory, and token memory after execution of an example execution tree illustrated in FIG. 6c.

FIG. 7 illustrates a snapshot of the processing memory 202, the index memory 204, and the token memory 206, after the execution of the execution tree 660 by the execution operation 276. As aforementioned, the memory snapshot illustrated in FIG. 7 shows only those elements that are relevant for the understanding of the described operation 276. More specifically, FIG. 7 does not show pages 550 and 551 (PAGE_A and PAGE_B) that include the core-model 240, and also does not show some parts of the tag-index 232, as the foregoing elements are not relevant for the understanding of the execution of the execution tree 700.

The processing memory 202 includes the transaction-context 220, the rollback-log 222, and the result-set 228. The transaction-context 220 does not include all cells as illustrated by the hatched area 709. As described earlier, the rollback-log 222 includes five (5) sub-indices 610-614, #CELL_CHG 610, #NEW_TAG 611, #FREE_BLOCK 612, #NEW_BLOCK 613, and NEW_PAGE 614, which include information about changed cells, new tags, freed memory blocks, newly allocated memory blocks, and newly allocated memory pages, respectively. Sub-index 611 starts with cell #NEW_TAG, which stores the number of new-tag entries or simply entries 716 that are included in sub-index 611. New-tag entry 716 includes two (2) cells WORD and LANG. The cell WORD stores the word ("Name") of a newly added tag, and the cell LANG stores a language-identifier (ENGLISH) for the newly added tag. Sub-index 613 start with cell #NEW_BLOCK, which stores the number of new-block entries 717 that are included in sub-index 613. Each new-block entry includes one (1) cell labeled BLOCK. For example, block entry 718 stores a memory address (e.g., memory address C01) of a memory block newly allocated in PAGE_C 750. Sub-index 614 start with cell #NEW_PAGE, which stores the number of new-page entries 719 that are included in the sub-index 614. Each new-page entry includes one (1) cell labeled PG_ID. For example, new-page entry 720 stores the ID of a memory page (e.g., PAGE_C 750) newly generated in token memory 206. As described earlier the information in the rollback-log 222 can be used by the TDB-Server 201 to undo changes that a currently processed transaction has executed in the index-memory 204 and token-memory 206.

The result 228 includes one result-entry 722, which includes the value INSERT in the cell INFO and the value OK in the cell RES. The values indicate that as the result of the statement 216 in request 214 (e.g., first statement in Request 1) the TDB-Server 201 has inserted information into the token-based database system 100 and the execution of the statement was successful.

The index memory 204 includes the page-index 230, the tag-index 232, and the transaction-index 234. The page-index 230 includes five (5) entries as indicated by cell #PAGE 520. For brevity and clarity the page-index 230 shows only three (3) entries 727-729, with the other two (2) entries shown as the hatched section at the top of the page-index 230. The tag-index 232 includes two sub-indices 535 and 536 for words in the English and the German languages. The sub-index 535 for the English words includes 101 word entries as indicated by cell #WORD 538, and the sub-index 536 for the German words includes 100 word entries. Again, for brevity and clarity only one word-entry 733 is shown in the English sub-index 535, with other word entries shown as the hatched section in the sub-indices 535 and 536.

The transaction-index 234 includes one entry 740, which includes five (5) cells, TID, DATE, TIME, VERS, and USER. The cell TID stores an identifier for the transaction 215 (e.g., TRANS_1). The cells DATE and TIME store respectively the date and time when the processing of transaction 215 was started by the TDB-Server 201 in processing operation 268. The cell VERS stores a version-identifier (e.g., VERS_1) that was assigned to the transaction 215 by the TDB-Server 201. It is reiterated that only transactions 215 that change the contents of the index memory 204 and/or token memory 206 are assigned with a version-identifier (e.g., VERS_1) and only such transactions are included in the transaction-index 234. The cell USER stores the name (e.g., "Dennis") of the database user that requested the execution of the transaction 215.

The token memory 206 includes memory pages 750, 751, and 752. As described earlier, the memory pages have corresponding entries in the page-index 230, which are 727, 728, and 729, respectively. Memory page 750 includes one (1) memory block 760 at memory address C01. As indicated by the value in cell BTYPE of the entry 727 in the page-index 230, the memory page 750 includes one or more memory blocks of the type HEAD. Moreover, the memory block 760 of the memory page 750 is a head-block of the type CLASS. More specifically, the letter "H" that prepends the value "CLASS" in the cell TYPE of the memory block 760 (e.g., "H_CLASS") indicates that this is a head-block. The memory block or head-block 760 includes eight (8) cells as described in connection with FIG. 4.

The memory page 751 includes one (1) memory block 761 at the memory address D01. The memory block 761 is a body-block of the type CLASS. More specifically, the letter "B" that prepends the value "CLASS" stored in cell TYPE of the memory block 761 (e.g., "B_CLASS") indicates that this is a body-block. As described earlier, the first three (3) cells of a body-block 761 include the cells TYPE, INS, and PREV, which store the type, the insert version-identifier, and the optional reference to a previous version of the body-block, respectively. The body-block 761 further includes cells INST 770, #RELA 771, #DERIV 772, and #DCODE. The cell INST 770 stores a reference to a memory page that includes the head-blocks of the instances that belong to the class "Name". The cell 770 is empty because the class (e.g., "Name") that the body-block 761 describes does not yet include instances. The cells 771, 772, and 773 are three (3) sub-indices. The sub-indices 771 and 772 store memory addresses of head-blocks of the types relation and derived, respectively, which can be connected to a class, as illustrated in FIG. 3. Sub-index 773 stores memory addresses of head-blocks that can include code (e.g., the types cluster and derived), as further illustrated in FIG. 3. The TDB-Server 201 uses the latter sub-index 773 to ensure consistency among code and data, e.g., instances, which are stored in the token-based database system 100, as will be described in greater detail hereinbelow.

The memory page 752 includes two (2) memory blocks, 762 and 763, at memory addresses E01 and E02, respectively. The memory blocks 762 and 763 are of the types TAG_LIST and TOKEN_LIST, which were described earlier.

In general, the TDB-Server 201 starts execution of the execution tree 660 from its root node 651a (e.g., operator INSERT 651a). The TDB-Server 201 executes the operator INSERT as follows: (i) test if there exists an entry (e.g., 740) in the transaction-index 234 for the current transaction 215; (ii) perform operations in the following paragraph if the entry does not exist; and (iii) skip the operations described in the following paragraph if the entry exists.

In the case that the TDB-Server 201 does not find the entry 740 in the transaction-index 234 for the current transaction 215, the TDB-Server 201 then generates a new entry 740. To do so, the TDB-Server 201 calculates a new version-identifier by incrementing the version-identifier in the cell SYS_VERS 600 of the transaction-context 220 (e.g. VERS_0 is incremented to VERS_1). It should be noted that the version-identifier in cell 546 of the transaction index 234 is not incremented, but will be incremented after a successful completion of the transaction 215. Next, the TDB-Server 201 generates the entry 740 in the transaction-index 234, and fills the cells of the entry 740 with values described above. Thereafter, the TDB-Server 201 writes INSERT into the cell CUR_MODE 775 of the transaction-context 220.

The TDB-Server 201 continues down the execution tree 660 to the next node, which is the operator IS 653a. As described earlier, the operator IS generally allocates new tokens within the token memory 206. More specifically, in connection with the operator IS, the TDB-Server 201 allocates a new head-block, and a corresponding body-block. The TDB-Server 201 then uses the node on the right-hand-side (e.g., node 654a) as the type for the newly allocated head-block, and the node on the left-hand-side (e.g., node 652a) as the tag for the newly allocated head-block. In the example execution tree 660, the TDB-Server 201 executes the following operations in connection with the execution of operator IS 653a.

The TDB-Server 201 first generates a new memory page 750, and generates the head-block 760 at the memory address C01 of the memory page 750. Then, the TDB-Server 201 generates a new memory page 751, and generates the body-block 761 at memory address D01 of the memory page 751. The TDB-Server 201 sets the types of the memory blocks 760 and 761 by writing values H_CLASS and B_CLASS to the cells TYPE, respectively. Furthermore, the TDB-Server 201 connects (or links) the head-block 760 to the body-block 761 by storing the memory address D01 in the cell BODY of the head-block 760. The TDB-Server 201 fills or writes the cell ID of the head-block 760 with a unique ID (e.g. ID_C01) that uniquely identifies the head-block 760. The cells INS of the head-block 760 and the body-block 761 are filled or written with the version-identifier (VERS_1), which is read from the cell TRANS_VERS 600 of the transaction-context 220.

It is noted that the memory blocks 760, 761 together describe the class "Name" as indicated by the title class "Name" of the dashed box 780 around these blocks. It is noted that the dashed box 780 is provided for reference purposes and does not form a part of the token-based database system 100. As described earlier, all information included in the token-based database system 100 is in the form of tokens, which are stored as a combination of one head-block (e.g., head-block 760) and one or more body-blocks (e.g. body-block 761).

Thereafter, the TDB-Server 201 generates a new memory page 752, and generates the tag-list memory block 762 at memory address E01 of the memory page 752, and further generates the token-list memory block 763 at memory address E02 of the page 763. The TDB-Server 201 then fills or writes the tag-list and token-list memory blocks 762 and 763 with values as described earlier in connection with the tagging of a core-block with respect to FIG. 5. More specifically, the cells 764, 765, 766, and 767 are filled with the language-identifier "ENGLISH", word "Name", and the memory addresses C01 and E01, respectively. Thereafter, the TDB-Server 201 generates a new word-entry 733, and fills or writes the cell WORD with "Name" and the cell TLST with memory address E02, referring to token-list memory block 763.

It is noted that during the execution of the aforementioned operations, the TDB-Server 201 also stores information about each newly generated memory element as described earlier (e.g., memory page, memory block, a tag word-entry, etc.) in the rollback-log 222. For example, the generation of the memory page 750 is logged in the cell 720, the generation of the memory block 760 is logged in the cell 718, and the generation of the word-entry 733 is logged in the cells 716.

After the TDB-Server 201 completes the execution of the operator 653a, the TDB-Server 201 has completed the processing of the first statement 216 of the request 214 (Request 1), and stores information about the successful processing in the result-entry 722 of result 228. The TDB- Server 201 thus returns to the beginning of the statement loop 270, and executes the tokenizing operation 272, the parsing operation 274, and the execution operation 276, on the second statement 216 in of the request 214 (Request 1).

Figure 8A:
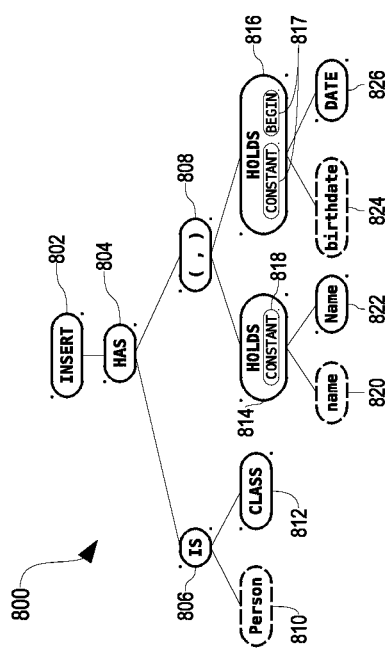
FIG. 8a illustrates an execution tree resulting from tokenizing and parsing an example second statement in the transaction included in the first example request.

FIG. 8a illustrates an execution tree 800 that results from the tokenizing and parsing operations 272, 274 of the second statement 216 in the transaction 215 included in the request 214 (Request 1). The execution tree 800 includes the operators INSERT 802, HAS 804, IS 806, LIST 808, and HOLDS 814, 816, the keywords CLASS 812 and DATE 826, the class "Name" 822, and the unknown words "Person" 810, "name" 820, and "birthdate" 824.

As described earlier, the operator HAS generates a new token of type relation and the operator HOLDS connects or links a relation to a target. The operator LIST (",") indicates that the connected (linked) sub-nodes of the operator LIST (e.g., operators HOLDS), should be interpreted as being directly connected or linked to the super-element of the operator LIST (e.g., operator HAS), and should thus be executed sequentially. The keyword CLASS indicates that the new token that the operator IS generates should be of type class. Moreover, the keyword DATE refers to a class "DATE" that is included in the core-model 240.

Figure 8B:
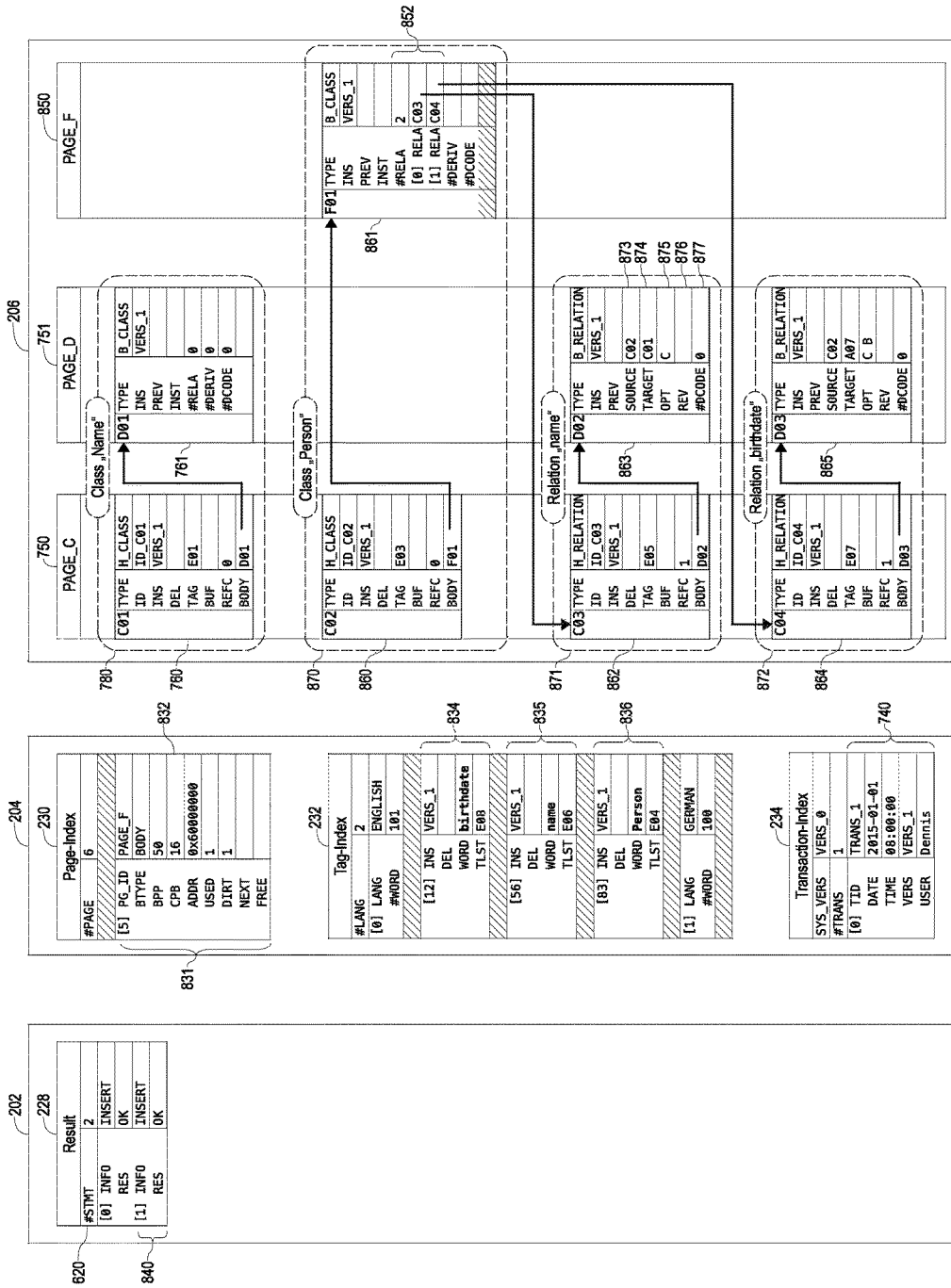

FIG. 8b illustrates a snapshot of the processing memory 202, the index memory 204, and the token memory 206, after the execution of the execution tree 800 by the execution operation 276. As aforementioned, the memory snapshot illustrated in FIG. 8b shows only those elements that are relevant for the understanding of the described operation 276. The processing memory 202 includes the result 228. The index memory 204 includes the page-index 230, the tag-index 232, and the transaction-index 234. The token memory 206 includes memory pages 750, 751, and 850.

The memory page 750 includes four (4) head-blocks 760, 860, 862, and 864 at the memory addresses C01, C02, C03, and C04. The memory page 751 includes three (3) body-blocks 761, 863 and 865 at memory addresses D01, D02, and D03. The body-block 761 is of the type class ("B_CLASS"), as described hereinabove with regard to FIG. 7. The body-blocks 863, 865 at memory addresses D02, D03, respectively, are of the type relation ("B_RELATION"). Like all body-blocks, the first three cells of the body-blocks 863, 865 store a type, an insert version-identifier, and an optional reference to a previous version of the body-block.

The body-block 863 further includes cells SOURCE 873, TARGET 874, OPT 875, REV 876, and #DCODE 877. The cell 873 includes a reference (e.g., memory address C02) to the head-block 860 of the source class of the relation at the memory address C02. The cell 874 includes a reference (e.g., memory address C01) to the head-block 760 of the target of the relation. The cell 875 includes options that further specify the nature of the relation. If cell 875 includes an option that specifies the relation as a two-way relation, then the cell 876 includes a reference (memory address) to another relation that is considered the counterpart of the two-way relation, which is also referred to as the reverse-direction relation, as described in greater detail hereinbelow. The sub-index 877 can optionally include references (memory addresses) to head-blocks of the types cluster or derived.

The memory page 850 includes one body-block 861 of type class ("B_CLASS") at memory address F01. It is noted that body-block 761 and body-block 861 both include descriptions of classes, e.g., the body-block 761 describes the class "Name" and the body-block 861 describes the class "Person". It should be noted that the description of the class "Person" includes nine (9) cells and thus does not fit into a memory block in the memory page 751, which can at most hold eight (8) cells. For this reason, the TDB-Server 201 generated the memory page 850 that includes larger memory blocks with 16 cells per memory block, as indicated in cell CPB 832 of entry 831 in the page-index 230.

The TDB-Server 201 starts the execution of execution tree 800 with the root node, which is operator 802 (INSERT). As described earlier, the TDB-Server 201 tests if the current transaction 215 (TRANS_1) is already included in the transaction-index 234. Because entry 740 of the transaction-index 234 already includes value TRANS_1 in the cell TID of the entry 740, the TDB-Server 201 thus continues with the execution of the operator 804 (HAS).

The TDB-Server 201 finds the operator 806 (IS) on the left-hand-side of the operator 804. The TDB-Server 201 executes the operator 806, which generates a head-block 860 of type class at memory address C02, and a corresponding body-block 861 at the memory address F01. As described above, the execution of operator 806 also generates a word (Person) in the entry 836 of the tag-index 232, as well as corresponding tag-list and token-list memory blocks (not shown).

After the execution of operator 806, the TDB-Server 201 continues with the execution of operator 804. The TDB-Server 201 generates a new head-block 862 at memory address C03, and fills or writes the cell TYPE with the type of the head-block (H_RELATION), the cell ID with ID_C03, and the cell INS with the active version-identifier (VERS_1). The TDB-Server 201 then generates the corresponding body-block 863 at memory address D02, and fills or writes the cell TYPE with value B_RELATION, the cell INS with the insert version-identifier (VERS_1), and the cell SOURCE with the memory address C02 of the source class 860 (Person). Thereafter, the TDB-Server 201 connects or links the head-block 862 to the body-block 863 by storing a reference (memory address D02) in cell BODY of head-block 862.

The TDB-Server 201 continues along the execution tree 800, with the execution of the first node of the operator 808 (LIST), which is the left-hand-side operator 814 (HOLDS). The execution of the operator 814 generally generates a connection or link among a relation and a target-class or a target-cluster, as follows.

The TDB-Server 201 finds the node 822 on the right-hand-side of operator 814 which references the class "Name" 780. Thus, the TDB-Server 201 stores the memory address C01 of the head-block 760 that represents class "Name" 780 in cell TARGET 874 of the body-block 863 at memory address D02. The TDB-Server 201 fills or writes the option 818 (CONSTANT) in the cell OPT 875 of the body-block 863. It is noted that for brevity and clarity of the description, the option 818 is represented as simply the letter "C" in cell OPT 875. Thereafter, the TDB-Server 201 inspects the left-hand-side of operator 814, and finds the unknown node 820 ("name"). The TDB-Server 201 generates a word-entry 835 ("name"), as well as corresponding tag-list and token-list memory blocks (not shown), such that the word-entry "name" refers to head-block 862 that represents the relation "name".

The TDB-Server 201 goes back to the execution of the operator 804, and inserts the memory address C03 into the sub-index 852 (#RELA) of body-block 861 that describes the class "Person". The inserted memory address C03 thus refers to the head-block 862 of the relation "name" and indicates that the relation "name" belongs to the class "Person".

At operator 804, the TDB-Server 201 repeats the execution of operator 804 as described above, however this time executing the second operator 816 (HOLDS) is connected to the operator 808 (LIST). This execution generates the relation "birthdate" 872 represented by a head-block 864 at memory address C04, a corresponding body-block 865 at memory address D03, and a word-entry 834 in the tag-index 232.

At operator 804, the TDB-Server 201 finds that all elements connected to operator 808 (LIST) have been processed. The TDB-Server 201 thus writes the result of the execution into the second result-entry 840 of the result 228. Thereafter, the TDB-Server 201 continues at the beginning of the statement loop 270, with the tokenizing, parsing, and execution operations 272, 274, and 276, respectively, for the third statement 216 in the request 214 (Request 1).

It is noted that the arrows in FIG. 8b graphically illustrate the connections among the various memory blocks (tokens) in the token memory 206. For clarity and brevity of the description, the head-blocks and the body-blocks that represent and describe specific tokens are indicated by respective titles of the dashed boxes 780, 870, 871, and 872. It is reiterated that the dashed boxes are provided for reference purposes and do not form a part of the token-based database system 100. For example, in box 870 the head-block 860 represents class "Person" while body-block 861 describes class "Person". However, it should be noted that the head-blocks 760, and 860, 862, 864, (e.g., the memory blocks on the memory page 750), only reference the body-blocks 761, 861, 863, and 865 or tag-list blocks (not shown), and do not reference any other head-blocks. Similarly, the body-blocks 761, 861, 863, and 865 (e.g., the memory blocks on memory pages 751, 850), only reference head-blocks, and do not reference any other body-blocks directly. The foregoing connections among memory blocks represent a general connection schema, with the sole exception that the cell PREV in a body-block can directly reference another body-block, which contains a previous version.

A useful consequence of foregoing connection schema is that a body-block is always referenced by exactly one other memory block (e.g., a head block). This makes it easy to move body-blocks around in token memory 206 because only one reference has to be updated in order to keep the references in the token database 238 consistent. Accordingly, this allows the TDB-Server 201 to rearrange body-blocks with precision. For example, the TDB-Server 201 can move body-blocks that are rarely accessed to archive pages (e.g., memory pages that are stored in permanent memory 110 and only loaded into working memory 102 when needed), which improves efficiency of the token-based database system 100.

The execution of the third statement 216 of request 214 (Request 1), inserts the class "Article" with the relations "name" and "price" into the extended model 242 of the token database 238. The structure of such execution tree is similar to the structure of execution tree 800, albeit with the following changes: Article 810; price 824; VARIABLE 817; and FLOAT 826. For brevity and clarity, such a structure is thus not illustrated explicitly. However, the execution of the third statement 216 generates a further relation with tag "name", which appears to generate an ambiguity. More specifically, the word "name" can now refer to the relation "name" among the class "Person" and the class "Name", or the word "name" can refer to the relation "name" among the class "Article" and the class "Name". It should be noted that FIG. 9 illustrates how this ambiguity is reflected in the tag-index 232 and the related memory blocks in the token memory 206.

Figure 9:
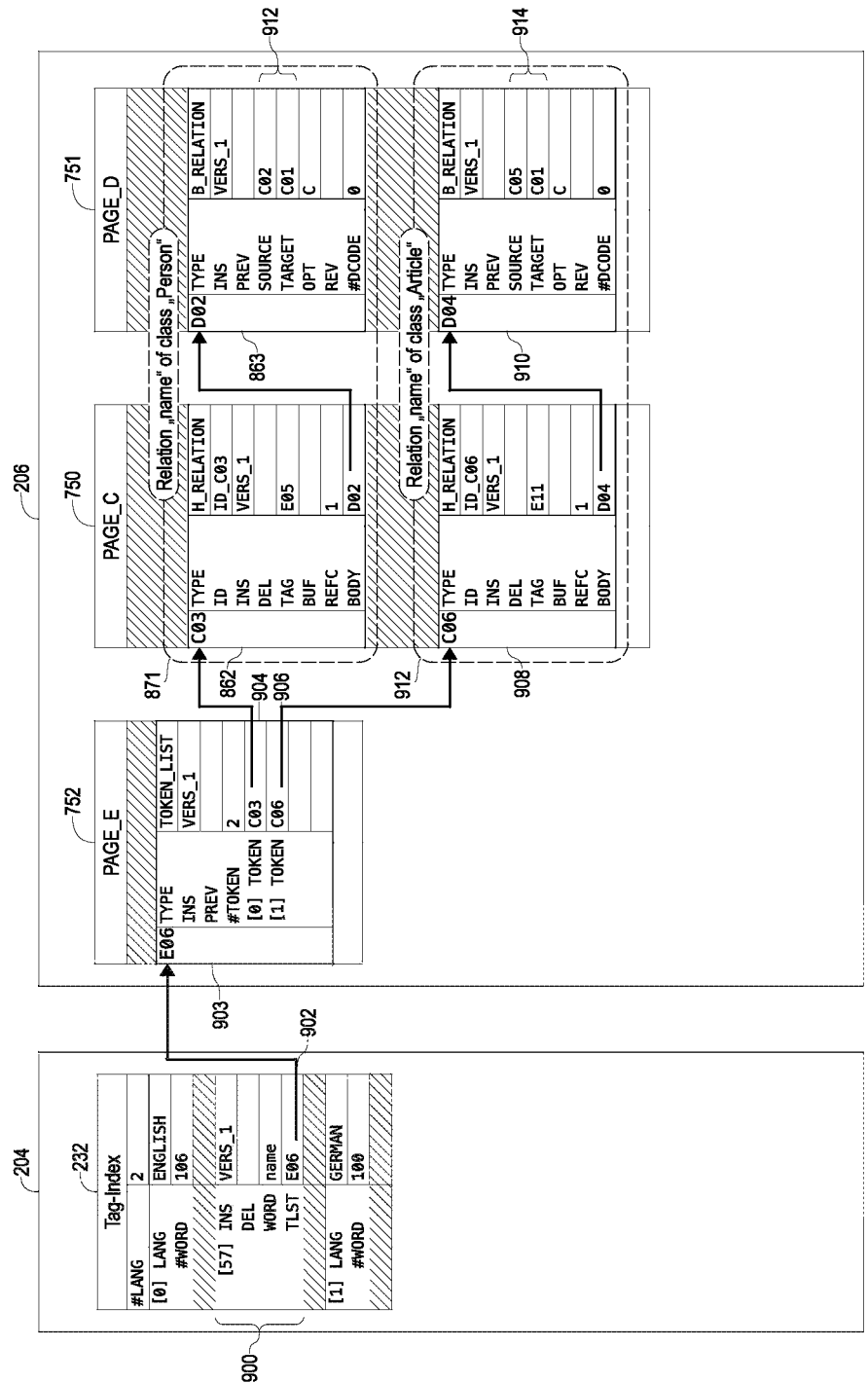
FIG. 9 illustrates a snapshot of index memory and token memory after an example third statement in the example first request is tokenized, parsed, and executed.

FIG. 9 illustrates a snapshot of the index memory 204 and the token memory 206, after the third statement 216 in request 214 (Request 1) is tokenized, parsed, and executed by operations 272, 274, and 276, respectively. The index memory 204 includes the tag-index 232, and the token memory 206 includes the memory pages 750, 751, and 752.

The tag-index 232 includes the word-entry "name" 900. The cell TLST 902 included in word-entry 900 stores a reference (memory address E06) to the token-list 903 that is included in memory page 752. The token-list 903 includes two (2) entries, first-entry 904 and second-entry 906. The first-entry 904 refers to head-block 862 at memory address C03, and the second-entry 906 refers to the head-block 908 at memory address C06. The head-blocks 862 and 908 are then connected or linked to the corresponding body-blocks 863 and 910 at memory addresses D02 and D04, respectively.

In this example, the cells 912 and 914 in body-blocks 863 and 910 include the information that the word "name" can either refer to a relation among the classes "Person" and "Name" at memory addresses C02 and C01, respectively, or a relation among the classes "Article" and "Name" at memory addresses C05 and C01, respectively. This information is thus used by the TDB-Server 201 when it tries to resolve an apparently ambiguous word during the execution of an execution tree, as will be described in greater detail hereinbelow.

After the execution of the third statement 216 in request 214 (Request 1), the TDB-Server 201 processes the fourth and last statement 216 of the request 214 (Request 1), executing the tokenization, parsing, and execution operations 272, 274, and 276, respectively in connection with the fourth statement.

In executing the fourth statement, the TDB-Server 201 inserts the class "Invoice" with properties "receiver" and "items" into the extended model 242 of the token database 238. The structure of the execution tree in connection with the fourth statement is similar to the structure of the execution tree 800, albeit with the following changes: Invoice 810, receiver 820, Person 822, CONSTANT TWO_WAY COPY 818, item 824, Article 826, and CONSTANT TWO_WAY MULTIPLE COPY 817. For brevity and clarity, such a structure is not illustrated explicitly. However, the difference is that the TDB-Server 201 generates two bidirectional relations for the relations "receiver" and "items" because these relations are marked with the option TWO_WAY, as illustrated in line 13 and 14 of Request 1.

Figures 10A, 10B:
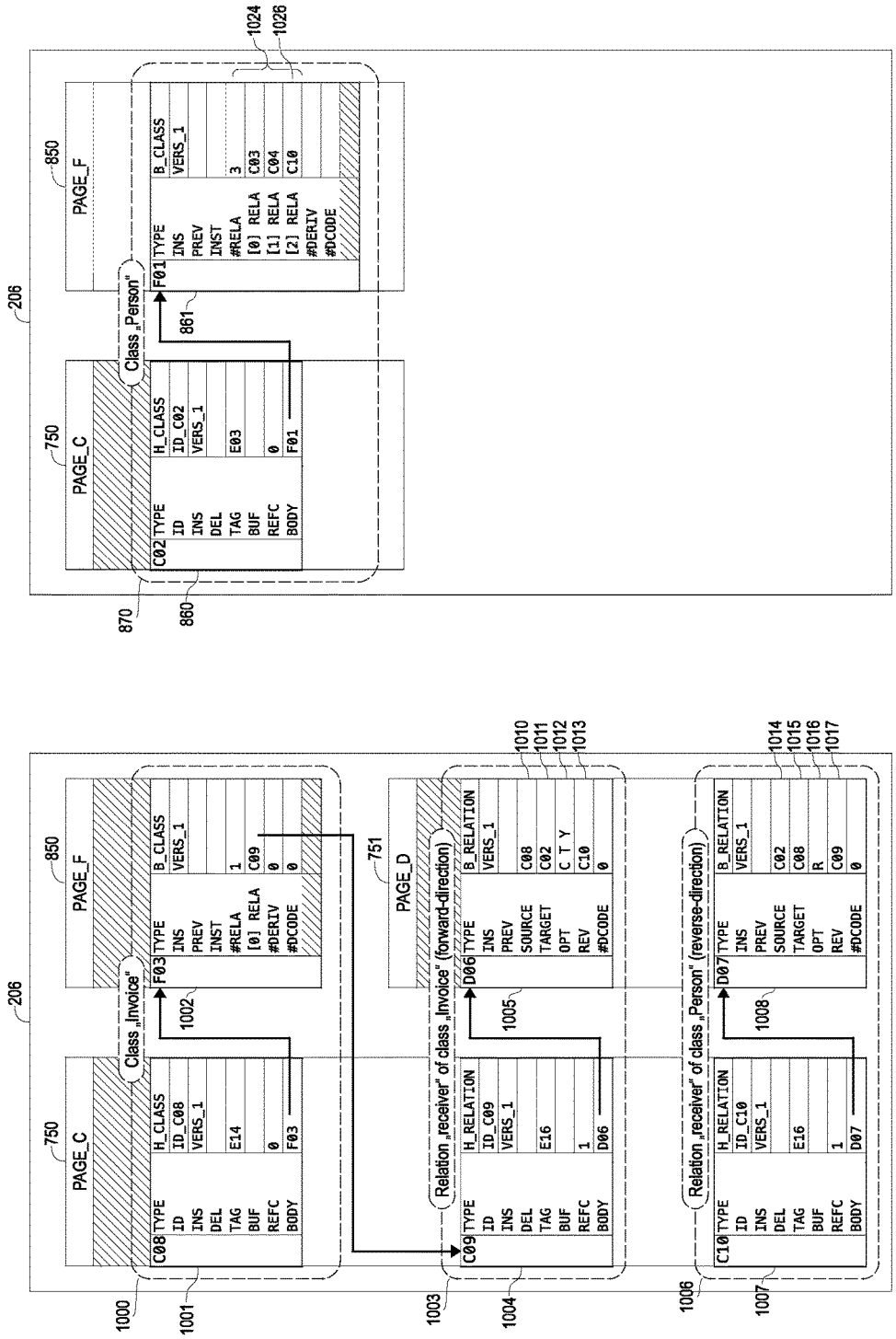
FIG. 10a illustrates a snapshot of token memory during the execution of an example fourth statement in the example first request.
FIG. 10b further illustrates the token memory illustrated in FIG. 10a in which a reverse-direction relation is added to relations of a source class.

FIG. 10a illustrates a snapshot of the token memory 206, during the execution operation of the fourth statement 216 in the request 214 (Request 1). The token memory 206 includes memory pages 750, 751, and 850. Memory page 750 includes a head-block 1001 of type class at memory address C08, and two head-blocks 1004 and 1007 of type relation at memory addresses C09 and C10, respectively. The head block 1001 is connected or linked to body-block 1002 at the memory address F03 of the memory page 850, and the head-blocks 1004 and 1007 are connected or linked to corresponding body-blocks 1005 and 1008 at the memory address D06 and D07, respectively.

During execution of the fourth statement, the TDB-Server 201 first generates the head-block 1001 that represents the class "Invoice", and then generates the body-block 1002 that stores the description of the class "Invoice". The TDB-Server 201 next generates the head-block 1004 that represents the relation "receiver", and then generates the corresponding body-block 1005 that stores the description of the relation "receiver". Because the relation "receiver" has the TWO_WAY option set, the TDB-Server 201 now additionally generates a head-block 1007 that represents the reverse-direction relation of the relation "receiver". Thereafter, the TDB-Server 201 generates the body-block 1008 that stores the description of this reverse-direction relation.

Body-blocks 1005 and 1008 show that the values in cell SOURCE 1010 and cell TARGET 1011 are reversed in cells SOURCE 1014 and TARGET 1015. This illustrates that the source and the target of the relation "receiver" 1003 (forward-direction) and its corresponding reverse-direction 1006 are reversed. The cell REV 1013 in the body-block 1005 and cell REV 1017 in body-block 1008 include references among the forward-direction and the reverse-direction relation. The cell OPT 1012 stores the value "C T Y" that indicates the options CONSTANT, TWO_WAY and COPY. The cell OPT 1016 in body-block 1008 stores the value "R" (REVERSE), which indicates that this relation was automatically generated by the TDB-Server 201 as a reverse-direction relation of a two-way relation. Whenever the TDB-Server 201 needs to lookup the options of a reverse-direction relation, the TDB-Server 201 uses the reference to the forward-direction relation, e.g., the memory address C09 stored in cell REV 1017, and looks up the options in cell 1012 of the forward-direction relation.

FIG. 10b further illustrates the token memory 206 of FIG. 10a in which a reverse-direction relation is also added to the relations of its source class. More specifically, the token memory 206 includes memory pages 750 and 850. The memory page 750 includes a head-block 860 of type class at memory address C02. The head-block 860 represents the class "Person" that was generated during the execution of the second statement 216 of the request 214 (Request 1). The memory page 850 at memory address F01 includes the body-block 861 that stores the description of the class "Person". The sub-index #RELA 1024 includes a reference 1026 to the newly generated reverse-direction relation that is stored in head-block 1003 of the memory page 750.

After the execution of the fourth statement of the Request 1, the TDB-Server 201 continues with the tokenizing operation 272 that reads a closing curly brace, which indicates the end of the transaction 215 of the request 214 (Request 1). Thereafter, the TDB-Server 201 exits the statement loop 270, and continues with the save changes operation 278.

In the operation 278, the TDB-Server 201 copies the contents of the index memory 204 and token memory 206 of the working memory 102 to the index file 208 and token file 210 of the permanent memory 110, respectively. This operation is an exact byte-copy operation of each index 230-236 in the index memory 204 and each memory page 246 in the token memory 206, with the exception that all memory references that are included in the cells of the memory blocks are converted to relative addresses, as illustrated in greater detail with reference to FIG. 11.

Figure 11:
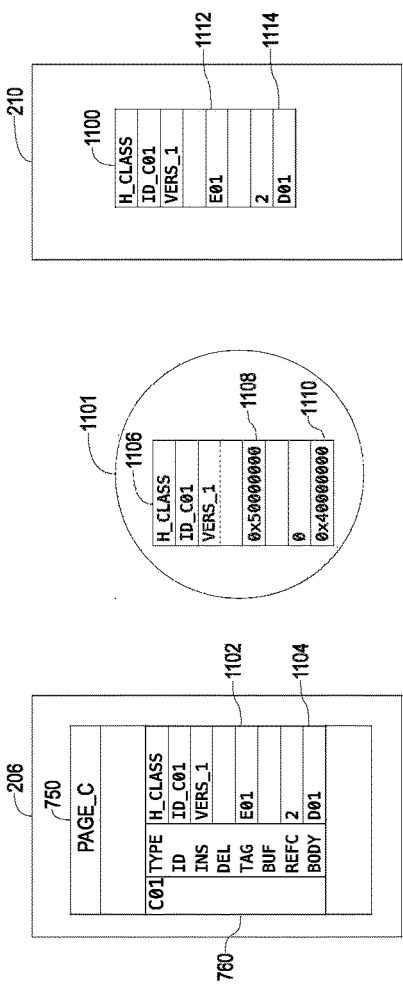
FIG. 11 illustrates correspondence of addressing amongst the token memory, working memory, and token file of permanent memory.

FIG. 11 shows the token memory 206, the token file 210 and an inset 1101. The token memory 206 includes example memory page PAGE_C 750 with the example head-block 760 at memory address C01 in the memory page 750, and the token file 210 includes an example memory block 1100 that represents a permanent copy of memory block 760. As mentioned earlier, the relative memory addresses (e.g., C01) are used in this description for clarity and brevity. However, the token-based database system 100 stores memory references as physical memory addresses, which allow efficient (direct) memory access.

The inset 1101 includes an example memory block 1106 that illustrates the memory-block 760 as it is actually stored in the working memory 102 of the token-based database system 100. Attention is drawn to the memory references included in the cells 1108 and 1110 of the memory block 1106, which correspond to the cells 1102 and 1104 of the memory-block 760. However, the cells 1108 and 1110 include the physical memory addresses 0x50000000 and 0x40000000, and not the relative memory addresses E01 and D01, which are shown in the cells 1102 and 1104 for clarity and brevity of the description.

The example memory-block 1100 of the token file 210 includes relative memory addresses E01 and D01 in the cells 1112 and 1114. These memory addresses have been calculated (converted) from the references in the cells 1108 and 1110 during the save operation 278 using information from the page-index 230, as described earlier in connection with FIG. 5.

It is noted that all relative references that are included in the index file 208 and token file 210 are converted back to physical memory addresses when the files 208, 210 are loaded into working memory 102 again (e.g., during the server initialization operation 260). It is noted further that storing relative memory references in the files 208, 210 make the files independent of the available physical memory addresses in the token-based database system 100. In this regard, if the token file 210 included physical memory addresses (e.g., 0x50000000), the TDB-Server 201 would not be able to load the token file 210 if the physical memory addresses (e.g., 0x50000000) were already used in the token-based database system 100.

After the TDB-Server 201 has executed the saving operation 278, the TDB-Server continues with the send answer operation 280, which sends back the result 228 to a database user of the computing system (not shown) connected to the token-based database system 100 (e.g., via the Internet) from which the request was received.

Figure 12A:
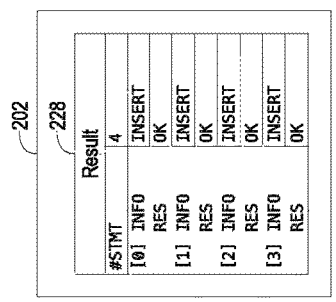
FIG. 12a illustrates a result in processing memory that includes the results from execution of insert statements in the transaction of the first request.

FIG. 12a illustrates the result 228 in the processing memory 202 that includes the results from the execution of the four insert statements 216 of the transaction 215 in request 214 (Request 1). The TDB-Server 201 translates the information included in the result into the language of the request 214 (English by default), and then sends back the answer 217 via the port generated on the socket 106 during initialization operation 260. It is noted that the answer 217 includes one result 228 for each transaction 215 included in a request 214. It is noted further that the TDB-Server 201 can summarize the result in the answer 217, e.g., result 228 in FIG. 12a can be summarized as "SUCCESSFULLY EXECUTED 4 INSERT STATEMENTS".

After the TDB-Server 201 sends the answer, the TDB-Server 201 continues with the clean-up operation 282, which cleans up the processing memory 202 after the request 214 (Request 1), e.g., clearing the transaction-context 220, roll-back-log 222, token-stream 224, execution-tree 226, and result 228.

After the processing memory 202 is cleaned, the TDB-Server 201 returns to the wait operation 264 of the request loop 262, and awaits the next database request 214. It is noted that after the execution of the first database request (Request 1), the token database 238 now includes an extended model 242 that describes people, articles, and invoices. The extended model 242 is described in greater detail with reference to FIG. 12b.

Figure 12B:
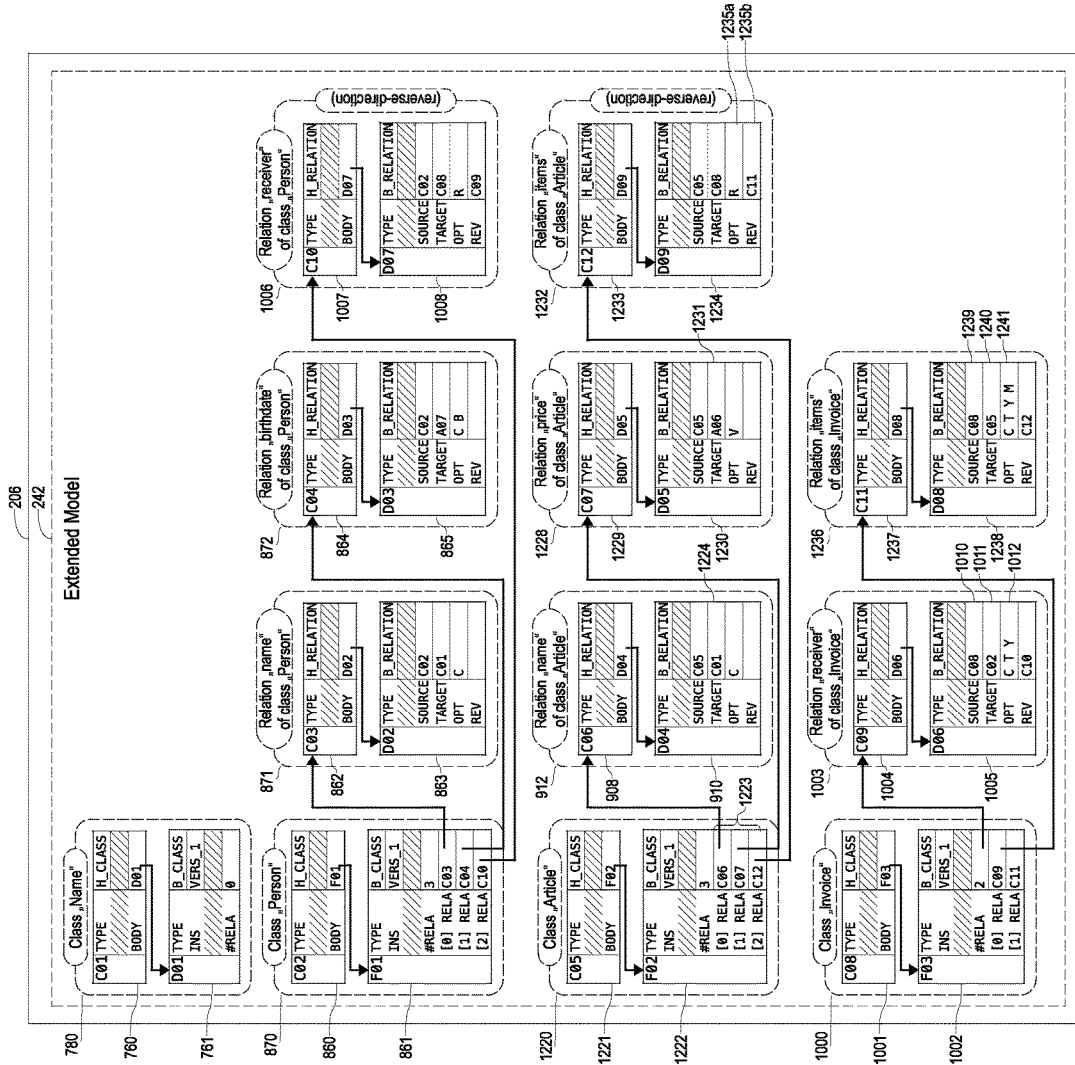
FIG. 12b illustrates token memory that includes certain classes and relations connected to these classes included in the extended model.

FIG. 12b illustrates the token memory 206 that includes the extended model 242, having certain classes and relations connected to these classes. The extended model 242 includes the class "Name" 780, class "Person" 870, class "Article" 1220, and class "Invoice" 1000, as well as a number of relations (e.g., 871, 872, 1006, 912, 1228, 1232, 1003, and 1236) that relate these classes.

Each of the dashed boxes 780, 870, 1220, and 1000, provided herein for clarity only, includes a head-block that represents a respective class and a body-block that describes the respective class. More specifically, the head-block 1221 represents the class "Article" and the body-block 1222 describes the class "Article" as having three (3) relations connected to it, as included in the sub-index #RELA 1223. The relation "name" 912 relates the class "Article" to the class "Name" 780, as indicated by memory address C01 in cell TARGET 1224. The relation "price" 1228 relates the class "Article" to the class FLOAT, as indicated by memory address A06 in cell TARGET 1231. It should be noted that the memory address A06 refers to the head-block 680 that is included in the core model, as illustrated hereinabove in FIG. 6*c*. The relation "items" 1232 is the reverse-direction relation of the relation "items" 1236, as indicated by the letter "R" included in cell OPT 1235*a* and the reference C11 in cell REV 1235*b*.

The class "Person" 870 also has three (3) connected relations, which are the relation "name" 871, the relation "birthdate" 872, and the reverse-direction relation "receiver" 1006. It should be noted that the relations 871, 872, and 1006 have been described earlier. The class "Invoice" 1000 has two (2) connected relations, which are the relation "receiver" 1003 and the relation "items" 1236. As described earlier, the relation "receiver" 1003 has the TWO_WAY option set, as indicated by the letter "T" in cell 1012. More specifically, the relation 1003 is the forward-direction relation that connects the class "Invoice" to class "Person", as indicated by memory addresses C08 and C02 in cells 1010 and 1011, respectively. Similarly, the relation "items" 1236 is the forward-direction relation that connects the class "Invoice" with the class "Article", as indicated by the memory addresses C08 and C05 in cells 1239 and 1240, respectively. It should be noted that the relation "items" 1236 also includes the option MULTIPLE, as indicated by the letter "M" in cell OPT 1241. This indicates that the relation "items" 1236 can connect to multiple instances, as described in greater detail hereinbelow.

The contents of the next database request 214 received by the TDB-Server 201 are shown in the example table below labeled Request 2. This database request 214 (Request 2) will now insert data into the user-data 244 of the token database 238. It is reiterated that the TDB-Server 201 affects informational changes to the token-based database system 100 in the form of one or more transactions 215 included in the database request 214. As described hereinbefore, the transaction 215 can include one or more statements 216.

| REQUEST 2 | |
|---|---|
| 1 | TRANSACTION ( ) { |
| 2 | INSERT Tim IS Name; |
| 3 | |
| 4 | INSERT Person WITH ( |
| 5 | name := Tim, |
| 6 | birthdate := @1970-01-01, |
| 7 | TAG := Tim); |
| 8 | |
| 9 | INSERT Article WITH ( |
| 10 | name := pencil, |
| 11 | price := 1.0 |
| 12 | TAG := pencil); |
| 13 | |

| REQUEST 2 | |
|---|---|
| 14 | INSERT Article WITH ( |
| 15 | name := paper, |
| 16 | price := 5.0, |
| 17 | TAG := paper); |
| 18 | |
| 19 | INSERT Invoice WITH ( |
| 20 | receiver := Tim, |
| 22 | items := (pencil, paper)); |
| 23 | } |

As illustrated immediately above, this database request 214 (Request 2) includes five (5) constituent statements 216. As described previously, the transaction starts with the keyword TRANSACTION, followed by a pair of parenthesis and a code block set forth between an opening curly brace and a closing curly brace. The first statement 216 inserts the name "Tim" into the token database 238. The second statement inserts a person named "Tim" that is born on 1 Jan. 1970. The third statement inserts an article named "pencil" that has a price of 1.0 (USD). The fourth statement inserts an article named "paper" that has a price of 5.0, and the last statement inserts an invoice that has the person named "Tim" as its receiver and lists a "pencil" and a "paper" article as its items.

The first insert statement 216 in Request 2 includes the operators INSERT and IS. As described above, the operator INSERT generates a new version-identifier for this transaction (VERS_2), while the operator IS allocates a new token of a specified token type in the token database 238.

The four statements set forth on lines 4-22 of Request 2 include the operators INSERT, WITH, and ASSIGN (":="). The operator WITH allocates a new head-block of type instance, and a corresponding body-block of the type instance. The operator ASSIGN generates a connection among a body-block of the type instance and a head-block of the type instance, as described in greater detail hereinbelow.

The keyword "@" set forth on line 6 indicates that the following characters should be interpreted as formatted date or date-time, e.g., "1970-01-01" represents 1 Jan. 1970 and "1970-12-31T14:00:00" represents 31 Dec. 1970 at 2 PM.

After the TDB-Server 201 receives Request 2, the TDB-Server 201 executes the initialization operation 268, which generates the memory structures in processing memory 202, as already described above with respect to Request 1, e.g., the transaction-context 220 is generated. Thereafter, the TDB-Server 201 enters the statement-loop 270, and executes the tokenizing operation 272 and the parsing operation 274 on the first insert statement of Request 2.

Figure 13A:
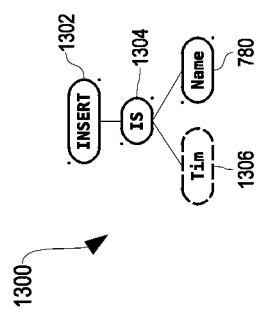
FIG. 13a illustrates an example execution tree that results from tokenizing and parsing an example first statement in an example transaction included in an example second request.

FIG. 13*a* illustrates an execution tree 1300 that results from the tokenizing and parsing operations 272, 274 of the first statement 216 in the transaction 215 included in the request 214 (Request 2). The execution tree 1300 includes the operators INSERT 1302 and IS 1304, the class "Name" 780, and the unknown word "Tim" 1306. It should be noted that the class "Name" 780 is a node in the execution tree that reference the class "Name" that is a token in the token-based database system 100, as described earlier with reference to FIG. 6*c*.

For brevity and clarity of the following description, the nodes in the execution tree that reference tokens in the extended model (FIG. 12*b*) are labeled with the same reference numbers, as illustrated in the extended model in FIG. 12*b*.

Figure 13B:
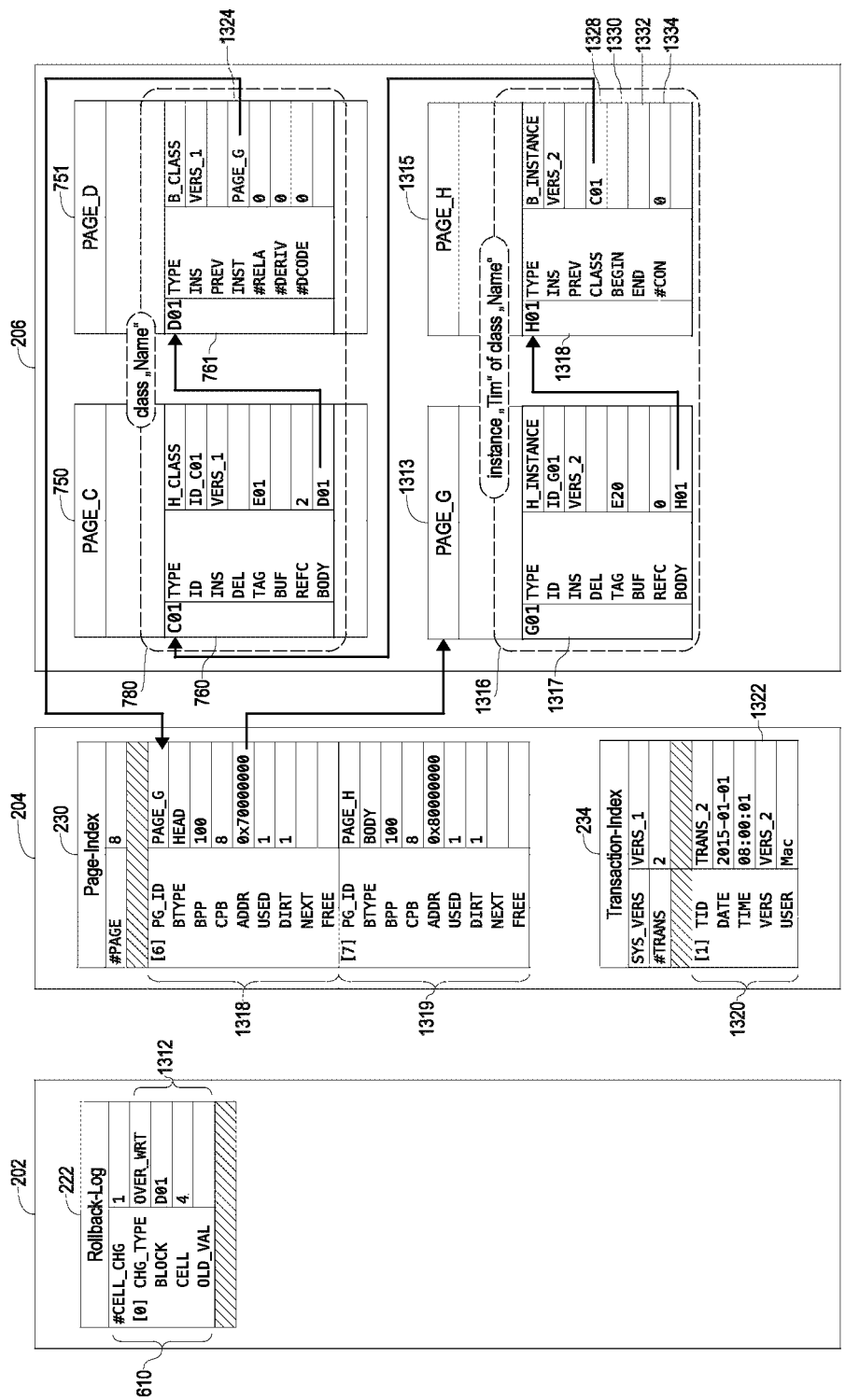

FIG. 13b illustrates a snapshot of the processing memory 202, the index memory 204, and the token memory 206, after the execution of the execution tree 1300. The processing memory 202 includes the rollback-log 222, which includes the sub-index #CELL_CHG 610 with one entry 1312. As aforementioned, the rollback-log 222 stores information about the changes to the index memory 204 and the token memory 206. These changes can be undone (rolled back) in the case of an error during execution.

The index memory 204 includes the page-index 230 and the transaction-index 234. The token memory 206 includes four memory pages 750, 751, and new memory pages 1313, and 1315. The memory page 750 includes head-blocks in the extended model 242 (e.g., head block 760 at memory address C01), and memory page 751 includes the corresponding body-blocks (e.g., body-block 761 at memory address D01). The memory page 1313 is a new memory page that includes head-blocks of the type instance (e.g., head-block 1317 at memory address G01), and memory page 1315 includes the corresponding body-blocks (e.g., body-block 1318 at memory address H01).

The body-block of type instance 1318 includes three cells TYPE, INS, and PREV, as described earlier. The cell CLASS 1328 includes a reference (memory address C01) to the class to which the instance "Tim" 1316 belongs. For example, the memory address C01 in cell 1328 refers to the head-block 760 that represents the class "Name" 780, indicating that the instance "Tim" is a name. The cell BEGIN 1330 and the cell END 1332 optionally store history-identifiers (real-world date-times) that indicate when the instance 1316 begins and when it ends. The sub-index #CON 1334 optionally stores connections to other instances.

The TDB-Server 201 starts the execution of execution tree 1300 with the operator 1302 (INSERT). As described earlier, the TDB-Server 201 checks if the transaction-index 234 already includes an entry for the current transaction. Because the transaction-index 234 does not include an entry for the current transaction, the TDB-Server 201 calculates a new version-identifier (VERS_2), and inserts a new transaction-index entry 1320 into the transaction-index 234, with the version VERS_2 included in cell VERS 1322. The TDB-Server 201 continues with the operator IS 1304 in the execution tree 1300.

The TDB-Server 201 inspects the left-hand-side and right-hand-side of the operator IS 1304, and finds the nodes with the word "Tim" 1306 and the class "Name" 780, respectively. This indicates that the TDB-Server 201 must generate a new instance of class "Name" that is tagged "Tim". In order to execute this operation, the TDB-Server 201 looks up the body-block 761 that includes the description of class "Name", and finds that the cell INST 1324 is empty initially (reference to memory-page written as follows). This indicates that the class "Name" has no instances yet. Accordingly, the TDB-Server 201 generates the two new memory pages 1313 and 1315, with corresponding entries 1318 and 1319 in the page-index 230. The memory page 1313 includes the head-blocks of the instances that belong to class "Name" (e.g., memory block 1317), and memory page 1315 includes the corresponding body-blocks for these instances (e.g., memory block 1318). The TDB-Server 201 next stores a reference (PAGE_G) to the page-index entry 1318 in cell INST 1324, such that the TDB-Server 201 finds the memory page 1313 the next time that the TDB-Server 201 must generate an instance of the class "Name".

Thereafter, the TDB-Server 201 allocates a new head-block 1317 at the memory G01 on memory page 1313, and a corresponding body-block 1318 at memory address H01 on memory page 1315, and thus fills the cells of these memory blocks in a way as described earlier. The final step in the execution of operator IS 1304 is the generation of a tag-index entry for the word "Tim", which includes the generation of the corresponding tag-list and token-list memory blocks (not shown).

It is noted that the execution of operator IS 1304 changed the value in cell INST 1324 from its previous value "empty" to its current value, the page reference "PAGE_G". This change is recorded in the sub-index #CELL_CHG 610 of the rollback-log 222. The cell-change entry 1312 includes four (4) cells. The cell CHG_TYPE (change type) includes the type of change (e.g., OVER_WRT), which indicates that the value of the cell has been overwritten. The cell BLOCK includes the memory address (D01) of the memory block 761 that includes the changed cell 1324. The CELL includes the position (e.g., value 4) of the changed cell 1324 within the memory block 761 (e.g., where the value 1 refers to the first cell in the block). The cell OLD_VAL (old value) includes the value of the changed cell 1324 before it was overwritten. More specifically, cell OLD_VAL is empty because the changed cell 1324 was empty before the change.

Figure 14A:
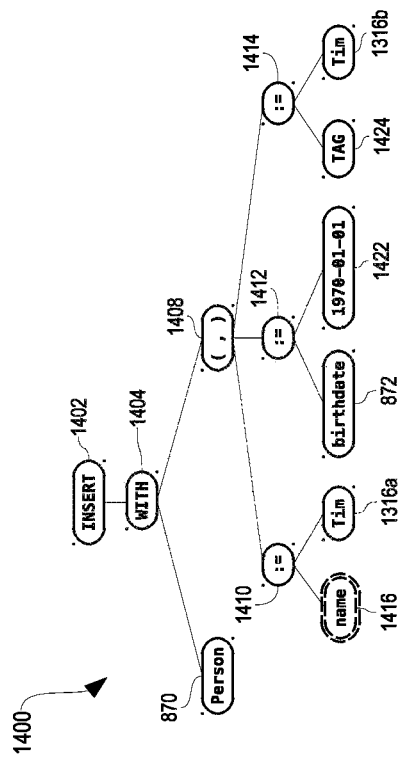
FIG. 14a illustrates an example execution tree that results from tokenizing and parsing an example second statement in the transaction included in the second request.

FIG. 14a illustrates an execution tree 1400 that results from the tokenizing and parsing operations 272, 274 of the second statement 216 in the transaction 215 included in the request 214 (Request 2). The execution tree 1400 includes the operators INSERT 1402, WITH 1404, ASSIGN 1410, 1412, and 1414, and LIST 1408, the keyword TAG 1424, the class "Person" 870, the relation "birthdate" 872, the instances "Tim" 1316a and 1316b, the date "1970-01-01" 1422, and the apparently ambiguous token "name" 1416.

Figure 14B:
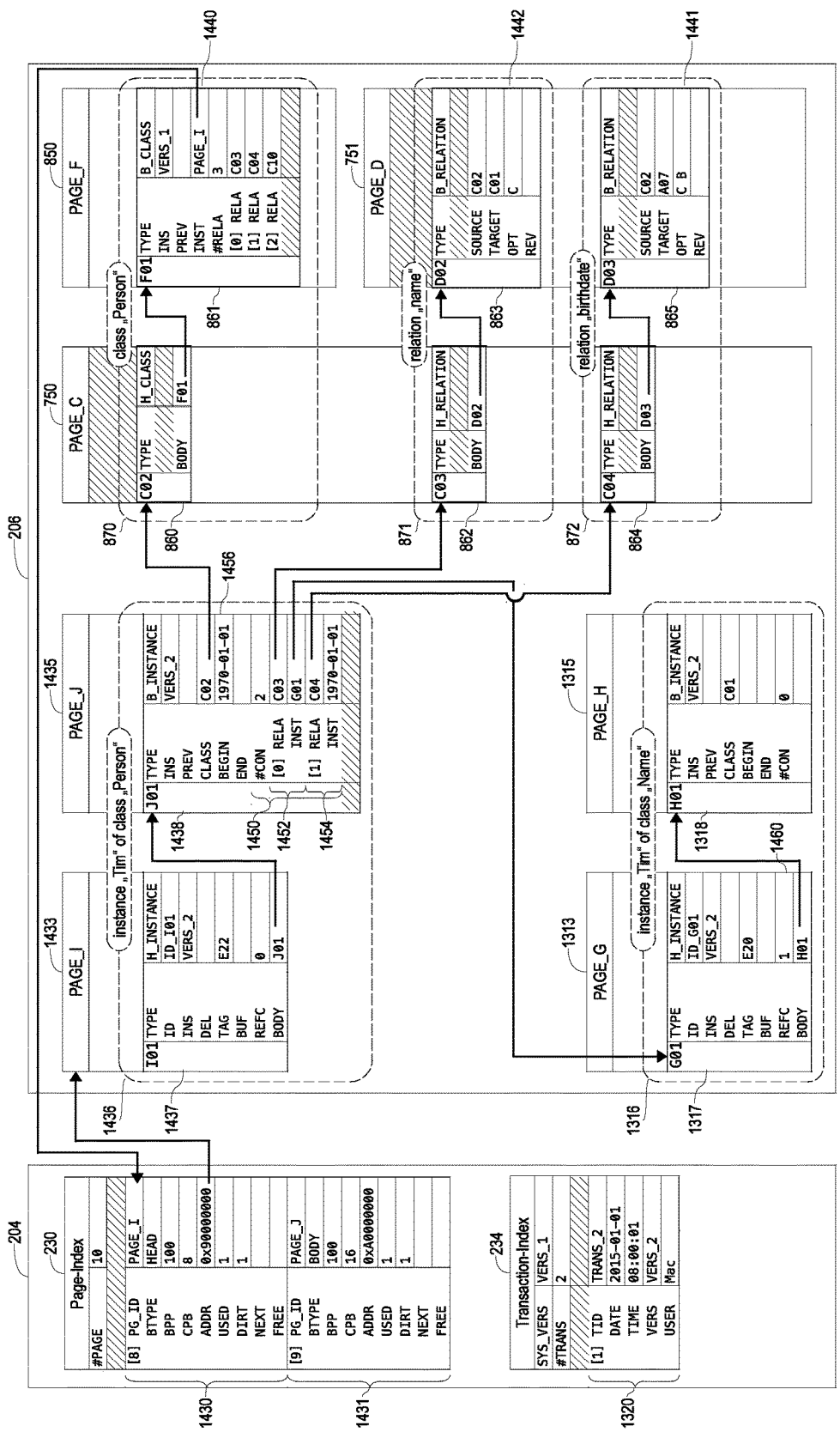

FIG. 14b illustrates a snapshot of the index memory 204 and token memory 206, after the execution of execution tree 1400. The index memory 204 includes the page-index 230 and transaction-index 234. The token memory 206 includes seven memory pages 750, 751, 850, 1313, and 1315, and new memory pages 1433, and 1435. The memory pages 750, 751, and 850 include information of the extended model 242. The memory pages 1313 and 1315 include instances of class "Name", and the memory pages 1433 and 1435 include the head-blocks and the corresponding body-blocks of instances of the class "Person", as described in greater detail hereinbelow.

The TDB-Server 201 starts the execution of execution tree 1400 with the INSERT operator 1402. As described earlier, the TDB-Server 201 tests whether the transaction-index 234 includes an entry for the current transaction (TRANS_2). The TDB-Server 201 finds that the entry 1320 exists and thus continues to the operator WITH 1404 of the execution tree 1400.

Accordingly, the TDB-Server 201 inspects the left-hand-side and right-hand-side of the operator WITH 1404, and finds the class "Person" 870 and the operator LIST 1408 that connects to the operators ASSIGN 1410, 1412, and 1414. This indicates that the TDB-Server 201 must generate a new instance of class "Person" and connect this instance to the other instances, as indicated by the operators ASSIGN 1410, 1412, and 1414.

In order to execute this operation, the TDB-Server 201 proceeds as follows. The TDB-Server 201 looks up the body-block 861 at memory address F01, which includes the description of the class "Person" and finds that cell INST 1440 is empty initially (cell INST 1440 will be written as described below). This indicates that the class "Person" has no instances yet. Accordingly, the TDB-Server 201 generates two new memory pages 1433 and 1435, with corresponding entries 1430 and 1431 in the page-index 230. The memory page 1433 includes the head-blocks of the instances that belong to class "Person" (e.g., memory block 1437), and memory page 1435 includes the corresponding body-blocks (e.g., memory block 1438). The TDB-Server 201 next stores a reference (PAGE_I) to the memory page 1433 in the cell INST 1440, such that that the TDB-Server 201 finds the memory page 1433 the next time that the TDB-Server 201 must generate an instance of the class "Person".

Thereafter, the TDB-Server 201 allocates a new head-block 1437 at memory address I01 on memory page 1433, and a corresponding body-block 1438 at memory address J01 on memory page 1435, and thus fills the cells of these memory blocks in a way as described earlier. The TDB-Server 201 then continues execution with the leftmost ASSIGN operator 1410 connected to the operator LIST 1408.

The TDB-Server 201 inspects the left-hand-side of the operator ASSIGN 1410 and finds the apparently ambiguous word "name" 1416. In order to resolve the apparent ambiguity, the TDB-Server 201 inspects the extended model 242 and finds that the word "name" can refer to different relations: relation (A) that relates the class "Person" to the class "Name"; or relation (B) that relates the class "Article" to the class "Name". In this case, the TDB-Server 201 chooses relation (A) because the operator WITH 1404 is connected to class "Person" 1406. The target of relation (A) is the class "Name". Accordingly, the TDB-Server 201 expects that the instance 1418 on the right-hand-side of the ASSIGN operator 1410 is of the class "Name".

On inspection of the instance "Tim" 1316, the TDB-Server 201 finds that the instance "Tim" is in fact of the class "Name". This assignment is thus considered valid. It is noted that if the TDB-Server 201 would have found an instance of a different class, the TDB-Server 201 generally would raise an "illegal assignment" error and would roll back the entire transaction 215 of request 214 (Request 2).

After the validation of the operator ASSIGN 1410, the TDB-Server 201 generates the connection among the newly generated instance 1436 and the instance 1316 ("Tim" of class "Name") by generating a new connection-entry 1452 in the sub-index #CON 1450 of the body-block 1438. The connection-entry 1452 includes two cells, RELA and INST. The cell RELA stores the memory address C03 of the head-block 862 that represents the relation on which this connection is based (e.g., the relation "name" connects the class "Person" to the class "Name"). The cell INST stores the memory address G01 of the head-block 1317 that represents the instance to which the connection is made (e.g., instance 1316).

The TDB-Server 201 now continues execution with the next operator ASSIGN 1412. The TDB-Server 201 finds the relation "birthdate" 872 on the left-hand-side. The TDB-Server 201 inspects the extended model 242, and finds that the relation "birthdate" targets the class DATE. The class DATE is part of the core model 240 and is represented by the head-block 681 at memory address A07, as illustrated in FIG. 6c. Accordingly, the TDB-Server 201 expects a date on the right-hand-side of the operator ASSIGN 1412. As this is the case, the assignment is thus valid, and the TDB-Server 201 generates the connection by storing another connection-entry 1454 in sub-index #CON 1450. As described before, the connection-entry 1454 includes two cells, RELA and INST. The cell RELA stores the memory address C04 of the head-block 864 that represents the relation on which the connection is based (e.g., relation "birthdate" connects class "Person" with class "DATE"). The cell INST stores the date 1970-01-01, which is the birthdate of the person "Tim". It should be noted that instances of core classes, e.g., the date instance 1970-01-01 of the core class DATE, are not stored as references but as values, which increases system performance.

During the above inspection of the relation "birthdate", the TDB-Server 201 also finds that the relation "birthdate" has the BEGIN option set, as indicated by the letter "B" in cell 1441. Therefore, the TDB-Server 201 stores the date 1422 from the right-hand-side of operator ASSIGN 1412 also in cell BEGIN 1456 of body-block 1438.

The TDB-Server 201 executes the rightmost operator ASSIGN 1414. The TDB-Server 201 finds the keyword TAG 1424 on the left-hand-side of operator ASSIGN 1414. This indicates that the TDB-Server 201 must tag the newly generated instance using the word "Tim" 1426, which is connected to the right-hand-side of the operator ASSIGN 1414. As described earlier, the generation of a tag includes a word-entry in the tag-index 232, and the corresponding tag-list and token-list memory blocks. The elements are not shown in FIG. 14b for brevity and clarity of the description.

It is noted that the connection-entry 1452 in sub-index #CON 1450 stores the memory address G01 of the head-block 1317 in memory page 1313. This implies that the head-block 1317 must not be removed because otherwise the stored memory address G01 might refer to an invalid memory block. In order to prevent this, the TDB-Server 201 increments a reference counter in cell REFC 1460 of the head-block 1314, e.g., the value of cell REFC is incremented from zero (0) to one (1). Accordingly, the TDB-Server 201 never removes head-blocks that stores a non-zero value in cell REFC.

It should be noted that the TDB-Server 201 does not insert an instance if the token database 238 already includes an identical instance. Instances are identical if they are connected to the same class and if all constant connection-entries are identical. More specifically, a constant connection-entry is a connection-entry that is based on a relation that has the option CONSTANT set, e.g., both of the relations "name" and "birthdate" have the option CONSTANT set, which is indicated by the letter "C" in cells 1441 and 1442, respectively. For example, the TDB-Server 201 would not allow the insertion of a duplicate instance of the class "Person", which has the name "Tim" and the birthdate 1 Jan. 1970 because such an instance already exists. This principle is referred to as "reality-identity" because it guarantees that the token-database 238 never includes two or more instances that refer to the same real-world object. It should be noted that current database systems do not provide such a feature. Thus, duplicate entries are generally possible in the current database systems, which can lead to erroneous results of database operations such as data queries.

Figure 15A:
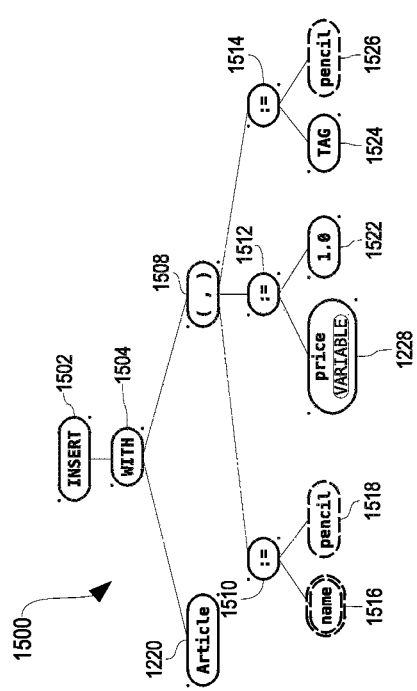
FIG. 15a illustrates an example execution tree that results from tokenizing and parsing an example third statement in the transaction included in the second request.

FIG. 15a illustrates the execution tree 1500 that results from the tokenizing and parsing operations 272, 274 of the third statement 216 in the transaction 215 included in the request 214 (Request 2). The execution tree 1500 has a similar structure as execution tree 1400, albeit with several differences. First, the right-hand-side of operator ASSIGN 1510 is an unknown word 1518. Second, the relation "price" 1228 has the option VARIABLE set. These differences affect the TDB-Server 201 execution of the execution tree 1500 as described hereinbelow.

Figure 15B:
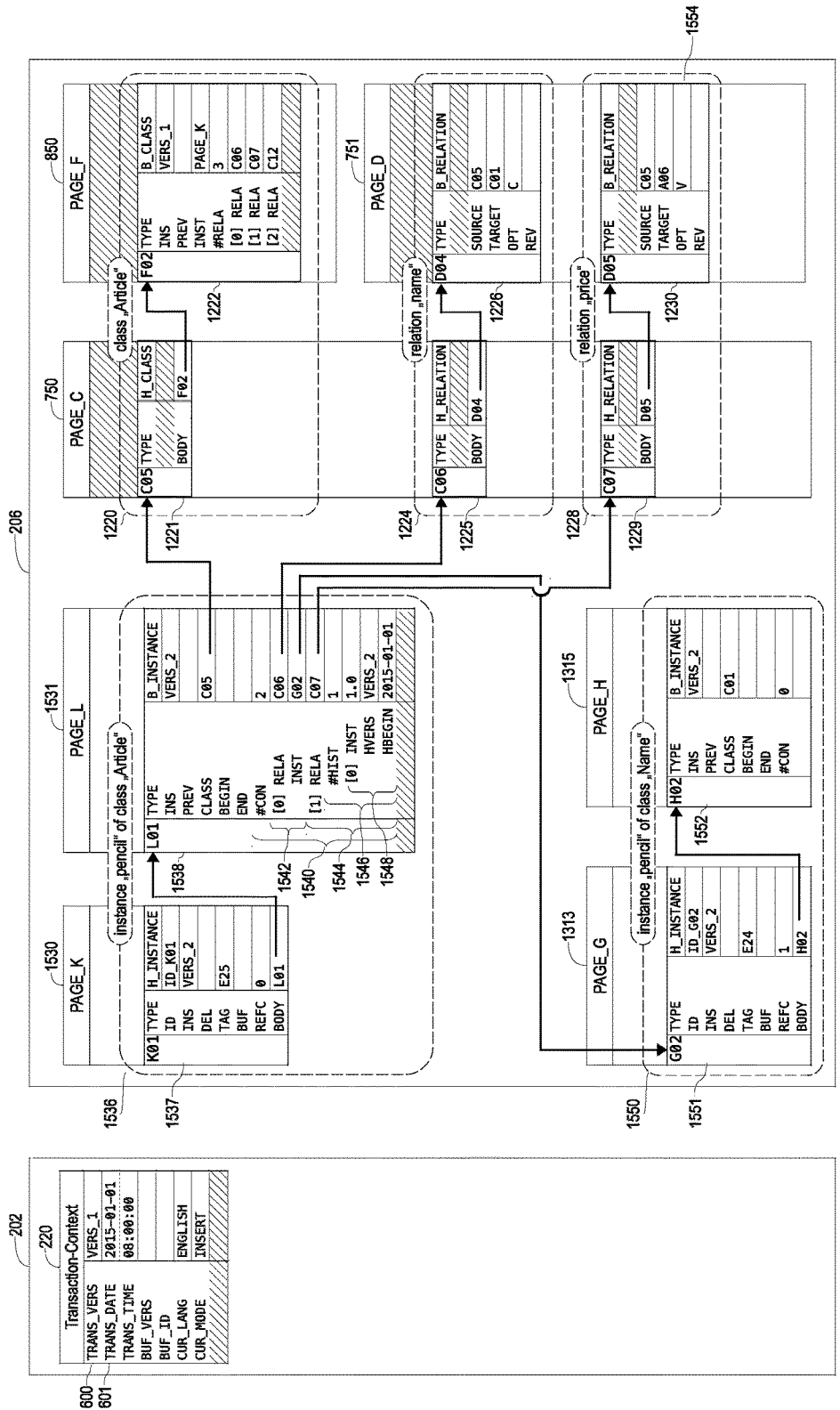

FIG. 15b illustrates a snapshot of the processing memory 202, including the transaction-context 220 and the token memory 206, after the execution of the execution tree 1500. The token memory 206 includes seven memory pages 750, 751, 850, 1313, and 1315, and pages 1530 and 1531, which have been newly generated during the execution of execution tree 1500. The memory pages 750, 751, and 850 include tokens of the extended model 242, and pages 1313 and 1315 include instances of the class "Name". The memory page 1530 includes the head-blocks of all instances of class "Article" (e.g., head-block 1537 at memory address K01), and the memory page 1531 includes the corresponding body-blocks (e.g., body-block 1538 at memory address L01).

As described above, the TDB-Server 201 starts the execution of execution tree 1500 with operator INSERT 1502, and continues execution with operator WITH 1504. The execution of the operator WITH 1504 generates memory pages 1530 and 1531, which include the head-block 1537 and the corresponding body-block 1538. The TDB-Server 201 then continues the execution with the operator ASSIGN 1510.

The TDB-Server 201 finds an apparently ambiguous word "name" 1516 on the left-hand-side of operator ASSIGN 1510 and resolves this apparent ambiguity to a relation (hereinafter relation (B)), which relates the class "Article" to the class "Name", as already described hereinabove. The TDB-Server 201 inspects the extended model 242 and finds that the relation (B) targets at the class "Name", and thus expects an instance of the class "Name" on the right-hand-side of operator ASSIGN 1510.

However, the TDB-Sever 201 finds the unknown word "pencil" 1518 on the right-hand-side of operator ASSIGN 1510. In such a case, the TDB-Server 201 re-inspects the extended model 242 in order to find out whether the target class of relation (B) (e.g., class "Name") is the source of any relations. Because the target of the relation (B) is not the source of any relations, the TDB-Server 201 generates a new instance 1550 of the class "Name", and tags the instance with the unknown word 1518 ("pencil"). In other words, the TDB-Server 201 implicitly or automatically executes a statement "INSERT pencil IS Name;". It should be noted that this statement and its execution is similar to the statement ("INSERT Tim IS Name;") set forth at line 2 of the Request 2. After the execution of this implicit statement, the word "pencil" 1518 is no longer unknown, but now refers to instance 1550 of the class "Name". Accordingly, the operator ASSIGN 1510 is now valid, and the TDB-Server 201 inserts the connection-entry 1542 into sub-index #CON 1540 of body-block 1538. It should be noted that the described implicit or automatic generation of tokens greatly simplifies the usage of relations. For example, with today's relational database languages (e.g., SQL), a data set must always be explicitly generated in the database before it can be referenced.

Thereafter, the TDB-Server 201 executes the operator ASSIGN 1512. The TDB-Server 201 finds the relation "price" 1228 on the left-hand-side of the operator ASSIGN 1512. The TDB-Server 201 then inspects the extended model 242, and finds that the relation "price" 1228 targets the class FLOAT. The class FLOAT is included in the core model 240 and referenced by head-block 680 at memory address A06, as illustrated in FIG. 6c. Accordingly, the TDB-Server 201 expects a floating point value on the right-hand-side of operator ASSIGN 1512. The right-hand-side of operator ASSIGN 1512 connects to the floating point number 1.0 1522. The operator ASSIGN 1512 is thus valid. During the above inspection of the relation "price" 1228, the TDB-Server 201 also finds that the relation "price" has the option VARIABLE set, as indicated by the letter "V" in the cell 1554. This indicates that the TDB-Server 201 must include a history-identifier within the connection-entry 1544, which the TDB-Server 201 now generates in sub-index #CON 1540 of the body-block 1538.

The connection-entry 1544 includes the cell RELA that stores the memory address C07 of the head-block 1229 of the relation on which the connection is based (e.g. memory address C07 which refers to the head-block 1229 of the relation "price"). The connection-entry 1544 further includes the sub-index #HIST 1546. The sub-index 1546 includes one history-element 1548, which includes three (3) cells, INST, HVERS, and HBEGIN. The cell INST stores the instance (e.g., floating point value 1.0) to which the connection-entry connects. It is reiterated that instances of core classes (e.g., class FLOAT) are not stored as references, but rather are directly stored as values. The cell HVERS stores the active version-identifier when the history-element 1548 was generated. The cell HBEGIN stores a history-identifier, which indicates when the history-entry 1548 begins in the real-world. In this regard, the TDB-Server 201 copies the value (VERS_2) from the cell TRANS_VERS 600 in the transaction-index 220 into HVERS of the history-element 1548, and further copies the value (2015-01-01) from the cell TRANS_DATE 601 in transaction-index 220 into cell HBEGIN of the history-element 1548.

Thereafter, the TDB-Server 201 concludes the execution of execution tree 1500, with the execution of operator ASSIGN 1514, which generates a tag "pencil" for the newly created instance 1536 as described earlier.

The third statement 216 in the request 214 (Request 2) inserts an instance of the class "Article" with a name "paper" and a price of 5.0 into the token database 238 of the token-based database system 100. The processing of this statement is identical to the second statement 216 in request 214 (Request 2) as previously described and will not be repeated.

However, the fourth statement 216 in the request 214 (Request 2) inserts an instance of the class "Invoice", which has the person "Tim" as the receiver and the articles "pencil" and "paper" as items.

Figure 16A:
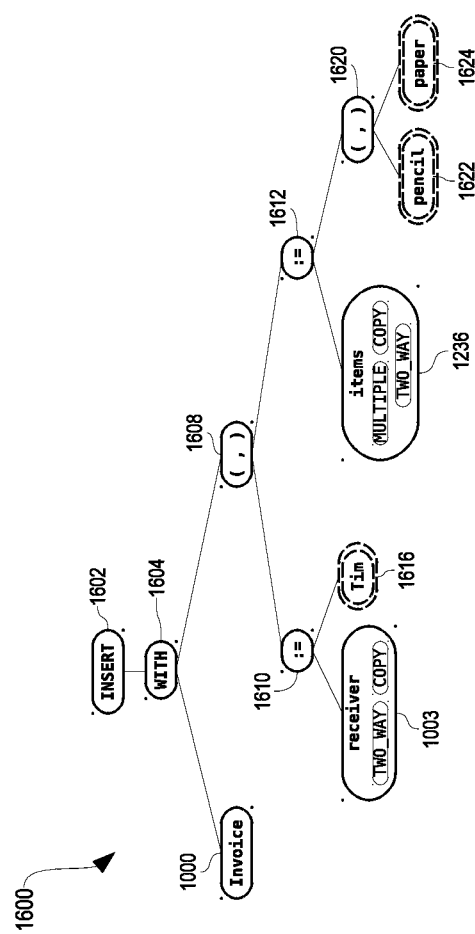
FIG. 16a illustrates an example execution tree that results from tokenizing and parsing an example fourth statement in the transaction included in the second request.

FIG. 16a illustrates the execution tree 1600 that results from the tokenizing and parsing operations 272, 274 of the fourth statement of 216 in the transaction 215 included in the request 214 (Request 2). The execution tree 1600 has a similar structure as execution tree 1400, albeit with the following difference. More specifically, the relation "receiver" 1003 has the options TWO_WAY and COPY set, and the relation "items" 1236 has the options MULTIPLE, COPY and TWO_WAY set. This difference affects the execution of execution tree 1600, as described in greater detail hereinbelow.

Figure 16B:
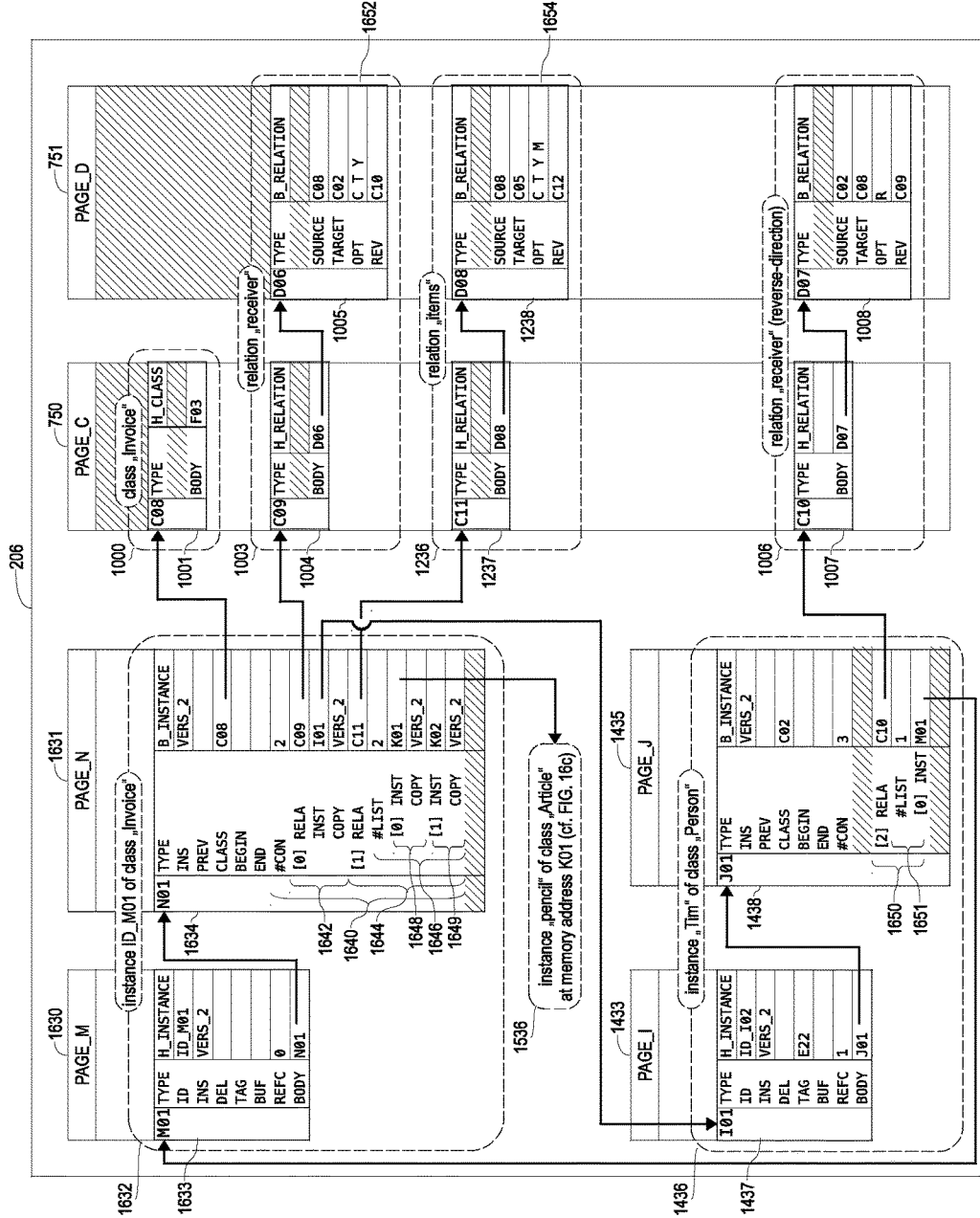

FIG. 16b illustrates a snapshot of the token memory 206 after the execution of the execution tree 1600. The token memory 206 includes six memory pages 750, 751, 1433, 1435, 1630, and 1631. Memory pages 750 and 751 include tokens of the extended model 242, and memory pages 1433 and 1435 include instances of the class "Person". The memory pages 1630 and 1631 are newly generated during the execution of the execution tree 1600. In particular, the memory page 1630 includes the head-blocks of instances of the class "Invoice", and the memory page 1631 includes the corresponding body-blocks.

The TDB-Server 201 starts the execution of the execution tree 1600 with the operator INSERT 1602, and continues the execution with the operator WITH 1604. The execution of the operator 1604 generates memory pages 1630 and 1631, which include a head-block 1633 at the memory address M01 and a corresponding body-block 1634 at the memory address N01. The TDB-Server 201 then continues execution with the operator ASSIGN 1610, which is similar to the execution of operator ASSIGN 1510 described above, and which generates connection entry 1642 in sub-index #CON 1640 that includes the connections that the body-block 1634 has to the other instances.

However, the connection-entry 1642 is different from connection-entry 1542 because it includes a third cell COPY, which stores the active version-identifier (VERS_2). The cell COPY is included in the connection-entry 1642 because the relation "receiver" 1003 has the option COPY set, as indicated by the letter "Y" included in cell 1652. The TDB-Server 201 can later use the version-identifier (VERS_2) in cell COPY to re-create the information as it was stored in the token memory 206 at version VERS_2. In other words, the TDB-Server 201 does not create a physical copy of the person "Tim", but rather uses the version-identifier to re-generate the information connected to the person "Tim" 1436, as described in greater detail with reference to FIG. 26b.

The TDB-Server 201 next generates a reverse-direction connection from the person instance "Tim" 1436 to the newly inserted invoice-instance 1632 because the relation "receiver" 1003 has the option TWO_WAY set, as indicated by the letter "T" included in the cell 1652. The TDB-Server 201 inserts a new reverse-direction connection-entry 1650 into the body-block 1438, which stores the description of the person instance "Tim" 1436. The reverse connection-entry 1650 includes the cell RELA that stores the memory address of the relation on which the connection is based, e.g., memory address C10 refers to the head-block 1007 of reverse-direction relation "receiver" 1006. The reverse-direction connection-entry 1650 further includes a sub-index #LIST 1651 that includes a memory reference M01 to the original invoice-instance 1632 to which the reverse-direction connection-entry 1650 connects. In other words, the connection entry 1642 connects the invoice-instance 1632 to the person "Tim" 1436, and the connection entry 1650 connects the person "Tim" 1436 back to invoice-instance 1632.

Thereafter, the TDB-Server 201 continues with the execution of the next operator ASSIGN 1612. The TDB-Server 201 finds the relation "items" 1236 on the left-hand-side of operator ASSIGN 1612. The TDB-Server 201 then inspects the extended model 242, and finds that the relation "items" 1236 targets the class "Article". Accordingly, the TDB-Server 201 expects an instance of the class "Article" on the right-hand-side of operator ASSIGN 1612. The right-hand-side of the operator ASSIGN 1612 connects to the operator LIST 1620. The TDB-Server 201 checks if the relation "items" 1236 is allowed to connect to multiple instances, and finds that the options MULTIPLE is set, as indicated by the letter "M" included in the cell 1654.

The TDB-Server 201 then inspects the elements 1622 and 1624 that are connected to the operator LIST 1620, and finds that the ambiguous elements 1622, 1624, which the TDB-Server 201 resolves to instances of the class "Article", as described earlier. Accordingly, the operator ASSIGN 1612 is thus valid. The TDB-Server 201 now generates the connection-entry 1644 in body-block 1634. The connection-entry 1644 includes a cell RELA that stores the relation on which the connection is based, e.g., memory address C11 refers to the head-block 1237 of relation "items" 1236. The connection-entry 1644 further includes the sub-index #LIST 1646. The sub-index #LIST includes two (2) list-elements 1648 and 1649. Each of the list-elements 1648, 1649 includes two (2) cells, INST and COPY. More specifically, the cell INST stores a reference (memory address K01 or K02) to the instance to which the list-entry connects (e.g., pencil or paper). The cell COPY stores the active version-identifier (VERS_2) when the list-entry was generated. The cell COPY is included in the list-elements 1648, 1649 because the relation "items" also has the option COPY set, as indicated by the letter "Y" included in the cell 1654. The relation "items" additionally has the option TWO_WAY set. Accordingly, the TDB-Server 201 also generates reverse-direction connections based on the reverse-direction relation stored at memory address C12. A first reverse-direction connection that originates from the instance "pencil" is illustrated in FIG. 16c.

Figure 16C:
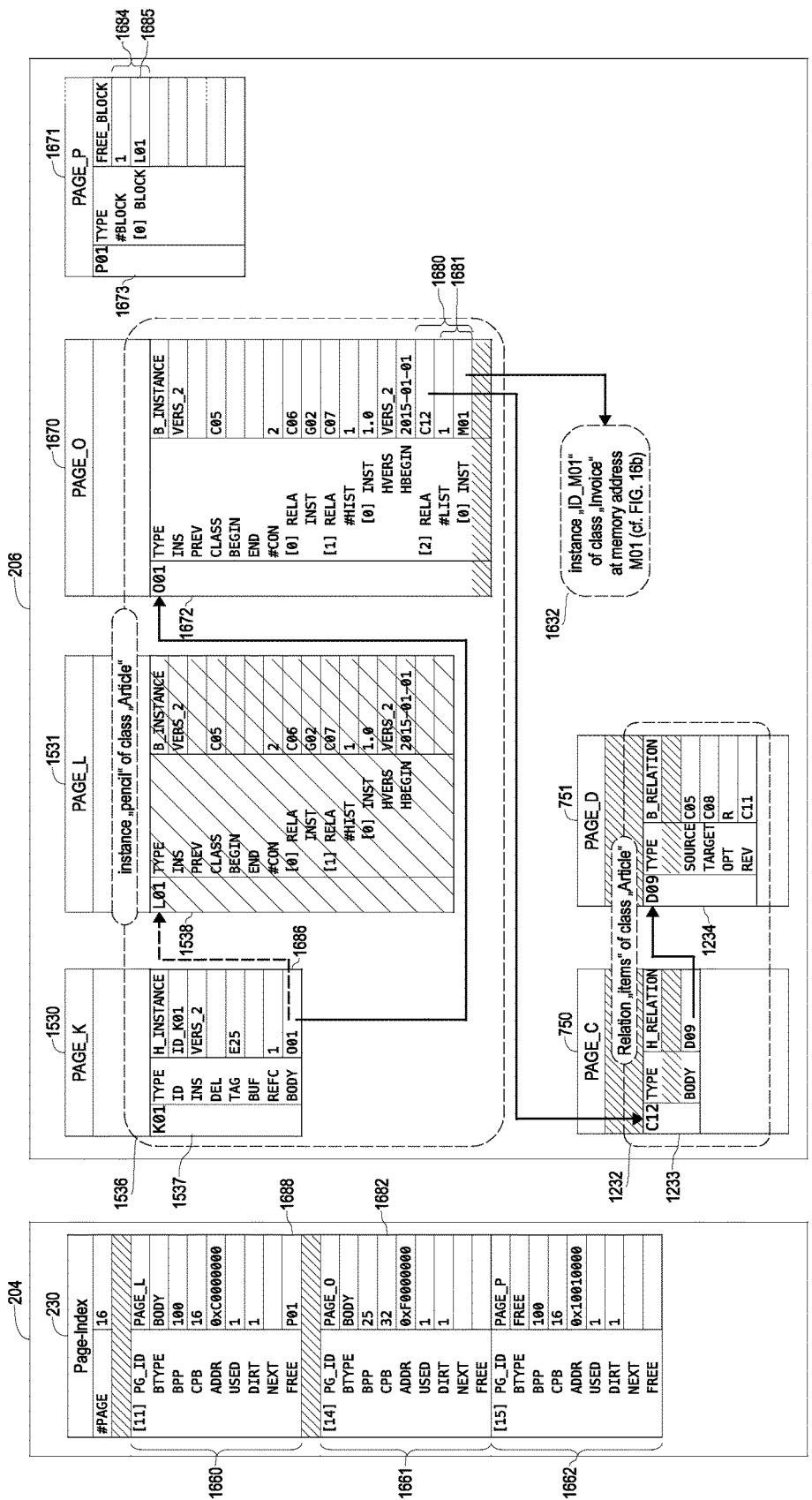
FIG. 16c illustrates a snapshot of index memory and token memory, in connection with generation of a reverse-direction connection entry.

FIG. 16c illustrates a snapshot of the index memory 204 and the token memory 206, in connection with the generation of the first reverse-direction connection entry 1680 included in body-block 1672 of the instance "pencil" 1536. The index memory 204 includes the page-index 230, and the token memory 206 includes memory pages 750, 751, 1530, 1531, 1670, and 1671. The memory pages 750 and 751 include tokens of the extended model 242, the memory pages 1530, 1531, and 1670 include the instance of the class "Article", and the memory page 1671 includes memory blocks that reference free blocks.

As illustrated, the memory pages 1670 and 1671 are newly generated during the generation of the reverse-direction connection entry 1680. The memory page 1670 includes body-blocks that have a block size of 32 cells-per-block as indicated by cell CPB 1682 in the corresponding entry 1661 in the page-index 230. The memory page 1671 includes memory blocks of type FREE_BLOCK (e.g., free-block 1673 at memory address P01), which store memory addresses of free blocks in sub-index #BLOCK 1684, as described below in greater detail.

The TDB-Server 201 generates the reverse-direction connection-entry 1680 in the body-block 1672 at the memory address O01. The reverse connection-entry 1680 includes the cell RELA that stores a reference to the relation on which the connection is based, e.g., memory address C12 refers to the head-block of reverse relation "items" 1232. The reverse connection-entry 1680 further includes a sub-index #LIST 1681 that includes the memory address M01. This means that now connection entry 1648 of instance "ID_M01" 1632 (shown in FIG. 16b) connects to instance "pencil" 1536 at memory address K01 and instance "pencil" 1536 connects back to instance "ID_M01" via connection entry 1680.

In view of the foregoing reverse-direction connection, the TDB-Server 201 moved the body-block 1538 at memory address L01 to the larger body-block 1672 at the memory address O01 because the reverse-direction connection-entry 1680 would not fit into body-block 1538 (e.g., there are three cells needed for the reverse-direction connection-entry, but only two empty cells were available in body-block 1538). In order to accomplish the block move, the TDB-Server 201 first generates the new page 1670, with a block size of 32 cells. The TDB-Server 201 then copies the contents of the body-block 1538 to body-block 1672, and further inserts the reverse-direction connection 1680. Thereafter, the TDB-Server 201 updates the cell BODY 1686 in head-block 1537 to reference the newly generated and filled body-block 1672 (e.g., the dashed line indicates that cell BODY 1686 previously referenced the body-block 1538, and the solid line indicates that the cell BODY 1686 now references the body-block 1672).

Because the body-block 1538 is no longer referenced by any other memory block, the body-block 1538 can thus be reused (freed) by the TDB-Server 201. Accordingly, the TDB-Server 201 generates the new memory page 1671, in which the TDB-Server 201 stores the memory addresses of the freed memory-blocks. As illustrated, the memory block 1673 is of type FREE_BLOCK and includes the memory address L01 in cell 1685. Moreover, the TDB-Server 201 also stores the reference P01 to the memory block 1673 in the cell FREE 1688 of the page-index entry 1660. Whenever the TDB-Server 201 needs to allocate a new memory block in memory page 1531, then the TDB-Server 201 reuses the free memory-blocks that are listed in memory-block 1673 first (e.g., memory-block 1538 in memory page 1531).

Upon completion of the execution of the Request 2, the TDB-Server 201 saves changes by executing operation 278, and sends the answer 217 with the information from the result 228 via the port generated on the socket 106. Thereafter, the TDB-Server 201 clean-ups at operation 282, and returns to the wait operation 264 of the request loop 262 to await the next database request.

The following description describes an example database request 214 (illustrated below in the table labeled Request 3), which is received and processed by the TDB-Server 201. In this example, the database request updates some of the information that was inserted into the user data 244 of the token database 238 by the previous request 214 (Request 2).

| REQUEST 3 |
| --- |
| 1  TRANSACTION ( ) { |
| 2    UPDATE Tim WITH ( |
| 3      birthdate := @1972-01-01); |
| 4 |
| 5    UPDATE pencil WITH ( |
| 6      price AT @2014-12-01 := 0.9); |
| 7  } |

As illustrated immediately above, this database request 214 (Request 3) includes a transaction 215 with two (2) constituent statements 216. The first statement 216 updates the birthdate of the person "Tim" to 1 Jan. 1972. The second statement updates the price of a pencil at 1 Dec. 2014 to 0.9.

The first statement includes the operators UPDATE, WITH, and ASSIGN (":="). The operator UPDATE generates a new version-identifier if the transaction does not already have a version-identifier assigned to it. The operator WITH generates a new body-block to include the updated information. The operator ASSIGN generates new connections among instances as described hereinabove. The second statement updates the price of a pencil to 0.9. The statement includes the same operators as the first statement and additionally includes operator AT. The operator AT is a history-operator, which indicates that the price update should be valid at a given date, e.g., 1 Dec. 2015.

Figure 17A:
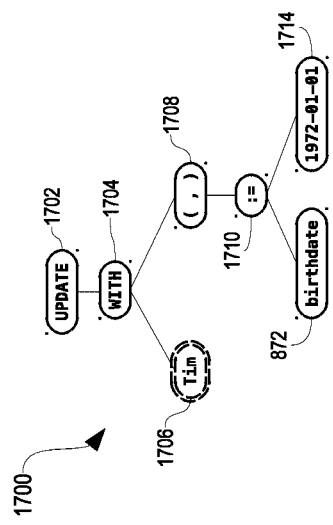
FIG. 17a illustrates an example execution tree that results from tokenizing and parsing an example first statement in an example transaction included in an example third request.

FIG. 17a illustrates the execution tree 1700 that results from the tokenizing and parsing operations 272, 274 of the first statement 216 in the transaction 215 included in the request 214 (Request 3). The execution tree 1700 includes the operators UPDATE 1702, WITH 1704, LIST 1708, and ASSIGN 1710, and further includes the relation "birthdate" 872, the date "1972-01-01" 1714, and the apparently ambiguous word "Tim" 1706.

Figure 17B:
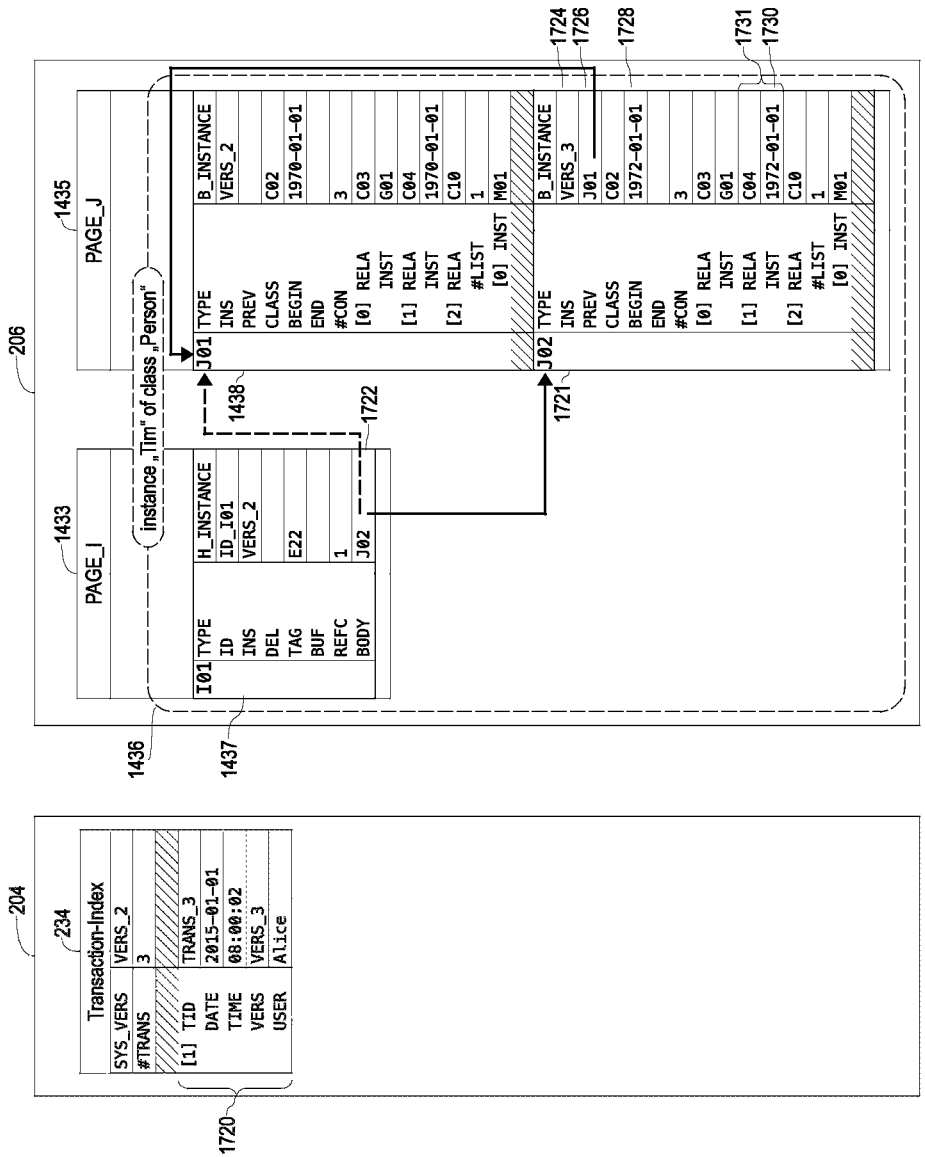

FIG. 17b illustrates a memory snapshot of the index memory 204 and the token memory 206, after the execution of the execution tree 1700. The index memory 204 includes the transaction-index 234, and the token memory 206 includes two memory pages, 1433 and 1435, which include instances of the class "Person".

The TDB-Server 201 starts the execution of execution tree 1700 with the operator UPDATE 1702. The execution of the operator UPDATE performs the same execution as the execution of the operator INSERT, which was already described hereinabove. This means that the execution of the operator UPDATE 1702 causes the TDB-Server 201 to generate a new version-identifier (VERS_3) and to insert a new entry 1720 into the transaction-index 234.

The TDB-Server 201 continues execution with the operator WITH 1704. The TDB-Server 201 finds the apparently ambiguous word "Tim" 1706 on the left-hand-side of the operator WITH 1704. By inspecting the tag-index 232, the TDB-Server 201 finds that the word "Tim" refers an instance of the class "Name" or an instance of the class "Person". The TDB-Server 201 now inspects the right-hand-side of the operator WITH 1704, and finds the operator ASSIGN 1710, which connects to the relation "birthdate" 872 on its left-hand-side. By inspecting the extended model 242, the TDB-Server 201 finds that the relation "birthdate" has as its source the class "Person". Accordingly, the TDB-Server 201 internally replaces or resolves the ambiguous word "Tim" 1706 with the instance "Tim" 1436 of the class "Person".

It should be noted that the described automatic resolving of ambiguous words is possible only in the token-based database system 100 because the tokens in the token database 238 are related to another. In contrast, data records in today's database systems typically store unrelated character strings. More specifically, an SQL statement "UPDATE Tim SET (birthdate='1972-01-01')" would be rejected by an SQL database management system with the error message "'Tim' is unknown", although the database may include one or more character strings "Tim" in the data records of the database. This error message illustrates clearly that today's SQL database management systems cannot relate the character strings "Tim" to any other objects in the database (e.g., tables) because such relations are not generated or stored.

Thereafter, the TDB-Server 201 continues with processing the LIST operator 1708, which leads to the operator ASSIGN 1710. The TDB-Server 201 validates the assignment as previously described and then starts to update the information in the token database 238. To accomplish update of the information in the token database 238, the TDB-Server 201 looks up the head-block 1437 of the instance "Tim", and thus finds the corresponding body-block 1438. As described earlier, the TDB-Server 201 does not directly change the birthdate information in block 1438, but rather copies the whole body-block 1438 over to the new (empty) block 1721 at memory address J02 in the memory page 1435, and changes the birthdate information in cells 1728 and 1730. As described in connection with the insertion of the person "Tim" in FIG. 14b, the change in cell 1730 updates the connection entry 1731 that is based on the relation "birthdate" and the change in cell 1728 updates the beginning of the instance "Tim" 1436. As described earlier, the update of cell 1728 is performed because the relation "birthdate" has the option BEGIN set, as indicated by the letter "B" in cell OPT of body-block 865 in FIG. 12b. The TDB-Server 201 then updates the version-identifier in cell 1724 to the active version-identifier (VERS_3), and stores a reference J01 to the original body-block 1438 in the cell PREV 1726 of body-block 1721. Finally, the TDB-Server 201 updates (redirects) the memory address in the cell BODY 1722 of head-block 1437 from its old reference J01 for the original body-block 1438 to the new reference J02 for the new body-block 1721.

The foregoing operations of changing information in copies of the original memory blocks, and relating these memory blocks to each other, provide assurance that the token-based database system 100 never loses information and that the TDB-Server 201 can always lookup "overwritten" information if necessary. However, these operations require a considerable number of memory blocks and accordingly memory, especially if the stored information is updated or changed frequently. To reduce the significant requirement of memory, the TDB-Server 201 uses a different update approach for the relations that are marked VARIABLE, as described in greater detail below in connection with the second statement of Request 3.

Figure 18A:
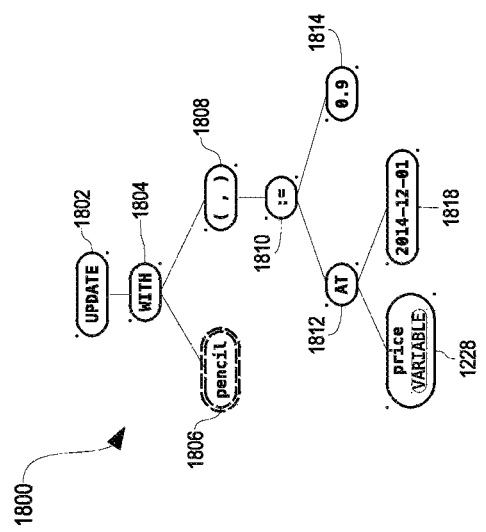
FIG. 18a illustrates an example execution tree that results from tokenizing and parsing an example second statement in the example transaction included in the third request.

FIG. 18a illustrates the execution tree 1800 that results from the tokenizing and parsing operations 272, 274 of the second statement in the transaction 215 included in the request 214 (Request 3). The execution tree 1800 includes the operators UPDATE 1802, WITH 1804, LIST 1808, ASSIGN 1810, and AT 1812, and further includes the relation "price" 1228, the floating point number "0.9" 1814, the date "2014-12-01" 1818, and the apparently ambiguous word "pencil" 1806.

Figure 18B:
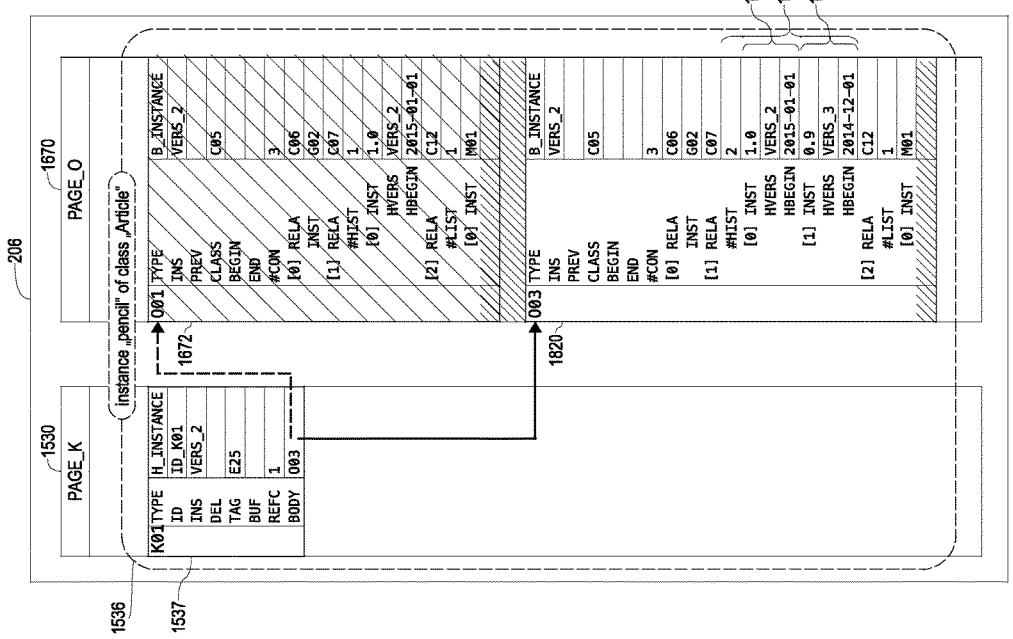

FIG. 18b illustrates a snapshot of the token memory 206 after the execution of the execution tree 1800. The token memory 206 includes two memory pages 1530 and 1670, which include the instance "pencil" of the class "Article".

The TDB-Server 201 starts the execution of the execution tree 1800 with the operator UPDATE 1802. The TDB-Server 201 finds that the transaction-index 234 already includes an entry for the current transaction, and thus continues with the operator WITH 1804. The execution of the operator WITH 1804 is similar to the execution described above in connection with the ambiguous word "Tim" 1706, e.g., the ambiguous word "pencil" 1806 is resolved to the instance "pencil" 1536 of the class "Article".

Thereafter, the TDB-Server 201 continues with processing the operator LIST 1808, which connects to the operator ASSIGN 1810. The operator ASSIGN 1810 connects to the operator AT 1812 on the left-hand-side. The occurrence of the operator AT 1812 on the left-hand-side of an operator ASSIGN is a special case in which the TDB-Server 201 does not execute the operator AT 1812, but simply caches the date 1818 that is connected to the right-hand-side of the operator AT. The TDB-Server 201 then inspects the left-hand-side of the operator AT 1812. Accordingly, the TDB-Server 201 finds the relation "price" 1228, which is then used by the TDB-Server 201 to validate the operator ASSIGN 1810, as described earlier.

After the validation of the operator ASSIGN 1810, the TDB-Server 201 updates the information in the token memory 206. More specifically, the TDB-Server 201 looks up the head-block 1537 of the instance "pencil" 1536, and finds the corresponding body-block 1672. The TDB-Server 201 then copies the contents of body-block 1672 (memory address O01) to a new (empty) body-block 1820 (memory address O03) in memory page 1670, and applies the foregoing updates to the new body-block 1820. More specifically, the TDB-Server 201 inserts the connection-entry 1822 into the sub-index #HIST 1546 that stores the history of prices. As the history of prices illustrates in #HIST 1546, the first connection-entry 1548 for the instance pencil is a price of 1.0, a version VERS_2, and a begin date HBEGIN of 1 Jan. 2015. In connection with the second connection-entry 1822, the TDB-Server 201 stores the cached date 1818 in the cell HBEGIN and the active version-identifier (VERS_3) in cell HVERS. The new connection-entry 1822 is inserted at the end of the sub-index #HIST 1820, because the connection-entries in sub-indices #HIST are generally sorted in descending order of the date stored in the cells HBEGIN.

It should be noted that the described update operation did not overwrite the cells in copied body-block 1820, but rather only added further cells, e.g., the three cells of connection-entry 1822. All information from the original body-block 1672 is still included in the copied and updated body-block 1820. Accordingly, the TDB-Server 201 updates the cell BODY of the head-block 1537 with the memory address O03 of the new body-block 1829 in the memory page 1670. After the update operation, the original body-block 1672 is not referenced by any other block, and is freed as described in greater detailed hereinabove. It should be noted further that the described update procedure used memory block efficiently and did not increase the overall number of used memory blocks, e.g., the procedure generated a new block 1820 and in turn freed block 1672.

Upon completion of the execution of the Request 3, the TDB-Server saves the changes by executing operation 278, and sends the answer 217 with the information from the result 228 via the port generated on the socket 106. Thereafter, the TDB-Server 201 clean-ups at operation 282, and returns to the wait operation 264 of the request loop 262 to await the next database request.

The following description describes an example database request 214 (illustrated below in the table labeled Request 4), which is received and processed by the TDB-Server 201. In this example, the database request updates some of the information that was updated into the user data 244 of the token database 238 by the Request 3. More specifically, the Request 4 performs another update of the pencil price.

| | REQUEST 4 |
|---|---|
| 1 | TRANSACTION ( ) { |
| 2 | UPDATE pencil WITH ( |
| 3 | price SINCE @2014-12-01 := 1.1); |
| 4 | } |

As illustrated immediately above, this database request 214 (Request 4) includes a transaction 215 with only one (1) constituent statement 216, which sets the price of a pencil to 1.1.

The statement includes the operators UPDATE, WITH, and ASSIGN (":="), as already described hereinabove. In addition, this statement also includes the history-operator SINCE, which indicates that the price update of the pencil should be valid since a given date, e.g., since 1 Dec. 2014.

It should be noted that the execution tree for the statement of Request 4 is similar to the execution tree 1800, and accordingly is not shown for brevity and clarity of the description. The only differences are the use of the operator SINCE instead of the operator AT, and the price of 1.1 instead of the price of 0.9. Accordingly, the execution tree 1800 could be simply updated to reflect these differences.

Figure 19:
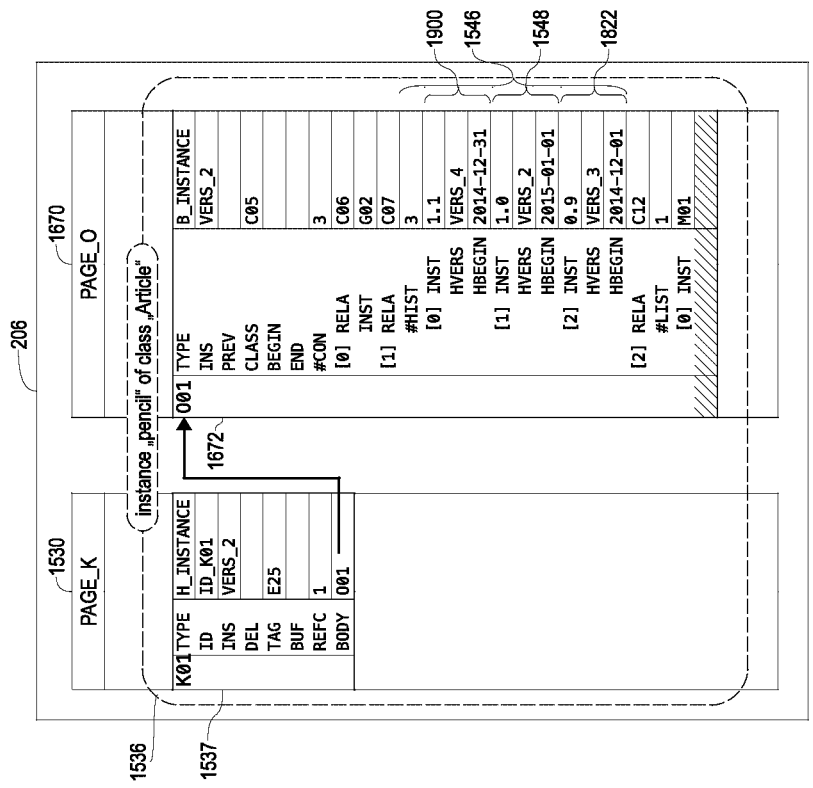
FIG. 19 illustrates snapshot of token memory after execution of an execution tree in accordance with a fourth example request.

FIG. 19 illustrates a snapshot of the token memory 206, which includes memory pages 1530 and 1670, after execution of the execution tree (not shown) in accordance with Request 4. More specifically, token memory 206 illustrates the copied and updated body-block 1672 after the execution of the statement of the Request 4. Attention is drawn to the fact that new connection-entry 1900 was inserted at the top of the sub-index #HIST 1546. It is noted that the history-operator SINCE indicates that a new connection-entry 1900 must be inserted at the top of a sub-index #HIST 1546, while history-operator AT indicates that a new connection-entry must be inserted into a sub-index #HIST in descending order with respect to the date values in cell HBEGIN. It will become apparent in connection with the following query examples that this ordering has the effect that the operator SINCE appears to overwrite one or more existing connection-entries with a new connection-entry, while the operator AT appears to insert a new connection-entry between the existing connection entries and generally does not overwrite the existing connection-entries. It should be noted that in one or more special cases, the operator AT can overwrite an existing connection-entry. For example, the operator AT will overwrite an existing connection-entry when the connection-entry exists at exactly the date-time at which the operator AT is requested to insert the new-connection entry.

Selecting Information from the Token-Based Database System

Figures 20A, 20B:

FIG. 20a illustrates an example nested table 2000 generated in the answer 217 by the TDB-Server 201 in response to the execution of a request 214 to select information from the token database 238. The example nested table 2000 includes three sub-tables "Person" 2002, "Invoice" 2004, and "Article" 2006. The sub-tables "Person" 2002 and "Invoice" 2004 include one column each, with the sub-table 2002 including a column labeled "name" and the sub-table 2004 including a column labeled "ID". The sub-table "Article" 2006 includes two columns, which are labeled "name" and "price".

The sub-table "Person" 2002 includes rows of people. For example, the first row 2008 of the sub-table "Person" 2002 includes a person with the name "Dennis". This person is associated with two invoices in the sub-table 2004, with the example IDs ID_M10 and ID_M44. More specifically, these invoices are included in the rows 2010 and 2012 of the adjoining sub-table "Invoice" 2004. Each invoice of the sub-table 2004 is associated with one or more articles in the sub-table 2006. For example, invoice ID_M10 is associated with articles "pencil" and "paper" which are included in rows 2014 and 2016 of the adjoining sub-table "Article" 2006.

The token-based database system 100 uses a relative method to store the nested table 2000 in memory, e.g., the processing memory 202. The term "relative" indicates that the token-based database system 100 does not store an absolute position of the values in the nested table 2000, but rather a relative position of the values in the nested table 2000, as will be described in greater detail below.

FIG. 20b illustrates how the nested table 2000 is actually stored in the result 228 of the processing memory 202. The cell INFO 2020 stores the value SELECT and cell RES 2022 stores the value OK, which indicate that the result 228 includes the result of a select statement and that the execution of the select statement was successful, respectively.

The following cells, starting with cell STREAM 2024 are referred to as a cell-stream. The cell 2024 marks the beginning of the nested table 2000, and more specifically of the header of the nested table 2000. The cell 2026 denotes that the following cell 2028 stores the name of a table (e.g., "Person"). The cell 2030 denotes that the following cell 2032 stores the name of a column (e.g., "name"), which belongs to the current table (e.g., "Person"). In this manner, a complete header of the nested table 2000 is stored in the cell-stream (e.g., table "Person" includes column "name", table "Invoice" includes column "ID", table "Article" includes columns "name" and "price").

The cell 2034 begins the representation of the body of the nested table 2000 (e.g., the rows of the nested table 2000). The cell-stream now alternatingly stores cells that either include a value that is displayed in nested table 2000, or include shifting information that indicate in which column, relative to the current column, the next value should be placed. The starting point of the nested table 2000 is row 1 of column 1. Accordingly, the value of cell 2036 ("Dennis") is displayed in row 1 of column 1. The next cell 2038 includes a positive column shift (e.g., COLUMN+1), which shifts positively from the current column by one column (e.g., row 1 of column 2), and indicates that the value of the next cell 2040 should be placed in that shifted column of the same row. Accordingly, the value of cell 2040 ("ID_M10") is placed in row 1 of column 2, and so on.

The cell 2042 includes negative column shift (e.g., COLUMN−1), which shifts negatively from the current column by one column into a new row (e.g., row 2 of column 3), i.e., the negative shift value also implies a positive row shift. Accordingly, the value of cell 2043 ("paper") is placed in row 2 of column 3, and so on. The end of the cell-stream is indicated by a negative shift (e.g., COLUMN−4 in cell 2044), which leads to a column position of zero.

The following description describes an example database request 214 (illustrated below in the table labeled Request 5), which is received and processed by the TDB-Server 201.

| REQUEST 5 |
| --- |
| 1   TRANSACTION ( ) { |
| 2     SELECT pencil.price; |
| 3 |
| 4     SELECT pencil.price UNTIL @2015-01-01; |
| 5 |
| 6     SELECT pencil.price UNTIL @2015-01-01 ASOF VERSION 3; |
| 7 |
| 8     SELECT Article. (name, price) UNTIL @2015-01-01; |
| 9 |
| 10    SELECT Article [UPDATED AT VERSION 3].(name, price AT @2014-12-15); |
| 11  } |

As illustrated immediately above, this database request 214 (Request 5) includes a transaction 215 with five (5) constituent select statements 216. The first select statement selects the current price of a pencil. This statement includes the operators SELECT and DOT ("."). The operator SELECT generally generates a cell-stream in a result 228, while the operator DOT connects information (tokens) that are stored in the token database 238, as described in greater detail hereinbelow.

The second select statement selects the prices of a pencil from the token database 238 associated with dates until 1 Jan. 2015. This select statement includes the operators SELECT, DOT, and UNTIL. The operator UNTIL 2204 is one of the five history-operators—AT, SINCE, UNTIL, BEFORE, AFTER—and indicates the end of a date-time range.

The third select statement selects the prices of a pencil from the token database 238 associated with dates until 1 Jan. 2015, as they were stored in version 3 (VERS_3). This select statement includes the operators SELECT, DOT, UNTIL, and ASOF. The operator ASOF is the version-operator that specifies a certain version. The keyword VERSION indicates that the following integer number should be interpreted as a version-identifier.

The fourth select statement selects the names and prices of all articles associated with dates until 1 Jan. 2015. This is in contrast to the first and second select statements that selected only the price of one article ("pencil").

The fifth select statement selects a name and a price of an article on 15 Dec. 2015, but only if the article has been updated in version number 3. This select statement includes the operators SELECT, DOT, AT, and INDEX ("[ ]"). The operator AT is a history-operator that specifies a certain point in time. The operator INDEX associates sub-statements with other code elements. The keyword UPDATED indicates that only information that has been updated should be selected.

FIG. 21a illustrates an execution tree 2100 for the first select statement ("SELECT pencil.price;") set forth in Request 5. The execution tree 2100 includes operator SELECT 2102 and operator DOT 2104, the relation "price" 1228, and the apparently ambiguous word "pencil" 2106. The sub-tree 2103 below the operator SELECT 2102 is referred to as the path of the first select statement. The path is a construct that connects different elements in a token database 238, for example, by using the operator DOT. The operator DOT 2104 connects the instance "pencil" to the relation "price", resulting in a path "pencil.price".

FIG. 21b illustrates the example processing memory 202 and the token memory 206, after the execution of the first select statement set forth in the Request 5. More specifically, the processing memory 202 includes the transaction-context 220 and the result 228. The result 228 includes a cell-stream 2110, which resulted from the execution of the execution tree 2100. The token memory 206 includes two memory pages, 1530 and 1670, which include instances of the class "Article".

As already mentioned hereinabove, the transaction-context 220 includes three sets 605, 606, and 607 of history-versioning related cells. The first set 605 includes the cells OWRT_VERS 2125 and OWRT_BUF_VERS 2127. The cell 2125 stores the current version-identifier, while cell 2127 stores the current buffer version-identifier. While the processing of the current system version-identifier in cell 2126 is described in paragraphs that follow immediately below, the processing of the buffer version-identifier in cell 2127 is described in greater detail in connection with the buffered transaction in FIG. 32 and the following. It is noted that an empty cell 2125 indicates that the TDB-Server 201 should use the version-identifier included in cell TRANS_VERS 600.

Whenever the TDB-Server 201 looks up a head-block or body-block in the token database 238, the TDB-Server 201 compares the version-identifier included in that memory block (e.g., in cell INS) against the current version-identifier in the cell 2125 of the transaction-context 220. If the version-identifier in the cell 2125 is smaller than the version-identifier in the memory block, this indicates that the memory-block is not valid (e.g., not visible). A head-block that is not visible is simply skipped and not processed by the TDB-Server 201.

If a body-block is not visible, the TDB-Server 201 additionally tests if the cell PREV of the body-block stores a reference to an earlier version of the body-block. If so, the TDB-Server 201 then checks if that earlier body-block is visible. If no previous body-block exists, or all previous body-blocks are not visible, the TDB-Server 201 then also skips the processing of the body-block.

The second set 606 includes six cells, which are labeled INST_VERS_BEG, INST_VERS_END, INST_VERS_OPT, INST_HIST_BEG, INST_HIST_END, and INST_HIST_OPT. These cells of the second set 606 are referred to as instance-selector cells or simply instance-selectors. The instance-selector cells include additional conditions regarding the visibility of the memory blocks of the type instance.

The first three instance-selector cells in set 606 indicate the allowed range of version-identifiers. This allowed range begins with the version-identifier in the cell INST_VERS_BEG, and ends with the version-identifier in the cell INST_VERS_END. The cell INST_VERS_OPT optionally includes information that further describes the range, e.g., whether the bounds of the range are included or excluded.

The second three instance-selector cells in set 606 indicate the allowed time range. Similarly to the version-identifier range, the time range begins with the time in the cell INST_HIST_BEG, and ends with the time in the cell INST_HIST_END. If a time range is set (e.g., the cells are not empty), the TDB-Server 201 tests each body-block of the type instance as to whether the times in the cells BEGIN and END of the body-block match with the indicated time range. If there is no match, the TDB-Server 2012 then skips the processing of the instance.

The third set 607 includes six cells, which are labeled CON_VERS_BEG, CON_VERS_END, CON_VERS_OPT, CON_HIST_BEG, CON_HIST_END, and CON_HIST_OPT. The cells of the third set 607 are referred to as connection-selector cells or simply connection-selectors. The connection-selector cells 607 have the same structure as the instance-selector cells 606. While the instance-selector cells are used to select the relevant instance, the connection-selector cells are used to select relevant connection-entries, as described hereinbelow in greater detail.

The following now describes the execution of the execution tree 2100 in connection with the first select statement of Request 5. More specifically, the TDB-Server 201 starts the execution of execution tree 2100 with the operator SELECT 2102. The execution of the operator SELECT 2102 first clears (empties or zeros) all cells of the transaction context 220 below cell CUR_MODE 2120. The TDB-Server 201 continues with the generation of the cell-stream 2110 in the result 228, which includes the generation of a header and the generation of a body in a nested table (e.g., nested table 2000). More specifically, the TDB-Server 201 starts the cell-stream 2110 by writing HEADER into cell 2140. The TDB-Server 201 then analyzes the execution tree 2100. Specifically, the TDB-Server 201 finds the operator DOT 2104 connected to the operator SELECT 2102. Accordingly, the TDB-Server 201 expects an instance or a class on the left-hand-side of the DOT operator.

In connection with the generation of the header in the nested table, the TDB-Server 201 finds the apparently ambiguous word "pencil" 2106, which the TDB-Server 201 resolves to the instance "pencil" of the class "Article", as described hereinabove. The TDB-Server 201 thus stores the values "TABLE" and "Article" in cells 2142 and 2144 of the cell-stream 2121. Now the TDB-Server 201 inspects the right-hand-side of the operator DOT 2104 and finds the relation "price" 1228. Accordingly, the TDB-Server 201 stores the values "COLUMN" and "price" in cells 2146 and 2148 of cell-stream 2121. The header of the cell-stream 2121 is now complete.

In connection with the generation of the body in the nested table, the TDB-Server 201 stores the value "BODY" in cell 2150 indicating that now the body part of the cell-stream 2121 begins. The TDB-Server 201 continues the execution of the operator SELECT 2102 by setting the cell CUR_MODE 2120 to SELECT. It is noted that the execution of the operator 2102 (SELECT) neither generates a new version-identifier nor generates an entry in the transaction-index 232. The TDB-Server 201 now executes the operator DOT 2104. The TDB-Server 201 first checks whether the cell CUR_TOKEN 2124 includes a memory address. If the cell 2124 is not empty, the TDB-Server 201 then continues processing with that memory address. However, if the cell 2124 is empty, the TDB-Server 201 then stores the memory address (e.g., K01) of the instance that is connected to the left-hand-side of the operator DOT 2104 into the cell CUR_

TOKEN 2124. The TDB-Server 201 additionally stores the value "INSTANCE" in the cell CUR_TYPE 2122, which indicates that the currently processed token is of the type instance.

Now the TDB-Server 201 looks up the head-block at the memory address in the cell 2124 (e.g., K01), and then checks the visibility of the memory block. As illustrated, the cell 2125 is empty. Accordingly, the TDB-Server 201 uses the version-identifier (VERS_4), which is stored in cell 600 for the visibility check. The TDB-Server 201 compares the version-identifier VERS_4 against the version-identifier VERS_2 stored in cell INS 2156 of head-block 1537, and determines that the head-block 1537 is valid (e.g. VERS_2 is smaller than VERS_4). The head-block 1537 is therefore considered visible.

Thereafter, the TDB-Server 201 looks up the corresponding body-block 1672 at memory address O01, which is referenced by the cell BODY 2158 in the head-block 1537. The TDB-Server 201 then checks the visibility of the body-block 1672 and determines that the body-block 1672 is also visible.

After checking that the body-block 1672 is visible, the TDB-Server 201 checks if body-block 1672 also satisfies the conditions included in the instance-selector cells 606. The instance-selector cells 606 are currently empty, which indicates that the TDB-Server 201 should use the latest available body-block. As the body-block 1672 is currently the only body-block in the version-chain of head-block 1537, the body-block 1672 is accordingly the latest available body-block.

Now the TDB-Server 201 checks if body-block 1672 includes a connection-entry that is based on the relation "price". The TDB-Server 201 finds the connection-entry 1544 that includes the price-history 1546, which includes price-history elements 1900, 1548, and 1822. Accordingly, the TDB-Server 201 selects elements from the price-history 1900 that satisfy the conditions of the connection-selector cells 607. The cells of the connection-selector are currently empty, which indicates that the TDB-Server 201 should select the latest element from the price-history 1546. As described earlier, the elements 1900, 1548, and 1822 in the price-history 1546 are sorted so that the latest element is at the top of the price-history. The TDB-Server 201 thus selects the top element 1900 from the price-history 1546. The TDB-Server 201 stores the value from the selected price-history element 1900 (e.g. value 1.1) in cell 2152 of the cell-stream 2110.

The operator DOT 2104 has only one instance (2106) connected to its left-hand-side, the TDB-Server 201 thus ends the execution of the operator DOT and returns to operator SELECT 2102. Thereafter, the TDB-Server 201 ends the execution of operator SELECT 2102 by storing the value COLUMN-1 in cell 2154, which closes the cell-stream 2110.

FIG. 21c illustrates a table 2180 that presents the cell-stream 2110 in a readable format, which results from the execution of the first select statement in Request 5 by the TDB-Server 201. The table 2180 includes a table name "Article" 2182, a column name "price" 2184, and a value 2186 (1.1).

FIG. 22a illustrates the execution tree 2200 for the second select statement ("SELECT pencil.price UNTIL @2015-01-01;") set forth in Request 5. The execution tree 2200 includes operators SELECT 2202, UNTIL 2204, and DOT 2210, and further includes the relation "price" 1228, the date "2015-01-01" 2012, and the apparently ambiguous word "pencil" 2214.

FIG. 22b illustrates the processing memory 202 and the token memory 206, after the execution of the second select statement of the Request 5. More specifically, the processing memory 202 includes the transaction-context 220 and the result 228. The result 228 includes a cell-stream 2220, which resulted from the execution of the execution tree 2200. The token memory 206 includes two memory pages 1530 and 1670. The memory page 1530 includes the head-block 1537 that represents the instance "pencil" 1536, and the memory page 1670 includes the corresponding body-block 1672.

The following now describes the execution of the execution tree 2200 in connection with the second select statement in the Request 5. More specifically, the TDB-Server 201 starts the execution of the execution tree 2200 with the execution of the operator SELECT 2202, which clears the transaction-context 220 as described above, and generates the cell-stream 2220 in the result 228. In the cell-stream 2220, the TDB-Server 201 stores header information in cells 2222 (associated with the header of a nested table) and the value "BODY" in cell 2223 (marking the beginning of the associated body of the nested table), as already described hereinabove. The TDB-Server 201 then executes the operator UNTIL 2204.

In executing the operator UNTIL 2204, the TDB-Server 201 writes time-range information and/or version-range information to the history-versioning related cells 605-607 of the transaction-context 220. However, before writing information to a cell, the content of that cell is cached in a newly generated time-stack entry (e.g., time-stack entry 2232) of the sub-index #TIME_STACK 626. After the execution of the operator 2204 is finished, the TDB-Server 201 writes the cached values in the time-stack entry (e.g., time-stack entry 2232) back to the cells 605-607 in the transaction-context 220. Such cache-restore mechanism generally allows the nesting of multiple operators UNTIL, or multiple time-version operators (e.g., AT, SINCE, etcetera), respectively. In executing the operator 2204, the TDB-Server 201 generates the time-stack entry 2232 and copies the values of the cells CON_HIST_END 2230 and CON_HIST_OPT 2231 into the respective cells of time-stack entry 2232. It is noted that the cells of entry 2232 are empty because the cells 2230 and 2231 were initially empty. Thereafter, the TDB-Server 201 writes the date "2015-01-01" 2008 that is connected to the right-hand-side of the operator 2204 into the cell 2230, and then writes the value "UNTIL" into the cell 2231.

The TDB-Server 201 continues the execution on the left-hand-side with the operator DOT 2210. In executing the operator 2210, the TDB-Server 201 selects a value from the price-history 2242 as described earlier. However, in this example the cells of the connection-selector 607 are not empty. Accordingly, the TDB-Server 201 does not select the latest price-history element from the price-history 1546, but rather iterates over the price-history 1546 in order to find relevant price-history elements until the relevant date of 2015 Jan. 1, as described in greater detail in the following paragraph.

The first price-history element 1900 in the price-history 1546 is visible and satisfies the condition of the connection-selector 607 because the cell HBEGIN of the price-history element 1900 stores the date 2014-12-31, which is before the relevant date of 2015 Jan. 1 stored in the cell 2230 of the connection-selector 607 in the transaction-contexts 220. Accordingly, the element 1900 is selected. The second price-history element 1548 is visible, but it has been "overwritten" by the first price-history element 1900. As mentioned earlier, the history-elements 1900, 1548, and 1822 are generally sorted in descending order with respect to the dates in the cells HBEGIN. However, the descending order of the price-history 1546 is broken by the second price-history element 1548, which has the date 2015-01-01 in the corresponding cell HBEGIN. More specifically, the date 2015-01-01 of the second price-history element 1548 is greater than the date 2014-12-31 of the first price-history element 1900. Accordingly, the TDB-Server 201 skips the second price-history element 1548. The third price-history element 1822 is visible, and also satisfies the condition of the connection-selector 607 because the cell HBEGIN of the price-history element 1822 stores the date 2014-12-01, which is before the relevant date of 2015 Jan. 1. Accordingly, the third price-history element 1822 is also selected.

The TDB-Server 201 stores the dates and values of both selected price-history elements 1900, 1822 in the cell-stream 2220, in connection with the body information of the nested table. For example, the date 2014-12-31 in cell 2224 of the cell-stream 2220 is copied from cell HBEGIN of price-history element 1900, and the value 1.1 in cell 2225 of the cell-stream 2220 is copied from the cell INST of the first price-history element 1900.

After executing the operator DOT 2210, the TDB-Server 201 returns to the operator 2204, which now restores the cached values from the time-stack entry 2232 to the cells 2230 and 2231. More specifically, the cells 2230 and 2231 are set to empty once again, in accordance with the cache-restore mechanism. However, for clarity and brevity of the description this is not reflected in FIG. 22*b*. Thereafter, the TDB-Server 201 returns to the operator 2202 and ends the execution of the execution tree 2200 by storing the value COLUMN −1 in the cell 2226 of the cell-stream 2220, which closes the cell-stream 2220.

FIG. 22*c* illustrates a table 2280 that presents the cell-stream 2220 in a readable format, which results from the execution of the second select statement in Request 5 by the TDB-Server 201. The table 2280 includes a table name "Article" 2282 and column name "price" 2284. The column price 2284 includes two (2) price entries 2286, 2288, each of which includes a date (e.g., 2014-12-31) and a value (e.g., 1.1).

Figures 23A, 23B, 23C:
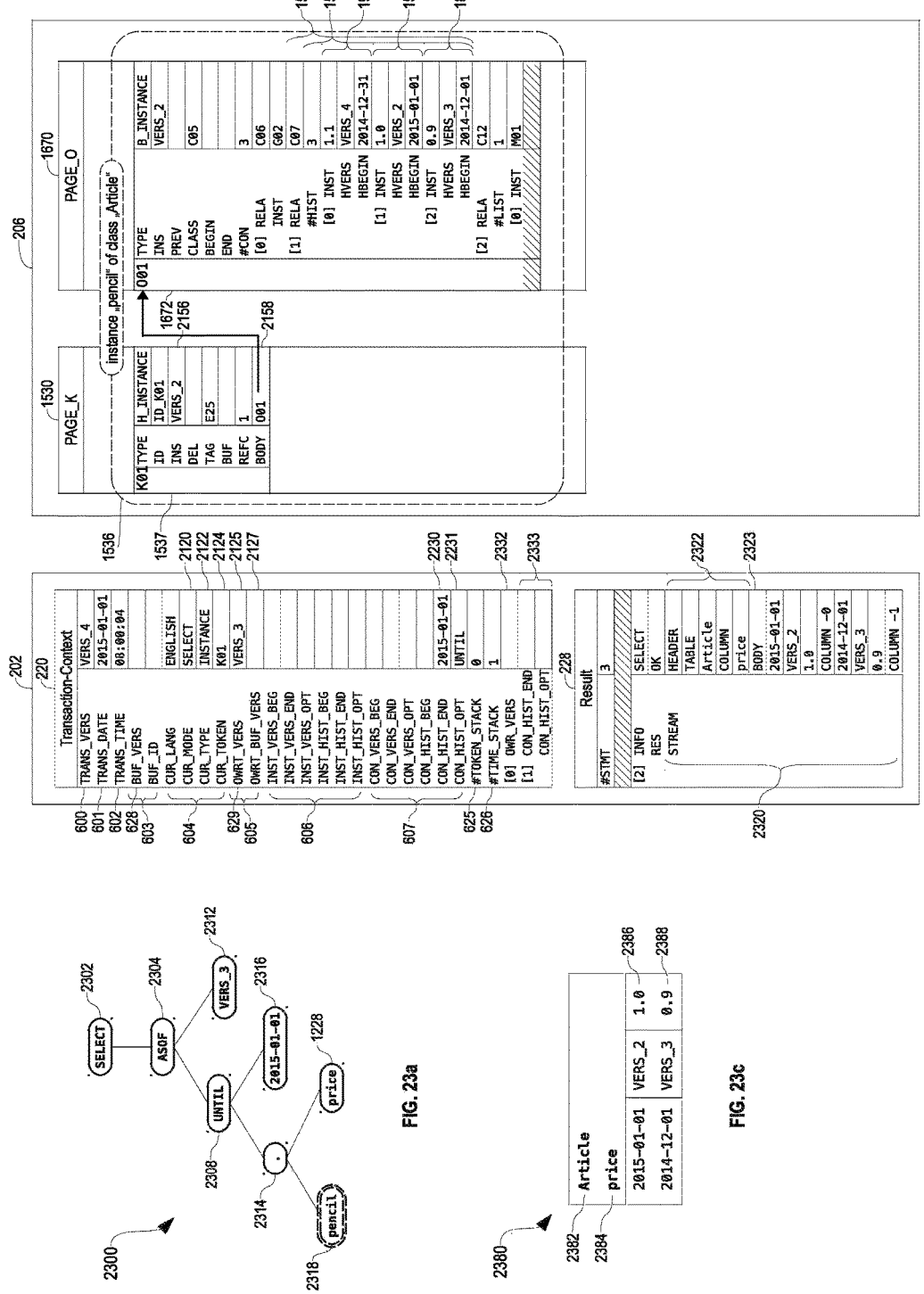

FIG. 23*a* illustrates the example execution tree 2300 for the third select statement ("SELECT pencil.price UNTIL @2015-01-01 ASOF VERSION 3;") set forth in the Request 5. The execution tree 2300 includes operators SELECT 2302, ASOF 2304, UNTIL 2308, and DOT 2314, and further includes relation "price" 1228, date "2015-01-01" 2316, version-identifier "VERS_3" 2312, and the apparently ambiguous word "pencil" 2318.

FIG. 23*b* illustrates the processing memory 202 and the token memory 206, after the execution of the third select statement of the Request 5. More specifically, the processing memory 202 includes the transaction-context 220 and the result 228. The result 228 includes a cell-stream 2320, which resulted from the execution of the execution tree 2300. The token memory 206 includes two memory pages 1530 and 1670, which include instances of the class "Article".

The following describes the execution of the execution tree 2300 in connection with the third select statement in the Request 5. More specifically, the TDB-Server 201 starts the execution of the execution tree 2300 with the execution of operator SELECT 2302, which clears the transaction-context 220 as described before, and generates the cell-stream 2320 in the result 228. In the cell-stream 2320, the TDB-Server 201 stores header information in the cells 2322 (associated with header of a nested table) and the value "BODY" (indicating the beginning of the body associated with the nested table) in the cell 2323, as described hereinabove. The TDB-Server 201 then executes the operator ASOF 2304.

In executing the operator ASOF 2304, the TDB-Server 201 generates a new time-stack entry 2332, and writes the value from the cell OWRT_VERS 2125 to the time-stack entry 2332. It should be noted that the time-stack entry 2332 is empty because the cell 2125 was initially empty. Thereafter, the TDB-Server 201 writes the version-identifier 2312 that is connected to the right-hand-side of operator ASOF 2304 to the cell 2125 of the transaction-context 220. The TDB-Server 201 continues execution with operator UNTIL 2308, which generates a new time-stack entry 2333 and writes values "2015-01-01" into the cell 2230 and "UNTIL" to the cell 2231, as described hereinabove.

Thereafter, the TDB-Server 201 executes the operator DOT 2314, which selects one or more values from the price-history 1546. The first price-history element 1900 is not selected because it is not visible (e.g., price-history element 1900 includes the version-identifier VERS_4, but the current version in cell OWRT_VERS 2125 is set to VERS_3). Accordingly, the TDB-Server 201 skips the first price-history element 1900. The second price-history element 1548 is visible, and satisfies the condition from the connection-selector 607. The third price-history element 1822 is also visible, and also satisfies the condition from the connection-selector 607. Accordingly, the price-history elements 1548 and 1822 of the price-history 1546 are selected and the values are written to the cell-stream 2320, as described hereinabove.

FIG. 23*c* illustrates a table 2380 that presents the cell-stream 2320 in a readable format, which results from the execution of the third select statement in Request 5 by the TDB-Server 201. The table 2380 includes a table name "Article" 2382 and a column name "price" 2384. The column price 2384 includes two (2) price entries 2386, 2388, each of which includes a date (e.g., 2015-01-01), a version (e.g., VERS_2), and a value (e.g., 1.0).

Figures 24A, 24C:
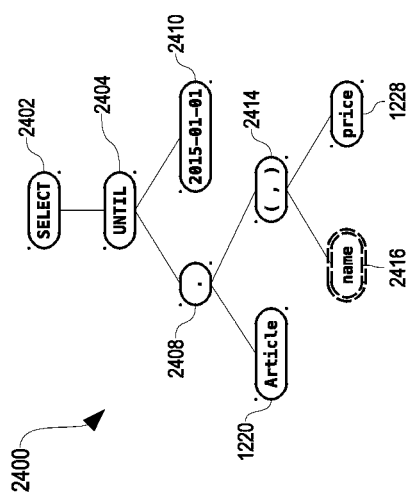

FIG. 24*a* illustrates the execution tree 2400 for the fourth select statement ("SELECT Article.(name, price) UNTIL @2015-01-01;") set forth in the Request 5. The execution tree 2400 includes operators SELECT 2402, UNTIL 2404, DOT 2408, and LIST 2414, and further includes class "Article" 1220, relation "price" 1228, date "2015-01-01" 2410, and the apparently ambiguous word "name" 2416.

Figure 24B:
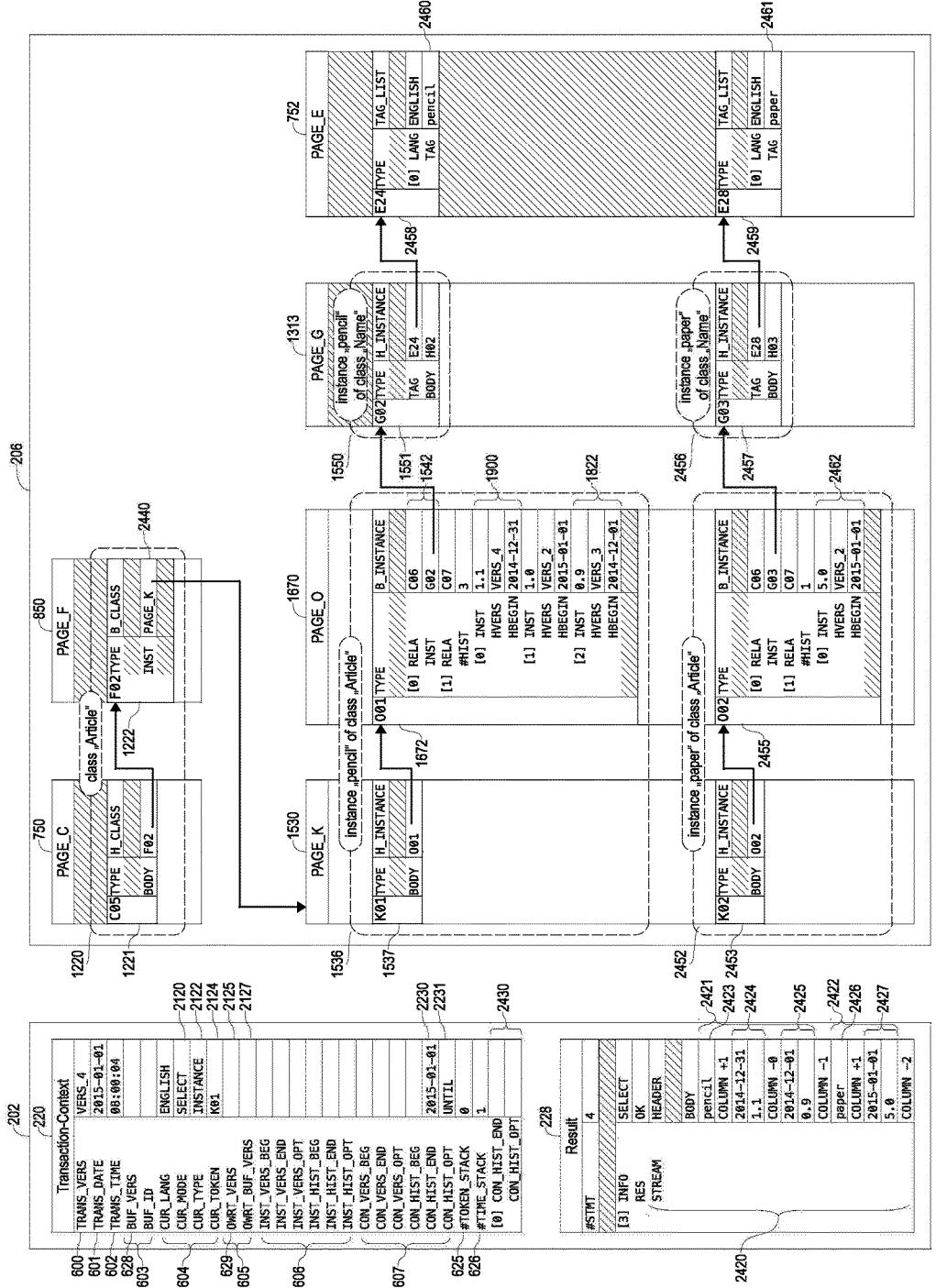

FIG. 24*b* illustrates the processing memory 202 and the token memory 206, after the execution of the fourth select statement of the Request 5. The processing memory includes the transaction-context 220 and the result 228. The token memory 206 includes the memory pages 750, 850, 1530, 1670, and 752. The memory pages 750 and 850 include tokens that belong to the extended model 240. The memory pages 1530 and 1670 include instances of the class "Article", and the memory page 752 includes memory blocks of type TAG_LIST.

In executing the execution tree 2400, the TDB-Server 201 starts with the execution of the operator SELECT 2402, which clears the transaction-context 220 and initializes the cell-stream 2420, as already described hereinabove. The TDB-Server 201 then executes the operator UNTIL 2404, which generates the time-stack entry 2430 and writes values "2015-01-01" and "UNTIL" into cells 2230 and 2231. Thereafter, the TDB-Server 201 executes the operator DOT 2408.

The operator 2408 has the class "Article" 1220 connected to its left-hand-side. This indicates that the TDB-Server 201 should iterate over all instances of the class "Article".

Accordingly, the TDB-Server 201 looks up the head-block 1221 of class "Article", and thus finds the body-block 1222 that stores a reference to the memory page 1530 in the cell INST 2440. The memory page 1530 includes the head-blocks of all instances of the class "Article".

Accordingly, the TDB-Server 201 now executes the following loop for all articles. More specifically, the TDB-Server 201 stores the memory address K01 of the first head-block 1537 in the memory page 1530 in cell CUR_TOKEN 2124, and then executes the operator 2408, as already described hereinabove. This execution stores contents of the cells 2421 in the cell-stream 2420. More specifically, the value "pencil" in the cell 2423 is read from the cell 2460 of the tag-list block 2458 in page 752, the date "2014-12-31" and the number "1.1" in the cells 2424 are read from the history-entry 1900, and the date "2014-12-01" and the number "0.9" in the cells 2425 are read from the history-entry 1822. Thereafter, the TDB-Server 201 stores the memory address of the next head-block K02 of the second head-block 2453 in memory page 1530 in cell CUR_TOKEN 2124, and then executes the operator 2408 again. This execution thus stores cells 2422 in cell-stream 2420. More specifically, the value "paper" in the cell 2426 is read from the cell 2461 of the tag-list block 2459 in the page 752, the date "2015-01-01" and the number "5.0" in the cells 2427 are read from the history-entry 2462 of the body-block 2455 at memory address O02. The TDB-Server 201 thus continues this loop until all head-blocks in memory page 1530 have been processed.

FIG. 24*c* illustrates a table that presents the cell-stream 2420 in a more readable format, which results from the execution of the fourth select statement in Request 5 by the TDB-Server 201. The table 2480 includes a table name "Article" 2482, and two columns "name" 2483 and "price" 2484. The column 2483 includes two (2) articles, a pencil and a paper. The column 2484 includes two (2) price entries 2486, 2488 for the pencil, each of which includes a date (e.g., 2014-12-31) and a value (e.g., 1.1). In a similar fashion, the column 2484 includes one (1) price entry 2490 for the paper, including a date (e.g., 2015-01-01) and a value (e.g., 5.0).

Figures 25A, 25B, 25C:
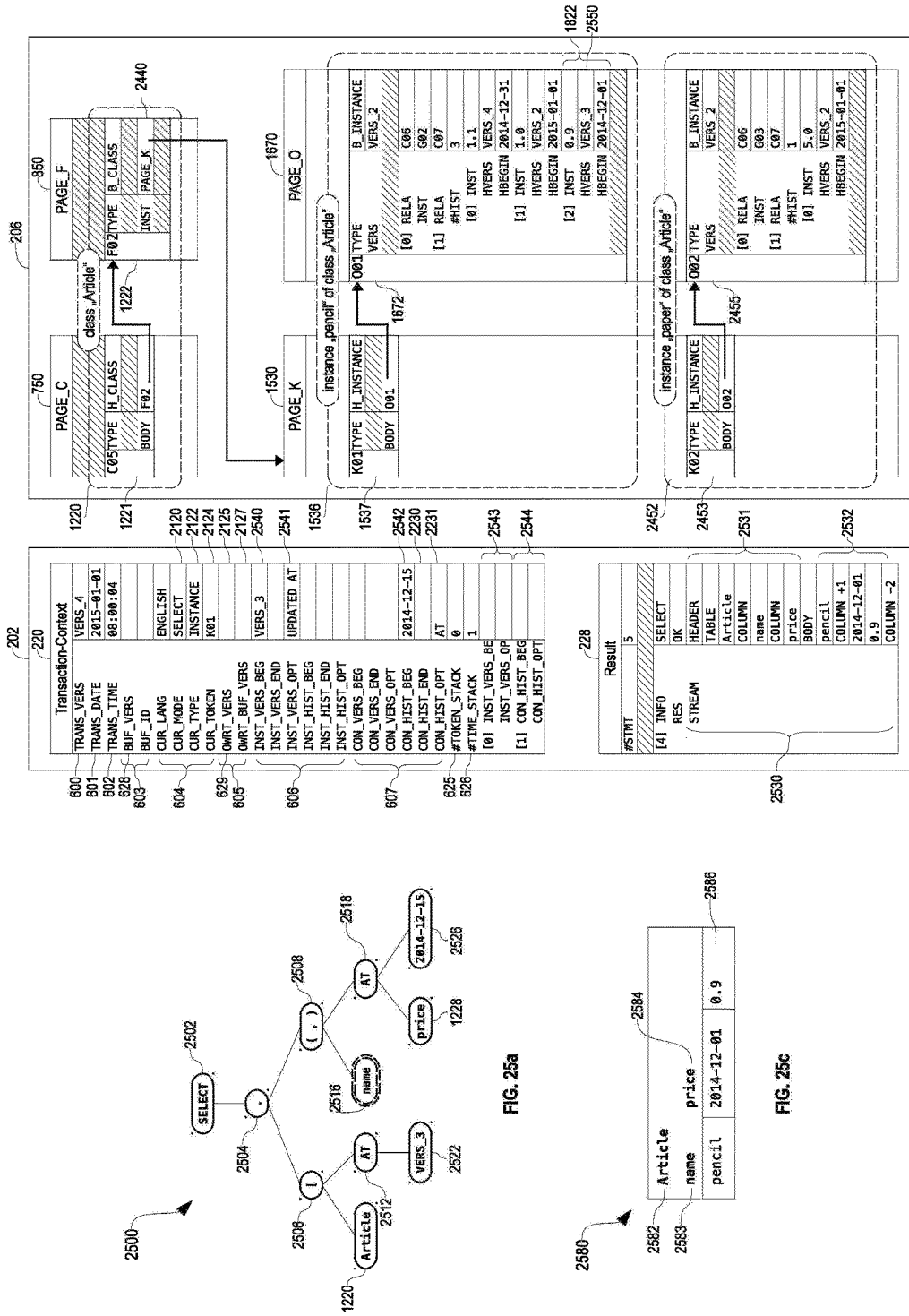

FIG. 25*a* illustrates the example execution tree 2500 for the fifth select statement ("SELECT Article[UPDATED AT VERSION 3].(name, price AT @2014-12-15)") set forth in the Request 5. The execution tree 2500 includes operators SELECT 2502, DOT 2504, INDEX 2506, LIST 2408, and AT 2512, 2518, and further includes class "Article" 1220, relation "price" 1228, date "2014-12-15" 2526, version-identifier "VERS_3" 2522, and the apparently ambiguous word "name" 2516.

FIG. 25*b* illustrates the processing memory 202 and the token memory 206, after the execution of the fifth select statement of the Request 5. The processing memory 202 includes the transaction-context 220 and result-set 228. The token memory 206 in FIG. 25*b* is identical to the token memory 206 in FIG. 24*b*, with the exception that memory pages 1313 and 753 are not shown for clarity and brevity of the following description.

In executing the execution tree 2500, the TDB-Server 201 starts execution with the operator 2502, which generates the cell-stream 2530 in the result 228 and writes the header cells 2531, as already described hereinabove. The TDB-Server 201 then executes operator 2504 that connects to the operator 2506.

Accordingly, the TDB-Server 201 inspects the operator connected to the left-hand-side of the operator 2504 and finds the operator INDEX ("[ ]") 2506. The left-hand-side of the operator 2506 is the class "Article" 2510 and the right-hand-side of the operator 2506 is the operator AT 2512. This indicates that the TDB-Server 201 must apply the time-operator 2512 to the class "Article" 2510. Accordingly, the TDB-Server 201 executes the operator 2512 which generates time-stack entry 2543 and writes values "VERS_3" and "UPDATED AT" into the cells 2540 and 2541, respectively.

Thereafter, the TDB-Server 201 continues with the execution of the operator 2504, as described hereinabove. More specifically, the TDB-Server 201 iterates over all instances of the class "Article" that are included in memory page 1530. The first instance represented by head-block 1537 is visible and connects to body-block 1672. The TDB-Server 201 thus inspects the body-block 1672, and finds that this body-block includes a connection-entry 1822, which includes a version-identifier (VERS_3) in the cell HVERS 2550. This indicates that body-block 1672 has been updated in version VERS_3, and thus satisfies the conditions as set forth in the instance-selector cells 2540 and 2541. Accordingly, the TDB-Server 201 stores the memory address K01 in cell CUR_TOKEN 2124, and continues the execution of the operator 2504 which stores the contents of the body cells 2532 in the cell-stream 2530, as described earlier. More specifically, the value "pencil" is read from the tag-list block 2458 illustrated in FIG. 24*b*, and the date "2014-12-01" and the number "0.9" are read from the connection entry 1822 illustrated in FIG. 25*b*.

The TDB-Server 201 iterates to the second instance of the class "Article" represented by head-block 2453, which is also visible and connects to body-block 2455. The TDB-Server 201 thus inspects the body-block 2455, but does not find a version-identifier (VERS_3), which indicates that the second instance has not been updated in version VERS_3. Accordingly, the TDB-Server 201 skips the head-block 2453.

FIG. 25*c* illustrates a table 2580 that presents the cell-stream 2530 in a readable format, which results from the execution of the fifth select statement in Request 5 by the TDB-Server 201. The table 2580 includes a table name "Article" 2582, and two columns "name" 2583 and "price" 2584. The column 2583 includes one (1) article, a pencil. The column 2584 includes one price entry 2586 for the pencil, including a date (e.g., 2014-12-01) and a value (e.g., 0.9).

The following description describes an example database request 214 (illustrated below in the table labeled Request 6), which is received and processed by the TDB-Server 201.

| REQUEST 6 |
| --- |
| 1  TRANSACTION ( ) { |
| 2     SELECT ID_M01->Article.price; |
| 3 |
| 4     SELECT Person.name->Invoice.ID->Article.(name, price); |
| 5  } |

As illustrated immediately above, this database request 214 (Request 6) includes a transaction 215 with two (2) constituent select statements 216. The first select statement selects the prices of all articles that are connected to a token with the ID "ID_M01". The first select statement includes the operators SELECT, JOIN ("->"), and DOT. The operator JOIN connects or joins tokens together, for example, by using the connections 330 generated amongst instance tokens, as illustrated in FIG. 3*a*. It is noted that the word "ID_M01" is directly interpreted as memory address M01, and is not looked up in the tag-index 232.

The second select statement selects all persons with all of their connected invoices and including all the connected articles. The second statement includes the operator JOIN two times: the first to join the class "Person" to the class "Invoice"; and the second to join the class "Invoice" to the class "Article".

FIG. 26a illustrates the execution tree 2600 for the first select statement of Request 6 ("SELECT ID_M01→Article.price;"). The execution tree 2600 includes operators SELECT 2602, JOIN 2604, and DOT 2610, and further includes class "Article" 1220, relation "price" 1228, and the token with ID ID_M01 2608. The operator JOIN 2604 includes information about the relation that joins the left-hand-side and the right-hand-side of the operator together. This is represented by sub-element 2605 which indicates that the operator 2604 uses the relation "items" for the joining operation as described in detail in the following.

The TDB-Server 201 determines the joining relation 2605 during the parsing operation 274. More specifically, during the parsing operation 274, the TDB-Server 201 inspects the extended model 242 and tries to find a relation, which relates the classes that are connected to the left-hand-side and right-hand-side of the operator 2604. If the TDB-Server 201 cannot find such a relation, then an "undefined join" error is returned. Moreover, if the TDB-Server 201 finds more than one matching relation, then an "ambiguous join" error is returned, which lists the matching relations. In the latter case, a user can correct the error by specifying the relation that should be used. In the foregoing example, the TDB-Server 201 finds that the token with ID "ID_M01" identifies instance 1632, which belongs to the class "Invoice". The TDB-Server 201 further finds that the operator JOIN 2604 relates to the class "Article" 1220 on the right-hand-side. The TDB-Server 201 thus looks for a forward-directed relation amongst the class "Invoice" and the class "Article". The extended model 242 includes only one such relation which is relation "items" 1236.

FIG. 26b illustrates the processing memory 202 and the token memory 206, after the execution of the first select statement of Request 6. The processing memory 202 includes the transaction-context 220 and the result-set 228. The token memory 206 includes the memory pages 1630 and 1631 which include instances of the class "Invoice", and memory pages 1530 and 1670 which include instances of the class "Article".

In executing the execution tree 2600, the TDB-Server 201 starts execution with the operator SELECT 2602, which generates the cell-stream 2620 in the result 228, writing the header cells, as already described hereinbefore. The TDB-Server 201 then executes the operator 2604.

Accordingly, the TDB-Server 201 inspects the left-hand-side of the operator 2604, and finds the ID "ID_M01" 2608. As described earlier the TDB-Server 201 can convert the relative memory address included in ID "ID_M01", e.g., the relative memory address M01 is converted to a physical memory address. The TDB-Server 201 thus directly accesses the head-block 1633 and finds the corresponding body-block 1634. The TDB-Server 201 looks for a connection-entry in the body-block 1628 that is based on the relation "items" (which is represented by the head-block at memory address C11) and finds the connection-entry 1644. The connection-entry 1644 includes a sub-index #LIST 1646, which includes list elements 1648 and 1649.

The TDB-Server 201 now iterates over the list elements in sub-index #LIST 1646. More specifically, the TDB-Server 201 writes the memory address (K01) included in cell INST of the first list-element 1648 to the cell CUR_TOKEN 2124 of the transaction-context 220. However, before writing to the cell 2124, the value in the cell 2124 is cached in the token-stack entry 2640 of the sub-index #TOKEN_STACK 625. After the processing of the memory address K01 is finished, the TDB-Server 201 then restores the cached value to the cell 2124. The cache-restore mechanism thus allows the nesting of operators JOINS, as described hereinbelow in connection with the second statement of Request 6.

The first list-element 1648 includes a cell COPY. The TDB-Server 201 thus implicitly executes the operator ASOF for the version-identifier included in the cell COPY (e.g., VERS_2). As described earlier, in executing the operator ASOF the TDB-Server 201 writes to the cell OWRT_VERS 2125 and caches an existing value in a time-stack entry. Accordingly, the TDB-Server 201 generates the time-stack entry 2641, and writes the value "VERS_2" to the cell 2125. The TDB-Server 201 then executes the operator 2610. As described earlier, the execution of an operator DOT is subject to the values included in the cells CUR_TOKEN 2124 and the OWRT_VERS 2125, respectively. More specifically, the TDB-Server 201 accesses head-block 1537 at memory address K01 and finds the corresponding body-block 1672. The TDB-Server 201 then selects the first visible price entry from the price history 1546, which is entry 1548. It should be noted that the entry 1900 is not visible at version VERS_2. The TDB-Server 201 thus writes the price "1.0", which is included in entry 1548 to the cell 2621 of the cell stream 2620.

The TDB-Server 201 then processes the second list-element 1649 in a similar way. More specifically, the TDB-Server 201 accesses the head-block 2453 at the memory address K02, and finds the corresponding body-block 2455. The TDB-Server 201 thus selects the visible price-entry 2462, and writes the price "5.0" to the cell 2622 of the cell-stream 2620.

FIG. 26c illustrates a table 2680 that presents the cell-stream 2620 in a readable format, which results from the execution of the first select statement in Request 6 by the TDB-Server 201. The table 2680 is labeled "Article" 2682 and includes a column "price" 2684. The column 2684 includes two (2) price entries. The first price entry 2686 contains the price of 1.0 for a pencil. This price of the pencil was valid when the invoice at the memory address M01 was generated in version VERS_2. This illustrates that the price changes to 0.9 and 1.1 executed with respect to Request 3 and Request 4, and stored in the connection entries 1822 and 1900, respectively, are not reflected in the invoice.

Figures 27A, 27C:
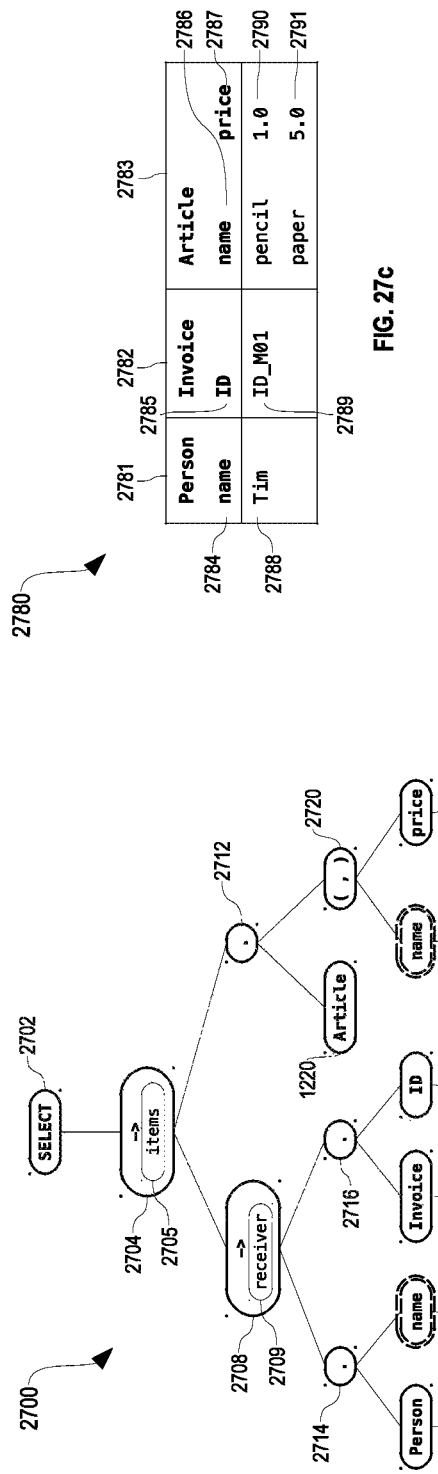

FIG. 27a illustrates the execution tree 2700 for the second select statement of the Request 6 ("SELECT Person.name→Invoice.ID→Article.(name, price);"). The execution tree 2700 includes operators SELECT 2702, JOIN 2704, 2708, DOT 2712, 2714, 2716, and LIST 2720, and further includes classes "Person" 870, "Invoice" 1000, and "Article" 1220, relation "price" 1228, and the apparently ambiguous words "name" 2724 and 2730. The execution tree 2700 also includes a keyword ID 2728 which represents an (internal) relation of a token to its ID. It is noted that operators 2704 and 2706 include the relation "items" 2705 and relation "receiver" 2707 which are used to join or connect the tokens during the execution of the operators as described hereinabove.

Figure 27B:
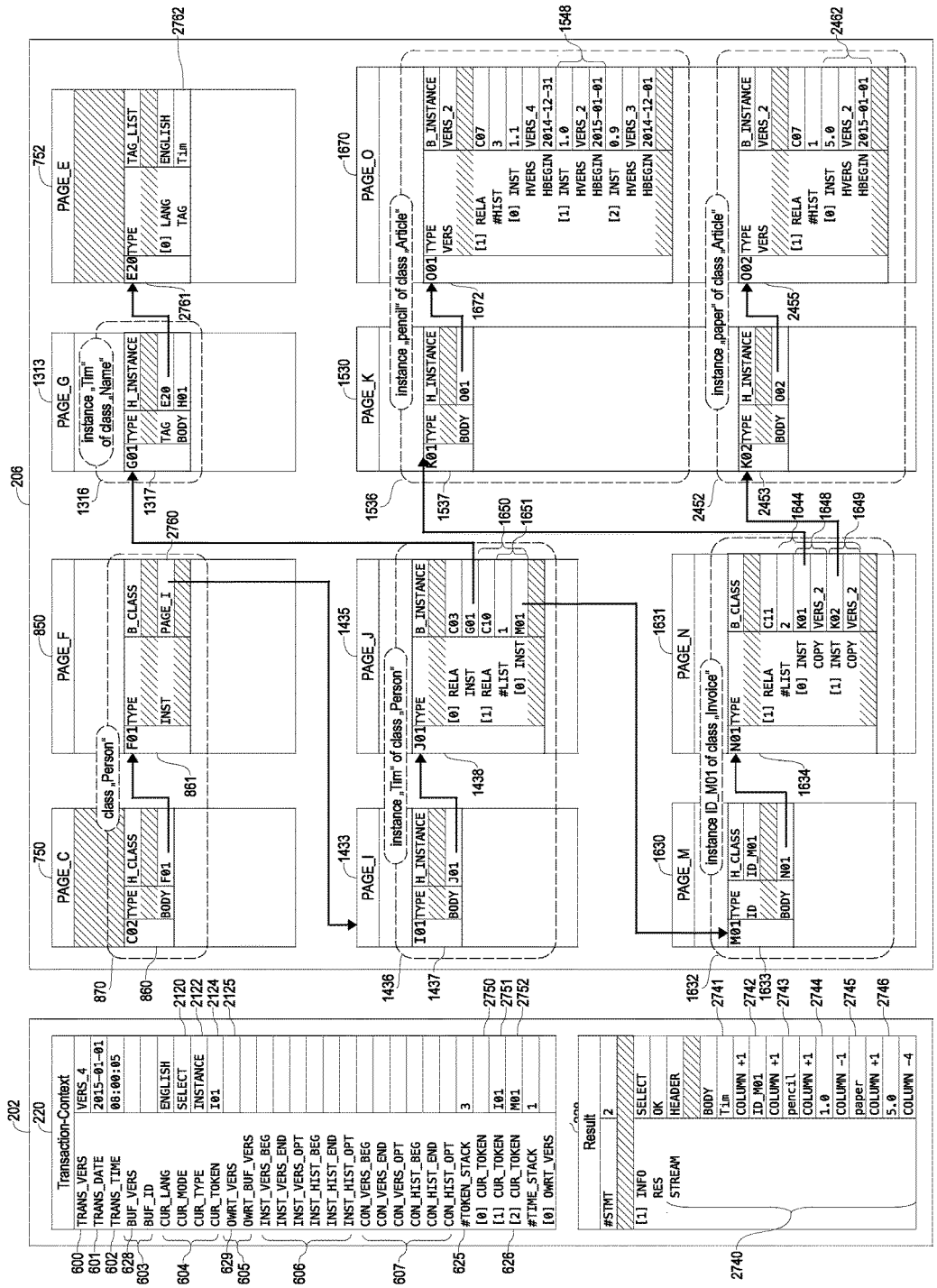

FIG. 27b illustrates the processing memory 202 and the token memory 206, after the execution of the second select statement of the Request 6. The processing memory 202 includes the transaction-context 220 and the result 228. The token memory 206 includes eight memory pages. Memory pages 750 and 850 include tokens of the extended model 242. Memory pages 1433 and 1435 include instances of the class "Person". Memory pages 1630, 1631, 1530, and 1670 are identical to the pages depicted in FIG. 26b.

In executing the execution tree 2700, the TDB-Server 201 starts execution with the operator 2702, which generates a cell-stream 2740 in the result 228, as described in greater detail hereinabove. The TDB-Server 201 then executes the operator 2704.

Accordingly, the TDB-Server 201 inspects the left-hand-side of the operator JOIN 2704, and finds another operator JOIN 2708. It should be noted that the TDB-Server 201 generally starts the execution of a path with the leftmost operator JOIN. Accordingly, the TDB-Server 201 inspects the left-hand-side of operator 2708, and finds the operator DOT 2714 that has the class "Person" on its left-hand-side. The operator DOT in connection with the class "Person" indicates to the TDB-Server 201 that all instances of class "Person" must be iterated.

The TDB-Server 201 finds the foregoing instances by accessing the class "Person" 870 in the token memory 206, where the TDB-Server finds a reference to the memory page 1433 (PAGE_I) in the cell 2760 of the body-block 861. Accordingly, the TDB-Server 201 iterates the head-blocks of the memory page 1433. The TDB-Server 201 thus writes the memory address (I01) of the first head-block 1437 to the cell CUR_TOKEN 2124 of the transaction-context 220. As described earlier, the initial value of cell 2124 (empty) is cached in token-stack entry 2750. The TDB-Server 201 then executes the operator DOT 2714. As described earlier, the execution looks up the value that is connected to the current token in the cell 2124. In the foregoing example, the value "Tim" is looked up in the cell 2762 of the tag-list block 2761 in the memory page 752. The value "Tim" is thus written to the cell 2741 of the cell-stream 2740.

The TDB-Server 201 now executes the operator JOIN 2708 that joins the person "Tim" 1436 to the invoice "ID_M01" 1632. Accordingly, the TDB-Server 201 looks up the connection-entry 1650 in the body-block 1438 of the person "Tim", and finds the connected invoice "ID_M01" that is represented by the head-block 1633. The TDB-Server 201 thus writes the memory address (M01) of the head-block 1633 to the cell 2124 (value is not shown) of the transaction-context 220. As described earlier, the initial value (I01) of cell 2124 is cached in the token-stack entry 2751.

Thereafter, the TDB-Server 201 executes the operator DOT 2716, which looks up the ID of the invoice in the cell 2763, and writes the value "ID_M01" to the cell 2742 of the cell-stream 2740. The TDB-Server 201 then executes the operator JOIN 2704, which is similar to the execution of the operator JOIN 2604, as described earlier in connection with FIG. 26b. More specifically, the TDB-Server 201 writes the memory address (K01) included in the first connection-entry 1648 of the body-block 1634 to the cell 2124 (value not shown) of the transaction-context 220. As also described earlier, the initial value (M01) of cell 2124 is cached in the token-stack entry 2752. The TDB-Server 201 then looks up memory address K01, and finds the instance "pencil" 1536. The TDB-Server 201 executes the operator DOT 2712, which is similar to the execution of the operator DOT 2408, as described earlier in connection with FIG. 24b. More specifically, the TDB-Server 201 looks up the name of the article ("pencil") in the cell 2460 of the tag-list block 2458 (not shown) and the price of the article (1.0) in the cell INST of history-element 1548 of the body-block 1672. The value "pencil" and the number "1.0" are then written to the cells 2743 and 2744 of the cell-stream 2740, respectively.

The TDB-Server 201 then processes the memory address (K02) included in the second connection-entry 1649, in the same way that appends the value "paper" and the number "5.0" to the cells 2745 and 2746 of the cell-stream 2740. More specifically, the value "paper" is read from the cell 2461 of tag-list block 2459 (not shown), and the number "5.0" is read from cell INST of the history-element 2462 in the body-block 2455.

The TDB-Server 201 finishes processing the operator 2704 by restoring the memory address M01 from the token-stack entry 2752 to the cell 2124 of the transaction-context 220, in accordance with the cache-restore mechanism. Thereafter, the TDB-Server 201 continues executing the operator 2706. Due to the cache-restore mechanism, the execution of the operator 2706 is not affected by the intermediate execution of the operator 2704. More specifically, the transaction-context 220 is in the same state as before the execution of the operator 2704. In continuing the execution of operator 2706, the TDB-Server 201 finds that there are no more invoices connected to person "Tim", e.g., the list 1651 in connection-entry 1650 of the body-block 1438 includes only one element. Accordingly, the TDB-Server 201 finishes processing the operator 2706 by restoring the memory address (I01) from the token-stack entry 2751 to the cell 2124 of the transaction-context 220.

FIG. 27c illustrates a nested table 2780 that presents the cell-stream 2740 in a readable format, which results from the execution of the second select statement in Request 6 by the TDB-Server 201. The nested table 2780 includes sub-tables "Person" 2781, "Invoice" 2782, and "Article" 2783. The sub-tables 2781, 2782, and 2783 include columns "name" 2784, "ID" 2785, "name 2786, and "price" 2786, respectively. The column 2784 includes one name—"Tim". The column 2785 includes one invoice—ID_M01. The sub-table "Article" 2783 includes two entries 2790 and 2791, each including an article name (e.g., pencil) and an associated price (e.g., 1.0).

The following description describes an example database request 214 (illustrated below in the table labeled Request 7), which is received and processed by the TDB-Server 201.

| REQUEST 7 |
| --- |
| 1    TRANSACTION ( ) { |
| 2        SELECT Article. (name, price, price < 3.0); |
| 3    } |

As illustrated immediately above, this database request 214 (Request 7) includes a transaction 215 with one constituent select statement 216. The select statement selects all articles that have a price of less than 3.0. The select statement includes the operators SELECT, DOT, LIST, and LESS_THAN. The operator LESS_THAN is a compare-operator that compares the value on its left-hand-side with the value on its right-hand-side, as will be described in greater detail hereinbelow.

Figures 28A, 28B:
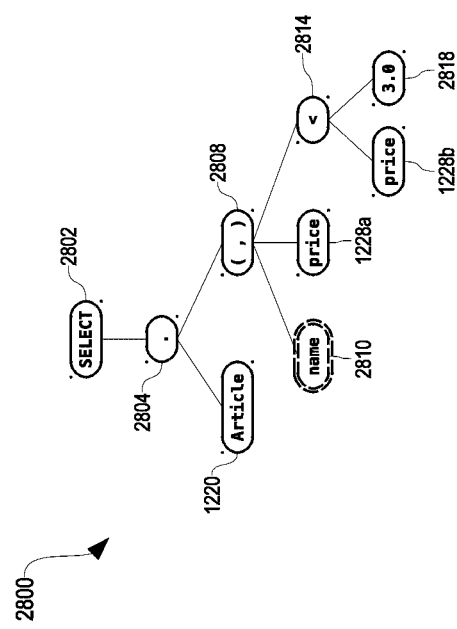

FIG. 28a illustrates the execution tree 2800 for the select statement of Request 7. The execution tree 2800 includes operators SELECT 2802, DOT 2804, LIST 2808, and LESS_ THAN 2814, and further includes class "Article"

1220, relations "price" 1228a, 1228b, floating point number "3.0" 2818, and the apparently ambiguous word "name" 2810.

The execution of execution tree 2800 is similar to the execution of the execution tree 2400, as described earlier in connection with FIG. 24a. However, when the TDB-Server 201 executes the operator 2804, it finds that the operator 2814 is connected to the operator 2808. Accordingly, the TDB-Server 201 executes the operator 2814 on the current instance (e.g., the instance stored in the cell CUR_TOKEN of the transaction-context 220). This execution compares the left-hand-side of operator 2814 (e.g., the price of the current instance) with the value on the right-hand-side (i.e., value of 3.0). If the execution results in the Boolean value TRUE, then the current instance is processed further. However, if the execution results in the Boolean value FALSE, then processing of the current instance is stopped, and the TDB-Server 201 continues execution with the next instance.

Now with reference to FIG. 26b, there is shown a depiction of the instance "pencil" 1536 and the instance "paper" 2452. In the foregoing example, when the TDB-Server 201 processes the instance "pencil" 1536, the TDB-Server 201 looks up the price 1.1 from the cell INST of the history-element 1900 of the price-history 1546 included in the body-block 1672. Because the price of 1.1 is less than 3.0, processing of the instance "pencil" 1536 continues. However, when the TDB-Server 201 processes the instance "paper" 2452, then the TDB-Server 201 looks up the price of 5.0 from the cell INST of the history-element 2462 in the body-block 2455. Because the price of 5.0 is not less than 3.0, the TDB-Server 201 stops further processing of the instance "paper" 2452.

FIG. 28b illustrates the table which results from the execution of the select statement in Request 7 by the TDB-Server 201. The table "Article" includes two columns "name" and "price" and has only one entry, which includes the article "pencil" and the price 1.1. As described above, the article "paper" is not included because it has a price of 5.0, and thus does not satisfy the condition price <3.0, included in the execution tree 2800.

Using Clusters in the Token-Based Database System

The following description describes an example database request 214 (illustrated below in the table labeled Request 8), which is received and processed by the TDB-Server 201.

| REQUEST 8 |
| --- |
| 1    TRANSACTION ( ) { |
| 2        INSERT Cheap_Article IS CLUSTER { Article. (price < 3.0); }; |
| 3    } |

As illustrated immediately above, the database request 214 (Request 8) includes a transaction 215 with one constituent insert statement 216. The insert statement inserts a cluster "Cheap_Article" into the extended model 242 of the token-database 238. As described earlier, a cluster in the token-based database system 100 is used to model details of classes. The insert statement includes the operators INSERT, IS, DOT, and LESS_THAN which have been described earlier. The keyword CLUSTER indicates that the operator IS must generate a new token of a type cluster. The insert statement further includes an operator BLOCK (opening curly bracket "{") that marks the beginning of a code block. The code block ends with a corresponding closing curly bracket ("}"). Moreover, the code block includes the path "Article.(price <3.0);", which selects all instances of the class "Article" that have a price of less than 3.0. In other words, the cluster "Cheap_Article" models details of the class "Article", describing articles (goods) that cost less than 3.0 as cheap articles.

Figure 29B:
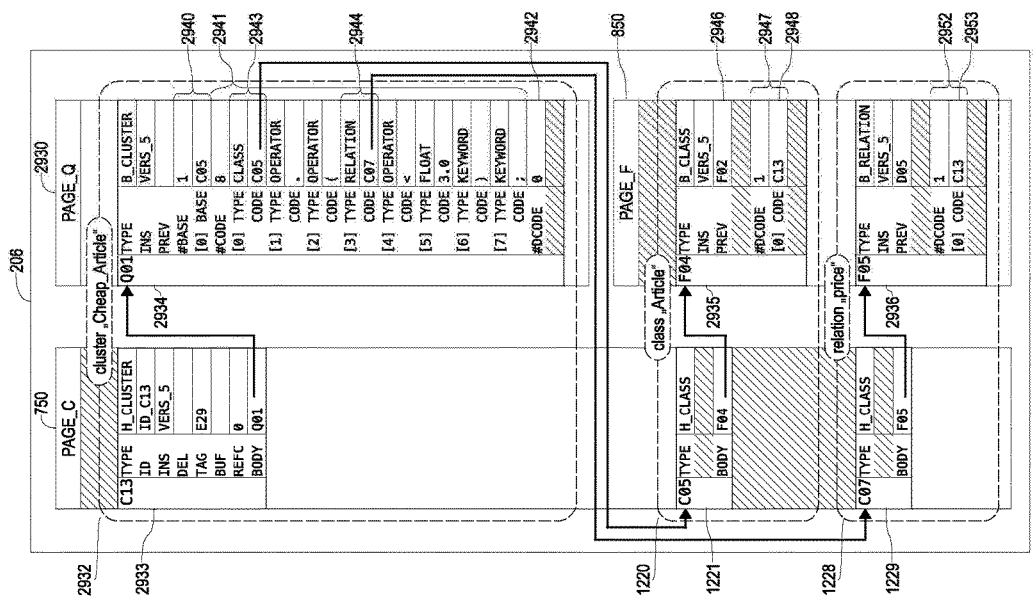
Figure 29A:
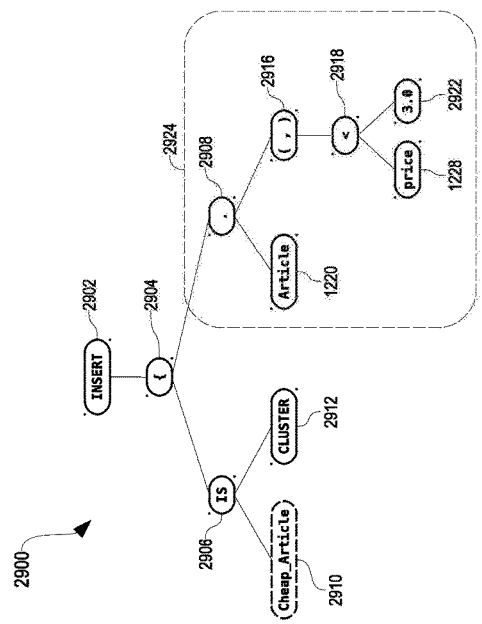
FIG. 29a illustrates an execution tree of an example insert statement in an example eighth request.

FIG. 29a illustrates the execution tree 2900 for the insert statement of Request 8. The execution tree 2900 includes operators INSERT 2902, BLOCK 2904, IS 2906, DOT 2908, LIST 2916, and LESS_THAN 2018, and further includes keyword CLUSTER 2912, class "Article" 1220, relation "price" 1228, floating point number "3.0" 2922, and the unknown word "Cheap_Article" 2910.

FIG. 29b illustrates the token memory 206, after the execution of the insert statement of Request 8. The token memory includes memory pages 750, 850, and 2928. The memory page 750 includes the head-blocks that are included in the extended model 242, and the memory pages 850 and 2930 include the corresponding body-blocks. The memory page 2930 is newly generated and includes body-blocks with a size of 32 cells-per-block. The body-block 2934 is of a type cluster and thus includes the description of a cluster. Like all body-blocks, the first three cells TYPE, INS, and PREV include the type, an insert version-identifier, and an optional reference to a previous version of the body-block, respectively. In addition, the body-block 2934 includes three sub-indices, including #BASE 2940, #CODE 2941, and #DCODE 2942.

The sub-index 2940 includes one or more memory addresses (e.g., memory address C05), which refer to class(es) and/or cluster(s) for which the newly inserted cluster models details. The sub-index 2941 includes one or more code-elements (e.g., code element 2943). Each of the code-elements includes two cells, TYPE and CODE. The cell TYPE includes the token type (e.g., CLASS) of the value that is included in the cell CODE. The sub-index #DCODE 2942 can optionally include one or more memory addresses of other tokens that indicate dependencies amongst tokens, as described in greater detail in the following.

In executing the execution tree 2900, the TDB-Server 201 starts with the execution of the operator 2902, which amongst other things, generates a new entry in the transaction-index 232 (not shown in FIG. 29b), as described earlier. The execution then continues with the operator 2904.

Accordingly, the TDB-Server 201 inspects the left-hand-side of the operator 2904 and finds the operator 2906, which is connected to the keyword 2912. This indicates that the TDB-Server 201 must generate a new head-block of a type cluster, and then must generate a corresponding body-block that stores the elements 2924, which are connected to the right-hand-side of the operator 2904 in the execution tree 2900. Accordingly, the TDB-Server 201 generates the head-block 2933 at the memory address C13 of the memory page 750, and generates a corresponding body-block 2934 at the memory address Q01 of the memory page 2930.

The TDB-Server 201 then stores the code-elements 2924 of the execution tree 2900 in the sub-index 2941 (e.g., class "Article" 1220 is stored in the code-element 2943, with the cell TYPE storing the value "CLASS", and the cell CODE storing the memory address "C05", which refers to the head-block 1221 of the class "Article" in the memory page 750).

Thereafter, the TDB-Server 201 includes the memory address (C13) of the newly generated cluster 2931 in the sub-indices #DCODE (e.g., sub-index 2947 in body-block 2935 of class "Article"), of all relevant body-blocks in the extended model 242. A body-block is considered relevant if it is referenced by the code that is included in the sub-index 2941 of the newly generated cluster 2932. More specifically the TDB-Server 201 inserts cell 2948, storing the memory address C13, into sub-index 2947 of body-block 2935 because the body-block 2935 is referenced by the code-element 2943, as illustrated by the arrows in FIG. 29b. Similarly, the TDB-Server 201 inserts the cell 2953 into the sub-index 2952 of the body-block 2936 because the body-block 2936 is referenced by the code-element 2944. It is reiterated that the TDB-Server 201 changes existing information (e.g., the class "Article") on the copied body-blocks that are linked back to the original body-blocks. Accordingly, the body-block 2935 at the memory address F04 is an (updated) copy of the original body-block 1222 (not shown) at the memory address F02. However, the body-block 2935 references the original body-block via the cell PREV 2946, such that the TDB-Server 201 can look up the old version if and when needed.

As described earlier, the TDB-Server 201 uses the sub-indices 2947, 2952 to keep code and data in the token database 238 consistent. For example, if a database user via computing system 114 requests the deletion of the class "Article", the TDB-Server 201 would deny this database request because the sub-index 2947 in the body-block 2935 is not empty, e.g., the sub-index 2947 includes a reference to head-block (C13) that represents the cluster "Cheap_Article". This indicates that the class "Article" is used in the sub-index 2941 of the cluster "Cheap_Article" and thus must not be deleted. It is noted that in the foregoing example the deletion of a token would also be prevented by the reference counting mechanism described earlier. However, while reference counting only provides information that a token is referenced (used) by another token or other tokens, the #DCODE sub-index provides information that identifies the tokens. In other words, the TDB-Server 201 can automatically provide detailed information about why a token cannot be deleted, e.g., "Class 'Article' cannot be deleted because it is used in the definition of cluster 'Cheap_Article'.

In the token-based database system 100, a cluster can generally be used in situations where a class can be used. For example, the select statement "SELECT Cheap_Article.(name)" would select the names of all articles that are cheap. More specifically, the select statement selects all articles that have a price <3.0, as defined in the cluster Cheap_Article. As another example, the update statement "UPDATE items HOLDS Cheap_Article" updates the relation "items" (originally inserted in the fourth statement by Request 1), so that this relation now targets the cluster "Cheap_Article". This means that the relation "items" can now only connect to instances of the class "Article" that have a price <3.0. As a further example, the insert statement "INSERT Cheap_Article WITH (name:=rubber, price:=2.9)" inserts a new instance of class "Article" and ensures that the newly inserted instance is a cheap article. More specifically, the TDB-Server 201 ensures that the price of the newly inserted instance is less than 3.0. If not, the TDB-Server then reports an error.

Using Derived Information in a Token-Based Database System

The following description describes an example request 214 (illustrated below in the table labeled Request 9), which is received by the TDB-Server 201.

| | REQUEST 9 |
|---|---|
| 1 | TRANSACTION ( ) { |
| 2 | UPDATE Invoice HAS total HOLDS DERIVED |

| | REQUEST 9 |
|---|---|
| 3 | {SELF->+Article.(price);}; <br> } |

As illustrated immediately above, this database request 214 (Request 9) includes a transaction 215 with one constituent update statement 216. The update statement inserts a derived-token 310 "total" into the extended model 242 of the token-database 238, and connects this derived-token 310 to the class "Invoice". The update statement includes the operators UPDATE, HAS, HOLDS, and BLOCK, all of which have been described earlier.

The keyword DERIVED indicates that the operator HAS must generate a new head-block and a corresponding body-block of the type "derived". The code block ("{") includes the path "SELF->+Article.(price)". The keyword SELF is a placeholder for the currently processed token (e.g., the token stored in cell CUR_TOKEN in the transaction-context 220). The operator JOIN ("->") is followed by operator PLUS ("+"), which indicates that the joined instances (e.g., instances of the class "Article") must be aggregated. More specifically, the keyword SELF refers to a currently processed invoice, the operator JOIN selects all articles that are connected to the currently processed invoice, and the operator PLUS calculates the sum of the prices associated with the connected articles. In other words, the derived-token "total" calculates the total price of an invoice.

Figures 30A, 30B:
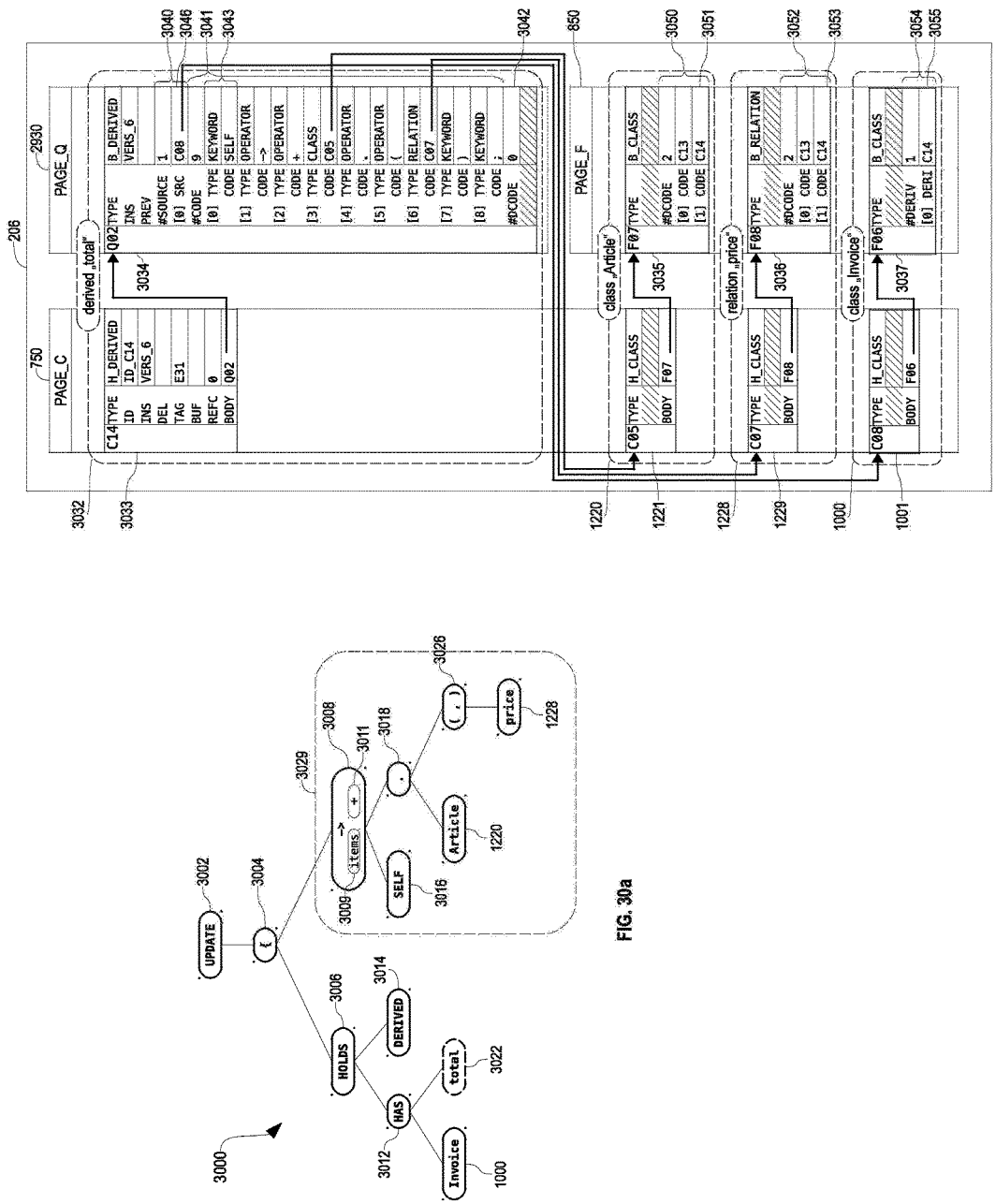

FIG. 30a illustrates the execution tree 3000 for the update statement of Request 9. The execution tree 3000 includes the operators UPDATE 3002, BLOCK 3004, HOLDS 3006, HAS 3012, JOIN 3008, DOT 3018, and LIST 3026, and further includes the keywords DERIVED 3014 and SELF 3016, the classes "Invoice" 1000 and "Article" 1220, the relation "price" 1228, and the unknown word "total" 3022. The execution tree 3000 includes execution-elements 3029, which are on the right-hand-side of the operator 3004, as will be described hereinafter in greater detail.

The operator 3008 includes two sub-elements 3009 and 3011. The element 3009 represents relation "items", which relates the class "Invoice" to the class "Article". The element 3011 represents the operator PLUS that is included as an option in the operator 3008 (e.g., the option 3011 indicates that the TDB-Server 201 must aggregate the joined instances).

FIG. 30b illustrates the token memory 206, after the execution of the update statement of the Request 9. The memory page 750 includes the head-blocks of the tokens that are included in the extended model 242, while the memory pages 850 and 2930 include the corresponding body-blocks. The memory page 2930 includes a body-block 3034 (at memory address Q02) of the type derived. Like all body-blocks, the first three cells TYPE, INS, and PREV include the type, the insert version-identifier, and the optional reference to a previous version of the body-block. In addition, the body-block 3034 includes a sub-indices #SOURCE 3040, #CODE 3041 and #DCODE 3042. The sub-index 3040 stores one or more references to classes or the clusters to which the derived 3032 belongs (e.g., the class "Invoice"). The sub-index 3031 includes code-elements that store execution-elements 3029 from the execution tree 3000, as described earlier. The sub-index #DCODE 3032 can optionally include memory address of other clusters or deriveds that include code that depends on the newly inserted derived as described in greater detail hereinbelow.

In executing the execution tree 3000, the TDB-Server 201 starts execution with the operator 3002, which amongst other things, generates a new entry in the transaction-index 220 (not shown in FIG. 30b), as described earlier. The TDB-Server 201 then continues with the operator 3004.

Accordingly, the TDB-Server 201 inspects the left-hand-side of the operator 3004 and finds the operator 3006, which connects to the operator 3012 and the keyword 3014. This indicates that the TDB-Server 201 must generate a new token of a type derived (derived-token or simply derived). The TDB-Server 201 thus generates a head-block 3033 (at the memory address C14 of the memory page 750) of type derived, with a corresponding body-block 3034 (at the memory address Q02 of the memory page 2930). The TDB-Server 201 further inspects the operator 3012 and finds that the class "Invoice" 1000 is connected on the left-hand-side. The TDB-Server 201 thus stores the memory address C08, which refers to the head-block of the class "Invoice", in the cell 3046 of the newly generated body-block 3034. The TDB-Server 201 then stores the execution-elements 3029 that are connected to the right-hand-side of the operator 3004 in the code-elements (e.g., code element 3043) of the sub-index 3041.

Thereafter, the TDB-Server 201 includes a reference to the newly inserted derived-token 3032 in the sub-indices #DERIV 3054 of the body-block 3037. The body-block 3037 includes the description of the class "Invoice", which now also includes a reference (memory address C14 in cell 3055) to the newly generated derived-token 3032.

Finally, the TDB-Server 201 includes a reference to the newly inserted derived-token 3032 in the sub-indices #DCODE of all the relevant body-blocks in the extended model 242. More specifically the TDB-Server 201 adds cells 3051 and 3053 that include the memory address C14 to the sub-indices 3050 and 3053 of body-blocks 3035 and 3036, respectively.

Figure 30C:
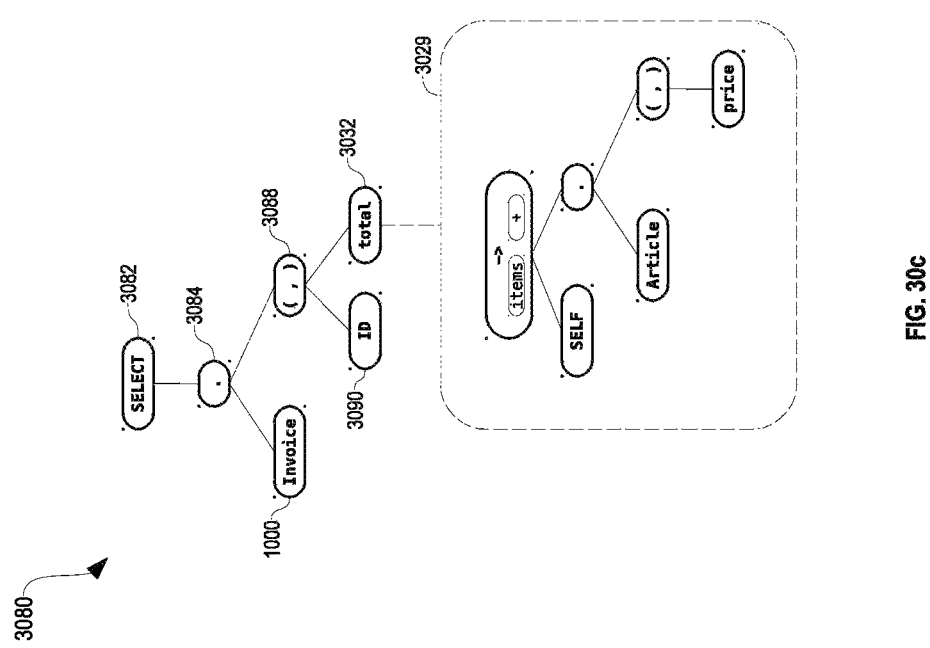
FIG. 30c illustrates an example execution tree of an example select statement, including a sub execution tree in connection with a derived token.

FIG. 30c illustrates an execution tree 3080 that includes the newly generated derived "total" 3032, which provides an example for the usage of derived tokens. In the token-based database-system 100, a derived-token is typically used in connection with a select statement. For example, the execution tree 3080 is generated from the select statement "SELECT Invoice.(ID, total);" which selects all invoices including their IDs and their total.

The execution tree 3080 includes the operators SELECT 3082, DOT 3084, and LIST 3008, and further includes keyword ID 3090, class "Invoice" 1000, and derived "total" 3032. The execution of execution tree 3080 is similar to the execution of execution tree 2400, as illustrated in FIG. 24a. However, a difference is that whenever the TDB-Server 201 accesses the derived "total" 3032, the TDB-Server 201 generates a sub-execution tree 3029 and executes the sub-execution tree 3029 before continuing with the processing of the main execution tree 3080.

It is noted that the execution of code that is included in a derived can sometimes fail. For example, an invoice can be connected to so many expensive articles that the execution of the aggregation code that is included in the derived "total" leads to a numerical overflow error. However, the TDB-Server 201 can prevent such errors by test-executing the code of the derived-token whenever information that is affected by the execution of a derived is inserted or updated. In connection with the aforementioned example, the TDB-Server 201 would test-execute the derived "total" whenever a new invoice is inserted or updated into the token-based database system 100. The TDB-Server 201 would thus detect the numerical overflow error already at the time of insertion or update and consequently would reject the insertion or update of that invoice. Accordingly, the TDB-Server 201 would roll back the transaction that includes the corresponding statement. The test-execution mechanism enables the token-based database system 100 to only include consistent information in the token database 238. In other words, the code that is included in a token-based database system 100 is thus guaranteed to execute without errors.

Deleting Information from a Token-Based Database System

The following description describes an example request 214 (illustrated below in the table labeled Request 10), which is received by the TDB-Server 201. As illustrated below, the database request 214 (Request 10) includes a transaction 215 with one constituent delete statement 216. More specifically, the delete statement deletes a certain token with ID ID_M01 from the token-database 238.

| REQUEST 10 |
|---|
| 1    TRANSACTION ( ) { |
| 2        DELETE ID _M01; |
| 3    } |

FIG. 31a illustrates the execution tree 3100 for the delete statement in the Request 10. The execution tree 3100 includes the operator DELETE 3102 and a token at memory address M01 3104.

FIG. 31b illustrates the token memory 206 after the execution of the delete statement of the Request 10 in the execution tree 3100. The token memory 206 includes memory pages 1433, 1530, 1630, and 1631. Memory pages 1630 and 1631 included instances of the class "Invoice", memory page 1433 includes head-blocks of the class "Person", and memory page 1530 includes head-blocks of the class "Article".

In executing the execution tree 3100, the TDB-Server 201 starts with the execution of the operator 3102. Accordingly, the TDB-Server 201 generates a new transaction-index entry 3110 in the transaction-index 234, as described earlier in connection with the operator INSERT, as shown in FIG. 7. Thereafter, the TDB-Server 201 inspects the head-block 1633 and finds that the reference counter in cell REFC 3121 is zero (0), which means that this head-block is not referenced by any other memory-block and therefore can be deleted. The TDB-Server 201 stores the active version-identifier (VERS_7) in the cell DEL 3120 of the head-block 1633, and thus marks the head-block 1633 as deleted.

The TDB-Server 201 then inspects the corresponding body-block 1634 and finds that the connection-entries 1642 and 1644 include connections to head-blocks 1437, 1537, and 2453, at the respective memory addresses I01, K01, and K02, which represent the person "Tim" and the articles "pencil" and "paper". It is noted that the TDB-Server 201 incremented the reference counter in the cells REFC 3122, 3123, and 3124 of the respective head-blocks 1437, 1537, and 2453, when the connection-entries 1642, 1644 were generated. Accordingly, the TDB-Server 201 now decrements the reference counter in the respective cells 3122, 3123, and 3124, resulting in the reference counter with a value of zero (0).

It is noted that the operator 3102 can also be used to delete other types of tokens that are included in the extended model 242. For example, a statement "DELETE total" marks the derived-token "total" 3092 as deleted.

Buffered Transactions

Figure 32:
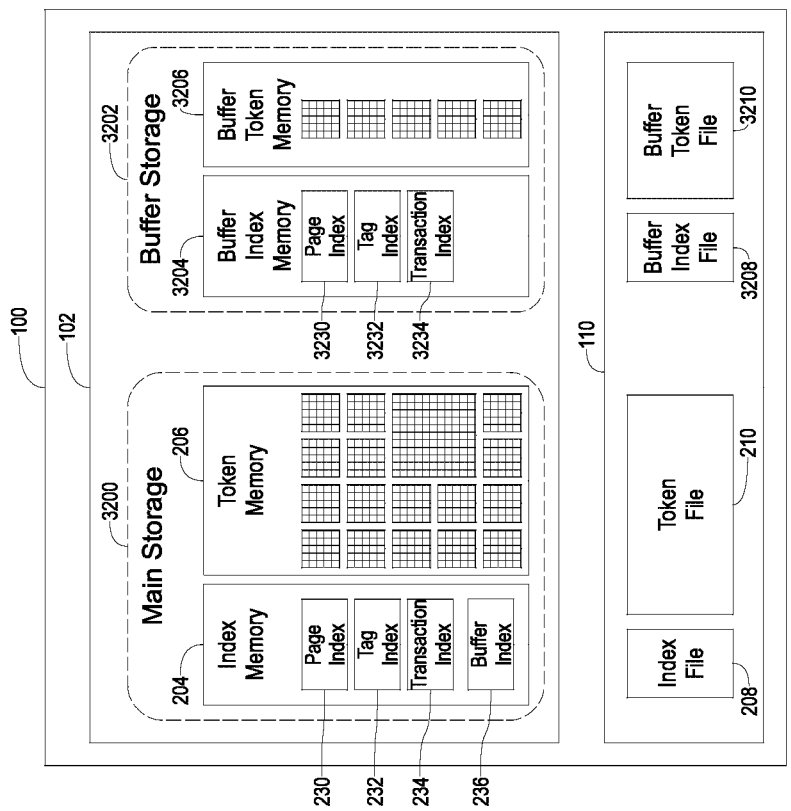
FIG. 32 illustrates working memory that includes example main storage and an example buffer storage.

FIG. 32 illustrates the working memory 102 of the token-based database system 100, which includes a main storage region 3200 (main storage) and a buffer storage region 3202 (buffer storage). The main storage 3200 includes the index memory 204 and the token memory 206, as described previously. More specifically, the index memory 204 includes the page index 230, tag index 232, transaction index 234, and buffer index 236.

The buffer storage 3202 includes the same or similar elements as the main storage 3202, including a buffer index memory 3204 and a buffer token memory 3206. The buffer index memory 3204 includes a page index 3230, tag index 3232, and transaction index 3234. However, the buffer index memory 3204 does not include an index that corresponds to the buffer index 236 of the index memory 204.

The execution of a normal transaction only affects the main storage 3200 (e.g., a new token is inserted into the token memory 206 included in the main storage 3200). In contrast, the execution of a buffered transaction affects the main storage 3200 and the buffer storage 3202. More specifically, a buffered transaction applies all changes (write operations) to the buffer storage 3202, but selects (reads) information from the buffer storage 3202 and also the main storage 3200. More specifically, the information that is stored in the buffer storage 3202 overrides information that is stored in the main storage 3200. For example, a buffered transaction can change the name of a person A from "Tim" to "Tom". The new name "Tom" will be stored in the buffer storage 3202. When another buffered transaction later selects the name of the person A, then the name "Tom" will be selected from the buffer storage 3202, and the name "Tim" will not be selected from the main storage 3200. However, for a normal (non-buffered) transaction, the name "Tim" will be selected because the information stored in the buffer storage 3202 is not visible to normal transactions.

As illustrated in FIG. 32, the permanent memory 110 includes the index file 208 and token file 210, which store images of the index memory 204 and the token memory 206, as described earlier. In addition, the permanent memory 110 also includes the buffer index file 3208 and the buffer token file 3210, which store images of the buffer index memory 3204 and the buffer token memory 3206. The buffer files 3208, 3210 allow the token-based database system 100 to store buffered content permanently, so that this content is not lost in case of a system shut down.

It is noted that the main storage 3200 and the buffer storage 3202 use independent version-identifier. In the following, the version-identifier that refers to the buffer storage 3202 is prepended with a "$". More specifically, $VERS_1 refers to the first version of the buffer storage 3202, while VERS_1 refers to the first version of the main storage 3200. The buffer storage 3202 includes exactly one main version-identifier, which is called the branch-off version-identifier. The branch-off version-identifier limits the visibility of information that a buffered transaction can see in the main storage 3200. In other words, a buffered transaction cannot see information that is inserted or updated in the main storage 3200 after a buffer storage has been generated (branched-off). This limitation avoids logical conflicts between information stored in the buffer storage 3202 and the information stored in the main storage 3200. An example for such a conflict would be a situation where information is marked as deleted in the main storage 3200 that is still referenced from the buffer storage 3202.

While the token-based database system 100 can include several buffer storages in the working memory 102, only one buffer storage 3202 is illustrated in FIG. 32 for brevity and clarity of the description. In this regard, the following description describes an example database request 214 (illustrated below in the table labeled Request 11), which is received and processed by the TDB-Server 201.

| REQUEST 11 | |
|---|---|
| 1 | TRANSACTION (BUFFER #1) { |
| 2 | INSERT Invoice WITH ( |
| 3 | receiver := Tim, |
| 4 | items := pencil); |
| 5 | |
| 6 | } |

As illustrated immediately above, the database request 214 (Request 11) includes a buffered transaction 215 that has the option BUFFER #1 set forth in the parentheses following the keyword TRANSACTION. The option BUFFER #1 indicates to the TDB-Server 201 that the insert statement included in the buffered transaction should be executed using a buffer with ID #1 ("BUF_1").

The initialization operation 268 of the buffered transaction is similar to the initialization executed for a normal transaction (e.g., the generation of the transaction-context 220, rollback-lock 222, and so on, as described earlier). The only difference is that the TDB-Server 201 stores the ID BUF_1 in cell BUF_ID of the transaction-context 220 (e.g., BUF_ID 3341 in FIG. 33b).

The tokenizing operation 272 of a buffered transaction is similar to the tokenizing process of a normal transaction. However, for a buffered transaction the TDB-Server 201 first looks up each word in the tag-index of the buffer storage 3202, e.g., tag-index 3232 in FIG. 33b. If the word is not found in tag-index 3232 of the buffer storage 3202, the TDB-Server 201 then looks up the word in the tag-index 232 of the main storage 3200.

Figure 33A:
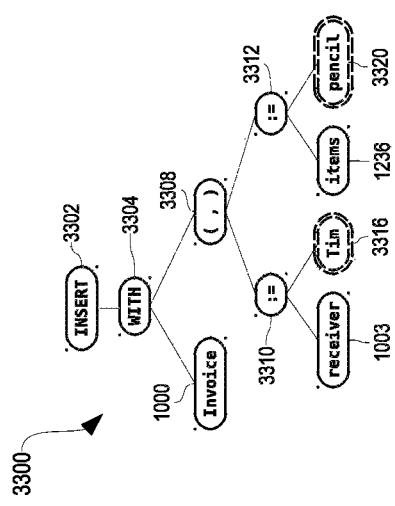
FIG. 33a illustrates an example execution tree of an example buffered transaction that includes an insert statement in accordance with an example eleventh request.

FIG. 33a illustrates the execution tree 3300 of the insert statement of Request 11. The execution tree 3300 includes operators INSERT 3302, WITH 3304, LIST 3308, and ASSIGN (":=") 3310, 3312, and further includes class "Invoice" 1000, relations "receiver" 1003 and "items" 1236, and the apparently ambiguous words "Tim" 3316 and "pencil" 3320.

Figure 33B:
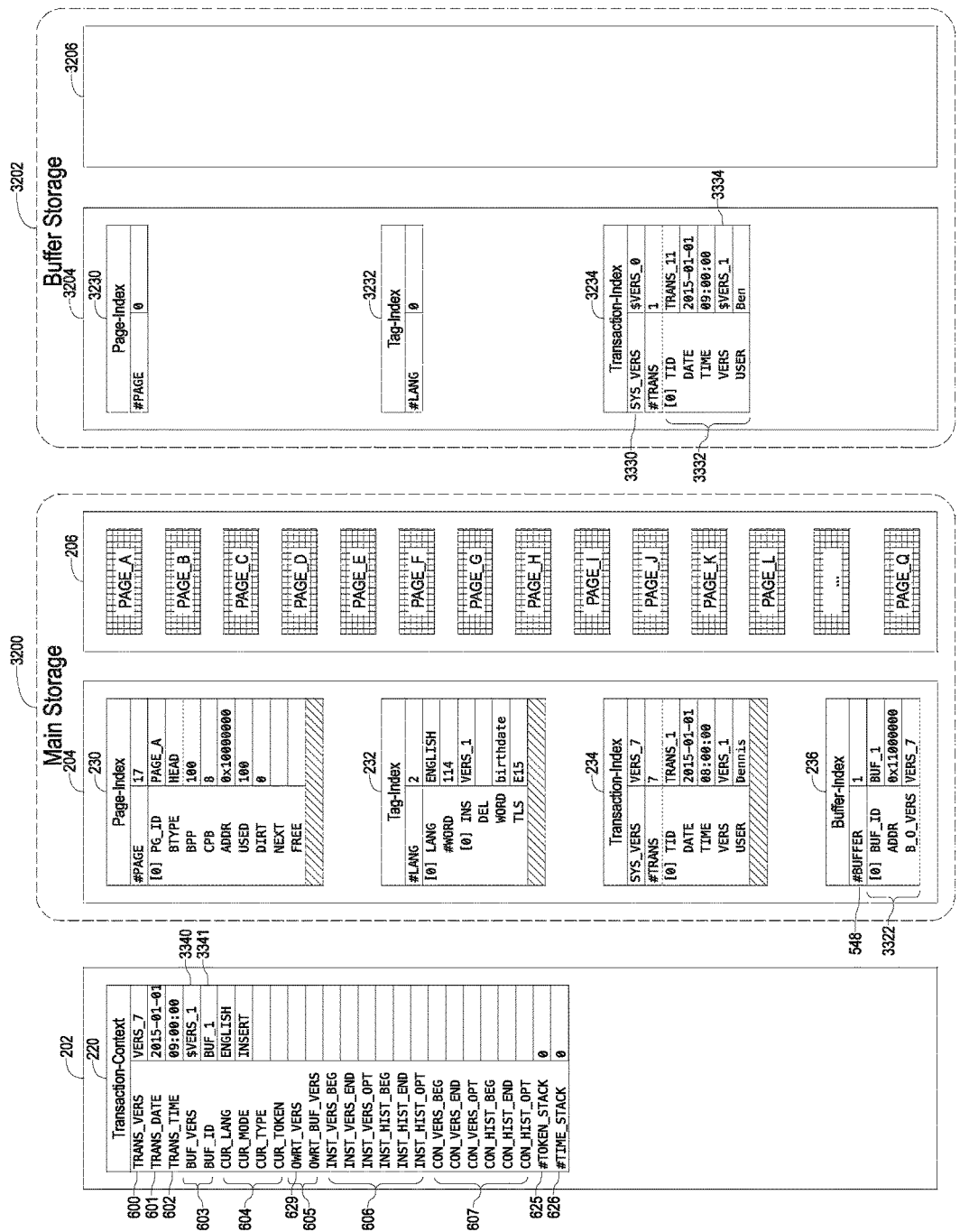

FIG. 33b illustrates the processing memory 202, the main storage 3200, and the buffer storage 3202, after the execution of operator 3302 (INSERT) in connected with buffered insert statement of Request 11. The processing memory 202 includes the transaction-context 220. The main storage 3200 includes the index memory 204 and the token memory 206. The index memory 204 includes the page-index 230, the tag-index 232, the transaction-index 234, and the buffer-index 236. The indices 230, 232, and 234 include the index-entries that have been generated by the execution of the foregoing example requests Request 1 to Request 10. For example, the page-index 230 includes 17 page-index entries, however for brevity and clarity, only the first page-index entry is shown in the page index 230 of FIG. 33b.

The buffer-index 236 includes one buffer-index entry 3322, which includes three (3) cells, BUF_ID, ADDR, and B_O_VERS. The cell BUF_ID includes the ID of a buffer (e.g., BUF_1), the cell ADDR includes the physical memory address where the buffer storage 3202 begins, and the cell B_O_VERS includes the branch-off version-identifier.

The token memory 206 includes example memory pages PAGE_A to PAGE_Q, which have been generated by the TDB-Server 201 during the execution of the previous example requests Request 1 to Request 10.

The buffer storage 3202 includes the buffer index memory 3204 and the buffer token memory 3206. The buffer index memory 3204 includes a page-index 3230, a tag-index 3232, and a transaction-index 3234. The page-index 3230 and the tag-index 3232 are empty, and the transaction-index 3234 includes one transaction-index entry 3330.

In executing the execution tree 3300, the TDB-Server 201 first looks for a buffer with ID BUF_1 in the buffer-index 236, but finds that the buffer-index 236 is initially empty. The TDB-Server 201 thus allocates memory for new buffer storage 3202 and generates a corresponding buffer-index entry 3322 in the buffer-index 236. Thereafter, the TDB-Server 201 stores the value "BUF_1" in cell BUF_ID, stores the physical memory address of the buffer (e.g., example address 0x11000000) in cell ADDR, and stores the branch-off version-identifier VERS_7 in cell B_O_VERS in the buffer-index entry 3322. The TDB-Server 201 then generates an empty page-index 3230, empty tag-index 3232, and an empty transaction-index 3234 in the buffer storage 3202. Further, the TDB-Server 201 stores the version-identifier $VERS_0 in cell SYS_VERS 3330 of the transaction-index 3224. This indicates that the buffer storage is empty.

In executing the operator 3302 (INSERT), the TDB-Server 201 then generates the transaction-index entry 3332 and stores an incremented version-identifier $VERS_1 in cell VERS 3334. The version-identifier $VERS_1 is additionally stored in cell BUF_VERS 3340 of the transaction-context 220. This indicates that all information that is entered into the buffer storage during the execution of the foregoing buffered transaction is assigned to version-identifier $VERS_1. More specifically, the TDB-Server 201 uses the version-identifier from cell TRANS_VERS 600 in connection with the main storage 3200 and uses the version-identifier from the cell BUF_VERS 3340 in connection with the buffer storage 3202.

Thereafter, the TDB-Server 201 continues execution of the execution tree 3300 with operator 3304, as will be described below with reference to FIG. 33c.

Figure 33C:
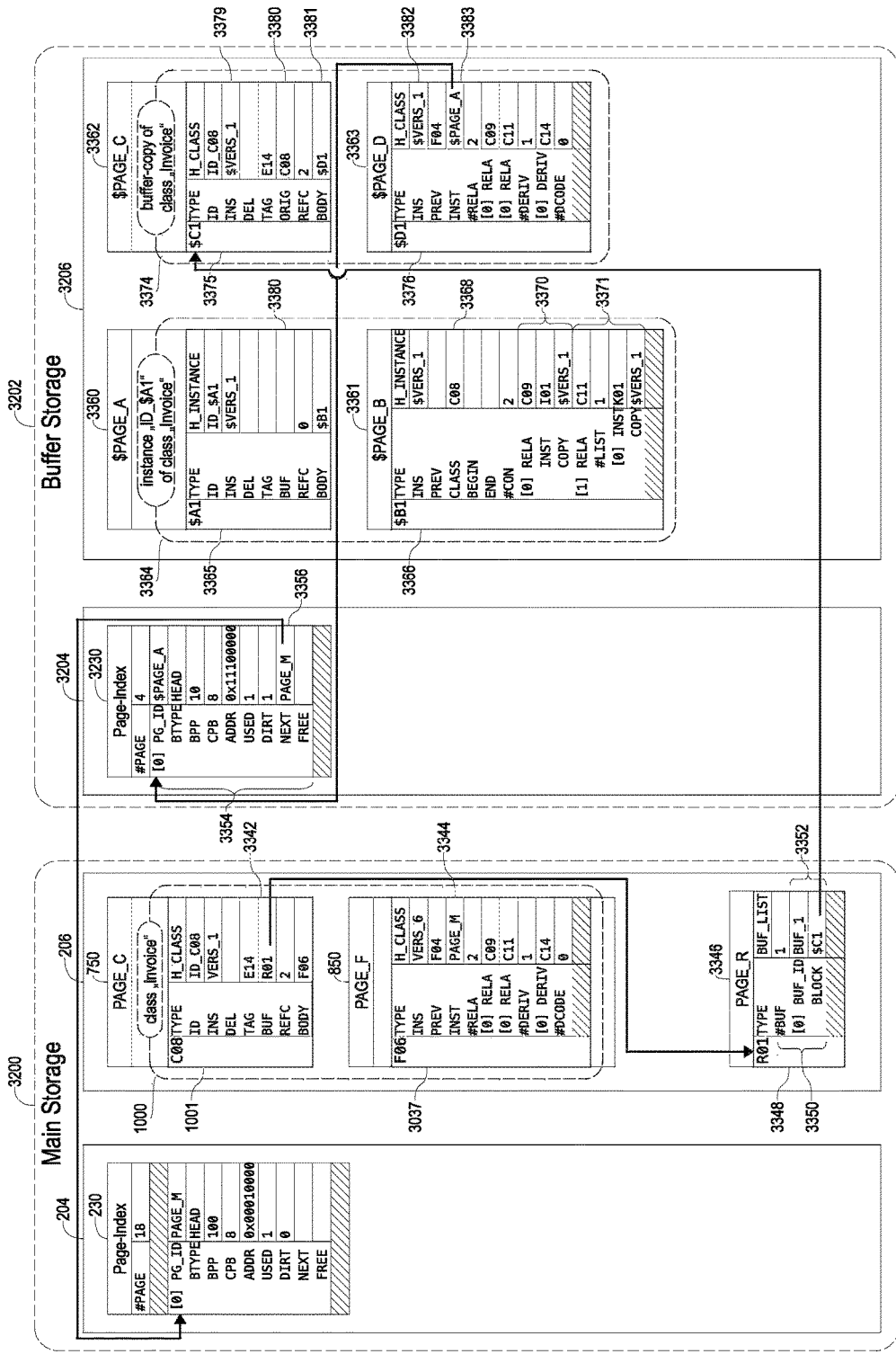

FIG. 33c illustrates the main storage 3200 and the buffer storage 3202, after the execution of the buffered transaction of the Request 11, in accordance with the execution tree 3300. The main storage 3200 includes the index memory 204 and the token memory 206. The index memory 204 includes the page-index 230, and the token memory 206 includes the memory pages 750, 850, and 3346. The memory page 750 includes head-blocks of the tokens that are included in the extended model 242, and the memory page 850 includes the corresponding body-blocks of these tokens. The memory page 3344 includes one memory block 3345 at memory address R01 of type BUF_LIST ("buffer-list").

A buffer-list-block includes a sub-index #BUF 3350, which includes one or more buffer-list entries (e.g., buffer list-entry 3352). Each buffer-list entry includes two cells, BUF_ID and BLOCK. The cell BUF_ID includes the ID of a buffer (e.g., BUF_1), and the cell BLOCK includes a memory address that is located in the buffer storage 3202. Accordingly, the memory addresses that are included in the buffer storage 3202 are prepended with a symbol "$". For example, memory address $C1 refers to the first memory block 3375 of the memory page $PAGE_C 3362 that is included in the buffer storage 3202.

The buffer storage 3202 includes the buffer index memory 3204 and the buffer token memory 3206. The buffer index memory 3204 includes buffer page-index 3230, and the buffer token memory 3206 includes memory pages 3360, 3361, 3362, and 3363. Each of the memory pages 3360-3363 includes one respective memory block 3365 at memory address $A1, 3366 at memory address $B1, 3375 at memory address $C1, and 3376 at memory address $D1, which are generated by the TDB-Server 201 during the execution of execution tree 3300, as further described hereinbelow.

In executing the operator 3204, the TDB-Server 201 generates a head-block 3365 of a type instance, and a corresponding body-block 3366. These memory blocks are generated in the buffer storage 3202 because the transaction is a buffered transaction. During the execution of operators 3310 and 3312, the TDB-Server 201 generates connection-entries 3370 and 3371 in the body-block 3366 as described earlier in connection with FIG. 16c. It should be noted that the memory addresses that are included in the body-block 3366 (e.g., memory address C08 of head-block 1001 in cell CLASS 3368) reference memory locations in the main storage 3200. This illustrates that the buffer storage 3202 does not include a full copy of the main storage 3200, but does include information that is new or that is updated with respect to the information included in the main storage 3200.

The TDB-Server 201 must next connect the newly generated instance represented by head-block 3365 to the class "Invoice". As described previously, the TDB-Server 201 realizes such a connection by storing a reference to the memory page that includes the head-block. For example, the TDB-Server 201 stores in the cell INST 3344 of the body-block 3037 at memory address F06 a reference to memory page 1630 (PAGE_M, not shown). The memory page 1630 includes the head-blocks of all instances of the class "Invoice" in the main storage 3200. However, the newly generated head-block 3365 is in the memory page 3360, which is in the buffer storage 3202. Accordingly, the TDB-Server 201 allocates the head-block 3375 and body-block 3376, and copies the contents of the head-block 1001 at the memory address C08 and the body-block 3037 at memory address F06 into these allocated memory blocks. The TDB-Server 201 now updates cell INST 3383 in body-block 3376 to store the reference $PAGE_A, and then stores the reference PAGE_M in cell NEXT 3356 of page-index entry 3354 in the page-index 3230, which indicates that the memory page 3360 is continued on the memory page PAGE_M.

Moreover, the TDB-Server 201 additionally updates the copied content in the following cells of head-block 3375 and the body-block 3376. More specifically, the cells INS 3379 and 3382 of respective memory blocks 3375 and 3376 are updated to $VERS_1, indicating that these memory blocks have been allocated at buffer version $VERS_1. The cell ORIG 3380 is updated to include the memory address C08, which references the original head-block 1001 from which the copy has been taken. The cell BODY 3381 is updated to include the memory address $D01, which references the copied body-block 3376.

Finally, the TDB-Server 201 updates the head-block 1001 in main storage 3200 to reference the copied head-block 3375 in buffer storage 3202. However, the TDB-Server 201 does not directly store the memory address $C1 of the head-block 3375 in the cell BUF 3342, but rather stores the memory address R01 that references the newly generated buffer-list-block 3348 in memory page 3346. The buffer-list-block 3348 then stores the memory address $C1 in cell BLOCK of buffer-list element 3352. It is noted that the buffer-list 3350 is necessary so that multiple copies of a head-block (e.g. head-block 1001) can be referenced in multiple buffers in the buffer storage 3202. It is noted further that the memory blocks of type BUF_LIST are the only memory blocks that the TDB-Server 201 generates in main storage 3200 during the execution of a buffered transaction. All other memory blocks that might be required are generated in the buffer storage 3202. Similarly, the cells BUF (e.g. 3342) are the only cells that the TDB-Server 201 directly updates in main storage 3202 during the execution of a buffered transaction. All other updates are executed on newly generated copies of memory blocks in buffer storage 3202, as described above.

If the TDB-Server 201 iterates over all buffered and non-buffered instances of the class "Invoice" (e.g., when executing the statement "SELECT Invoice.(ID)", which selects the IDs of all invoices), the TDB-Server 201 starts at head-block 1001 that represents the class "Invoice". In the cell BUF 3342 of the head-block 1001, the TDB-Server 201 finds the reference to memory address R01 of buffer-list-block 3348 that stores the buffer-list. The TDB-Server 201 then inspects the buffer-list and finds that it includes a buffer list-entry 3352 with ID BUF_1, and thus the TDB-Server 201 finds the copied head-block 3375 at memory address $C1 of memory page 3362 in buffer storage 3202. The TDB-Server 201 then uses the memory address $D01 in cell BODY of the head-block 3375 to access the copied body-block 3376 at memory address $D01, which stores the reference to the page-index entry 3354 in page-index 3230, which represents memory page 3360 ($PAGE_A). The TDB-Server 201 now iterates all head-blocks of the memory page 3360, and then continues iterating all head-blocks of memory page PAGE_M because the cell NEXT 3356 indicates that the memory page $PAGE_A continues on the memory page PAGE_M (not shown).

In the case that the TDB-Server 201 iterates over all instance of class "Invoice" in a normal (not buffered) transaction, the TDB-Server 201 also starts at head-block 1001, but then directly looks up the body-block 3037 referenced by the memory address F06 included in the cell BODY. The body-block 3037 includes a reference to the memory page PAGE_M in the cell INST 3344.

The following description describes an example database request 214 (illustrated below in the table labeled Request 12), which is received and proceed by the TDB-Server 201.

| REQUEST 12 |
| --- |
| 1 TRANSACTION (BUFFER #1) { |
| 2    UPDATE Invoice HAS total HOLDS DERIVED { SELF->+Article.(1.2*price);}; |
| 3 } |

As illustrated immediately above, this database request 214 (Request 12) includes a buffered transaction 215 that changes the code of the derived-token "total" so that the total of an invoice is calculated 20% higher (e.g., to include value-added tax).

Figure 34A:
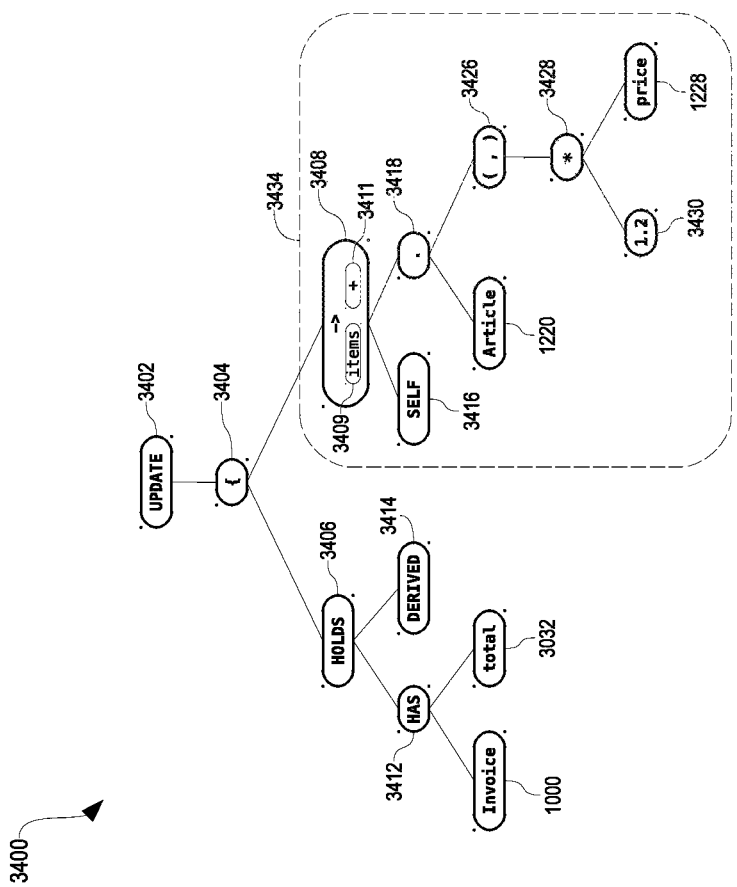
FIG. 34a illustrates an example execution tree of an example buffered transaction that includes an update statement in accordance with an example twelfth request.

FIG. 34a illustrates the execution tree 3400 for the buffered update statement of Request 12. The execution tree 3400 is similar to the execution tree 3000 illustrated in FIG. 30a, but differs in two places. First, the derived "total" 3032 was an unknown word in execution tree 3000, but is now a known token. Second, the execution-elements 3434—forming the code of the derived-token—additionally include operator MULTIPLY 3428, which is connected to the floating point number "1.2" 3430 and the relation "price" 1228.

Figure 34B:
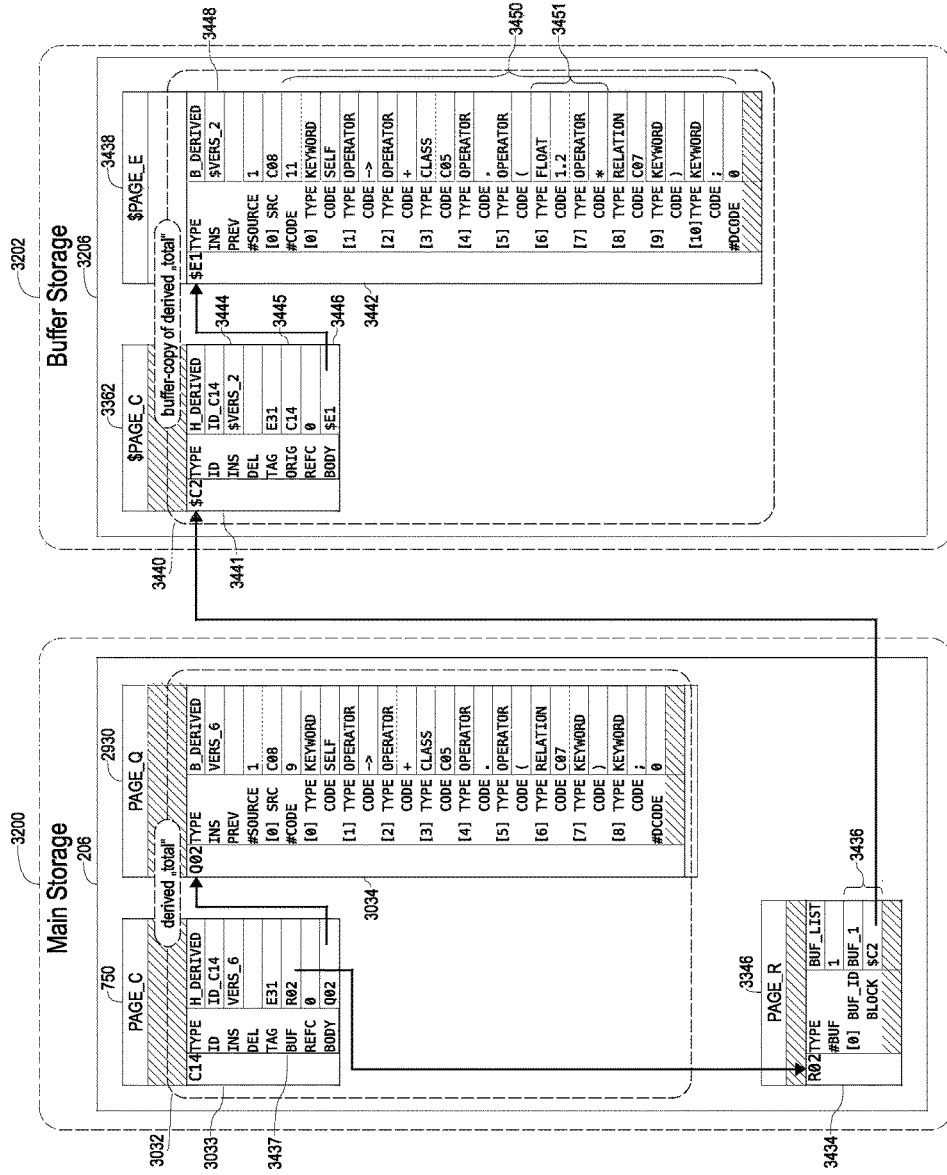

FIG. 34b illustrates the main storage 3200 and the buffer storage 3202, after the execution of the buffered update statement of Request 12, as set forth in the execution tree 3400.

The main storage 3200 includes the token memory 206, which includes memory pages 750, 2930, and 3346. The memory page 750 includes the head-blocks that represent tokens of the extended model 242, and the memory page 2930 includes the corresponding body blocks (e.g., body-block 3034). The memory page 3346 includes memory-block 3434, which includes a buffer-list.

Moreover, the buffer storage 3202 includes buffer token-memory 3206, which includes memory pages 3362 and 3438. The memory page 3362 includes head-blocks (e.g., derived head-block 3441) and the memory page 3438 includes corresponding body-blocks (e.g., derived body-block 3442).

In executing the execution tree 3400, the TDB-Server 201 starts execution with the operator 3402. The execution of operator 3402 generates a new version-identifier $VERS_2, and a corresponding transaction-index entry in the transaction-index of the buffer storage (not shown in FIG. 34b). The TDB-Server 201 continues with the execution of operator 3404. In doing so, the TDB-Server 201 inspects the left-hand-side of operator 3404 and finds the operator 3406 connected to operator 3412, which has the derived-token "total" 3422 connected to the right-hand-side. This indicates to the TDB-Server 201 that the derived-token "total" 3422 must be updated with the code of the execution-elements 3434 connected to the right-hand-side of operator 3404.

Accordingly, the TDB-Server 201 accesses the head-block 3033 of the derived "total" at memory address C14, and copies the contents of head-block 3033 into a newly generated head-block 3441 at memory address $C2 in the buffer storage 3202. Similarly, the TDB-Server 201 copies the contents of the corresponding body-block 3034 at memory address Q02 into a newly generated body-block 3442 at the memory address $E1 of the buffer storage 3202. As described earlier, the TDB-Server 201 updates the copied head-block 3441 so that it includes the active version-identifier $VERS_2 in cell INS 3444, a reference (memory address C14) to the original head-block 3033 in cell ORIG 3445, and a reference (memory address $E1) to the newly generated body-block 3442 in cell BODY 3446.

Thereafter, the TDB-Server 201 updates the body-block 3442 so that it includes the active version-identifier $VERS_2 in cell INS 3448 and the updated code of execution-elements 3434 in sub-index #CODE 3450. Moreover, the TDB-Server 201 inspects the changed (inserted) code-elements 3451. Because the TDB-Server 201 determines that these code-elements 3451 do not include references to other head-tokens in the extended model 242, the TDB-Server 201 does not need to update any sub-indices #DCODE.

Finally the TDB-Server 201 generates a buffer-list block 3434 at the memory address R02, inserts a buffer-list entry 3436, and stores a reference (memory address R02) to this buffer-list block in cell BUF 3437 of the head-block 3033.

The following description describes an example database request 214 (illustrated below in the table labeled Request 13), which is received and proceed by the TDB-Server 201.

| REQUEST 13 |
| --- |
| 1 TRANSACTION (BUFFER #1) { |
| 2    DELETE Article: :pencil; |
| 3 } |

As illustrated immediately above, this database request 214 (Request 13) includes a buffered transaction with one statement that deletes the instance "pencil" of class "Article". The buffered statement includes operator NAMESPACE (":"). The operator NAMESPACE connects words (tags) so that the connected words uniquely identify a token in the token database 238. The operator NAMESPACE is necessary in the statement of Request 13 because the word "pencil" can either refer to the instance "pencil" of class "Name" or to the instance "pencil" of the class "Article". Without the operator NAMESPACE identifying the class "Article", the TDB-Server 201 would not know which token should be deleted and thus would raise an "ambiguity" error during processing.

FIG. 35*a* illustrates execution tree 3500 for the delete statement of Request 13. The execution tree 3500 includes operators DELETE 3502 and NAMESPACE 3504, and further includes class "Article" 1220, and the ambiguous word "pencil" 3508.

FIG. 35*b* illustrates the main storage 3200 and the buffer storage 3202, after the execution of the delete statement in Request 13, as set forth in the execution tree 3500.

The main storage 3200 includes the token memory 206, which includes the memory pages 1313, 1530, 1670, and 3346. The memory page 1313 includes the head-blocks of instances of the class "Name". The memory page 1530 includes head-blocks of instance of the class "Article", and the memory page 1670 includes corresponding body-blocks. The memory page 3346 includes buffer-list blocks.

Moreover, the buffer storage 3202 includes the buffer token memory 3206, which includes memory page 3362. The memory page 3362 includes copies of head-blocks from the main storage 3200.

In executing the execution tree 3500, the TDB-Server 201 starts with the execution of the operator 3502, which generates a new version-identifier $VERS_3 and also generates a transaction-index entry in the transaction-index of the buffer storage 3202 (not shown in FIG. 35*b*). The execution continues with operator 3504. In this regard, the TDB-Server 201 finds the class "Article" 1220 and the apparently ambiguous word "pencil" 3508 connected to the operator 3504. The TDB-Server 201 thus resolves the ambiguous word "pencil" 3508 to the instance "pencil" 1536 of the class "Article".

Thereafter, the TDB-Server 201 accesses the head-block 1537 at memory address K01 for the instance "pencil" of class "Article", and copies the contents of head-block 1537 into the newly generated head-block 3518 in the buffer storage 3202. The TDB-Server 201 next updates the cell INS 3522 of the head-block 3518 to store the active version-identifier $VERS_3, and further updates the cell ORIG 3523 to store a reference (memory address K01) to the original head-block 1537. The TDB-Server 201 further stores the active version-identifier $VERS_3 in cell DEL 3524, which marks the head-block 3518 as deleted.

Moreover, the TDB-Server 201 inspects the connection-entries (e.g. 1542) that are included in body-block 1672 and finds that the connection-entry 1542 refers to the instance "pencil" of the class "Name". Accordingly, the TDB-Server 201 must now decrement the reference counter in cell REFC 3516 of head-block 1551 which represents the instance "pencil" of class "Name". As described earlier, in a buffered transaction the TDB-Server 201 does not generally change the memory cells in the main storage 3200 directly but executes the changes on copied cells in buffer storage 3202. The TDB-Server 201 thus copies the head-block 1551 into the newly generated head-block 3520, and updates the cells INS 3526 and ORIG 3527, as described hereinabove with reference to head-block 3518. Thereafter, the TDB-Server 201 decrements the reference counter stored in cell REFC 3528.

Finally, the TDB-Server 201 associates the newly generated head-blocks 3518 and 3520 with the corresponding head-blocks 1537 and 1551 in the main storage 3200. More specifically, the TDB-Server 201 generates and writes buffer-list blocks 3512 and 3514 at memory addresses R03 and R04 and stores references to these buffer-list blocks in the head-blocks 1537 and 1551, as illustrated by the arrows in FIG. 35*b*.

Flowchart of Method Implementing a Token-Based Database System

Figure 36:
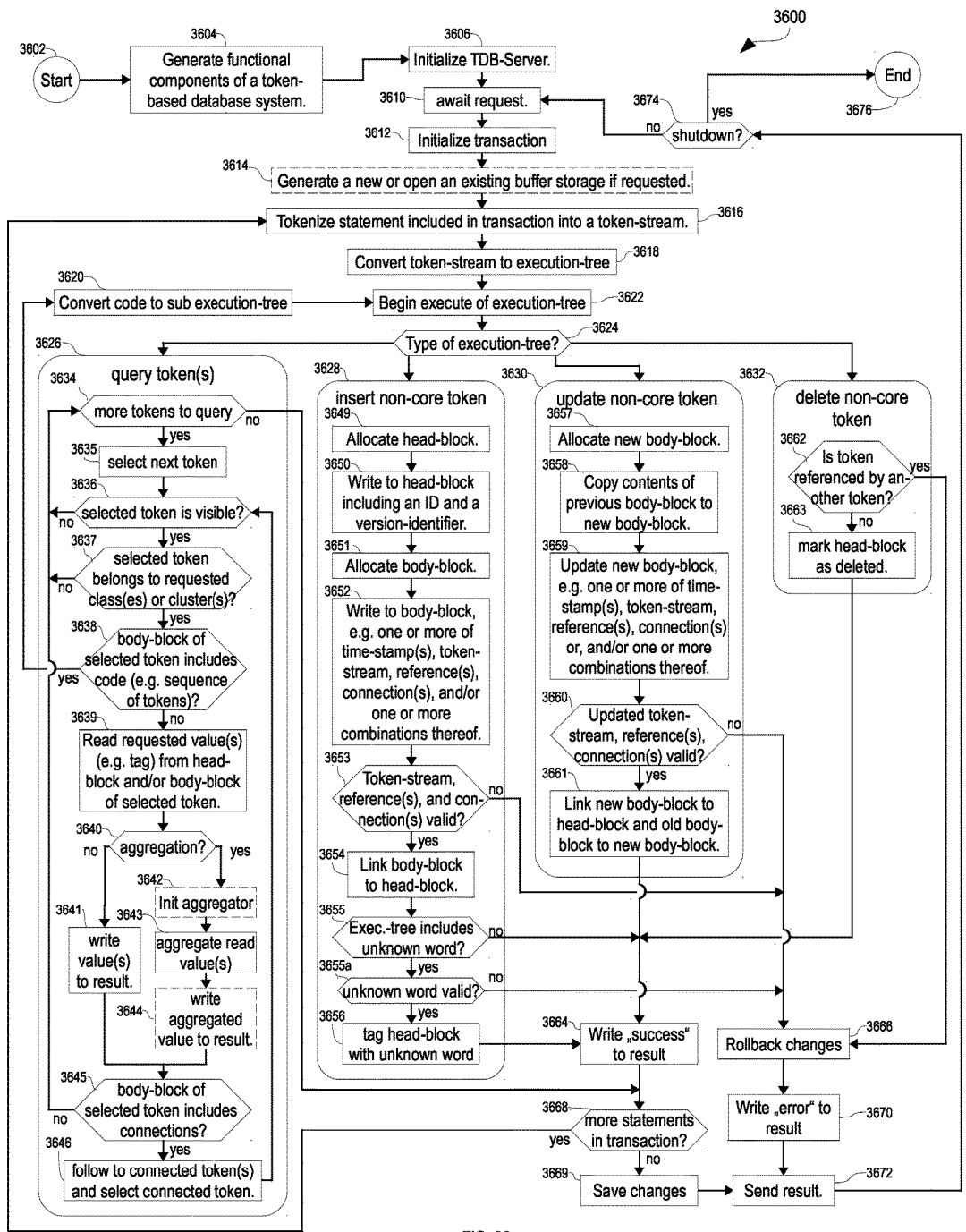
FIG. 36 illustrates a flowchart of an example method to implement a token-based database system.

FIG. 36 illustrates a flowchart of an example method 3600 to implement a token-based database system.

The method 3600 starts at operation 3602. At operation 3604, functional components of the token-based database system 100 are generated, as illustrated in FIG. 2*a*. More specifically, the working memory 102 includes a server memory 200, a processing memory 202, an index memory 204, and a token memory 206. Moreover, the permanent memory 110 includes an index file 208 and a token file 210, and the static memory 112 includes a default model 212.

At operation 3606, the TDB-Server 201 is initialized and further initializes the token-based system 100, as described with reference to example operation 260 in FIG. 2*c*. More specifically, indices 230-236 are generated in the index memory 204, and the token database 238 is generated in the token memory 206, as illustrated in FIG. 2*b*. Thereafter, the contents of the index file 208 are loaded into the index memory 204, and contents of the token file 210—including the core model 240—are loaded into the token memory 206, if the index file 208 and the token file 210 exist. If the index file 204 and the token file 210 do not exist, the core model 240 of the token database 238 is initialized in the token memory 206 using a basic core model included in the static memory 112, as described in FIG. 5. After initialization, the method continues with operation 3610 and awaits database requests 214, as described with reference to example operation 264 in FIG. 2*c*.

At operation 3612, the TDB-Server 201 has received a database request 214 and initializes processing of a first transaction 215 included in the database request 214, as described with reference to example operation 268 in FIG. 2*c*. More specifically, the structures 220-228 are generated and initialized in the processing memory 202, as described with reference to FIG. 6*a*.

At optional operation 3614, a new buffer storage is generated or an exiting buffer storage is opened based on the processed transaction 215, as described at least with reference to FIG. 32. If so, the following operations are thus performed in connection with the generated or opened buffer storage 3202. Alternatively, the following operations are performed in connection with the main storage 3200.

At operation 3616, a first or next statement 216 included in the processed transaction 215 is tokenized into a token stream, as described with reference to example tokenizing operation 272 in FIG. 2*c*. Thereafter, at operation 3618 the token-stream is converted to an execution tree, as described with reference to example parse operation 274 in FIG. 2*c*. At operation 3622, the execution of the execution tree is begun, as described with reference to example execution operation 276 in FIG. 2*c*.

At operation 3624, a determination is made as to the type of the execution tree that is being executed. The execution tree can be in connection with a query of one or more tokens 3626, an insert of a non-core token 3628, an update of a non-core token 3630, or a delete of a non-core token 3632.

If it is determined at operation 3624 that the execution-tree is in connection with a query of one or more tokens 3626, the method 3600 continues at operation 3634, where a determination is made as to whether there are more token to query (process). If it is determined that there are no more tokens to query at operation 3634, then the method 3600 continues at operation 3668, as will be described in greater detail below. However, if it is determined that there are more tokens to query at operation 3634, the method continues at operation 3635 where a token is selected. Thereafter, at operation 3636 a determination is made as to whether the selected token is visible.

If it is determined that the selected token is not visible, the method 3600 continues at operation 3634 in connection with querying further tokens, if any. However, if it is determined that the selected token is visible, the method 3600 continues at operation 3637 where a determination is made as to whether the selected token belongs to a requested class(es) or cluster(s). If it is determined that the selected token does not belong to the requested class(es) or cluster(s), the method 3600 continues at operation 3634 in connection with querying further tokens, if any. However, if determined that the selected token belongs to the requested class(es) or cluster(s), the method 3600 continues at operation 3638.

At operation 3638, a determination is made as to whether a body-block of the selected token includes code (e.g., a sequence of tokens). If is determined that the body-block of the selected token includes code, the method continues at operation 3620, where the code is converted to a sub execution tree, and execution of this sub execution tree is then begun at operation 3622 as already described hereinabove. After executing the sub execution tree, the method continues at operation 3639. However, if it is determined that the body-block of the selected token does not includes code, the method continues at operation 3639, where the requested value(s) (e.g., tag) are then read from a head-block and/or the body-block of the selected token.

Thereafter, at operation 3640 a determination is made as to whether aggregation of queried values is required. If it is determined that aggregation of the values is not required, then the queried value is written to a result at operation 3641. However, if it is determined that aggregation of the values is required, optional operations 3642-3644 are then performed. More specifically, at operation 3242 an aggregator is initialized for a first aggregated value. At operation 3642, the read value(s) are aggregated using the aggregator. At operation 3644, the aggregated value of the aggregator is written to the result after a last value has been aggregated. Thereafter, the method 3600 continues at operation 3645.

At operation 3645, a determination is made as to whether the body-block of the selected token includes connections. If it is determined that the body-block of the selected token does not include connections, the method 3600 continues at operation 3634 to query further tokens, if any. Operations 3634-3645 are performed for all selected tokens. However, if it is determined that the body-block of the selected token includes connections, the method 3600 continues at operation 3646 to follow the connected token(s) and selects a first connected token, as described with reference to FIG. 26b. Thereafter, the method 3600 continues at operation 3636 to process the connected token. Operations 3636-3646 are performed successively for any connected tokens.

Now back with reference to operation 3624, if it is determined that the execution-tree is in connection with the insert of a non-core token 3628, the method 3600 continues at operation 3649 where a head-block is allocated for the non-core token in the main storage or the buffer storage based on whether buffer storage is requested in operation 3614. At operation 3650, an ID and a version identifier are written to the head-block, which uniquely identifies the non-core token and when it was inserted, as described with reference to FIG. 4. At operation 3651, a body-block is allocated for the non-core token. For example, allocation of the body block is described with reference to FIG. 7.

At operation 3652, time-stamp(s), token-stream, reference(s), connection(s), and/or one or more combinations thereof, are written to the body-block, as described with reference to at least FIG. 14b (time-stamp(s) and connection(s)), FIG. 29b (token-stream), and FIG. 8b (reference(s)). At operation 3653 a determination is made as to whether the token-stream, reference(s), and connections of the body-block are valid, as also described in connection with the aforementioned figures. If it is determined that the token-stream, reference(s), and connections of the body-block are not valid, the method 3600 continues at operation 3666 to rollback the changes. However, if it is determined that the token-stream, reference(s), and connections of the body-block are valid, the body-block is linked to the head-block to form the non-core token. Thereafter, the method 3600 continues with operation 3655.

At operation 3655, a determination is made as to whether the execution tree includes an unknown word. If it is determined that the execution tree does not include an unknown word, then the method 3600 continues with operation 3664 at which a success indicator is written to the result, indicating the successful insertion of the non-core token. However, if the execution tree includes an unknown word, then the method continues at operation 3655a where a determination is made as to whether the unknown word is a valid tag for the head-block, as described with reference to FIG. 3c. If it is determined that the word is not a valid tag, then the method continues at operation 3666 to rollback the changes. However, if the word is a valid tag, then the method continues with operation 3656, where the unknown word is assigned as a tag to the head-block, as described with reference to FIG. 7.

Now back with reference to operation 3624, if it is determined that the execution-tree is in connection with the update of a non-core token 3630, the method 3600 continues at operation 3657 where a body-block is allocated for the non-core token to be updated in the main storage or the buffer storage based on whether buffer storage is requested in operation 3614. At operation 3658, contents of the previous body-block are written to the new body-block. At operation 3659, time-stamp(s), token-stream, reference(s), connection(s), and/or one or more combinations thereof, are written to the new body-block.

At operation 3660, a determination is made as to whether the token-stream, reference(s), and connection(s) of the new body-block are valid, as described with reference to at least FIG. 17b (connection(s)) and FIG. 30b (token-stream, and reference(s)). If it is determined that the token-stream, reference(s), and connections of the new body-block are not valid, the method 3600 continues at operation 3666 to rollback the changes. However, if it is determined that the token-stream, reference(s), and connections of the new body-block are valid, the new body-block is linked to the head-block, and then the previous body-block is linked (connected) to the new body-block to update the non-core token. Thereafter the method 3600 continues with operation 3668 where a success indicator is written to the result.

Now back with reference to operation 3624, if it is determined that the execution-tree is in connection with the delete of a non-core token 3632, the method 3600 continues at operation 3662, where a determination is made as to whether the head-block of the token to be deleted is referenced by another token, as described with reference to FIG. 31b. If it is determined that the head-block is referenced by another token, then the method 3600 continues with operation 3666 to rollback changes. However, if it is determined that the token is not referenced by another token, the method 3600 continues at operation 3663, where the head-block of the token to be deleted is marked as deleted by writing a delete version identifier to the head-block, as also described with reference to FIG. 31b. The method 3600 then continues to operation 3664 where a success marker is written to the result, and then the method 3600 continues to determination operation 3668.

At operation 3668, a determination is made as to whether the transaction 215 contains more statements 216. If it is determined that the transaction 215 does contain more statements 216, then the method continues at operation 3616 where a next statement 216 included in transaction 215 is tokenized and processed as described hereinabove. However, if the method 3600 determines that the transaction 215 does not contain more statements 216, then the method 3600 continues with operation 3669 where changes are saved. For example, the changes in the index memory 204 and/or token memory 206 are saved to the index-file 208 and/or token file 210, as described with reference to operation 278 in FIG. 2c.

If it is determined at operations 3653 or 3660 that a token-stream, reference, or connection is not valid, or if it is determined at operation 3655a that an unknown word was not valid, or if it is determined at operation 3662 that a token to be deleted is referenced by another token, then the method 3600 continues at operation 3666 to rollback changes. For example, any changes in the index memory 204 and/or token memory 206 are undone and memory is released, as described with reference to FIG. 7 and FIG. 13b. At operation 3670, an error indication is written to the result.

Thereafter, at operation 3672 the result generated in connection with the query, insert, update, or delete is sent to a requesting system 114. For example, the sending of the result is described with reference to operation 280. The method 3600 continues at operation 3674 where a determination is made as to whether the TDB-Server 201 is to be shutdown, e.g., by evaluating an interrupt signal generated by an on/off switch. If it is determined that the TDB-Server 201 is to be shutdown, then the method 3600 ends at operation 3676. Alternatively, if the TDB-Server 201 is not to be shutdown, then the method 3600 continues at operation 3610 and awaits the next request.

Block Diagram of a General Computer System

Figure 37:
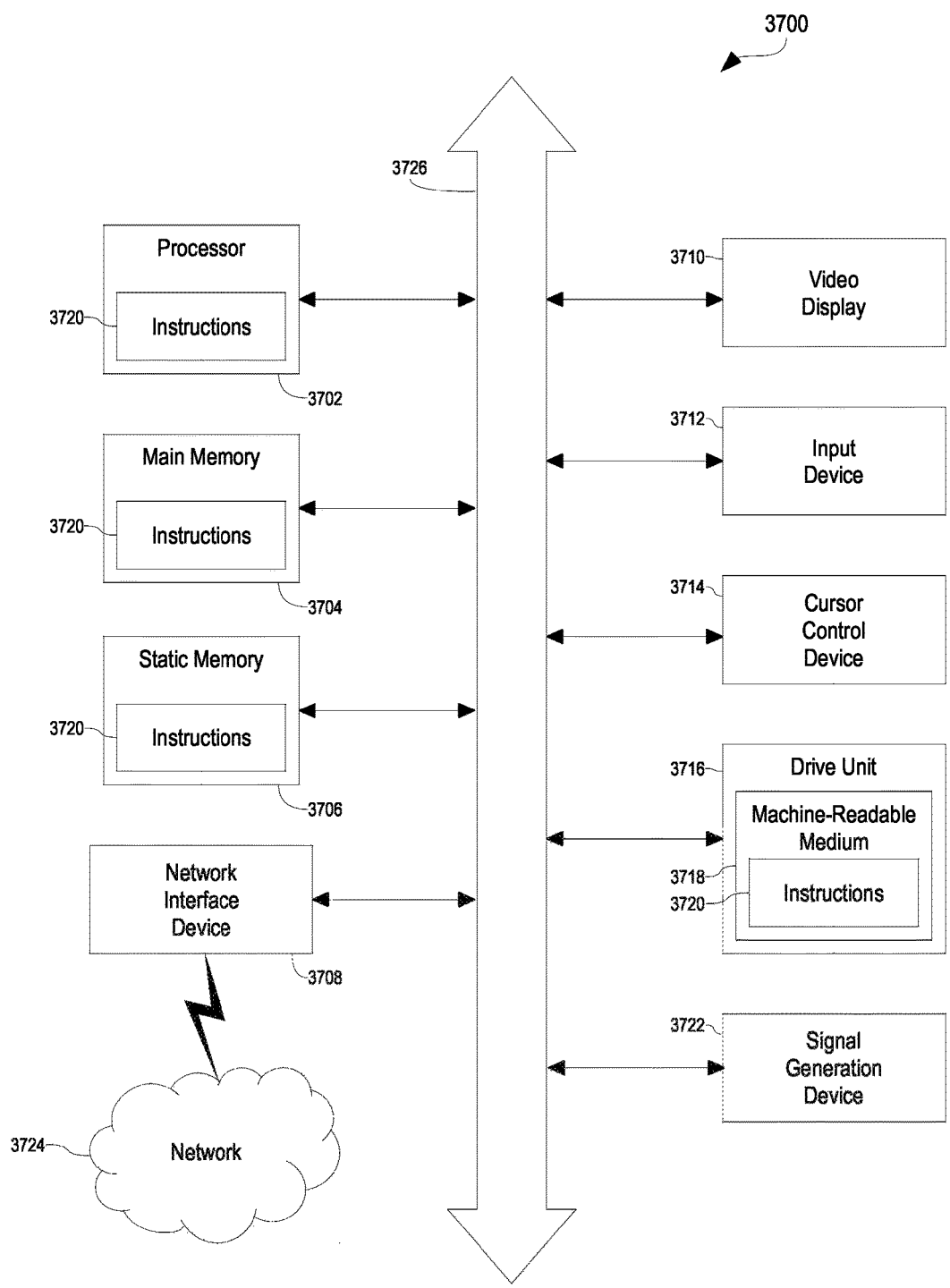
FIG. 37 illustrates a block diagram of a general computer system that can perform any one or more of the methods or computer based functions disclosed herein.

FIG. 37 is a block diagram of an illustrative embodiment of a general computer system 3700. The computer system 3700 can include a set of instructions that can be executed to cause the computer system 3700 to perform any one or more of the methods or computer based functions disclosed herein in FIGS. 1-36. The computer system 3700, or any portion thereof, may operate as a standalone device or may be connected, e.g., using a network or other connection, to other computer systems or peripheral devices. For example, the computer system 3700 may be the token-based database system 100, and may further be connected to other systems and devices, such as computing systems 114, via a network.

The computer system 3700 may also be implemented as or incorporated into various devices, such as a personal computer (PC), a tablet PC, a personal digital assistant (PDA), a mobile device (e.g., smartphone), a palmtop computer, a laptop computer, a desktop computer, a communications device, a control system, a web appliance, or any other machine capable of executing a set of instructions (sequentially or otherwise) that specify actions to be taken by that machine. Further, while a single computer system 3700 is illustrated, the term "system" shall also be taken to include any collection of systems or sub-systems that individually or jointly execute a set, or multiple sets, of instructions to perform one or more computer functions.

As illustrated in FIG. 37, the computer system 3700 may include a processor 3702, e.g., a central processing unit (CPU), a graphics-processing unit (GPU), or both. Moreover, the computer system 3700 may include a main memory 3704 and a static memory 3706 that can communicate with each other via a bus 3726. As shown, the computer system 3700 may further include a video display unit 3710, such as a liquid crystal display (LCD), an organic light emitting diode (OLED), a flat panel display, a solid state display, or a cathode ray tube (CRT). Additionally, the computer system 3700 may include an input device 3712, such as a keyboard, and a cursor control device 3714, such as a mouse. The computer system 3700 can also include a disk drive (or solid state) unit 3716, a signal generation device 3722, such as a speaker or remote control, and a network interface device 3708.

In a particular embodiment or aspect, as depicted in FIG. 37, the disk drive (or solid state) unit 3716 may include a computer-readable medium 3718 in which one or more sets of instructions 3720, e.g., software, can be embedded. Further, the instructions 3720 may embody one or more of the methods or logic as described herein. In a particular embodiment or aspect, the instructions 3720 may reside completely, or at least partially, within the main memory 3704, the static memory 3706, and/or within the processor 3702 during execution by the computer system 3700. The main memory 3704 and the processor 3702 also may include computer-readable media.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computer systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computer system processing can be constructed to implement one or more of the methods or functionality as described herein.

It is also contemplated that a computer-readable medium includes instructions 3720 or receives and executes instructions 3720 responsive to a propagated signal, so that a device connected to a network 3724 can communicate voice, video or data over the network 3724. Further, the instructions 3720 may be transmitted or received over the network 3724 via the network interface device 3708.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Thus, a token-based database system and a method of interfacing with the token-based database system have been described. Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

The invention claimed is:

1. A token-based database system comprising:
a processing device; and
a memory device storing instructions that, when executed by the processing device, cause the processing device to perform operations comprising:
accessing in a memory a token database that includes a core model, the core model including one or more core model tokens that provide default functionality;
generating in the token database an extended model, the extended model including one or more non-core extended model tokens, the extended model tokens conforming to the core model and referencing the core model tokens;
generating in the token database one or more non-core instance tokens, the instance tokens conforming to the extended model and referencing the extended model tokens, each of the instance tokens configured to have zero or more connections connecting to other instance tokens, wherein the token database comprises a plurality of tokens that includes the core model tokens, the extended model tokens, and the instance tokens;

associating a token with a version identifier in the token database, the version identifier associated with a system-generated date and time of one or more of insertion, update, and deletion of the token in the token database; and associating a connection with a version identifier in the token database, the version identifier associated with a system-generated date and time of one or more of insertion, update, and deletion of the connection in the token database.

2. The system of claim 1, wherein the operations further comprise differentiating the extended model tokens into one or more of class tokens, cluster tokens, relation tokens, derived tokens, and combinations thereof.

3. The system of claim 2, wherein a relation token references:

one or more connections amongst instance tokens;

a source token being one of a class token and a cluster token, the source token representing a source of the connection; and a target token being one of a class token and a cluster token, the target token representing a target of the connection.

4. The system of claim 3, wherein the relation token includes one or more connection options associated with the connection amongst the instance tokens, the connection options comprising:

a constant option indicating that an associated connection is constant and cannot change over time;

a variable option indicating that an associated connection is variable and changeable over time;

a copied option indicating that an associated connection must generate an immutable copy of one or more instance tokens associated with the connection; and a linked option indicating that an associated connection must not generate an immutable copy of one or more instance tokens associated with the connection.

5. The system of claim 1, wherein the operations further comprise:

associating an instance token with at least one of a first history identifier and a second history identifier, the first history identifier associated with a user-selected date and time when the instance token was generated in the real world, the second history identifier associated with a user-selected date and time when the instance token was deleted in the real world; and associating a connection with at least one of a first history identifier and a second history identifier, the first history identifier indicating a user-selected date and time when the connection was generated in the real world, the second history identifier indicating a user-selected date and time when the connection was deleted in the real world.

6. The system of claim 1, wherein the operations further comprise associating a token with a tag in the token database, the tag including a word and a language identifier, the word distinctively identifying the token using a language associated with the language identifier in the token database.

7. The system of claim 1, wherein the operations further comprise:

generating an execution tree based on a sequence of tokens, the execution tree including a plurality of nodes, a node of the execution tree being associated with one or more tokens; and associating the execution tree with a current version identifier of the token database.

8. The system of claim 7, wherein the operations further comprise executing one or more nodes of the execution tree associated with inserting a token into the token database.

9. The system of claim 8, wherein operations of inserting the token comprise:

allocating a head block and a body block associated with the token in the token database;

writing to the head block an identifier and the current version identifier, the identifier identifying the head block in the token database;

writing to the body block the current version identifier and one or more of a history identifier, a token sequence, a reference, a connection, and a combination of one or more thereof; and linking the body block to the head block.

10. The system of claim 7, wherein the operations further comprise:

converting text of a database request into the sequence of tokens and an unknown word; and generating the execution tree based on the sequence of tokens and the unknown word, a node of the execution tree being associated with the unknown word.

11. The system of claim 10, wherein the operations further comprise executing one or more nodes of the execution tree associated with inserting a token into the token database.

12. The system of claim 11, wherein operations of inserting the token comprise:

allocating a head block and a body block associated with the token in the token database;

writing to the head block an identifier and the current version identifier, the identifier identifying the head block in the token database;

writing to the body block the current version identifier and one or more of a history identifier, a token sequence, a reference, a connection, and a combination of one or more thereof; and linking the body block to the head block.

13. The system of claim 12, wherein the operations further comprise associating the token with a tag represented by the unknown word, the tag distinctively identifying the token in the token database.

14. The system of claim 7, wherein the operations further comprise executing one or more nodes of the execution tree associated with generating a connection amongst a first instance token and a second instance token in the token database.

15. The system of claim 14, wherein the operations further comprise:

writing a connection entry to a body block of the first instance token, the connection entry including a reference to a head block of the second instance token;

validating the connection entry against a relation token that references the connection entry to determine whether the second instance token is referenced by a target token of the relation token, the target token being one of a class token and a cluster token; and validating whether one or more connection options included in the relation token are satisfied, the relation token being associated with the connection.

16. The system of claim 15, wherein the operations further comprise:
   determining whether the relation token includes a copied option that is set; and
   writing the current version identifier to the connection entry based on determination that the copied option is set.

17. The system of claim 7, wherein the operations further comprise executing one or more nodes of the execution tree associated with inserting a sequence of tokens into a token of the token database, the token being one of a cluster token and a derived token, the cluster token referencing one or more instance tokens that conform to one or more conditions associated with the cluster token, the derived token referencing one or more instance tokens that are derived or calculated according to code associated with the derived token.

18. The system of claim 17, wherein operations of inserting the sequence of tokens comprise:
   allocating a body block associated with the token;
   writing the sequence of tokens to the body block of the token;
   test generating a second execution tree based on the sequence of tokens, the second execution tree including a second plurality of nodes; and
   linking the body block to a head block associated with the token based on a successful test generation of the second execution tree.

19. The system of claim 7, wherein the operations further comprise executing one or more nodes of the execution tree associated with querying one or more tokens in the token database.

20. The system of claim 19, wherein the operations further comprise determining the visibility of a token being queried.

21. The system of claim 20, wherein operations determining visibility further comprise testing one or more of whether the token is not marked as deleted, a version of the token is smaller than the current version identifier of the execution tree, and the version of the token matches a visible version range that is associated with the execution tree.

22. The system of claim 19, wherein the operations further comprise:
   determining whether the execution tree is associated with buffered storage; and
   accessing a buffered token in a buffer storage associated with a token being queried, the token being queried being in a main storage.

23. The system of claim 19, wherein a token being queried is an instance token, the operations further comprise:
   determining whether the instance token belongs to one of a class and a cluster that is associated with a node in the execution tree; and
   determining whether the instance token is visible based on a comparison of a history identifier associated with the instance token against a visible time range associated with the execution tree.

24. The system of claim 19, wherein the operations further comprise:
   reading one or more values from at least one of a head block and a body block of a token being queried in the token database; and
   appending the one or more values to a result that is associated with execution of the execution tree.

25. The system of claim 19, wherein a token being queried is a derived token, the operations further comprise:
   generating a sub-execution tree based on a sequence of tokens included in the derived token;
   executing the sub-execution tree that queries at least one second token in the token database;
   reading one or more second values from at least one of a head block and a body block of the at least one second token being queried in the token database;
   appending the one or more second values to a sub result that is associated with execution of the sub-execution tree; and
   appending the one or more second values of the sub result to one or more values of a result associated with execution of the execution tree.

26. The system of claim 7, wherein the operations further comprise executing one or more nodes of the execution tree associated with following a connection amongst instance tokens, the connection comprising a reference to a source instance token, a reference to a target instance token, a reference to a relation token, a version identifier, and a history identifier.

27. The system of claim 26, wherein the operations further comprise determining visibility of the connection.

28. The system of claim 27, wherein operations of determining visibility comprise:
   comparing the version identifier against the current version identifier and a visible version range associated with the execution tree; and
   comparing the history identifier against a visible time range associated with the execution tree.

29. The system of claim 27, wherein operations of following the connection comprise:
   determining whether the connection comprises a copy version identifier indicating a latest version of the target instance token that is accessible;
   determining whether the target instance token is visible based on the copy version identifier; and
   processing the target instance token based on a successful determination of visibility.

* * * * *